(12) United States Patent
Bunton

(10) Patent No.: US 7,010,607 B1
(45) Date of Patent: Mar. 7, 2006

(54) METHOD FOR TRAINING A COMMUNICATION LINK BETWEEN PORTS TO CORRECT FOR ERRORS

(75) Inventor: William P. Bunton, Pflugerville, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 763 days.

(21) Appl. No.: 09/661,214

(22) Filed: Sep. 14, 2000

Related U.S. Application Data

(60) Provisional application No. 60/154,150, filed on Sep. 15, 1999.

(51) Int. Cl.
*G06F 15/16* (2006.01)

(52) U.S. Cl. .................... 709/228; 709/237
(58) Field of Classification Search ........... 710/60–61; 707/227–237; 709/227–237, 248; 370/241, 370/242, 252, 465, 503
See application file for complete search history.

(56) References Cited

U.S. PATENT DOCUMENTS

| | | | | |
|---|---|---|---|---|
| 4,570,220 A | * | 2/1986 | Tetrick et al. | 710/306 |
| 4,584,684 A | * | 4/1986 | Nagasawa et al. | 714/749 |
| 4,674,037 A | * | 6/1987 | Funabashi et al. | 713/600 |
| 5,548,732 A | * | 8/1996 | Hoashi et al. | 710/105 |
| 5,600,793 A | * | 2/1997 | Nord | 709/230 |
| 5,835,498 A | * | 11/1998 | Kim et al. | 370/537 |
| 5,961,616 A | * | 10/1999 | Wakasugi et al. | 710/65 |
| 6,202,096 B1 | * | 3/2001 | Williams et al. | 709/230 |
| 6,493,320 B1 | * | 12/2002 | Schober et al. | 370/241 |
| 6,493,343 B1 | * | 12/2002 | Garcia et al. | 370/394 |
| 6,667,993 B1 | * | 12/2003 | Lippett et al. | 370/509 |

\* cited by examiner

*Primary Examiner*—Marc D. Thompson

(57) ABSTRACT

A technique for training links in a computing system is disclosed. In one aspect, the technique includes configuring a first receiver in a first port using a first training sequence or a second training sequence; transmitting the second training sequence from the first port indicating the first receiver is configured; and receiving a second training sequence transmitted by a second port at the first port, the second training sequence transmitted by the second port indicating that a second receiver in the second port is configured. In a second aspect, the technique includes locking a communication link; handshaking across the locked link to indicate readiness for data transmission; transmitting information after handshaking across the locked link. And, in a third aspect, the technique includes transmitting a first training sequence from a first port and a second port; and synchronizing the receipt of the first training sequence at the first and second ports; transmitting a second training sequence from the first and second ports upon the synchronized receipt of the first training sequence at the first and second ports; and receiving the second training sequence transmitted by the first and second ports and the second and first ports, respectively, in synchrony.

29 Claims, 49 Drawing Sheets

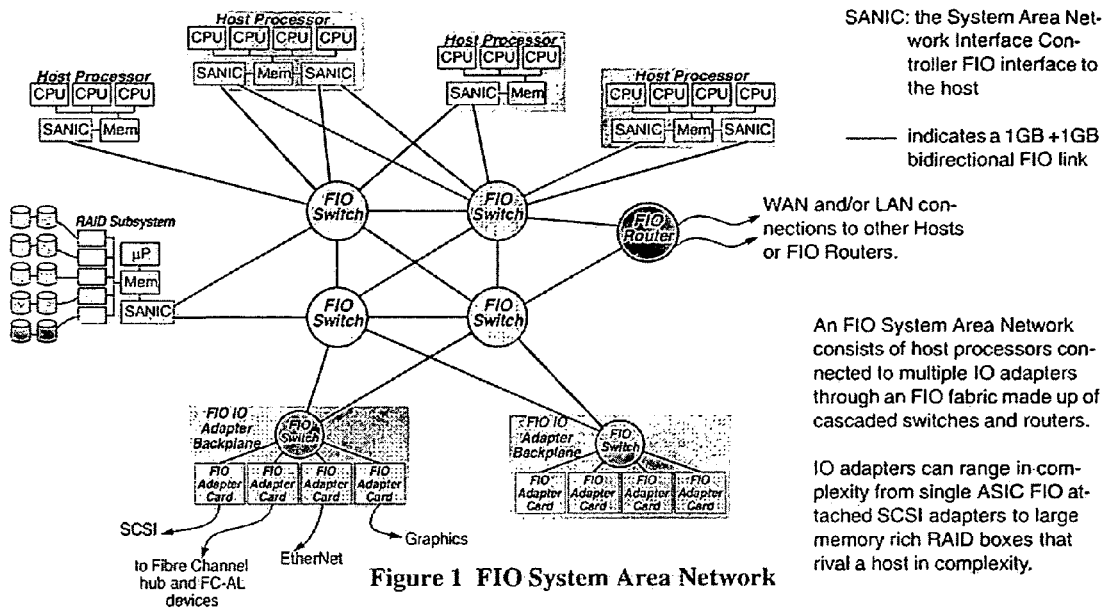

SANIC: the System Area Network Interface Controller FIO interface to the host

——— indicates a 1GB +1GB bidirectional FIO link

WAN and/or LAN connections to other Hosts or FIO Routers.

An FIO System Area Network consists of host processors connected to multiple IO adapters through an FIO fabric made up of cascaded switches and routers.

IO adapters can range in complexity from single ASIC FIO attached SCSI adapters to large memory rich RAID boxes that rival a host in complexity.

Figure 1 FIO System Area Network

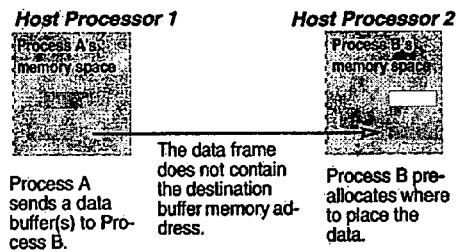

Process A sends a data buffer(s) to Process B.

The data frame does not contain the destination buffer memory address.

Process B pre-allocates where to place the data.

Figure 2 Data Transfer with Channel Semantics

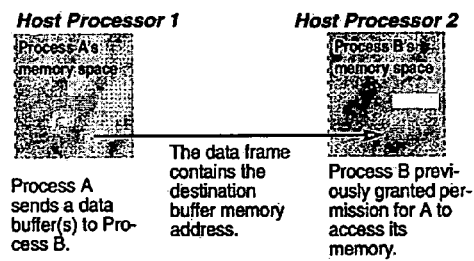

Process A sends a data buffer(s) to Process B.

The data frame contains the destination buffer memory address.

Process B previously granted permission for A to access its memory.

Figure 3 Data Transfer with Memory Semantics

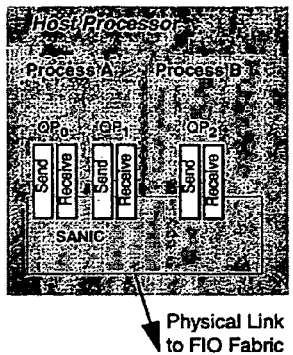
Figure 4 FIO Client Processes Communicates With FIO Hardware Through Queue Pairs
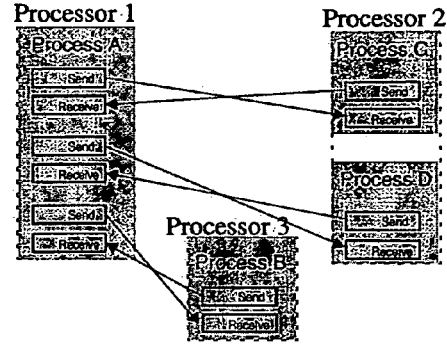
Figure 5 Connected Queue Pairs
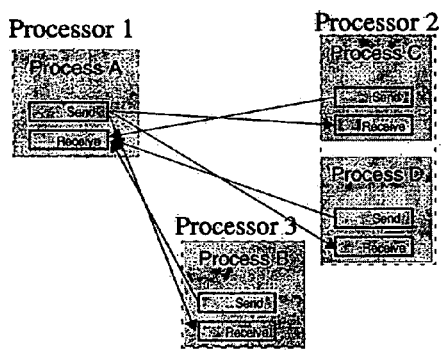
Figure 6 Connectionless Queue Pairs
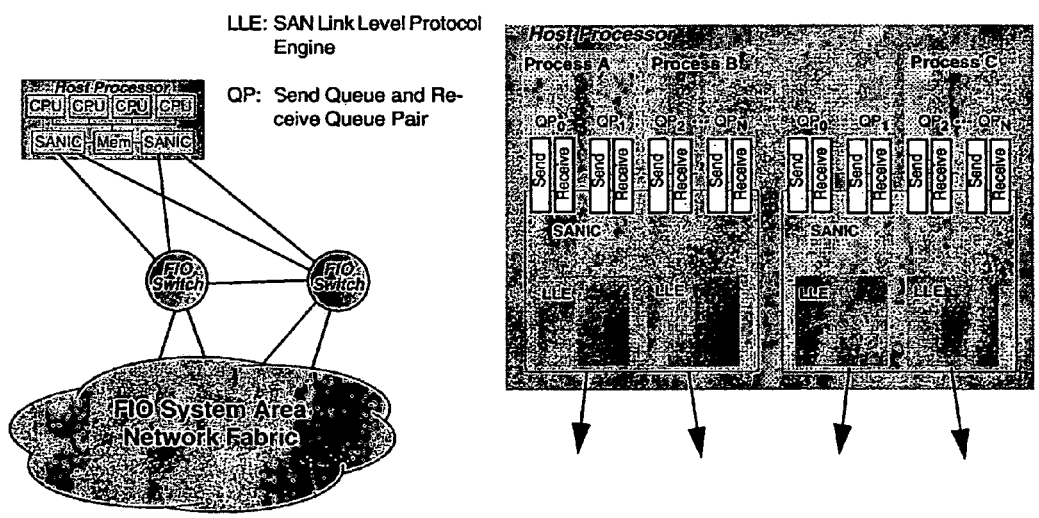
Figure 7 Multiple SANICs per host and multiple ports per SANIC

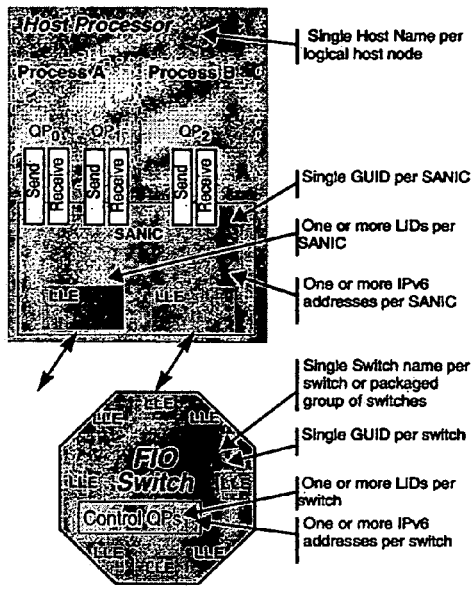
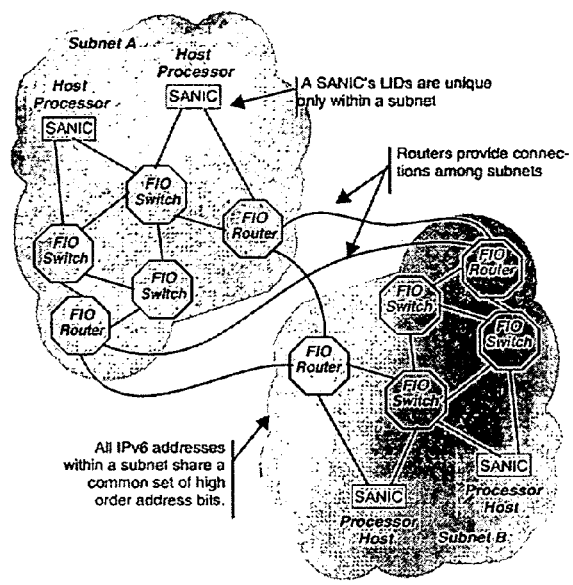
Figure 8 Identifying Names for LLEs, SANICs, etc.
Figure 9 Subnets and Local Identifiers (LIDs)
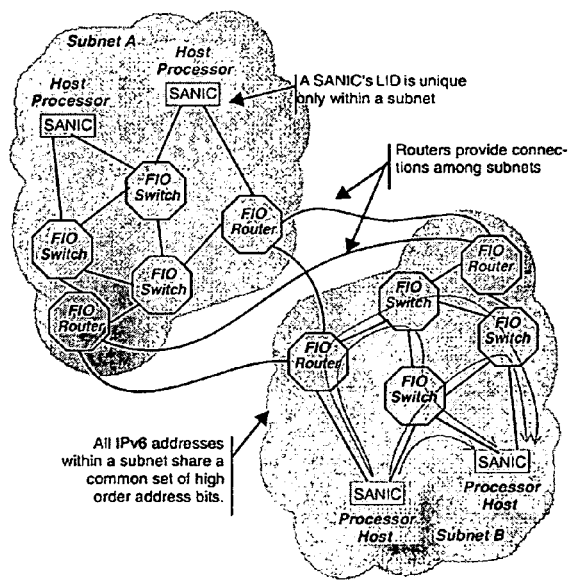
Figure 10 Paths Within and Among Subnets Figure 14 Remote I/O - Active Backplane
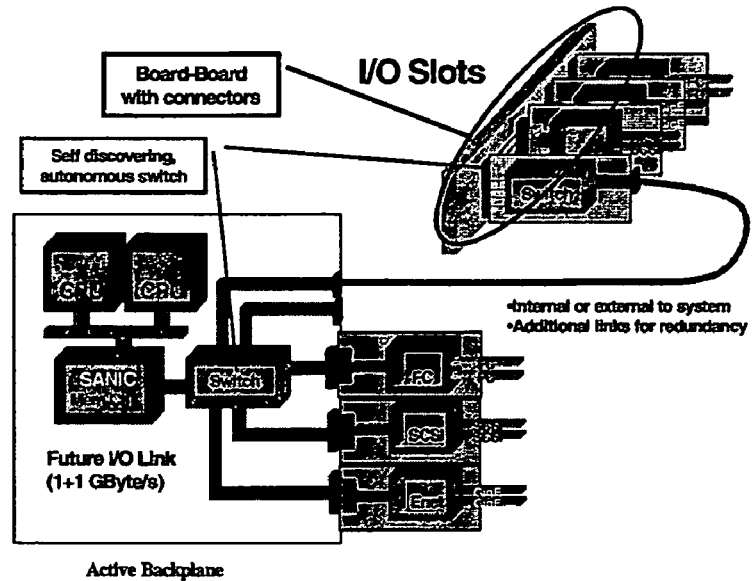
Figure 15 Remote I/O - Passive Backplane
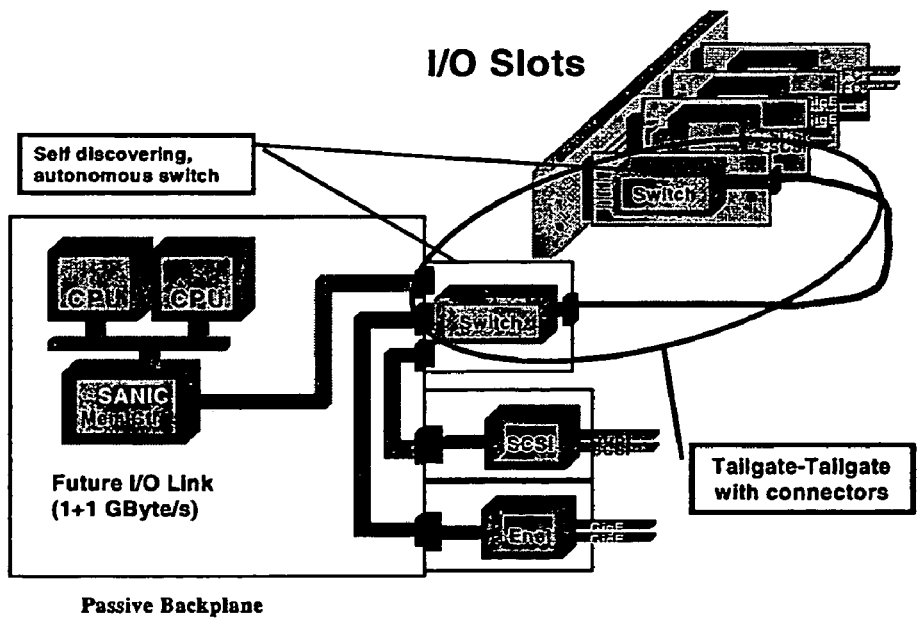

Figure 16 Chassis-to-Chassis Topology
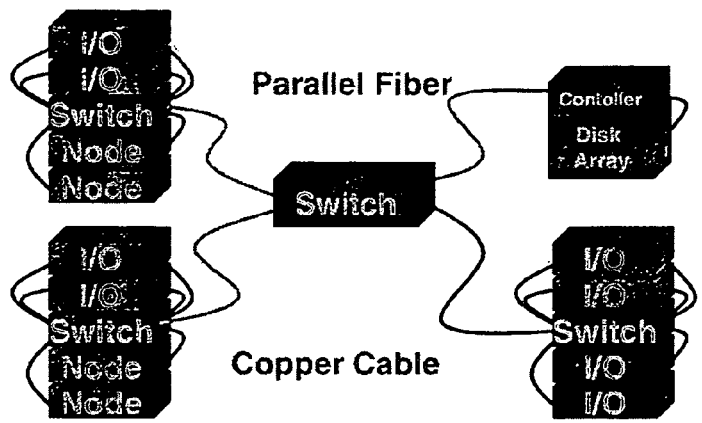
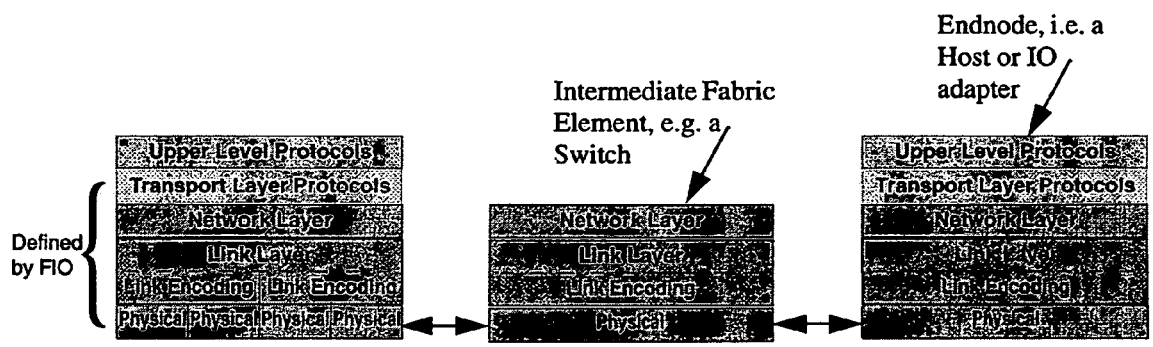
Figure 17 FIO Architecture Layers
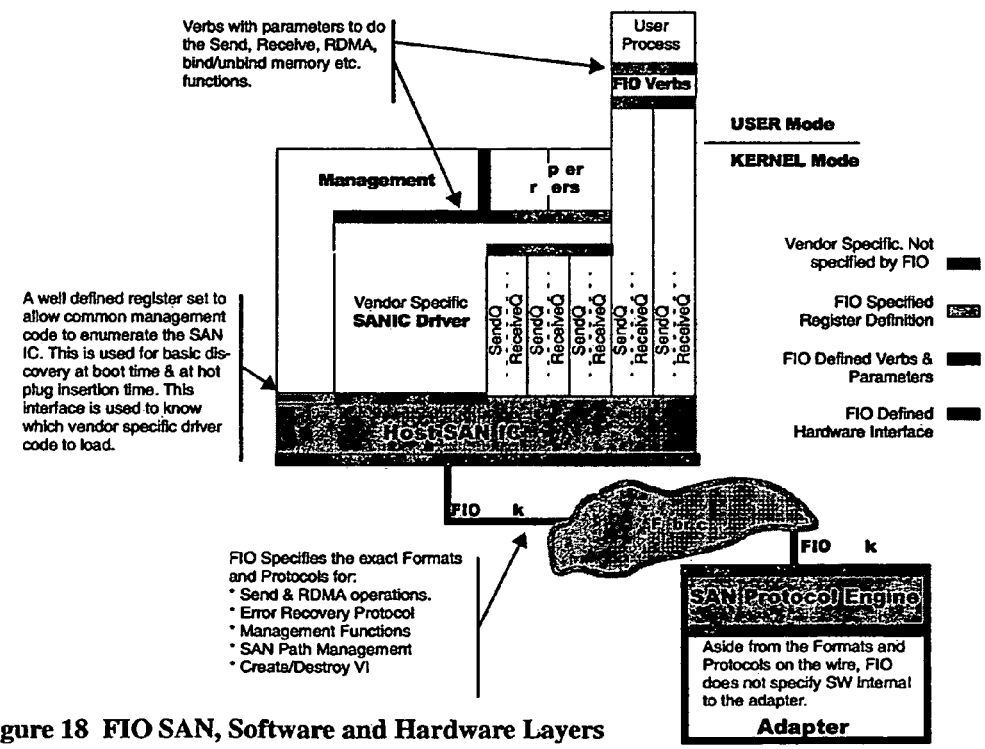
Figure 18 FIO SAN, Software and Hardware Layers

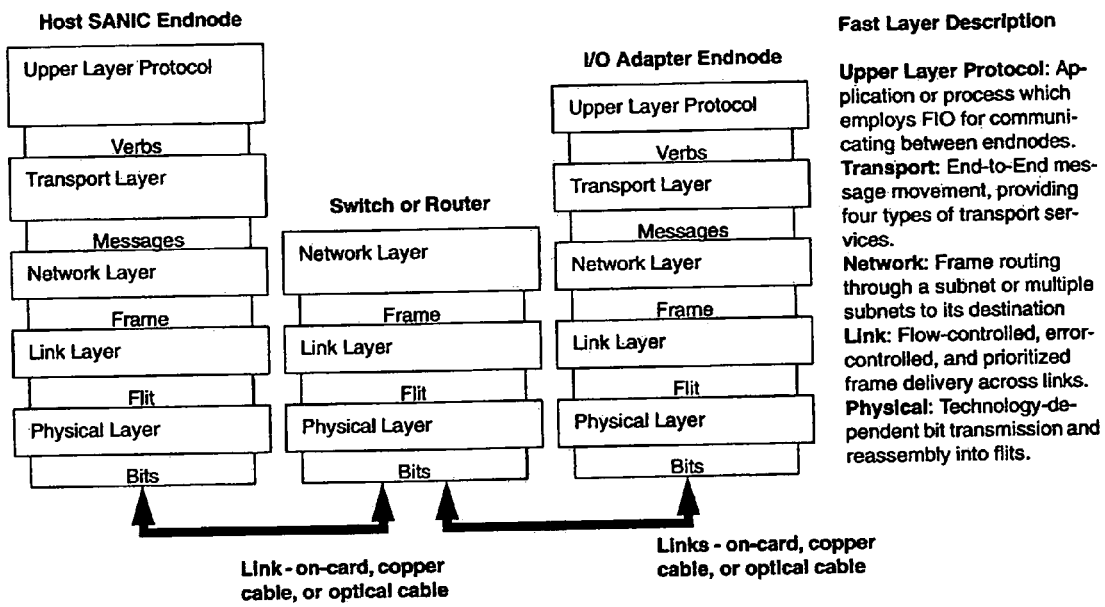
Figure 19 Future I/O Layered Architecture
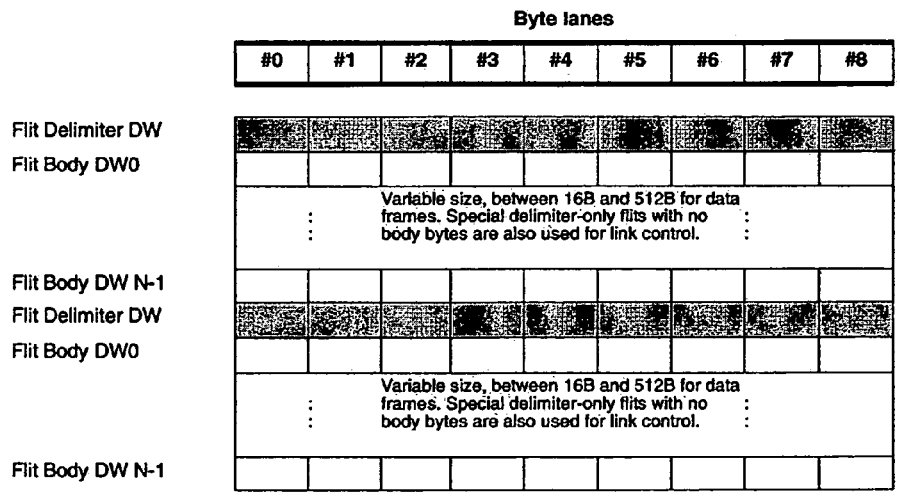
Figure 20 Data flow of flit delimiters and flit body data in flit layer Figure 21  Flit Delimiter Fields

| Byte | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 0 | TYPE ||| VL |||| SIZE |||||| rsvd |||
| 2 | SEQ ||||||||||||||||
| 4 | FECN || FFC |||| CRVL |||| CR ||||||
| 6 | LCRC ||||||||||||||||

Flit Header Field Definitions

| | | |
|---|---|---|
| Flit Header for following flit | TYPE (3b) | Type of following flit |
| | VL - Virtual Lane (4b) | Virtual Lane, in range 0-15 |
| | SIZE (6b) | Flit size = 8 * SIZE (in bytes), SIZE = 0b00000 may either mean 0 bytes, or 512 bytes, depending on TYPE - see Figure 22 on page 55. |
| | SEQ - Sequence Number (16b) | Flit Sequence Number of following flit, only used for sequenced flits |
| Network | FECN (2b) | Forward Explicit Congestion Notification - End-to-End notification to frame destinations that the frames experienced congestion in the fabric - this information is fed back to the frame source in the ACK, to assist source injection rate control for congestion avoidance. |
| | FFC (4b) | Forward Flow Control - Indication, at each switch stage, of how many input ports at the preceding switches in the network have data queued for the same output port and VL. This information is aggregated through the network, so that the switch arbitration engines at following switch stages in the network can adjust policies for greater fairness across sources. |
| Link Flow control and error control | CRVL (4b) | Virtual Lane for which credit is being given in the CR field |
| | CR - Credit (4b) | Number of 64-Byte flit buffer slots that have been freed up to accept more flit body data. |
| | LCRC = Link-level CRC (16b) | Covers flit body of preceding flit and preceding fields of the delimiter. Uses $x^{16} + x^{12} + x^{5} + 1$ CRC polynomial. |

Figure 22 Flit TYPE definition

| TYPE | Usage | Description | SIZE | VL | SEQ | CRVL/CR | Flit Body |
|---|---|---|---|---|---|---|---|
| 0 | Link Idle/Ack | Used when there are no other flits to send. Acknowledges flits received in the opposite direction across the link | SIZE=0; size is 8 bytes | 15 | Carries Seq number of last flit received correctly | 0/15 at sender Ignored receiver | none |
| 1 | Credit-only | used to carry credit update information when there are no Frame flits to send. | Size=0; size is 8 bytes | 15 - doesn't require credit | 0x000-0x7FE, incrementing | CRVL indicates which VL is being given transmission credit. CR indicates how many 64-byte flit buffer credits are being given. | none |
| 2 | Frame: First | Frame Flits These flits are used for transporting frames between FIO components. | Normal Flit contains 16*SIZE Bytes of body data. (0b00000 = 512B) | 0-14 for Data Fames, 15 for Management/Network Control Frames | 0x000-0x7FE, incrementing | | 16B-512B, indicated by SIZE field |
| 3 | Frame: Middle | | | | | | |
| 4 | Frame: Last | | | | | | |
| 5 | Frame: First and Last | | | | | | |
| 6 VL is used as sub-type, and no credit is required to send. | Init | (Initializes all flit-level parameters: VL credit to 0 on all VLs, clear all ECRC accumulators, clear SEQ to 0x000, etc.) | Size=0; size is 8 bytes | 0 | 0x7FF unsequenced | 0/15 at sender Ignored by Receiver | none |
| | Pong - Link Control | Sent to acknowledge reception of a Ping flit. Not retransmitted. | Size=0; size is 8 bytes | 1* | 0x7FF unsequenced | | none |
| | Ping - Link Control | Used during link initialization with the Pong flit to time the length of the link | Size=0; size is 8 bytes | 2* | 0x7FF unsequenced | | none |
| | TOD Control Frame | Time-of-Day frame - Not retransmitted, since a retransmit would contain the "old" (incorrect) time. | Normal | 3 | 0x7FF unsequenced | | 16B-512B, indicated by SIZE |
| | reserved - | Ignored by receiver, logged and reported as an error | | 4-15 | | | |
| 7 | reserved - | Ignored by receiver, logged and reported as an error | | | | | |

Figure 23 Flit Transmission Priority

| Priority | Level | Flit Type Commentary |
|---|---|---|
| 1 | Time-of-Day Service Packets | Require near-real-time processing. A returned Time-of-Day (transmitted in response to a received one) should have higher priority than one being initiated. |
| 2 | Link Control Flits - Required Link Ack/Idles, Init | Ack/Idles must be sent at regular intervals to prevent sender time-out retransmission. If |
| 3 | VL15 (Management) | Used for management frames on the management VL |
| 3 | VL0 - VL14 frame Flits | Normal traffic - Configurable VL arbitration engine determines which VL to transmit from, based on overall network quality-of-service objectives. |
| 4 | Credit-only Flits - If no other traffic to send. | |
| 5 | Ack/Idle Flits If no other traffic or credits to send. | |

Figure 28 Future I/O Layered Architecture

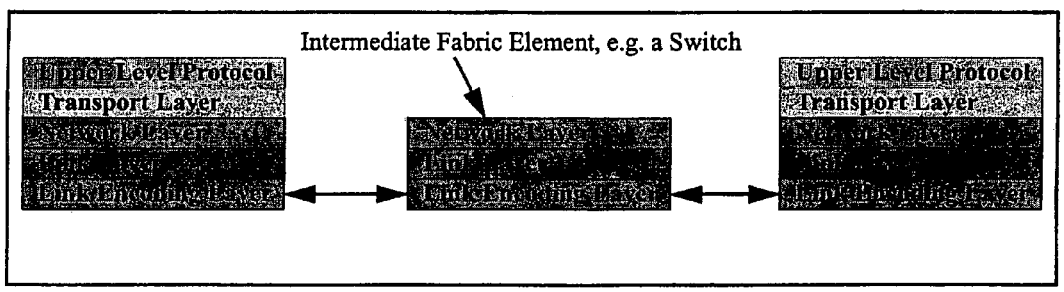

Figure 29 Sample Point-to-point Topologies

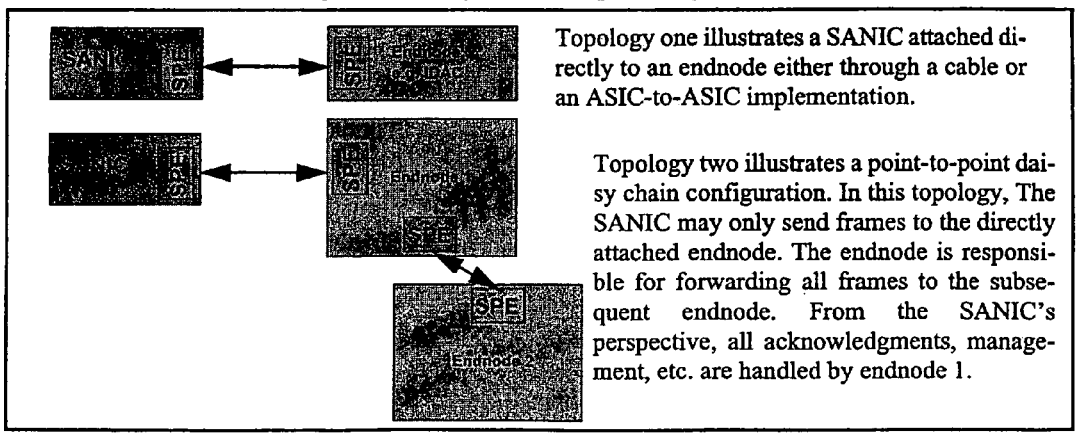

Topology one illustrates a SANIC attached directly to an endnode either through a cable or an ASIC-to-ASIC implementation.

Topology two illustrates a point-to-point daisy chain configuration. In this topology, The SANIC may only send frames to the directly attached endnode. The endnode is responsible for forwarding all frames to the subsequent endnode. From the SANIC's perspective, all acknowledgments, management, etc. are handled by endnode 1.

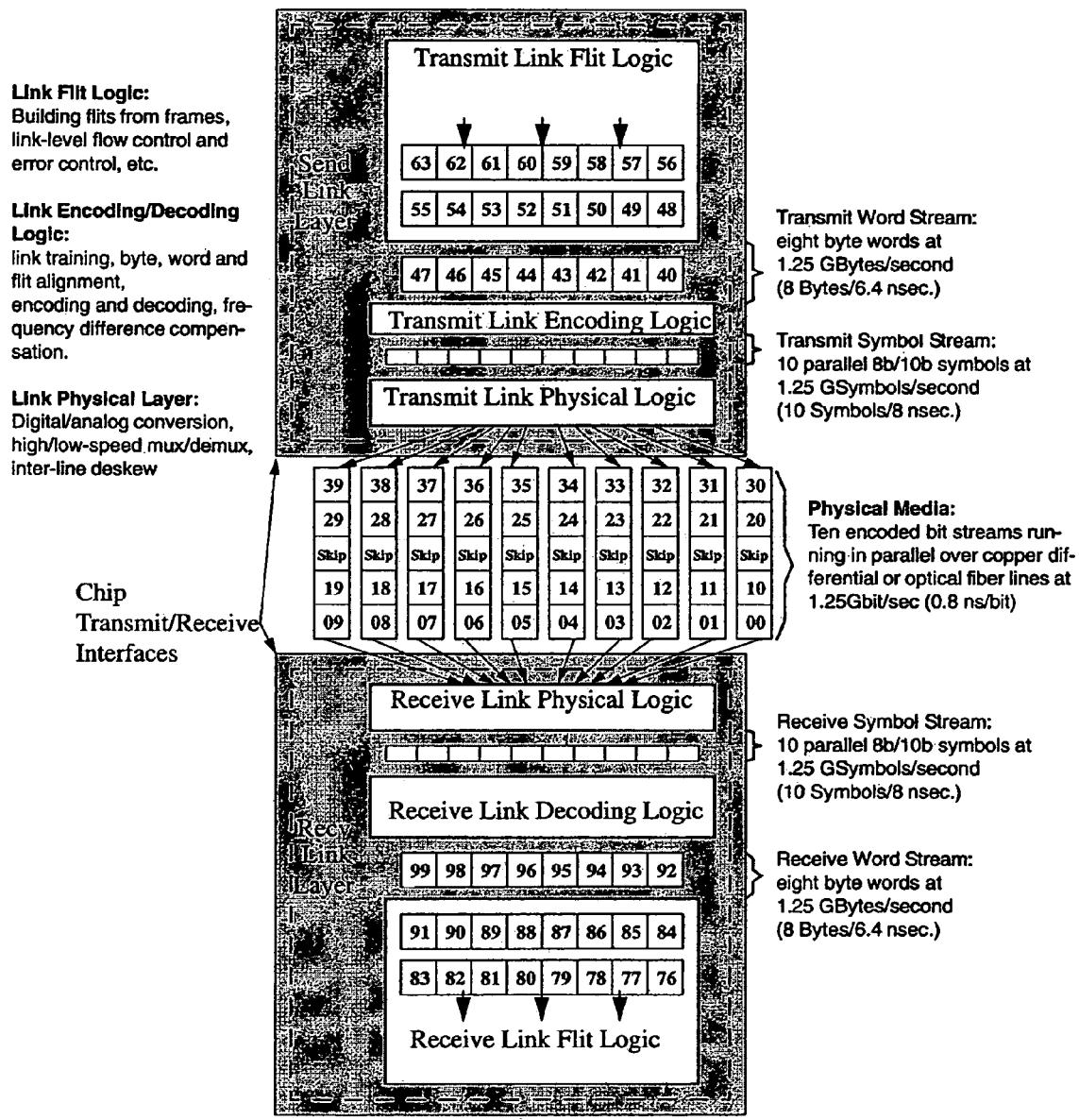
Figure 24 FIO Data Path and Interfaces for Link and Physical Layers

| 5B/6B coding for Data Characters | | |
|---|---|---|
| Unencoded EDCBA | Current RD− abcdei | Current RD+ abcdei |
| D0: 00000 − | 100111 | 011000 |
| D1: 00001 − | 011101 | 100010 |
| D2: 00010 − | 101101 | 010010 |
| D3: 00011 | 110001 | 110001 |
| D4: 00100 − | 110101 | 001010 |
| D5: 00101 | 101001 | 101001 |
| D6: 00110 | 011001 | 011001 |
| D7: 00111 | 111000 | 000111 |
| D8: 01000 − | 111001 | 000110 |
| D9: 01001 | 100101 | 100101 |
| D10:01010 | 010101 | 010101 |
| D11:01011 | 110100 | 110100 |
| D12:01100 | 001101 | 001101 |
| D13:01101 | 101100 | 101100 |
| D14:01110 | 011100 | 011100 |
| D15:01111 − | 010111 | 101000− |
| D16:10000 − | 011011 | 100100− |
| D17:10001 | 100011 | 100011 |
| D18:10010 | 010011 | 010011 |
| D19:10011 | 110010 | 110010 |
| D20:10100 | 001011 | 001011 |
| D21:10101 | 101010 | 101010 |
| D22:10110 | 011010 | 011010 |
| D23:10111 − | 111010 | 000101− |
| D24:11000 | 110011 | 001100 |
| D25:11001 − | 100110 | 100110− |
| D26:11010 − | 010110 | 010110− |
| D27:11011 − | 110110 | 001001− |
| D28:11100 | 001110 | 001110 |
| D29:11101 | 101110 | 010001 |
| D30:11110 | 011110 | 100001 |
| D31:11111 | 101011 | 010100 |

| 3B/4B coding for Data Characters | | |
|---|---|---|
| Unencoded HGF | Current RD− fghj | Current RD+ fghj |
| −−.0: 000 − | 1011 | 0100 |
| −−.1: 001 | 1001 | 1001 |
| −−.2: 010 | 0101 | 0101 |
| −−.3: 011 | 1100 | 0011 |
| −−.4: 100 − | 1101 | 0010 |
| −−.5: 101 | 1010 | 1010 |
| −−.6: 110 | 0110 | 0110 |
| −−.7: 111 − | 1110/0111 | 0001 |

| 5B/6B coding for Special Characters | | |
|---|---|---|
| Unencoded EDCBA | Current RD − abcdei | Current RD + abcdei |
| K28:11100 − | 001111 | 110000 |
| K23:10111 − | 111010 | 000101 |
| K27:11011 − | 110110 | 001001 |
| K29:11101 − | 101110 | 010001 |
| K30:11110 − | 011110 | 100001 |

| 3B/4B coding for Special Characters | | |
|---|---|---|
| Unencoded HGF | Current RD − fghj | Current RD + fghj |
| −−.0: 000 − | 1011 | 0100 |
| −−.1: 001 | 0110 | 1001 |
| −.2: 010 | 1010 | 0101 |
| −−.3: 011 | 1100 | 0011 |
| −−.4: 100 − | 1101 | 0010 |
| −−.5: 101 | 0101 | 1010 |
| −−.6: 110 | 1001 | 0110 |
| −−.7: 111 − | 0111 | 1000 |

| Valid Special Characters |
|---|
| Char Current RD−/Current RD+ Name (#) abcdei fghj−−abcdei fghj |
| K28.0(1C) 001111 0100−−110000 1011 |
| K28.1(3C) 001111 1001−−110000 0110 |
| K28.2(5C) 001111 0101−−110000 1010 |
| K28.3(7C) 001111 0011−−110000 1100 |
| K28.4(9C) 001111 0010−−110000 1101 |
| K28.5(BC) 001111 1010−−110000 0101 |
| K28.6(DC) 001111 0110−−110000 1001 |
| K28.7(FC) 001111 1000−−110000 0111 |
| K23.7(F7) 111010 1000−−000101 0111 |
| K27.7(FB) 110110 1000−−001001 0111 |
| K29.7(FD) 101110 1000−−010001 0111 |
| K30.7(FE) 011110 1000−−100001 0111 |

The comma series b'0011 1110' or b'1100 0001' can be used for synchronization, since it contains a run length of 5, which can not appear in any data character or combination of data characters.

Figure 25  8b/10b Coding Conversion

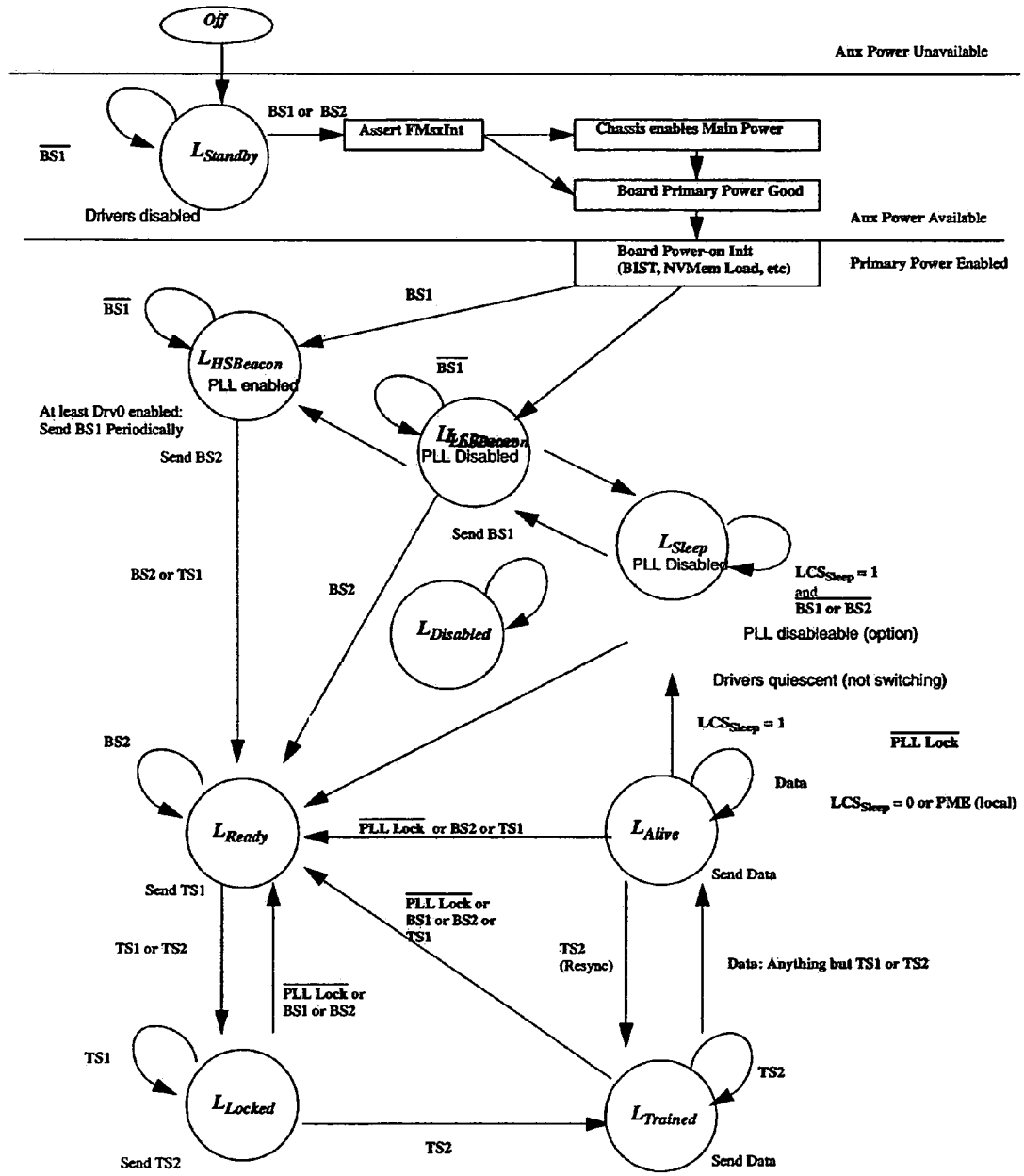
Figure 26 Beacon Sequence

Figure 27 FIO Link Training - One End Power-on shows the typical order of transmission of beaconing and link training sequences used in bringing a link from a powered-off state to an alive and operational state.
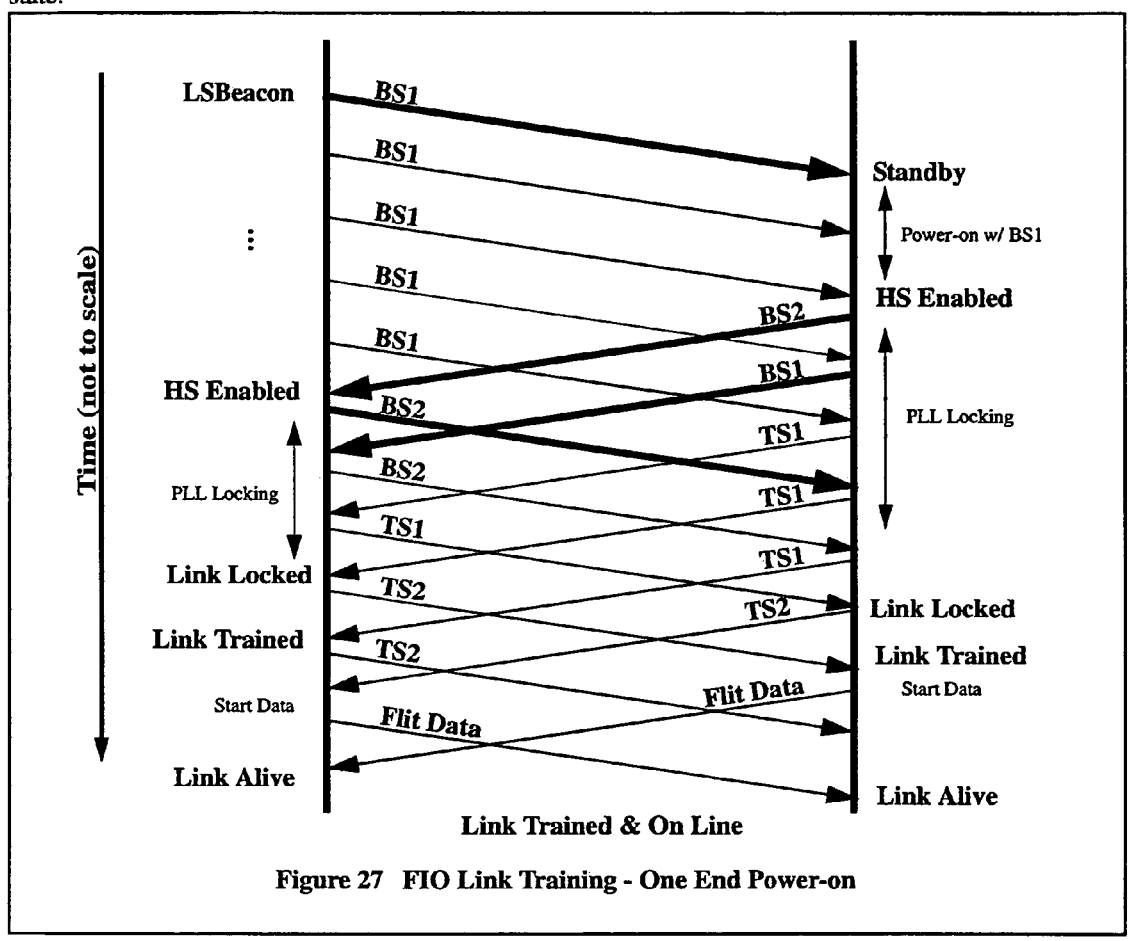
Figure 27 FIO Link Training - One End Power-on

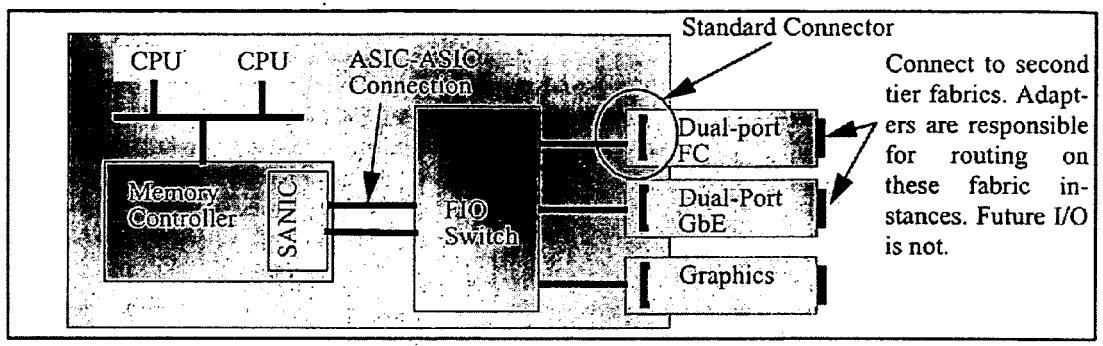
Figure 30 Single-board Platform
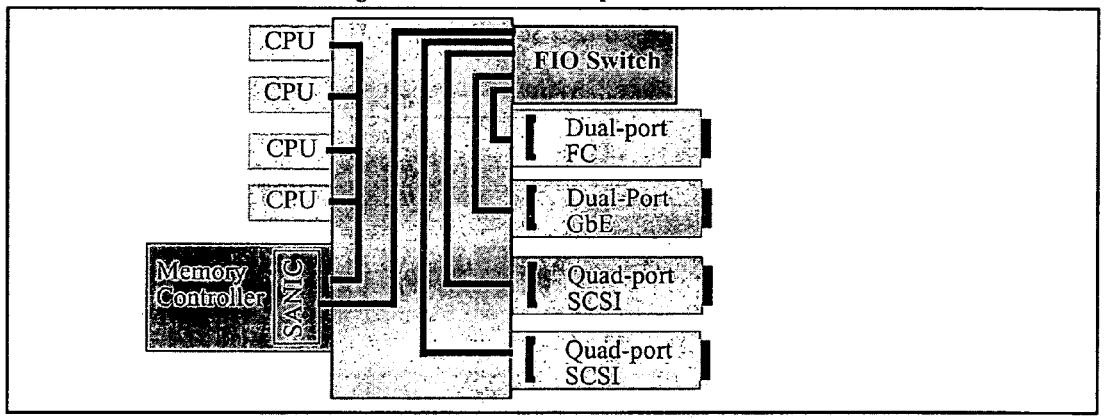
Figure 31 Passive Backplane Platform
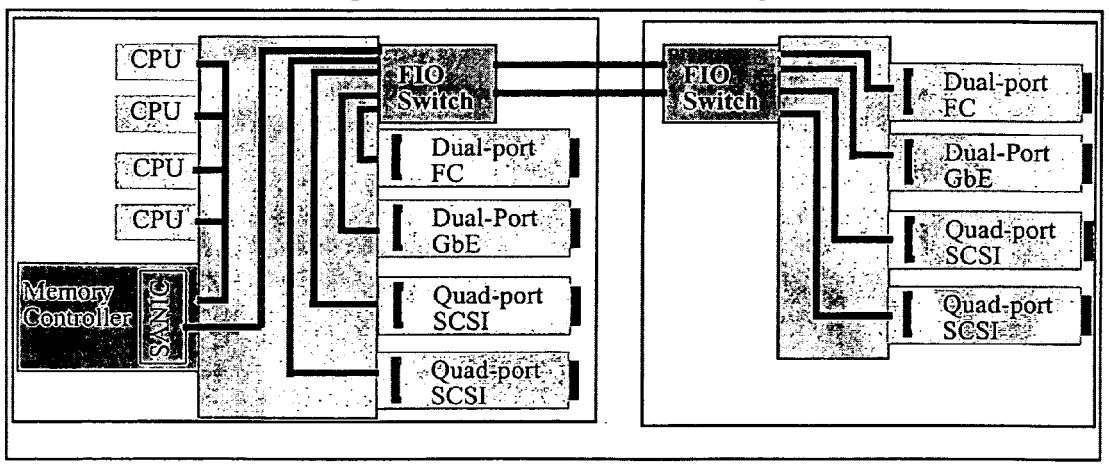
Figure 32 Platform-to-Chassis Topology

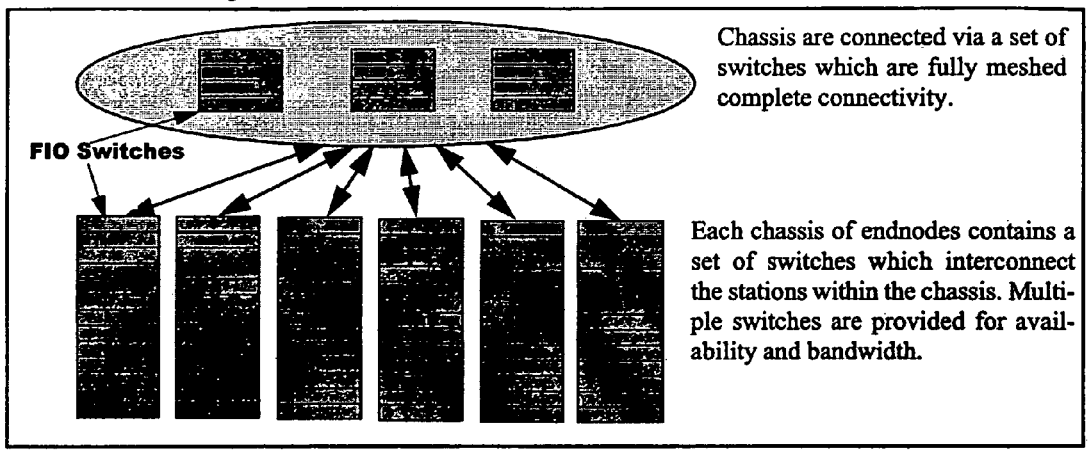
Figure 33 endnodes Connected via External Switch Elements
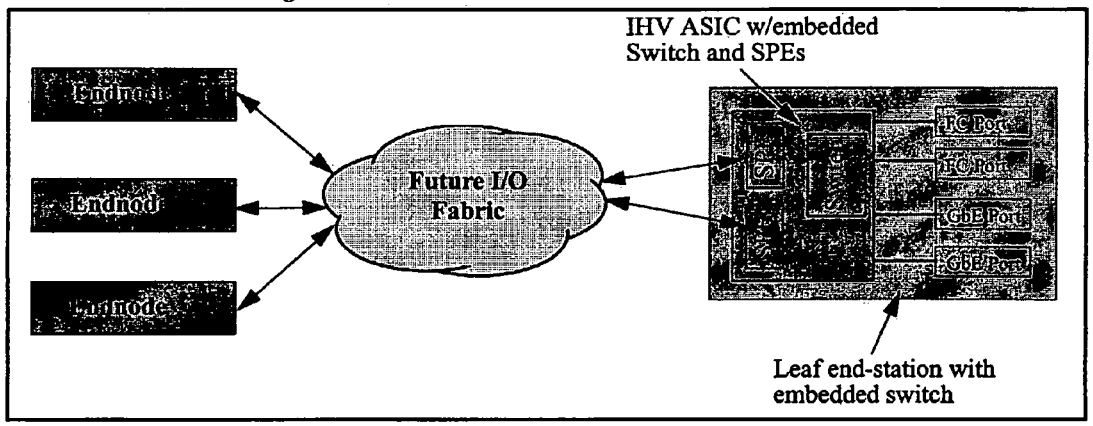
Figure 34 Leaf End-station with Embedded Switch
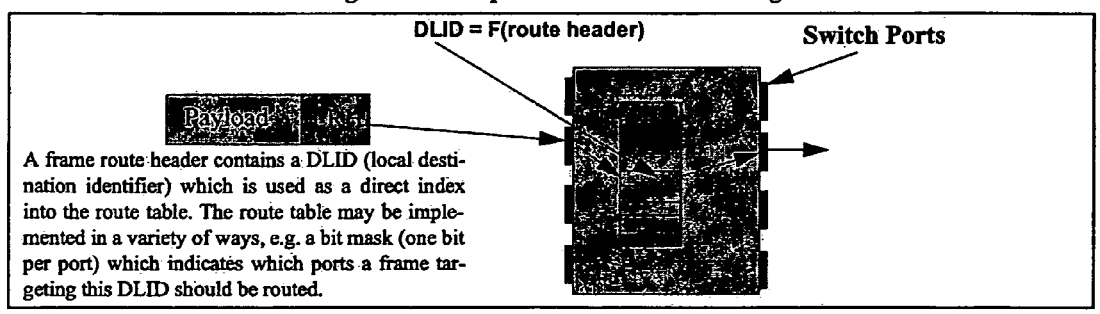
Figure 35 Sample Switch Frame Routing Figure 36 Sample Router Route Operation

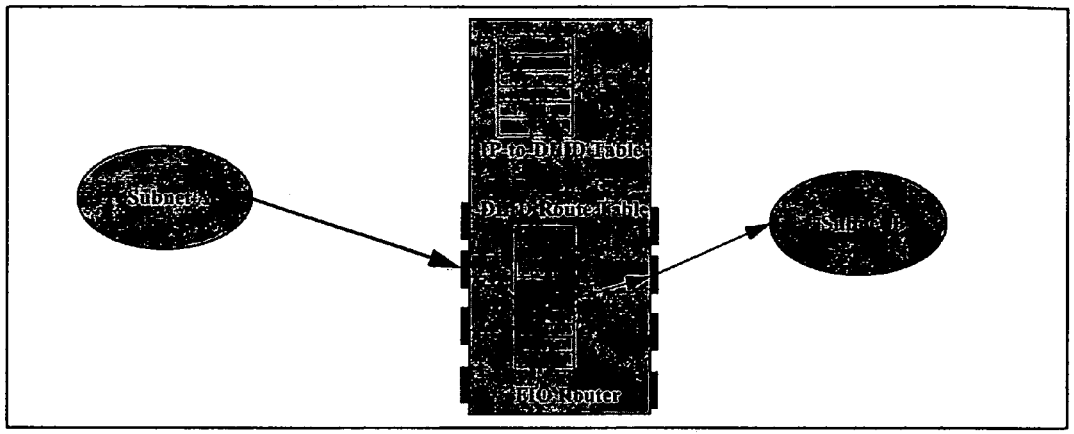

Figure 38 Graphical View of Route Headers and Payloads

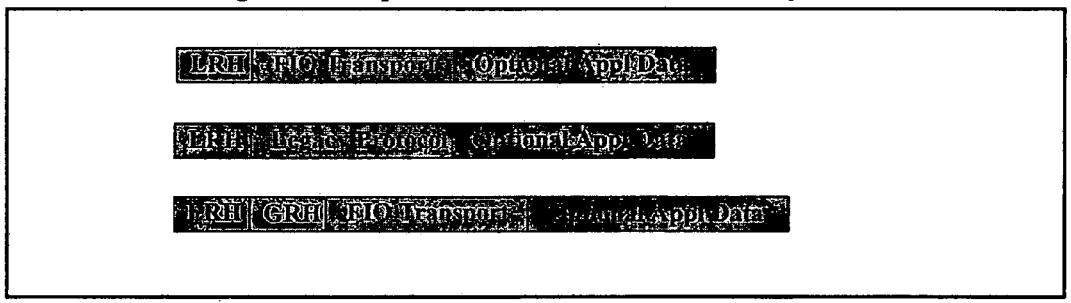

Figure 39 Sample Unreliable Multicast Send Operation

Endnode creates a frame which sets the DLID to be a previously configured multicast DLID. A single frame is sent from the SANIC to the switch.

The switch receives the frame, performs a route table look-up and discovers the destination targets three output ports. In this example, the switch replicates the frame (replicates flits as they are received) to each port.

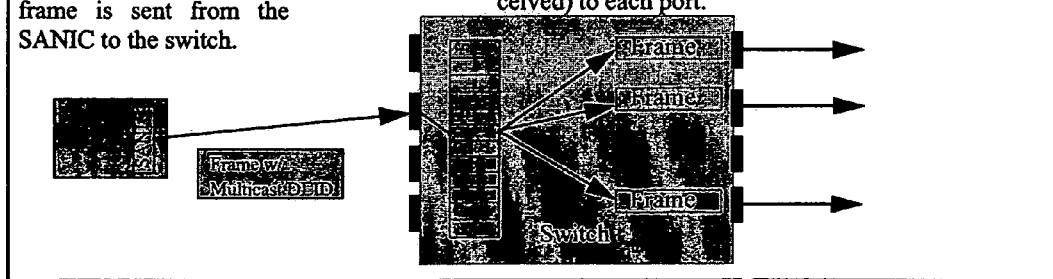

Figure 37 Attribute Comparison of Switch Routing Technologies

| Attribute | Wormhole | Cut-through | Store-Forward |
|---|---|---|---|
| Fabric Efficiency - Small radius configurations have essentially equivalent efficiency regardless of the algorithm used. | Medium to large radius fabrics have maximum 60% efficiency (random packet distribution). Typically, 40-50% is reality. | Due to additional memory to deal with head-of-line blocking, this algorithm provides better efficiency than wormhole. | Depending upon the amount of memory within the switch and the traffic patterns, this algorithm provides better efficiency than cut-through or wormhole. |
| Design Simplicity | Simplest design - does not require routing table - depends upon whether one is using source or destination routing. | Additional complexity due to additional packet buffering. Possible to implement some QoS within the switch should congestion occur else operation is essentially wormhole. | Most complex of the three but the impact varies depending the amount of QoS, memory component integration, etc. |
| Adaptive Routing | Partial adaptivity (based on redundant cables) | Partial adaptivity - similar to wormhole | Yes. Implementation trade-off in terms of management, ordering requirements (e.g. deals with ghost I/O), etc. |
| Deadlock Avoidance - no loops within the fabric allowed. | Yes, under assumption end node makes forward progress. | Similar to wormhole. | Typically use 802.1D/OSPF to avoid loops. Layer 3 switches may also modify packet header hop/TTL. |
| Cost, i.e. price/performance | Lowest | Higher than Wormhole but less than store-forward | Highest relative cost of the three due to increased resource management. |
| Memory Reqs - Each requires minimally 2X RTT slack buffers which may be either implemented in on-chip or off-chip memory | Low - Slack buffers and optional route table may be implemented on-chip | Typically additional off-chip memory for congestion buffers | Off-chip memory - amount varies with bandwidth, number of ports, possibly fabric radius. |
| Flow-control Reqs | Symbols (dominant) / Credit | Symbols/Credits | Symbols/Credit/None/etc. |
| Misc. Resource Reqs | Minimal management. Depends upon whether source or destination routing. Destination reqs external service frames to program route table. | Similar to wormhole. | Depends upon what value-added capabilities are provided. For example, if a layer 3 or layer 4 switch, then additional management tools/resources required to provide policies. |
| QoS Capabilities | Requires VC approach which is a limited resource and hence limited fabric QoS capabilities | Similar to wormhole. | Complex QoS capabilities. May use variety of tag or flow schemes to determine priority of service and guarantee bandwidth |
| Latency | Best | Same as wormhole except when congestion occurs | Complexity of providing store-forward buffer management, QoS, etc. increases latency compared to /wormhole |
| Fragmentation/Reassembly | Unlimited frame size but often implemented with max MTU. FIO specifies MTUs for flits and frames. | Due to limited congestion buffering, requires max MTU. FIO specifies MTUs for flits and frames. | Max MTU to avoid skewing traffic. FIO specifies MTUs for flits and frames. |

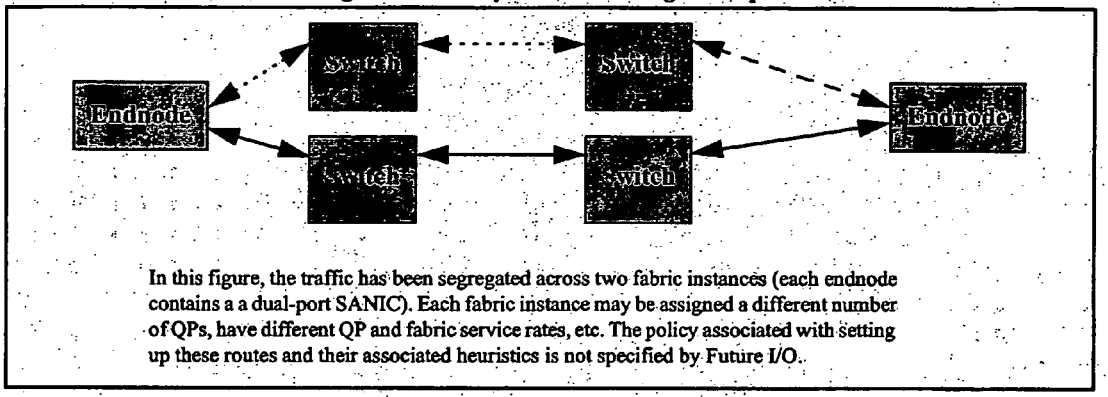

Figure 40 Policy Based Routing Example

In this figure, the traffic has been segregated across two fabric instances (each endnode contains a a dual-port SANIC). Each fabric instance may be assigned a different number of QPs, have different QP and fabric service rates, etc. The policy associated with setting up these routes and their associated heuristics is not specified by Future I/O.

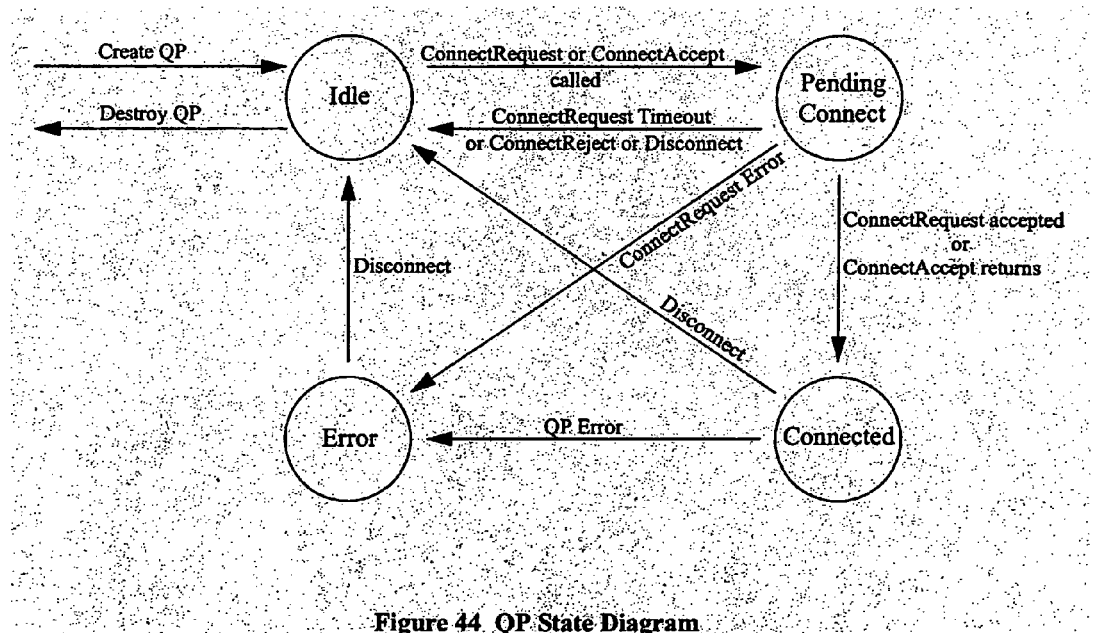

Figure 44 QP State Diagram

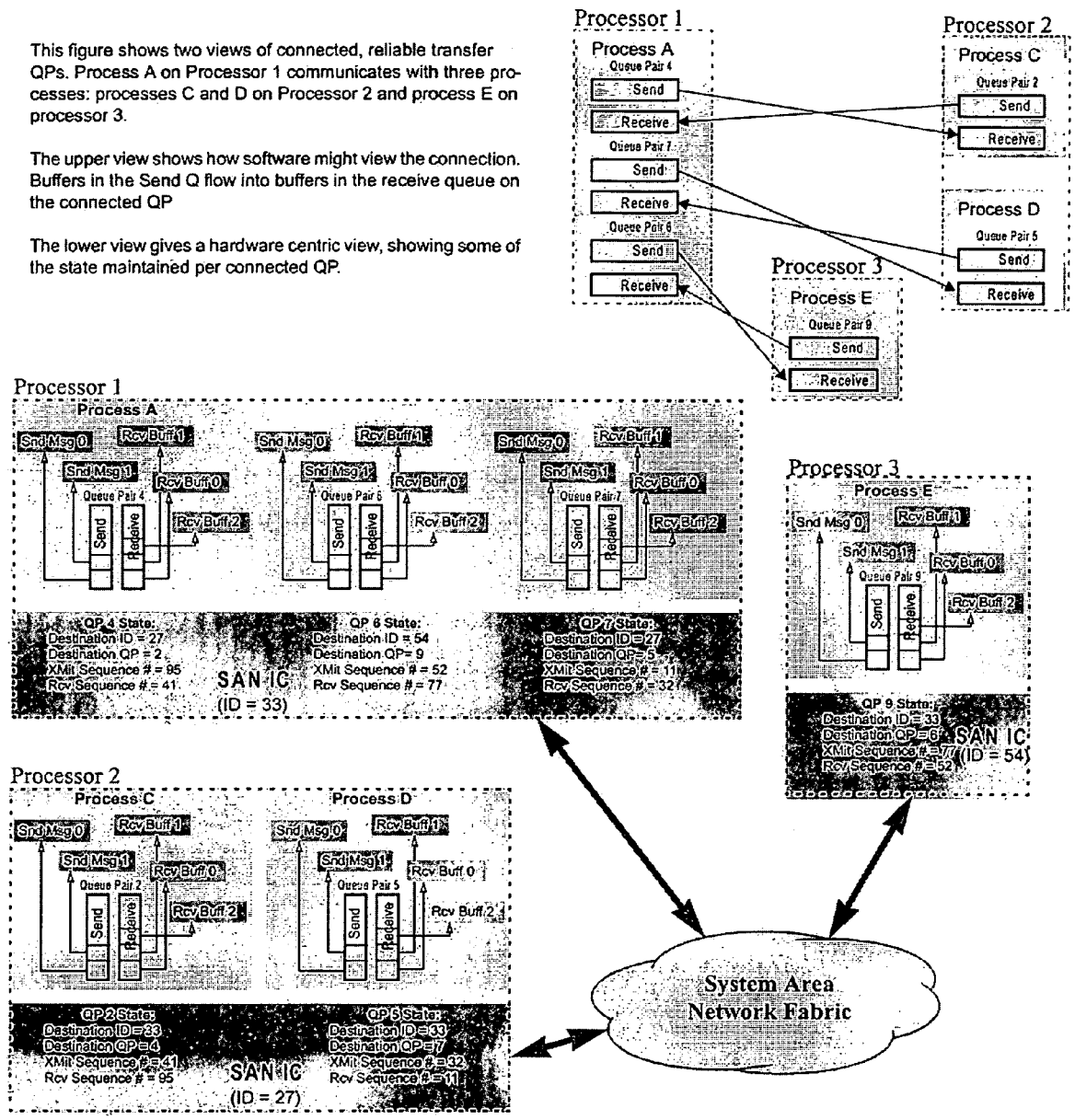
Figure 41 Connected QPs for Reliable Transfer Operation

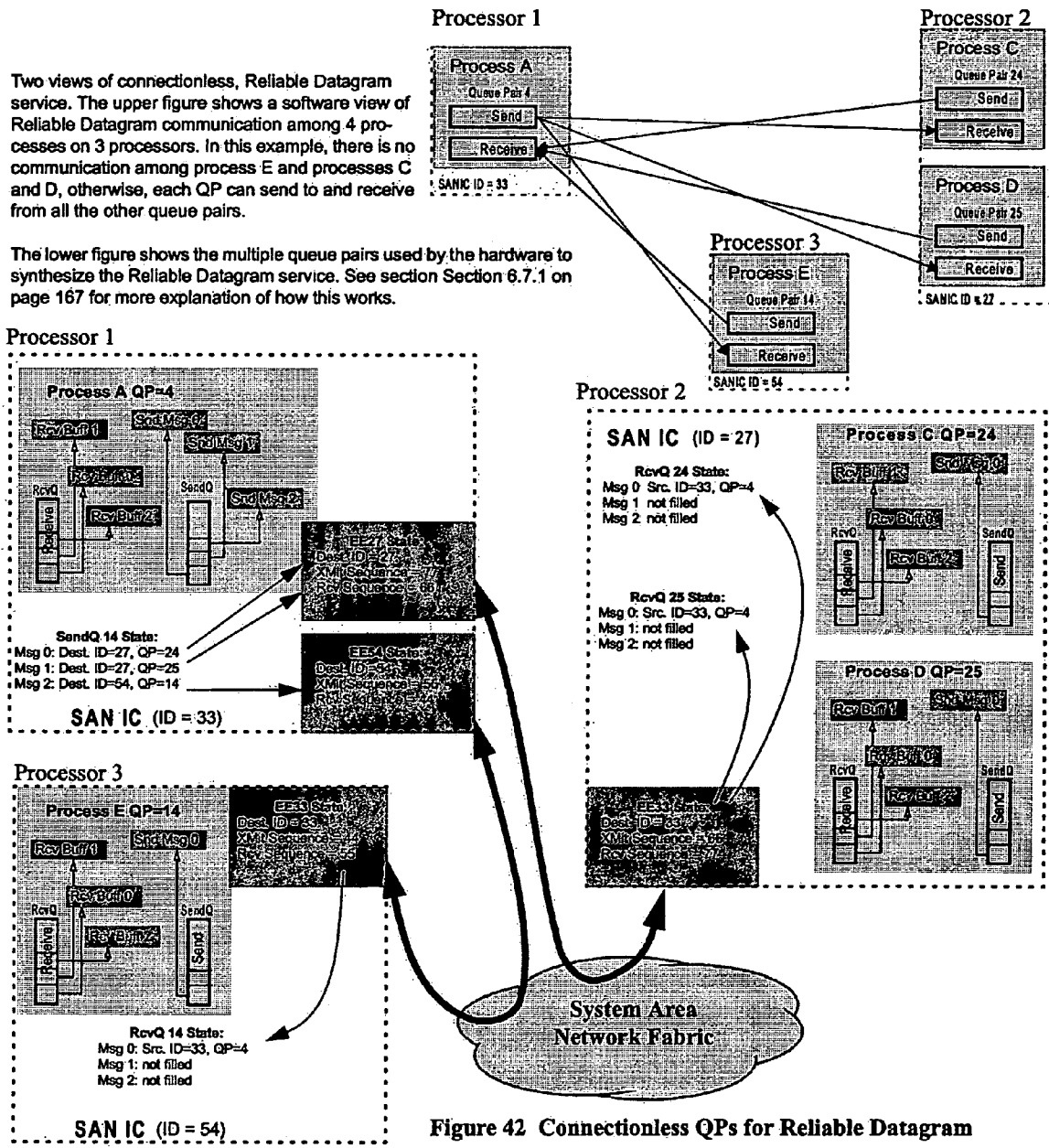
Figure 42 Connectionless QPs for Reliable Datagram

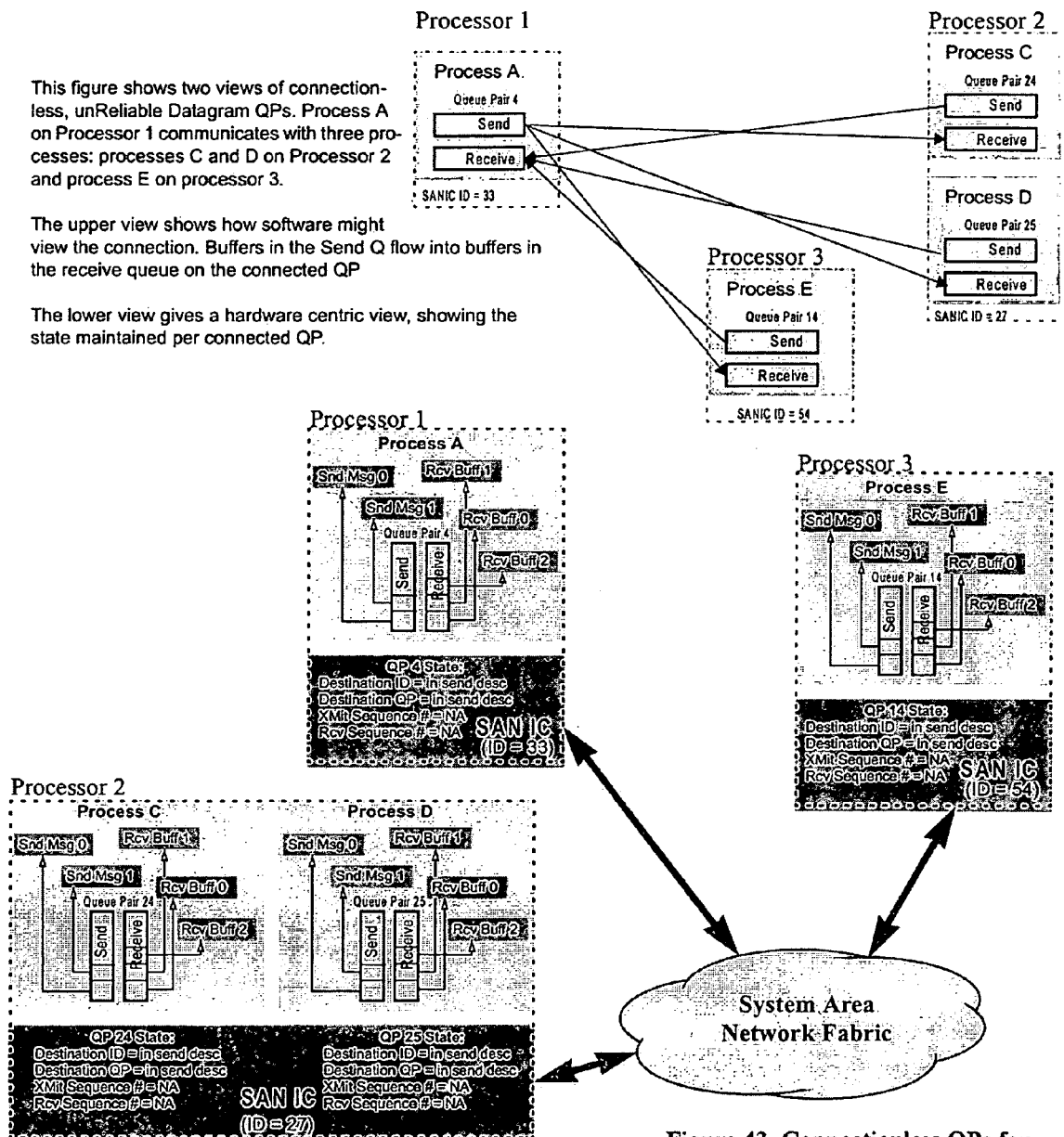
Figure 43 Connectionless QPs for UnReliable Datagram Operation

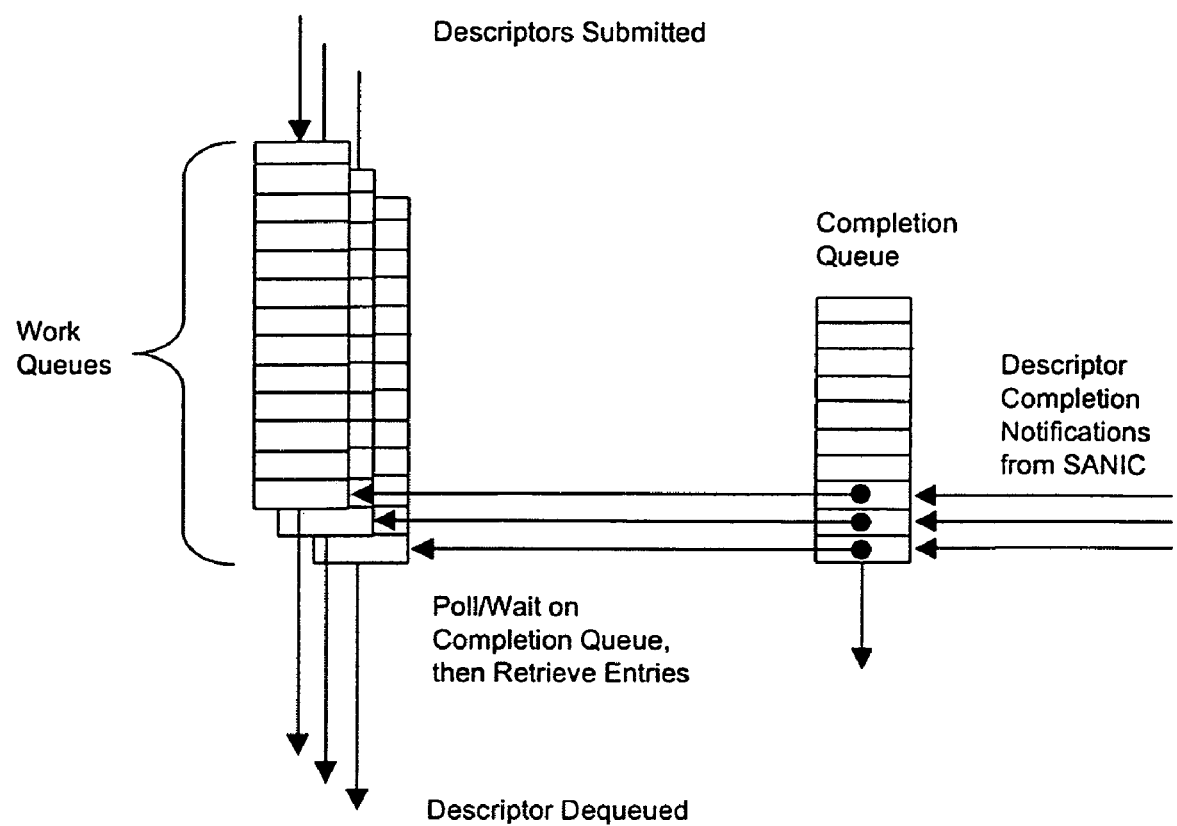
Figure 45 Completion queue model

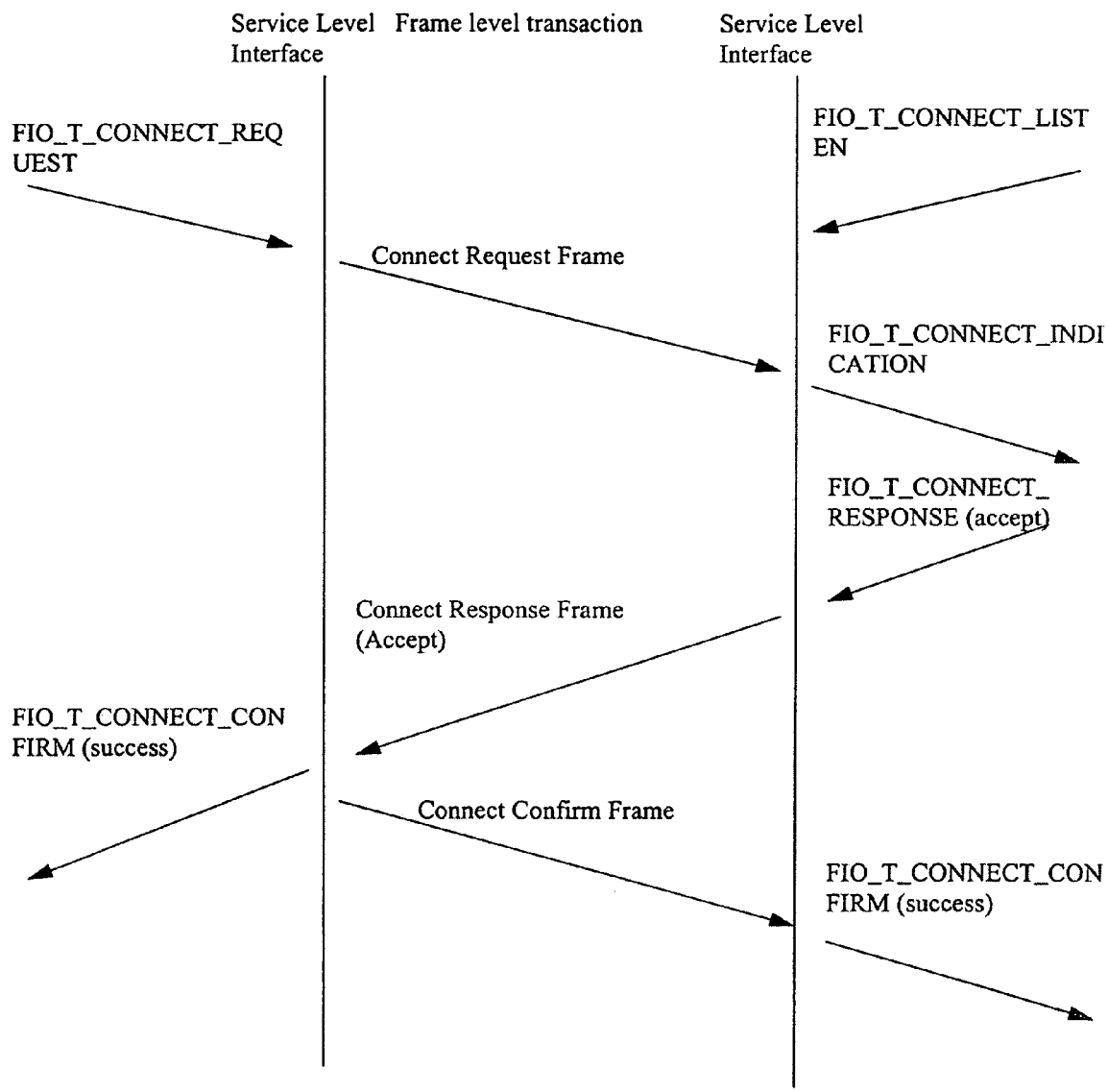
Figure 46 Connection establishment accept frame transmission sequence

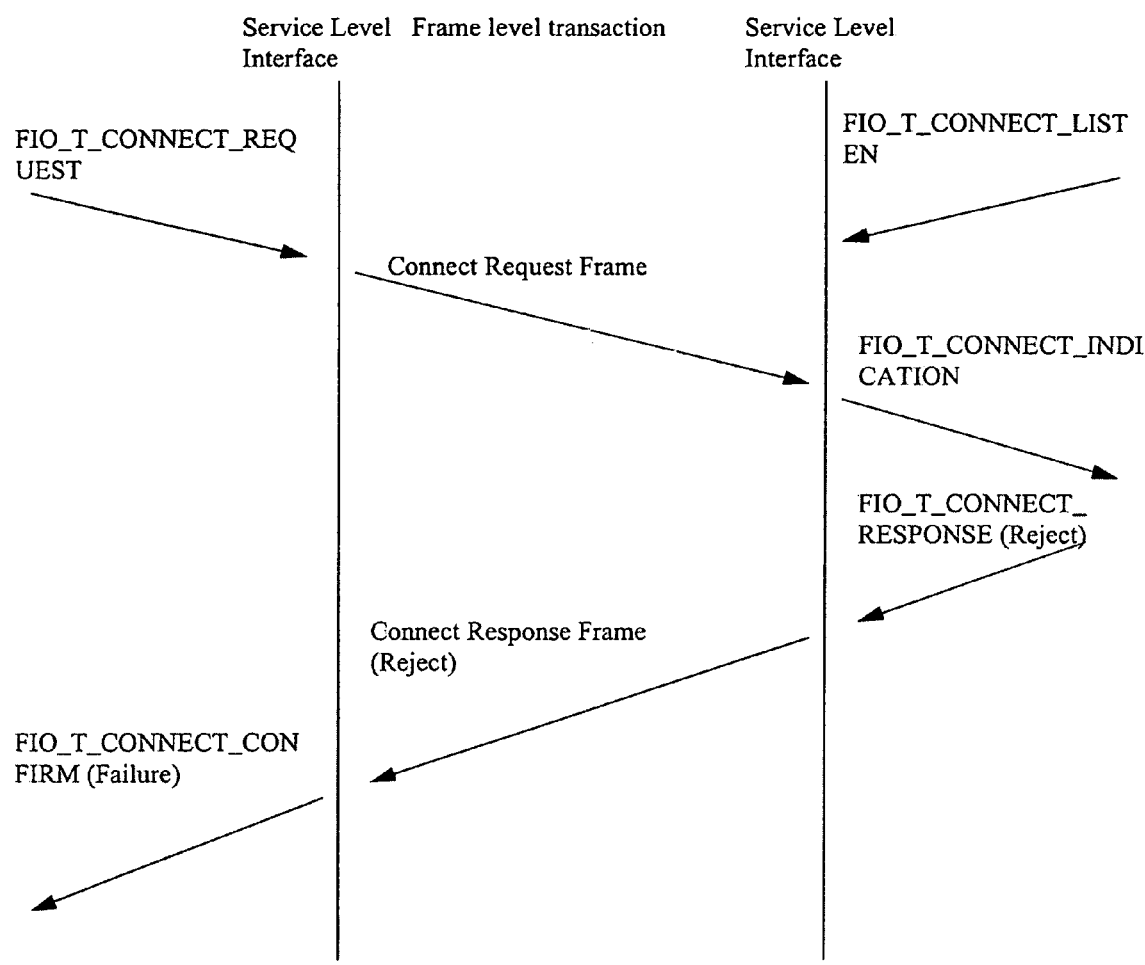
Figure 47 Connection establishment reject frame transmission sequence

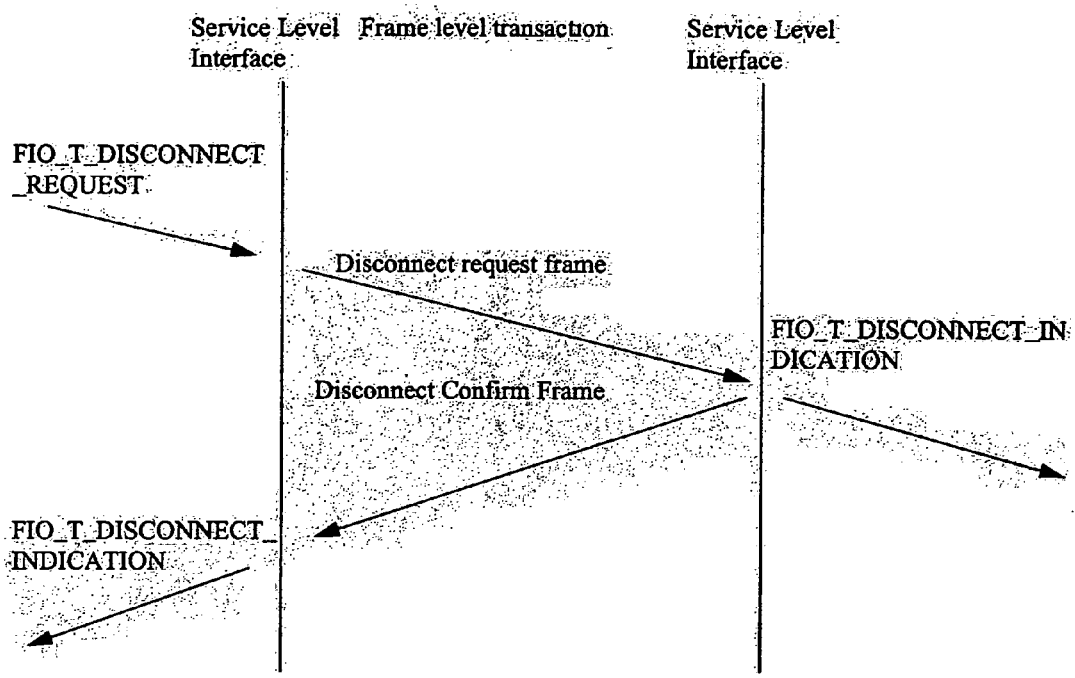
Figure 48 Connection teardown frame transmission sequence

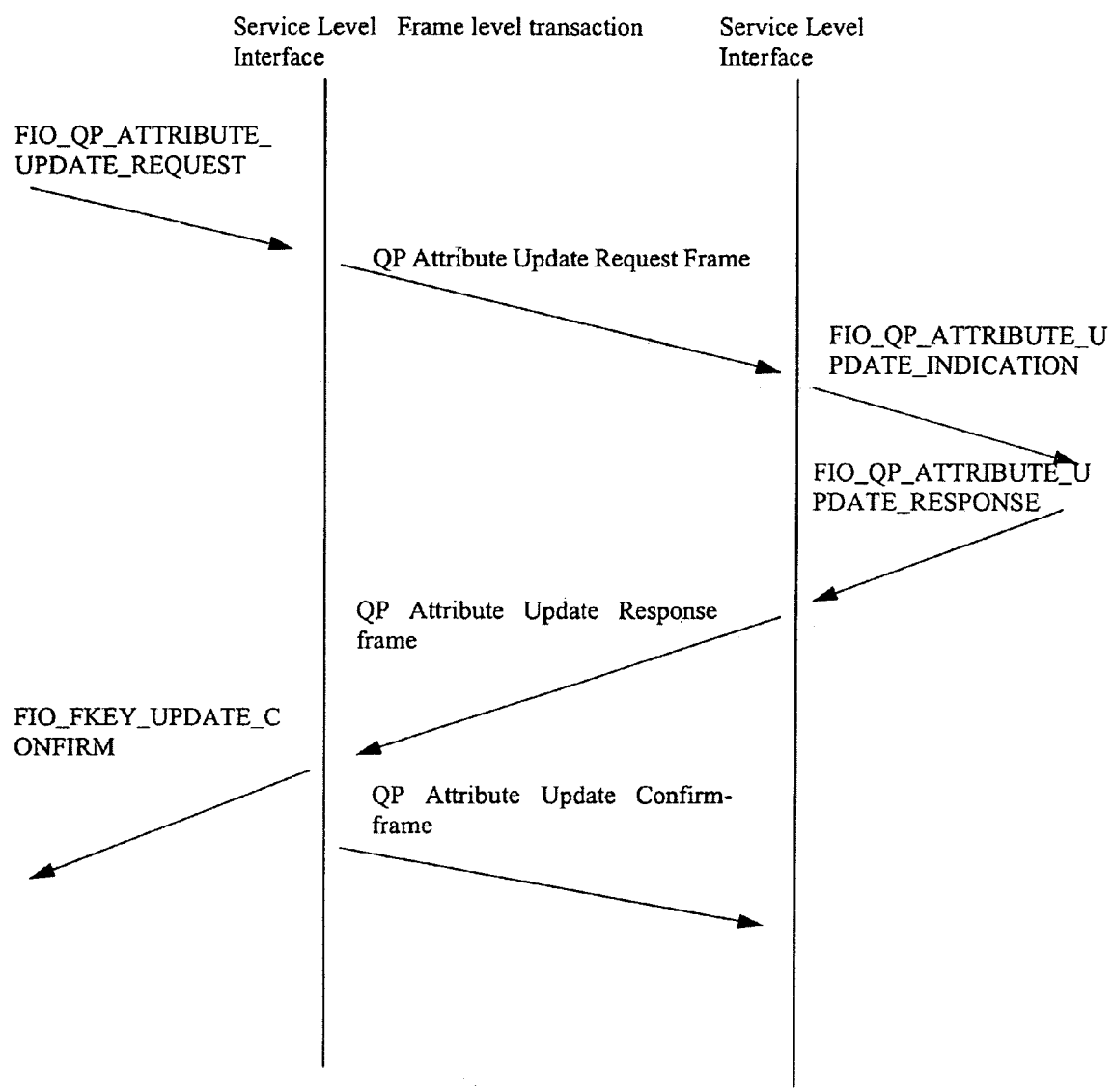
Figure 49 QP Attribute Update frame transmission sequence

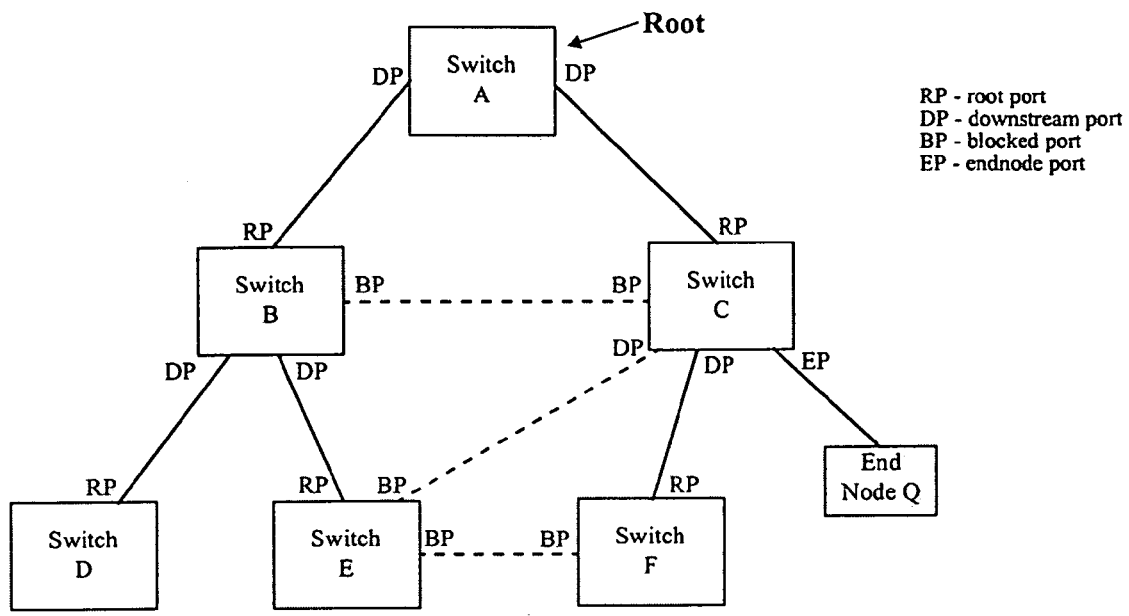
Figure 50 - Port States in Spanning Tree
RP - root port
DP - downstream port
BP - blocked port
EP - endnode port
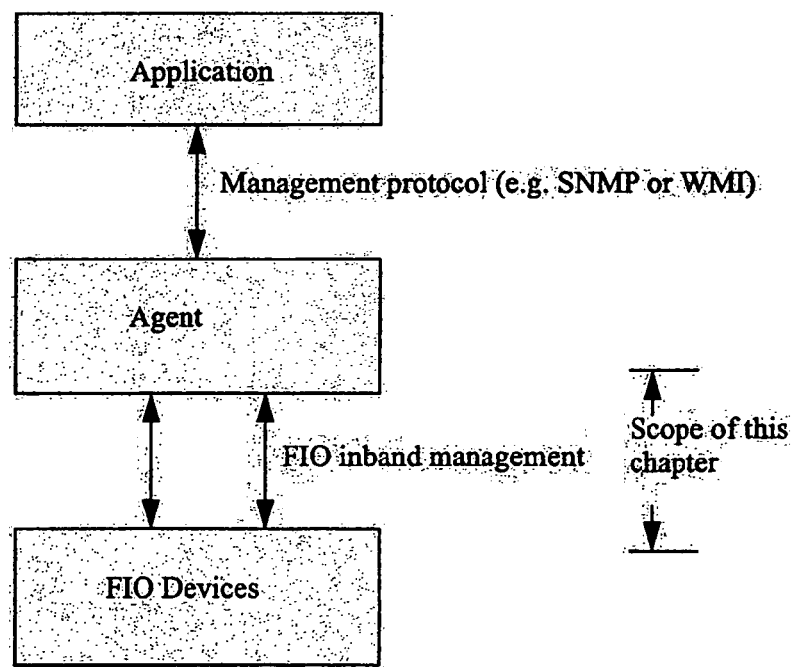
Figure 55

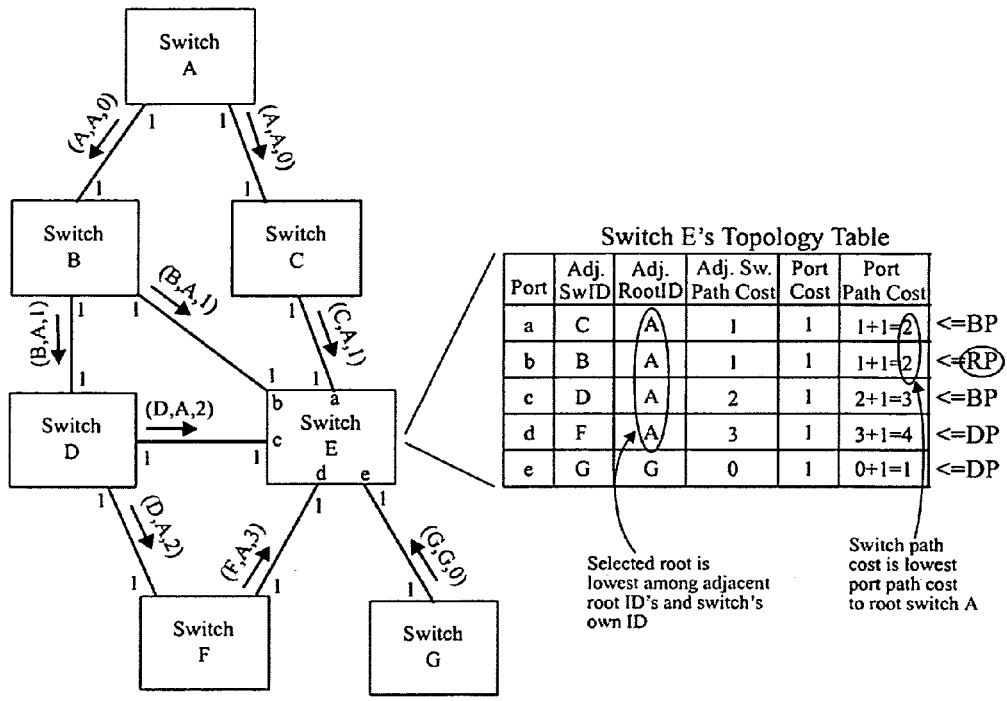
Figure 51 - Path Costs to Root (seen by Switch E)
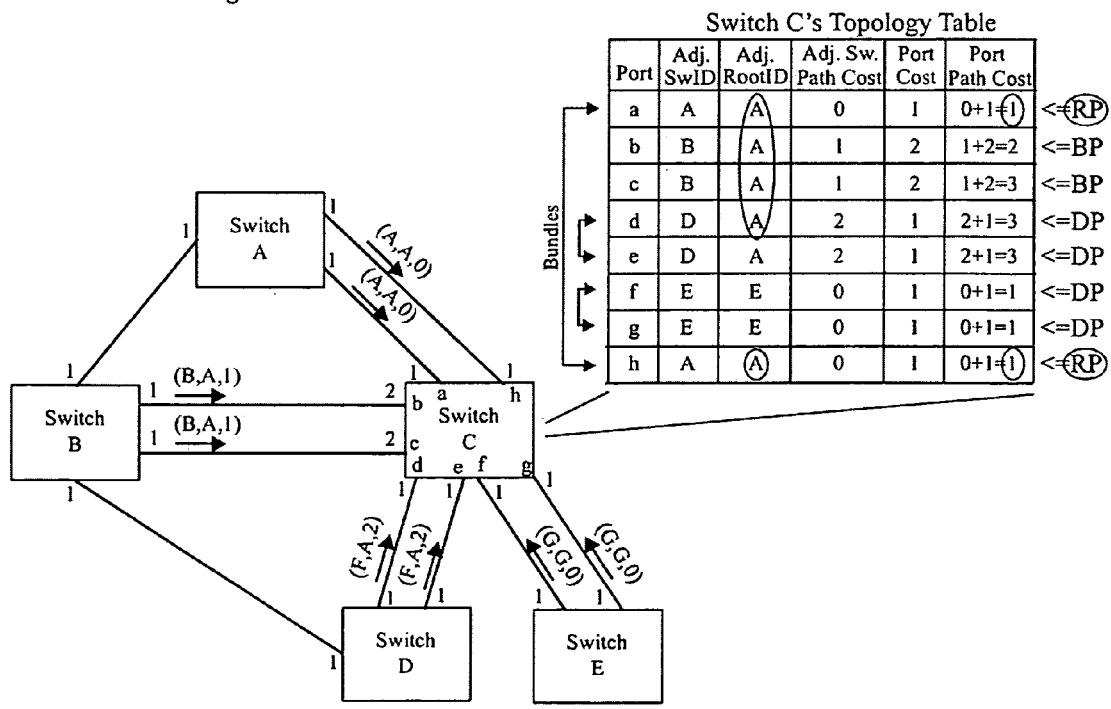
Figure 52 - Bundles

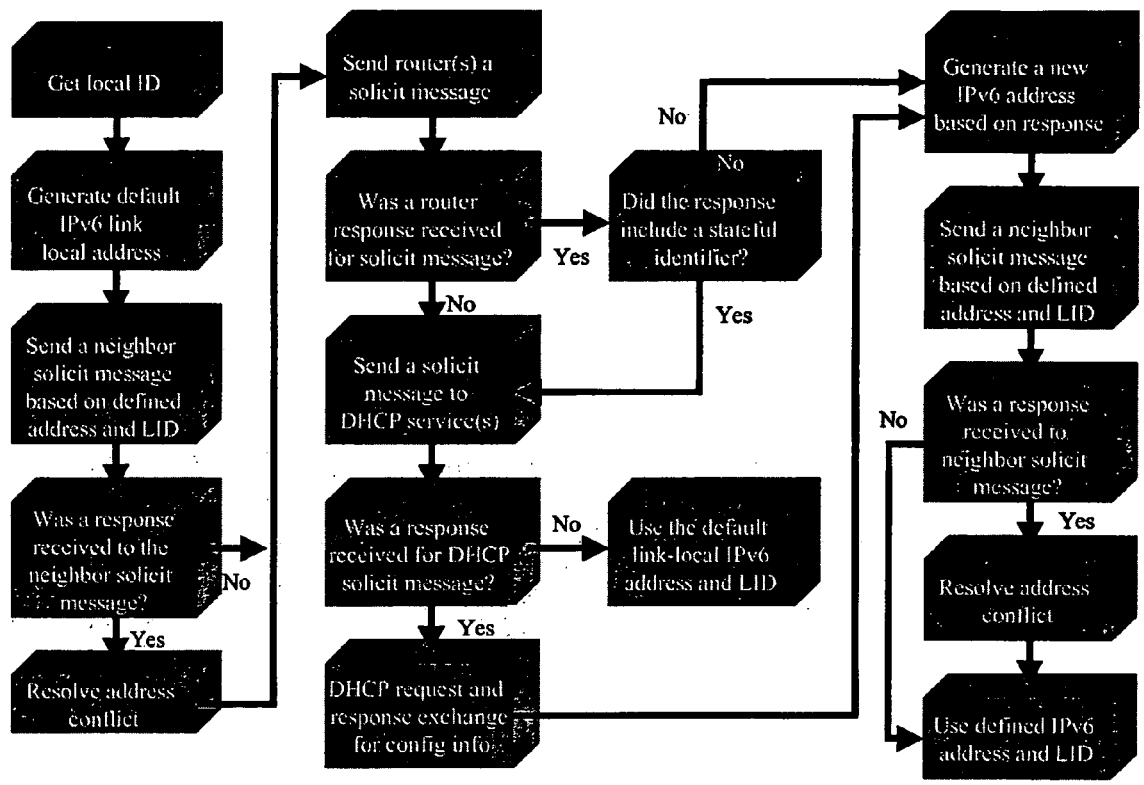
Figure 53 Node Configuration and Discovery
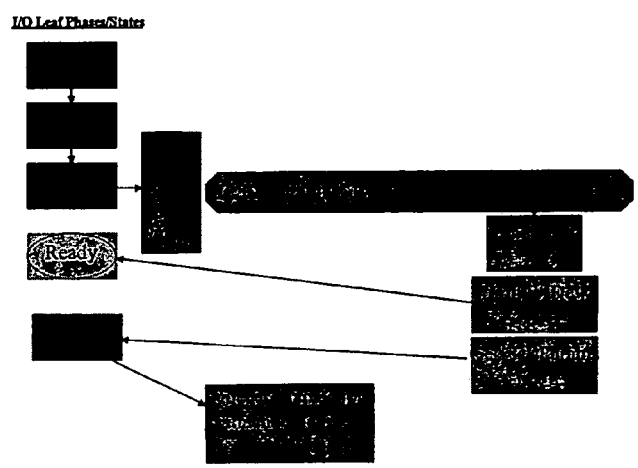
Figure 54 Boot Process

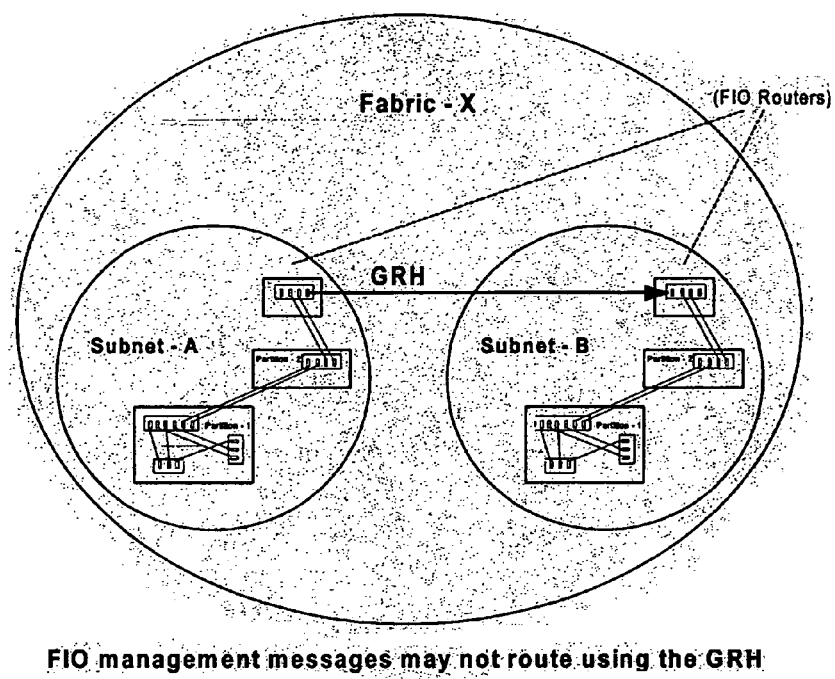
FIO management messages may not route using the GRH
Figure 60
Figure 63 Simple Tree with Mixed Bandwidth Links and Adapter Leaves
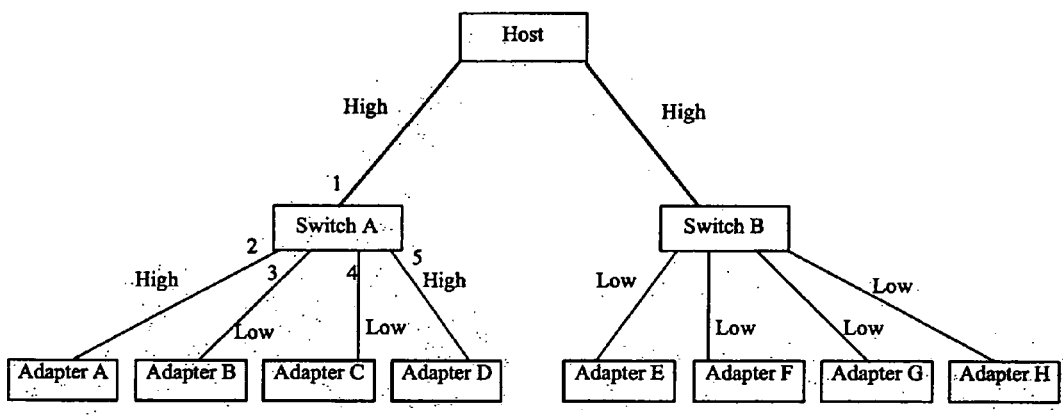

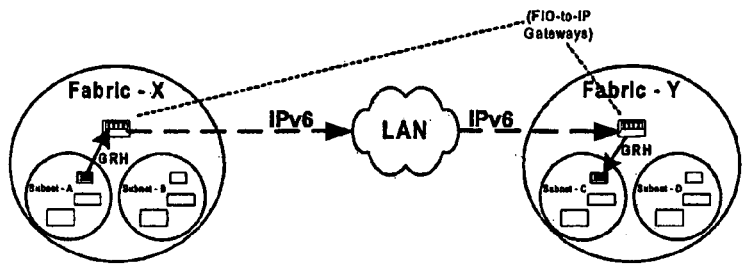
Figure 61 While IPv6 interoperability is a key advantage for FIO, management messages *may not* route via IP
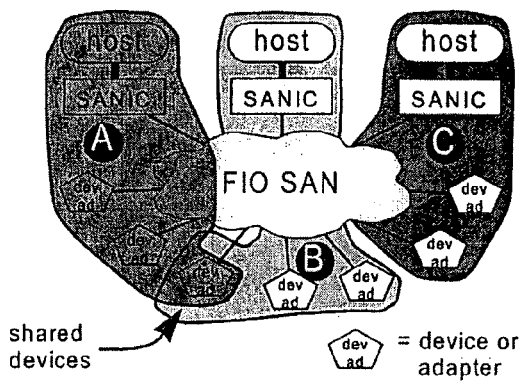
Figure 62 Example Endpoint Partitions of an FIO-Connected Cluster
Figure 65 - Simple Tree with Mixed Bandwidth Links and Adapter and Router Leaves
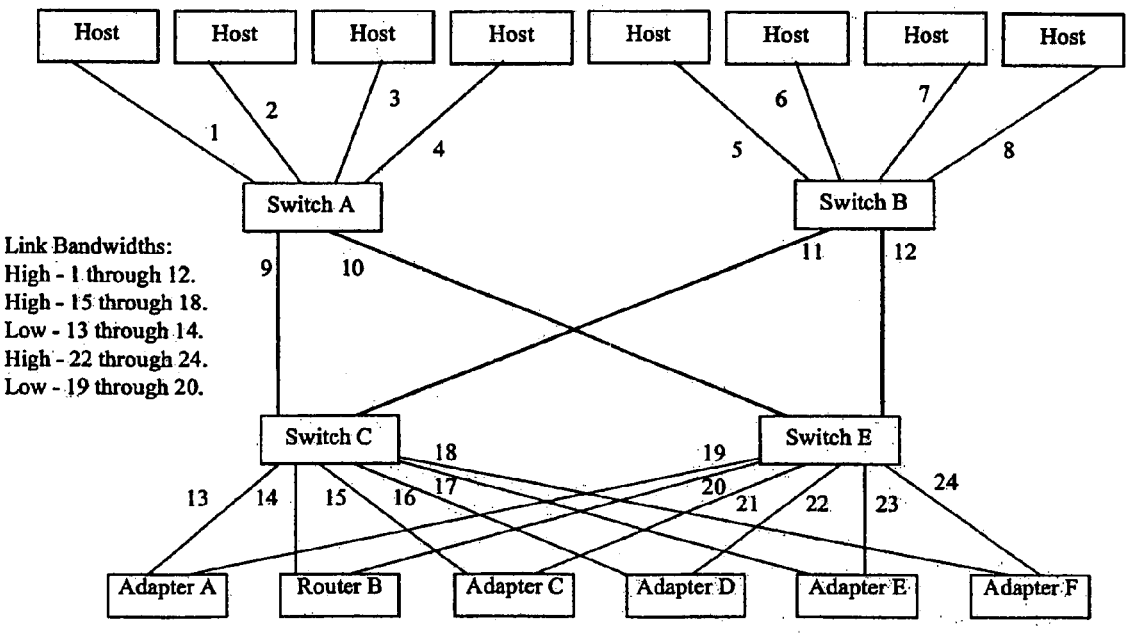
Link Bandwidths:
High - 1 through 12.
High - 15 through 18.
Low - 13 through 14.
High - 22 through 24.
Low - 19 through 20.

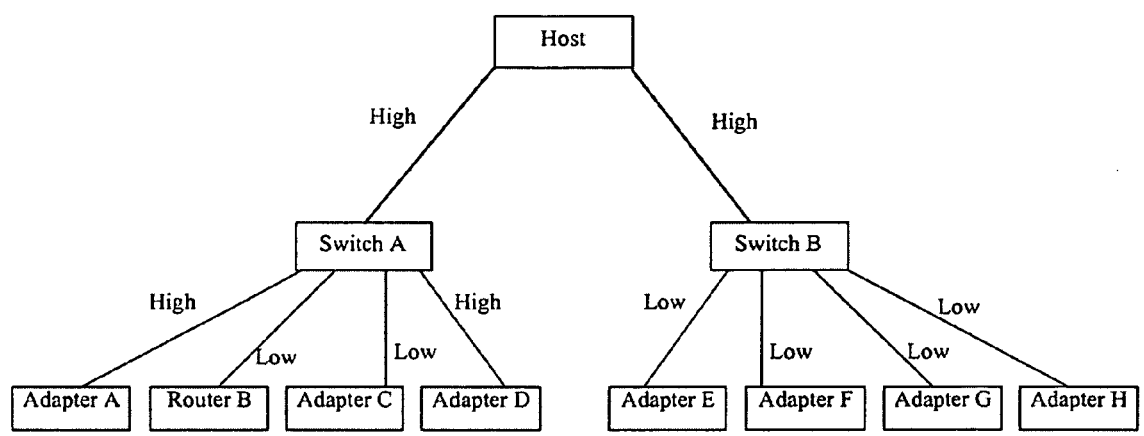
Figure 64 Simple Tree with Mixed Bandwidth Links and Adapter and Router Leaves

TRAINING SET 1 (TS1)

| COM | COM | COM | COM |
|---|---|---|---|
| LANE 0 | LANE 1 | LANE 2 | LANE 3 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |
| D10.2 | D10.2 | D10.2 | D10.2 |

TRAINING SET 2 (TS2)

| COM | COM | COM | COM |
|---|---|---|---|
| LANE 0 | LANE 1 | LANE 2 | LANE 3 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |
| D5.2 | D5.2 | D5.2 | D5.2 |

FIG. 72

Physical Link Lane Identifiers

| LANE IDENTIFIER | 8B/10B CODE NAME | NEGATIVE RD | POSITIVE RD |
|---|---|---|---|
| LID 0 | D0.0 | 10011 10100 | 01100 01011 |
| LID 1 | D1.0 | 01110 10100 | 10001 01011 |
| LID 2 | D2.0 | 10110 10100 | 01001 01011 |
| LID 3 | D4.0 | 11010 10100 | 00101 01011 |
| LID 4 | D8.0 | 11100 10100 | 00011 01011 |
| LID 5 | D15.0 | 01011 10100 | 10100 01011 |
| LID 6 | D16.0 | 01101 10100 | 10010 01011 |
| LID 7 | D23.0 | 11101 00100 | 00010 11011 |
| LID 8 | D24.0 | 11001 10100 | 00110 01011 |
| LID 9 | D27.0 | 11011 00100 | 00100 11011 |
| LID 10 | D29.0 | 10111 00100 | 01000 11011 |
| LID 11 | D30.0 | 01111 00100 | 10000 11011 |

FIG. 73

METHOD FOR TRAINING A COMMUNICATION LINK BETWEEN PORTS TO CORRECT FOR ERRORS

This application claims the earlier effective filing date of U.S. Provisional Application 60/154,150, filed Sep. 15, 1999, and entitled "Method and Apparatus for Transferring Data."

BACKGROUND OF THE INVENTION

1. Field of the Invention
2. Description of the Related Art

As information technology has matured, computing systems have evolved into what are now known as "enterprise computing systems." An enterprise computing system is typically a large number of computing and storage devices, all of which are employed by users from a single concern, or "enterprise." One popular type of enterprise computing system is an "intranet," which is a computing system that operates like the Internet, but requires special authorization to access. Such access is typically only granted to employees and/or contractors of the enterprise. However, not all enterprise computing systems are intranets or operate along the principles of the Internet. One of the defining characteristics of the Internet is that communications among the computing devices utilize the Transmission Control Protocol/Internet Protocol ("TCP/IP") as do intranets. However, there are many protocols, some of them proprietary, that may instead be employed in enterprise computing systems for, among other reasons, security purposes.

Thus, modern computer systems have advanced at a truly astonishing rate. Compute performance and memory capacity have followed Moore's Law predictions for over two decades. However, the predominant I/O sub-system architecture of these systems has not followed suite. Typical I/O subsystems have been designed around shared bus architectures that, while adequate in performance at the time of their introduction, have not been able to keep pace with the rapid advances in processor and memory subsystem performance. To meet the ever increasing I/O demands of the next decade, a revolutionary approach to I/O will be required that can co-exist with the evolutionary improvements to legacy I/O, such as Peripheral Component Interface ("PCI") and Peripheral Component Interface Extension ("PCI-X").

More particularly, Internet and electronic commerce has grown to the point where demands placed on existing computer systems are severely testing the limits of system capacities. Microprocessor and peripheral device performances have improved to keep pace with emerging business and educational needs. For example, internal clock frequencies of microprocessors have increased dramatically, from less than 100 MHz to more than 1 GHz over a span of less than ten years. Where this performance increase in inadequate, high performance systems have been designed with multiple processors and clustered architecture. It is now commonplace for data and software applications to be distributed across clustered servers and separate networks. The demands created by these growing networks and increasing speeds are straining the capabilities of existing Input/Output ("I/O") architecture.

Peripheral Component Interconnect ("PCI"), released in 1992, is perhaps the most widely used I/O technology today. PCI is a shared bus-based I/O architecture and is commonly applied as a means of coupling a host computer bus (front side bus) to various peripheral devices in the system. Publications that describe the PCI bus include the PCI Specification, Rev. 2.2, and Power Management Specification 1.1, all published by the PCI Special Interest Group. The principles taught in these documents are well known to those of ordinary skill in the art and are hereby incorporated herein by reference.

At the time of its inception, the total raw bandwidth of 133 MBps (32 bit, 33 MHz) provided by PCI was more than sufficient to sustain the existing hardware. Today, in addition to microprocessor and peripheral advancements, other I/O architectures such as Gigabit Ethernet, Fibre Channel, and Ultra3 SCSI are outperforming the PCI bus. Front side buses, which connect computer microprocessors to memory, are approaching 1–2 GBps bandwidths. It is apparent that the conventional PCI bus architecture is not keeping pace with the improvements of the surrounding hardware. The PCI bus is quickly becoming the bottleneck in computer networks.

In an effort to meet the increasing needs for I/O interconnect performance, a special workgroup led by Compaq Computer Corporation developed PCI-X as an enhancement over PCI. The PCI-X protocol enables 64-bit, 133 MHz performance for a total raw bandwidth that exceeds 1 GBps. While this is indeed an improvement over the existing PCI standard, it is expected that the PCI-X bus architecture will only satisfy I/O performance demands for another two or three years.

In addition to the sheer bandwidth limitations of the PCI bus, the shared parallel bus architecture used in PCI creates other limitations which affect its performance. Since the PCI bus is shared, there is a constant battle for resources between processors, memory, and peripheral devices. Devices must gain control of the PCI bus before any data transfer to and from that device can occur. Furthermore, to maintain signal integrity on a shared bus, bus lengths and clock rates must be kept down. Both of these requirements are counter to the fact that microprocessor speeds are going up and more and more peripheral components are being added to today's computer systems and networks.

Today, system vendors are decreasing distances between processors, memory controllers and memory to allow for increasing clock speeds on front end buses. The resulting microprocessor-memory complex is becoming an island unto itself. At the same time, there is a trend to move the huge amounts of data used in today's business place to storage locations external to network computers and servers. This segregation between processors and data storage has necessitated a transition to external I/O solutions.

One effort to meet some of these demands resulted in what is known as the Future I/O ("FIO") Architecture Specification. The FIO Architecture Specification lays the groundwork for this revolutionary approach to industry standard I/O components and their interconnections. It is an architectural successor to PCI and PCI-X that allows the I/O subsystem to scale proportionally with advances in the rest of the computer system. FIO supports both scaling in size to meet the needs of large enterprise systems designed to serve the Internet, and scaling over time to allow I/O performance upgrades to more closely track the up-grades of microprocessor and memory technology.

FIO is designed around a point-to-point, switched I/O fabric, whereby endnode devices (which can range from very inexpensive I/O devices like single chip SCSI or Ethernet adapters to very large host computers) are interconnected by one or several cascaded switch devices. The physical properties of the FIO interconnect support three predominant environments, with bandwidth, distance and cost optimizations appropriate for these environments:

1) Chip-to-chip, as typified on single board computers
2) Board-to-board, as typified by larger computer systems that support I/O board add-in slots
3) Chassis-to-chassis, as typified by interconnecting computers, external storage devices and external LAN/Wan access devices (such as switches, hubs and routers) in a data-center environment.

The FIO switched fabric can be viewed as a reliable transport mechanism where messages are enqueued for delivery between end nodes. Message content and meaning is not specified by FIO, but rather is left to the designers of end node devices and software that is hosted on end node devices. Sufficiently reliable hardware transport protocols are defined to support both reliable messages (send/receive) and memory manipulation semantics (e.g., Remote Direct Memory Access ("RDMA") and fetch operations ("fetchops")) without software intervention in the data movement path. Adequate protection and error detection mechanisms are defined to allow messages to originate and terminate from either privileged kernel mode (to support legacy I/O and IPC needs) or user space (to support emerging IPC demands). The FIO Architecture Specification also addresses the need for a rich manageability infrastructure to support interoperability between multiple generations of FIO components from many vendors over time. This infrastructure provides inherent ease of use and consistent behavior in high-volume, cost-sensitive deployment environments. Also specified are industry-standard management interfaces that interoperate with enterprise class management tools for configuration, asset management, error reporting, performance metric collection and topology management necessary for data center deployment of FIO.

The FIO architecture has been carefully designed to minimize disruption of prevailing market paradigms and business practices. By simultaneously supporting chip, board and chassis interconnections, it is expected that vendors will be able to adopt FIO technology for use in future generations of existing products, within current business practices, to best support their customers needs. FIO is an I/O fabric connecting multiple media-specific I/O adapter devices. It is neither a competitor of nor replacement for any existing I/O media. FIO can support bandwidths that are anticipated to remain an order of magnitude greater than prevailing I/O media (SCSI, Fibre Channel, Ethernet). This ensures its role as the common interconnect for attaching I/O media. Reinforcing this point is FIO's native use of Ipv6 headers, which supports extremely efficient junctions between FIO fabrics and traditional internets and intranets.

FIO will be delivered by multiple vendors and channels supporting diverse customer needs and al-lowing customers the ultimate flexibility for purchasing computing components. The FIO Architecture supports implementations as simple as a single node computer system, and can be expanded to include: replication of components for increased system reliability, cascaded switched fabric components, and I/O adapters for additional I/O capacity and bandwidth, additional host node computing elements for scalable computing or any combinations thereof. FIO is a revolutionary architecture that enables computer systems to keep up with the ever increasing customer requirement for increased scalability, in-creased bandwidth, decreased central processing unit ("CPU") utilization, high availability and support for Internet technology.

A second solution to this I/O problem has been proposed by the InfiniBand(SM) Trade Association. The InfiniBand (SM) Trade Association is an independent industry body that is developing a channel-based, switched-network-topology interconnect standard. This standard will de-couple the I/O subsystem from the microprocessor-memory complex by using I/O engines referred to as channels. These channels implement switched, point to point serial connections rather than the shared, load and store architecture used in parallel bus PCI connections.

The InfiniBand interconnect standard offers several advantages. First, it uses a differential pair of serial signal carriers, which drastically reduces conductor count. Second, it has a switched topology that permits many more nodes which can be placed farther apart than a parallel bus. Since more nodes can be added, the interconnect network becomes more scalable than the parallel bus network. Furthermore, as new devices are added, the links connecting devices will fully support additional bandwidth. This InfiniBand architecture will let network managers buy network systems in pieces, linking components together using long serial cables. As demands grow, the system can grow with those needs.

The trend towards using serial interconnections as a feasible solution to external I/O solutions is further evidenced by the emergence of the IEEE 1394 bus and Universal Serial Bus (USB) standards. USB ports, which allow users to add peripherals ranging from keyboards to biometrics units, have become a common feature in desktop and portable computer systems. USB is currently capable of up to 12 MBps bandwidths, while the IEEE 1394 bus is capable of up to 400 MBps speeds. A new version of the IEEE 1394 bus (IEEE 1394b) can support bandwidth in excess of 1 GBps.

However, one problem common to even these new approaches is how to "train" communications links within the computing system. "Training" refers to the process by which ports through which communications are conducted are brought into the fabric of the computing in a manner that is efficient, but not disruptive. The present invention is directed to resolving, or at least reducing, one or all of the problems mentioned above.

SUMMARY OF THE INVENTION

The invention comprises a technique for training links in a computing system. In one aspect, the technique includes configuring a first receiver in a first port using a first training sequence or a second training sequence; transmitting the second training sequence from the first port indicating the first receiver is configured; and receiving a second training sequence transmitted by a second port at the first port, the second training sequence transmitted by the second port indicating that a second receiver in the second port is configured. In a second aspect, the technique includes locking a communication link; handshaking across the locked link to indicate readiness for data transmission; transmitting information after handshaking across the locked link. And, in a third aspect, the technique includes transmitting a first training sequence from a first port and a second port; and synchronizing the receipt of the first training sequence at the first and second ports; transmitting a second training sequence from the first and second ports upon the synchronized receipt of the first training sequence at the first and second ports; and receiving the second training sequence transmitted by the first and second ports and the second and first ports, respectively, in synchrony.

BRIEF DESCRIPTION OF THE DRAWINGS

The invention may be understood by reference to the following description taken in conjunction with the accompanying drawings, in which reference numerals identify like elements, and in which:

FIG. 1 depicts one particular embodiment of a Future I/O SAN constructed, configured, and operated in accordance with the present invention;

FIGS. 2–3 illustrate the data transfer concepts of "channel semantics" and "memory semantics" in the context of the present invention;

FIG. 4 FIO Client Processes Communicates With FIO Hardware Through Queue Pairs 28;

FIG. 5 Connected Queue Pairs;

FIG. 6 Connectionless Queue Pairs;

FIG. 7 Multiple SANICs per host and multiple ports per SANIC;

FIG. 8 Identifying Names for LLEs, SANICs, etc.;

FIG. 9 Subnets and Local Identifiers ("LIDs");

FIG. 10 Paths Within and Among Subnets;

FIG. 14 Remote I/O-Active Backplane;

FIG. 15 Remote I/O—Passive Backplane;

FIG. 16 Chassis-to-Chassis Topology;

FIG. 17 FIO Architecture Layers;

FIG. 18 FIO SAN, Software and Hardware Layers;

FIG. 19 Future I/O Layered Architecture;

FIG. 20 Data flow of flit delimiters and flit body data in flit layer;

FIG. 21 Flit Delimiter Fields;

FIG. 22 Flit TYPE definition;

FIG. 23 Flit Transmission Priority;

FIG. 24 FIO Data Path and Interfaces for Link and Physical Layers;

FIG. 25 8b/10b Coding Conversion;

FIG. 26 Beacon Sequence;

FIG. 27 FIO Link Training—One End Power-on;

FIG. 28 Future I/O Layered Architecture;

FIG. 29 Sample Point-to-point Topologies;

FIG. 30 Single-board Platform;

FIG. 31 Passive Backplane Platform;

FIG. 32 Platform-to-Chassis Topology;

FIG. 33 endnodes Connected via External Switch Elements;

FIG. 34 Leaf End-station with Embedded Switch;

FIG. 35 Sample Switch Frame Routing;

FIG. 36 Sample Router Route Operation;

FIG. 37 Attribute Comparison of Switch Routing Technologies;

FIG. 38 Graphical View of Route Headers and Payloads;

FIG. 39 Sample Unreliable Multicast Send Operation;

FIG. 40 Policy Based Routing Example;

FIG. 41 Connected QPs for Reliable Transfer Operation;

FIG. 42 Connectionless QPs for Reliable Datagram Operation;

FIG. 43 Connectionless QPs for UnReliable Datagram Operation;

FIG. 44 QP State Diagram;

FIG. 45 Completion queue model;

FIG. 46 Connection establishment accept frame transmission sequence;

FIG. 47 Connection establishment reject frame transmission sequence;

FIG. 48 Connection teardown frame transmission sequence;

FIG. 49 QP Attribute Update frame transmission sequence;

FIG. 50—Port States in Spanning Tree;

FIG. 51—Path Costs to Root (seen by Switch E);

FIG. 52—Bundles;

FIG. 53 Node Configuration and Discovery;

FIG. 54 Boot Process;

FIG. 55 Diagram highlighting communication between Application, Agent and FIO devices;

FIG. 60 FIO management routing diagram;

FIG. 61 IPv6 interoperability diagram;

FIG. 62 Example Endpoint Partitions of an FIO-Connected Cluster;

FIG. 63 Simple Tree with Mixed Bandwidth Links and Adapter Leaves;

FIG. 64 Simple Tree with Mixed Bandwidth Links and Adapter and Router Leaves;

FIG. 65—Simple Tree with Mixed Bandwidth Links and Adapter and Router Leaves;

FIG. 72 shows a table of the training sequences that comprise the training sequences used in FIG. 71 to train the ports;

FIG. 73 shows a table of lane identifiers used to label the individual channels in a serial physical link;

Figure 11:
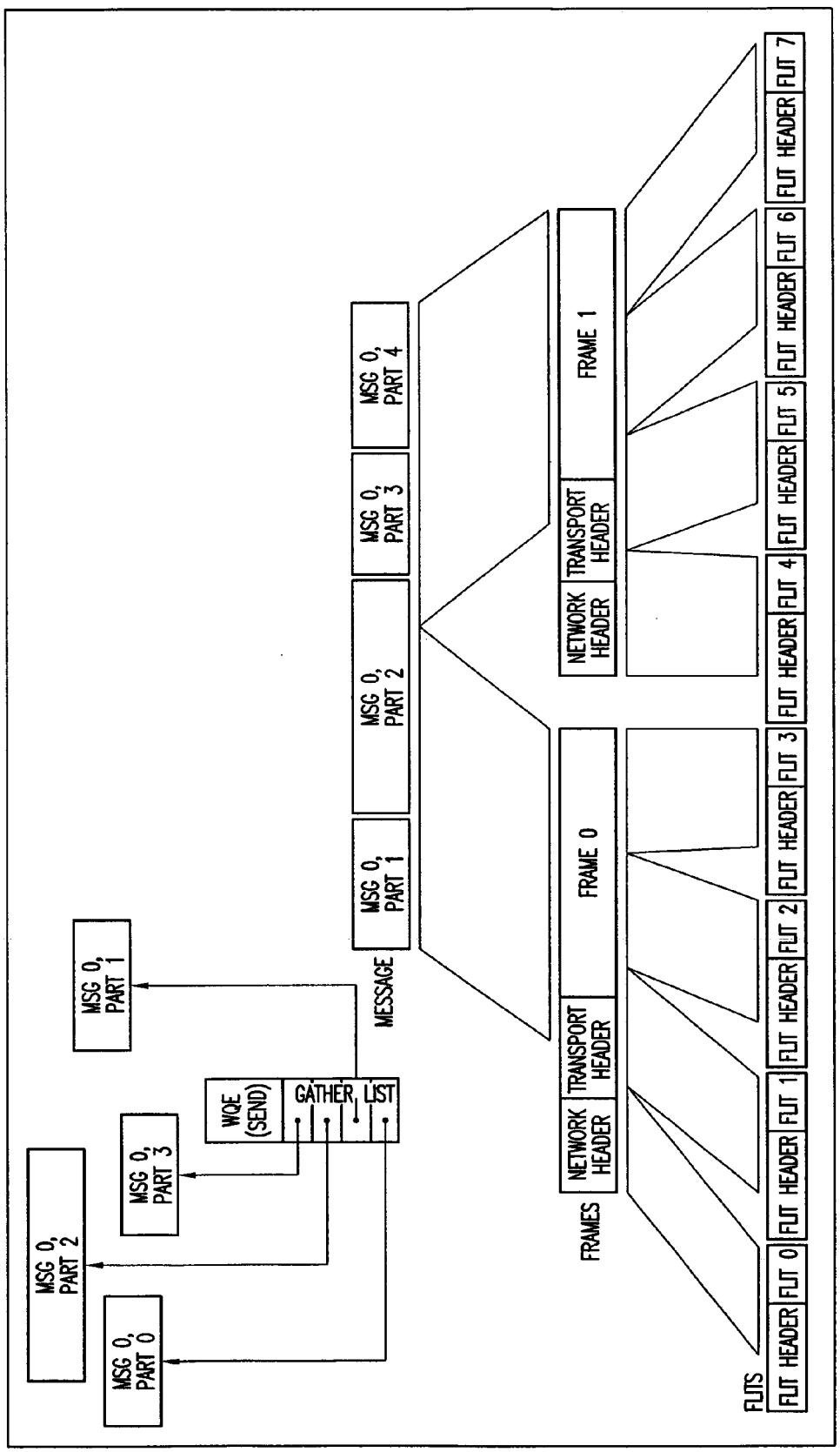
FIG. 11 An FIO message partitioned into Frames and Flits.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 67:
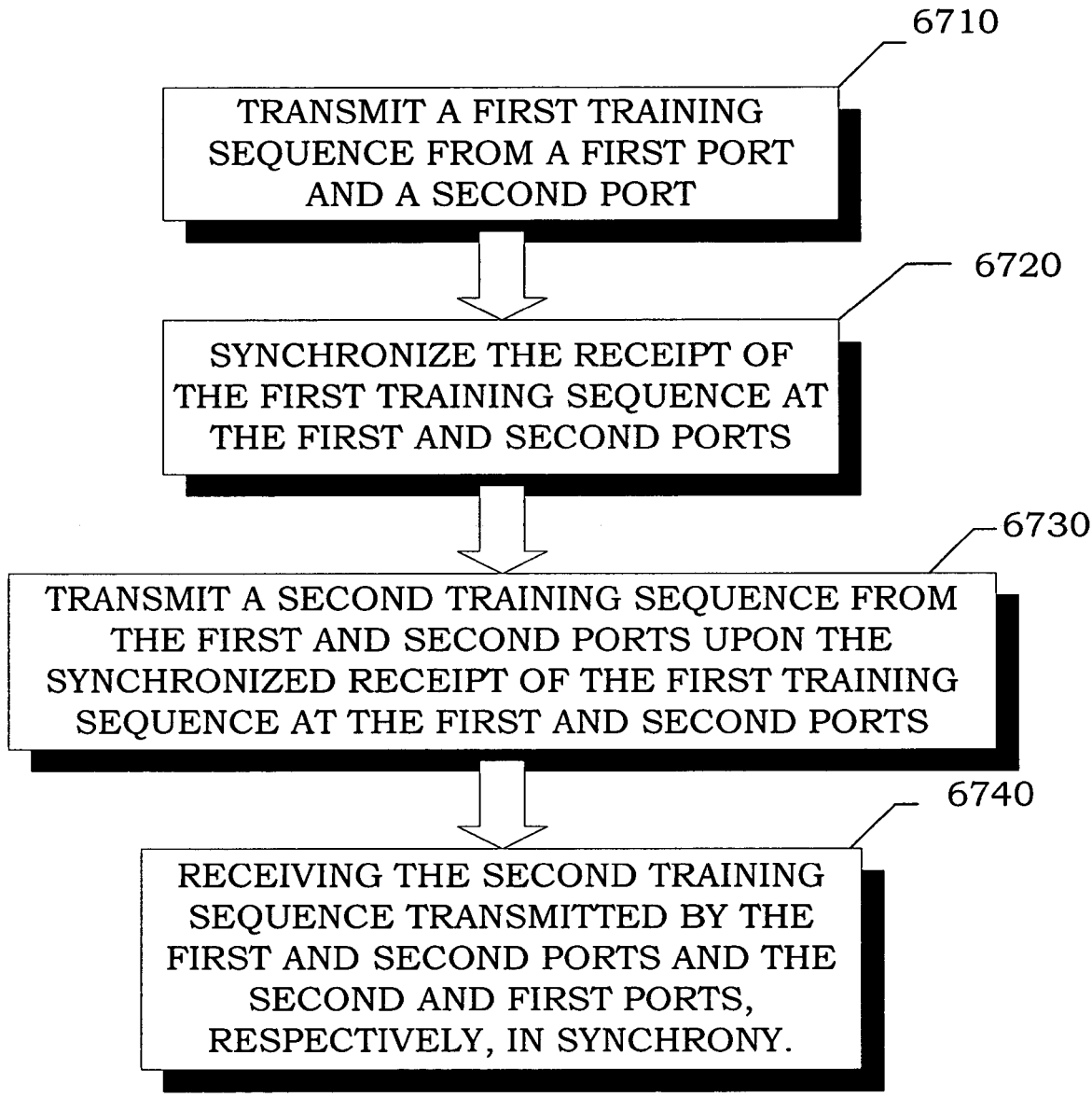
FIG. 67 illustrates a method for training communications links in one aspect of the method in FIG. 66.
Figure 68:
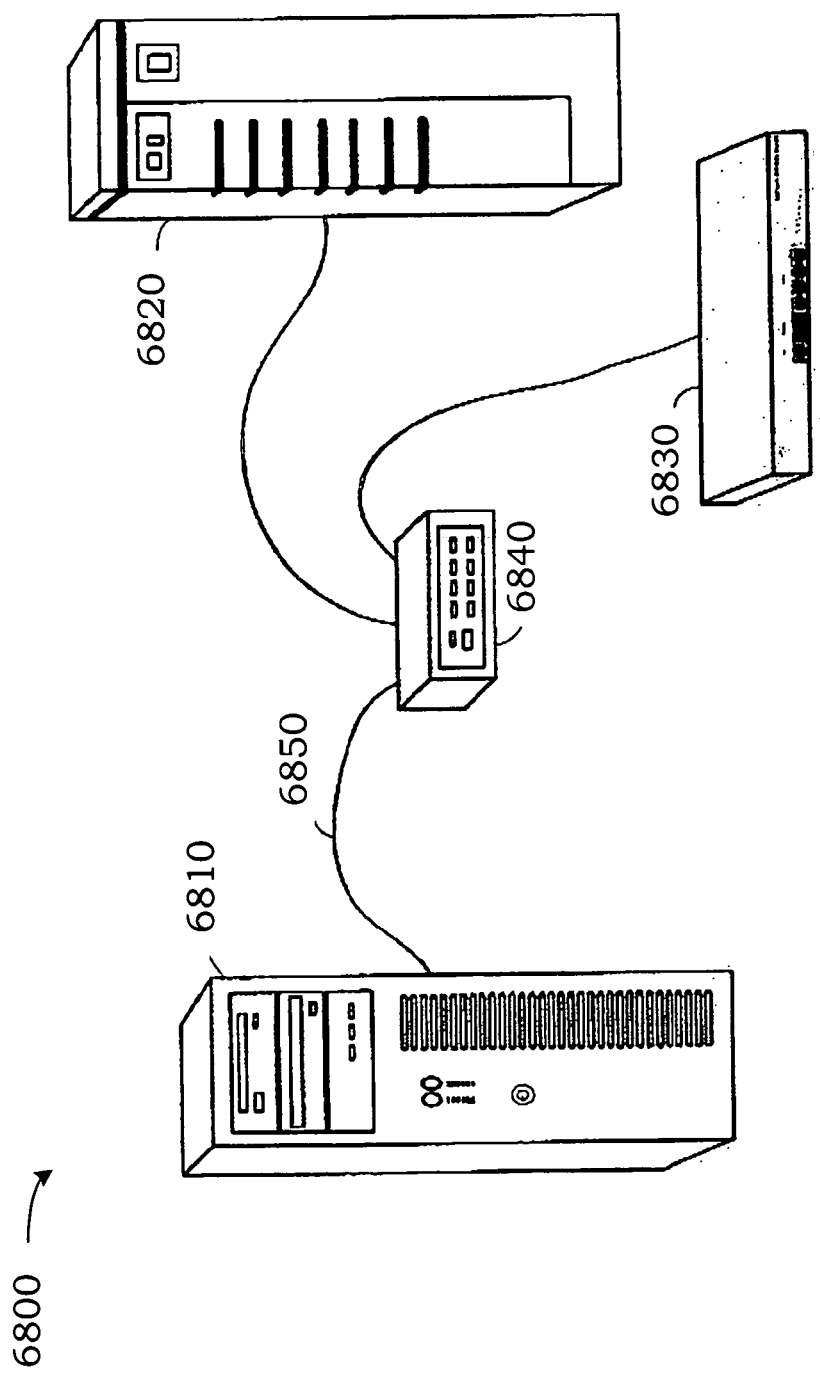
FIG. 68 depicts an exemplary embodiment of a computing system on which the method of FIG. 66 may be implemented.

The present invention is a "link training" technique for use in SANs implementing, e.g., Future I/O or InfiniBand I/O technologies. The following detailed description is separated into three parts. First, there is a discussion of one particular embodiment of a SAN implementing an FIO system in accordance with the present inventionSecond, there is a more general discussion of various aspects of the invention that are illustrated in FIGS. 67, 68, and 77. Third, a second embodiment implementing the present invention in a computing system employing InfiniBand, rather than FIO. This discussion is associated with FIGS. 69–76.

Structure of the FIO Implementation

Architectural Overview

FIGS. 1–18 and Table 1 provide an architectural overview for a SAN 100, shown in FIG. 1. The SAN 100 constructed, configured, and operated in accordance with the present invention. FIO defines a System Area Network ("SAN"), e.g., the SAN 100, connecting multiple independent processors, I/O adapters and I/O devices. The FIO SAN 100 comprises a plurality of host processors 110 connected to a plurality of multiple I/O adapters 130 through an FIO fabric 115 made up of cascaded switches 140 and routers 150. The FIO SAN 100 is the communications and management infrastructure supporting both I/O and interprocessor communications ("IPC") within one or more computer systems. FIO computer systems could range from a small server with one processor and a few I/O adapters to a massively parallel supercomputer installation with hundreds of processors and thousands of I/O adapters. Furthermore, the IP—(Internet protocol) friendly nature of FIO may easily be bridged to an Internet or intranet and connect to remote computer systems as well.

FIO defines a switched communications fabric allowing many devices to concurrently transfer with high bandwidth and low latency in a secure, remotely managed environment. Endnodes can communicate over multiple FIO ports and utilize multiple paths through the FIO fabric. The multiplicity of FIO ports and paths through the network are exploited for both fault tolerance and increased bandwidth for data transfers. FIO hardware off-loads much of the CPU and I/O adapter communications overhead. This allows multiple concurrent communications over a switched network without the traditional overhead associated with communicating protocols. The FIO SAN gives its I/O and IPC clients zero processor-copy data transfers, with no kernel involvement, and uses hardware to provide completely reliable, fault tolerant communications.

Turning now to FIG. 1, the SAN 100 in the illustrated embodiment comprises a plurality of host processors 110, a redundant array of inexpensive disks ("RAID") subsystem 120, a plurality of FIO I/O adapter backplanes 130, a plurality of FIO switches 140, and a FIO router 150. Note that the FIO router 150 provides interconnections 152 to wide area networks ("WANs") or local area networks (LANs) (not shown), but are not necessary to the practice of the invention. Note also that the FIO switches 140 and the FIO router 150 are cascaded. The manner in which they are cascaded is discussed in further detail below. Each of the of host processors 110, RAID subsystem 120, FIO I/O adapter backplanes 130, FIO switches 140, and the FIO router 150 are interconnected with a 1 GB+1 GB bi-directional link 160.

Each of the host processors 110 includes a plurality of CPUs 112, at least one system area network interface controller ("SANIC") 114, and some memory 116. The CPUs 112 may be any suitable processor known to the art, such as an Intel x86 processor, e.g., a Pentium III or Pentium Pro processor. The SANICs 114 interface between the FIO fabric and the host processors 110. The memory 116 may be private, shared, or distributed depending on the particular implementation.

The RAID subsystem 120 also includes a processor 112, a memory 116, and a SANIC 114. Enterprise computing networks, however, typically use mass storage units extensively, and RAID is common. As is known in the art, this technology uses multiple disks in a single unit in conjunction with one another to improve performance and enhance reliability. A RAID improves both performance and reliability by storing data onto multiple physical disk drives. Reliability is improved through redundancy of information, and performance is improved by exploiting the fact that multiple disks are available for use.

Note that there are several alternative, standard RAID implementations as well as many derivative or proprietary versions. The standard alternatives include:

RAID 0, also known as "striping without parity," in which information is stored in "stripes" across multiple disk drives, i.e., part of the data is written to a first drive, another part to a second drive, etc. This provides parallel access to enhance access times during writes to and reads from the memory. However, there is little or no redundancy, which hampers data protection. Consequently, some authorities do not technically categorize this as a RAID implementation.

RAID 1, also known as "mirroring," in which every write to the array is performed to at least two disks in its entirety. This produces as many exact copies of the written information as there are writes to separate disks.

RAID 5, or "striping with parity," which stripes information across the disks like RAID 0, but with parity information. The parity information can be used to reconstruct any lost data in the event that one of the disks in the array fails.

Note, however, that there are many other types of disk storage available, and any may be used alternative to, or in conjunction with, the RAID subsystem 120.

Each of the FIO I/O Adapter backplanes 130 includes an embedded FIO switch 140 interfacing with a plurality of FIO adapter cards 132. The adapter cards 132 may interface with devices operating in accordance with practically any protocol, including the Small Computer System Interface ("SCSI"), Fibre Channel, Ethernet, protocols or some sort of graphics application. The FIO I/O adapters can range in complexity from single Application Specific Integrated Circuit ("ASIC") FIO attached SCSI adapters to large memory rich RAID boxes that rival a host in complexity.

More generally, the FIO system 100 is made up of host and I/O adapter "endnodes" communicating through FIO "links." Endnodes include the host processors 110 or the I/O adapters 130 that connect to the FIO fabric 115. An endnode has Queue Pairs (discussed further below) that are the source or destination of FIO frames (also discussed below). Endnodes generate request frames and return acknowledgment frames. Links attach endnodes to other endnodes or, more typically, attach endnodes, switches, and routing devices. Links can be copper or optical cables or printed circuit wiring on a backplane or board. Links connect endnodes to switches and switches to switches and are defined for copper trace and cables. FIO also defines a board form factor for FIO connected I/O adapters. Since FIO is intended as a general purpose I/O standard to supplement PCI, FIO architecturally defines an I/O card suitable for plugging into a backplane. If vertically mounted, the card can fit in a 3U cage. Each of these cards has one require FIO backplane connection with an optional second FIO port. A dual height 6U version (with 2 to 4 FIO ports) is also defined. See the FIO Electrical Mechanical specification for a full description.

More precisely, an endnode (either a host processor or I/O adapter) can have one or more SAN Integrated Circuits ("SANICs"). The SANIC can in turn have one or more connections, or SAN Link Level Engines ("LLEs"), attached to the FIO fabric. FIG. 7 illustrates a host processor with two SANICs, each in turn with two LLEs that runs the link level FIO protocols. When a SANIC has multiple LLEs, RDMA traffic generated by that SANIC can make use of the LLEs simultaneously. This striping across LLEs increases the bandwidth for a single QP as well as provides multiple fault tolerant paths as well as decreases the latencies for message transfers. Multiple LLEs in a SANIC are invisible to the FIO client generating message requests. When a host processor has multiple SANICs, the FIO client must explicitly move data on the two SANICs in order to gain parallelism. A single QP cannot be shared by SANICs. Instead, a QP is owned by one local SANIC.

There are several different FIO defined terms for naming and identifying an endnode:

Host Processor or I/O Adapter Name. The host name identifies the endpoint for messages (i.e., messages are destined for processes residing on a specific host). There is one name per node but a node may have multiple SANICs.

Globally Unique ID ("GUID")—a EUI-64 compliant GUID. The GUID identifies the transport endpoint (i.e., the device supporting the transport QPs). There is one GUID associated with each SANIC.

Local ID—a 16 bit ID used to identify a SANIC within a single subnet. The Source Local Identifier ("SLID") and Destination Local Identifier ("DLID") are the source and destination Ids used in the FIO local network header. An LLE has a single LID and it is unique within a subnet.

IP Address—a 128 bit Ipv6 ID. A SANIC has one or more Ipv6 addresses associated with it. Analogous to the Local ID, the Ipv6 address is used in the global network header when routing frames outside of the subnet. LIDs and Ipv6 addresses are network endpoints and are the target of frames routed through FIO.

The LLE is not named as it is not architecturally visible to client software. Management refers to LLEs as an enumerated subset of the SANIC.

The naming strategy is very similar for Switches and Routers. Each input/output FIO path on the switch element and router has an LLE. Names used for Switches are: *

Each Switch, or group of switches packaged and managed together, has a single Switch name.

Each Switch or Router element has a single unique GUID.

Each Switch has one or more LIDs and Ipv6 addresses that are used as an endnode for management frames.

Each LLE is not given an explicit external name. Since links are point-to-point, the other end of the link does not need to address the LLE.

The Queue tail, consists of a Send Queue and a Receive Queue, message requests are initiated by posting Work Queue (WQE) to the Send Queue. The FIO client's message is referenced by a gather-list in the Send WQE as shown in FIG. 11. Each entry in the gather-list points to a virtually contiguous buffer in the clients local memory space.

Hardware reads the WQE and packetizes the messages into frames and flits. Frames are routed through the network, and for reliable transport services, are acknowledged by the final destination. If not successfully acknowledged, the frame is retransmitted by the source endnode. Frames are generated and consumed by the source and destination endnodes, not by the switches and routers along the way.

Flits are the smallest unit of flow control on the network and are generated and consumed at each end of a physical link. Flits are acknowledged at the receiving end of each link and are retransmitted if there is an error.

The send request message is sent as two frames. Each request frame is in turn broken down into 4 flits. The ladder diagrams shown on FIG. 12 show the request and ACK frames going between the source and destination endnodes as well as the requests and ACK flits between the source and destination of each link.

Figure 12:
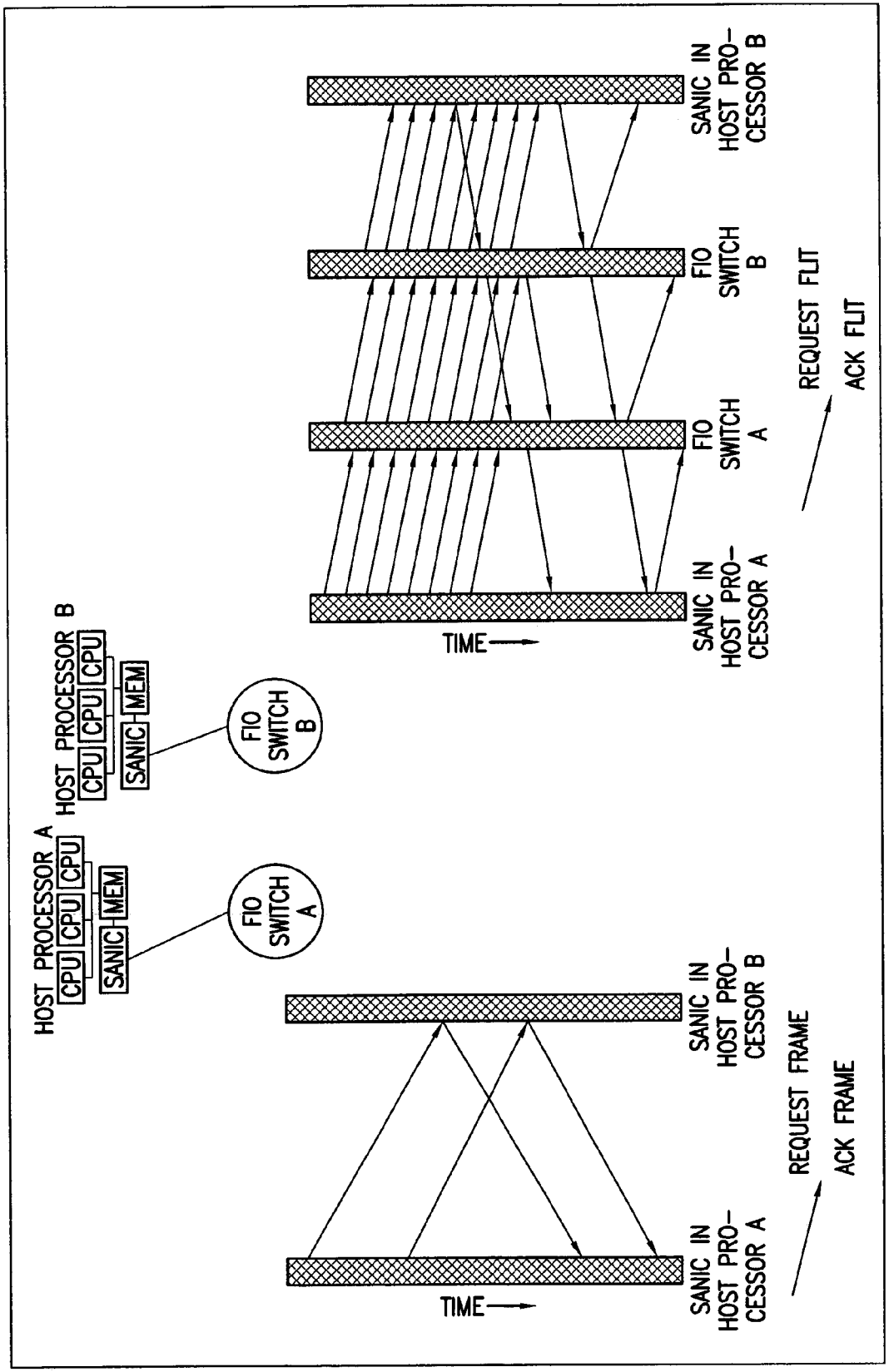
FIG. 12 Multiple Request Frames (and Flits) and Their Acknowledgment Frames (and Flits)

In FIG. 12, a message is shown being sent with a reliable transport. Each request frame is individually acknowledged by the destination endnode. The second part of FIG. 12 shows the flits associated with the request and acknowledgment frames passing among the processor endnodes and the two FIO switches. An ACK frame fits inside one flit and one acknowledgement flit acknowledges several flits.

The FIO SAN is a fully switched fabric. There is no concept of an FIO bus or an FIO arbitrated loop. The FIO fabric is made of subnets connected to each other with FIO routers. A subnet has up to $2^{16}$ endnodes, switches and routers. A subnet is a group of endnodes and cascaded switches that is managed as a single unit. Typically a subnet would occupy a single geographic or functional area, for example, a single computer system in one room. The switches in a subnet can do very fast worm-hole or cut-through routing of FIO messages. The switch examines a 16-bit destination local ID (DLID) that is unique within the subnet. This allows the switch to quickly and efficiently route incoming FIO message frames. The switch is relatively simple, typically implemented as a single ASIC. By cascading switches, a subnet can have hundreds or thousands of endnodes. For expansion to much larger systems, subnets are tied together with FIO Routers. The FIO router is able to interpret the Ipv6 destination ID and therefore route the IP-like FIO frame.

Switches and Routers both degrade gracefully when links are over-utilized. Link level backpressure is used to temporarily slow the flow of data when multiple input frames compete for a common output. Link or buffer contention does not cause the loss of data.

Switches, routers and endnodes use the FIO link protocol to transfer data. The link protocol supports an automatic error retry. Link level acknowledgments detect errors and force retransmission of any data impacted by bit errors. Link-level error recovery greatly reduces the number of data errors that are handled by the end-to-end protocols. Note that whether the error is detected and corrected by the link-level or the end-to-end protocol, the FIO user client is not involved with error recovery.

Switches and Routers use multiple virtual lanes within a single physical FIO link. Frames injected into the FIO fabric follow a particular virtual lane from their source to their destination. At any one time, only one virtual lane can make progress on a given physical link. Virtual lanes are a technique where link level flow control can be applied to one lane without affecting the others. When a frame on one virtual lane blocks (due to contention or QOS considerations) a frame on a different virtual lane is allowed to make progress. Virtual lanes are used for several reasons:

For quality of service. Certain virtual lanes can be reserved for high priority or isochronous traffic.

For deadlock avoidance. Virtual lanes allow topologies that contain loops to send frames across all physical links and still be assured the loops won't cause back pressure dependencies that might result in deadlock.

To alleviate head-of-line blocking. With virtual lanes, a blocked frame can "pass" a temporarily stalled frame that is destined for a different final destination.

An FIO switch will propagate data from only one frame at time, per virtual lane through its crossbar switch. That is, on any one virtual lane a switch will propagate a single frame from start to finish. Frames are not multiplexed together on a single virtual lane.

Thus, there may be a variety of paths through the FIO subnet. Within a subnet, a path from a source port to a destination port is determined by the LID (local identifier) of the destination SANIC port. Between subnets, a path is determined by the Ipv6 address of the destination SANIC port. The paths used by the request frame and its corresponding acknowledged ("Ack") or not acknowledge ("Nack") frame are not required to be symmetric. Switches select an output port based on the DLID (i.e., oblivious routing). A switch may use one set of routing decision criteria (e.g., one routing table) for all its input ports or it may use a separate set of criteria for each input port. Each port on an endnode may have multiple Ipv6 addresses. Multiple addresses may be used for several reasons:

different IP addresses can identify different partitions or services on the endnode.

different IP addresses can be used for different quality of service attributes.

different IP addresses can identify different paths through the intrasubnet routes.

Each port on an endnode may have multiple LIDs. Multiple LIDs may be used for several reasons.

different LIDs can identify different partitions or services on the endnode.

different LIDs can be used to specify different quality of service attributes.

different LIDs specify different paths through the subnet.

There is not necessarily a one-to-one correspondence between LIDs and Ipv6 addresses. A SANIC may have more or less LIDs than Ipv6 addresses for each port. For SANICs with redundant ports and redundant connectivity to multiple fabrics, it is not required nor prohibited for SANICs to use the same LID and Ipv6 address on each of its ports.

A Host FIO endnode and an I/O adapter endnode will typically have different capabilities. For example, a host endnode might support 4 FIO ports, hundreds of thousands of QPs, and allow incoming RDMA operations. An FIO attached I/O adapter endnode might only support one or two FIO ports and tens of QPs and not allow incoming RDMA operations. Furthermore, a low end FIO attached I/O adapter may choose to use software to handle much of the network and transport layer functionality as the Host FIO endnode does in hardware. FIO allows significant freedom of implementation while still defining a common architecture to ensure interoperability. The FIO architecture does not define many aspects of the endnode or switch design. This is done to allow flexibility to meet specific design goals (e.g., cost and performance) and to encourage competition and new designs. To start the FIO design efforts, the FIO Coreware group defines several FIO implementations, a pre-silicon simulation environment and validation suites. The coreware defines internal hardware inter-faces that allows portions of the coreware design to be refined and reused.

Channel and Memory Semantics. FIO supported communications give the user both channel semantics, as shown in FIG. 2, and memory semantics, as shown in FIG. 3. Channel semantics, sometimes called Send/Receive or Push, refers to the style of communications used in a classic I/O channel—one party pushes the data and the destination party determines the final destination of the data. The frame transmitted on the wire only names the destination process's communication port, the frame does not describe where in the destination process's memory space the frame will be written. With memory semantics one party directly reads or writes the virtual address space of a remote node. The other party need only communicate the location of the buffer; it is not involved with the transfer of any of the data. Both channel semantics and memory semantics are supported by FIO and both are necessary for I/O and IPC. A typical I/O operation might use a combination of channel and memory semantics. For example, a host processor initiates an I/O operation by using channel semantics to send a disk write command to an I/O adapter. The I/O adapter examines the command and uses memory semantics to read the data buffer directly from the memory space of the processor. After the operation is completed, the I/O adapter then uses channel semantics to push an I/O completion message back to the host.

FIO Scope. The FIO Architecture Specification defines the FIO interconnect fabric, routing elements, endnodes, and the formats and protocols for communication. It does not specify specific I/O commands or cluster services. These will be implementation specific depending on factors that will be apparent to those skilled in the art having the benefit of this disclosure. For example, consider an FIO attached SCSI adapter. FIO does not define the disk I/O commands, how the disk communicates with the SCSI adapter, or how the operating system ("OS") views the disk device, or which processor in the cluster owns the disk adapter. FIO is an essential underpinning of each of these operations, but does not directly define any of them. Instead, FIO defines how data and commands are transported between the host processor and the SCSI adapter. FIO handles the data communications for I/O and IPC in a multi computer environment. It supports the high bandwidth and scalability required for I/O. It also supports the extremely low latency and low CPU overhead required for IPC. With FIO, user clients can bypass the operating system ("OS") kernel and directly access FIO network communication hardware, enabling efficient message passing protocols. FIO is well suited to current computing models and will be a building block for new forms of I/O and cluster communication. FIO allows I/O adapters to communicate among themselves or communicate with any or all of the processor nodes in a system. With an I/O adapter attached to a SAN, the I/O adapter has the same communications capability as any processor element.

Queue Pairs. The FIO client's software communicates with FIO hardware through one or more "queue pairs". A SANIC in a host processor will support many thousands of QPs while the SAN interface in an I/O adapter might support less than ten QPs. As is shown in FIG. 4, the queue pair (QP) 400 is a Send Work Queue 410 and a Receive Work Queue 420 combined. Software places work items, called Work Queue Entries ("WQE") (not shown) onto the queues and the work item is executed by hardware. Work Queue Entries can initiate data communications using channel or memory semantics or can be instructions to the hardware to set or alter remote memory access protections, or to delay the execution of subsequent WQEs posted to the same Send Queue 410.

Specifically, the WQEs supported for Send Queues are:

Send Buffer—a channel semantic operation to push a local buffer to a remote QP's receive buffer. The Send WQE includes a gather list to combine several virtually contiguous local buffers into a single message that is pushed to a remote QP's Receive Buffer. The local buffer virtual addresses are in the address space of the process that created the local QP.

Remote Direct Memory Access ("RDMA") Read—a memory semantic operation to read a virtually contiguous buffer on the remote node. The RDMA Read WQE reads a virtually contiguous buffer on a remote endnode and writes the data to a virtually contiguous local memory buffer. Like the Send WQE, the local buffer is in the address space of the process that created the local QP. The remote buffer is in the virtual address space of the process owning the remote QP targeted by the RDMA Read.

RDMA Write—a memory semantic operation to write a virtually contiguous buffer on a remote node. The WQE contains a scatter list of local virtually contiguous buffers and the virtual address of the remote buffer into which the local buffers are written.

RDMA FetchOp—a memory semantic operation to do an atomic operation on a remote 64 bit word. The RDMA FetchOp is a combined RDMA Read, Modify and RDMA Write operation. Several read-modify-write operations, such as Compare and Swap if equal are supported.

Bind/Unbind R-Key—a command to the SANIC hardware to modify the association of a "Remote access Key" (R-Key) with a local virtually contiguous buffer. The R-Key is part of each RDMA access and is used to validate that the remote process has permitted access to the buffer. R-Keys are further described below.

Delay—a command to the SANIC hardware to delay processing of the QP's WQEs for a specific time interval. This allows a process to meter the flow of FIO operations into the fabric.

For Receive Queues, only a single type of WQE is supported:

Receive Buffer—a channel semantic operation describing a local buffer into which incoming Send messages are written. The Receive WQE includes a scatter list describing several virtually contiguous local buffers. An incoming Send message is written to these buffers.

The buffer virtual addresses are in the address space of the process that created the local QP.

For IPC, a user-mode software process can transfer data through the QPs directly from where the buffer resides in memory. Furthermore these transfers can bypass the operating system and consume few host instruction cycles. Zero processor copy data transfer, with no kernel involvement, is important to FIO efficiently supporting high bandwidth, low latency communication.

FIO operations use virtual addresses and existing virtual memory protection mechanisms to assure correct and proper access to all memory. FIO application are not required to use physical addressing for any operations. Remote memory accesses are further restricted by the user mode client of FIO. Before a process allows remote memory accesses, it first binds a remote memory access key to a description of the buffer. Only an incoming RDMA request with the correct key can gain access to the specific range of previously defined data buffers. This binding of memory access permissions can be done entirely in hardware and does not require any CPU overhead or kernel involvement. Remote accesses can be controlled with byte granularity on both the lower and upper bound of each virtually contiguous buffer.

FIO Transport Services. The FIO transport mechanisms provide four types of communication services. When a QP is created, it is set to provide one of the four types of transport services:

Reliable Connection;

Reliable Datagram (connectionless);

Unreliable Datagram (connectionless); and

Raw Datagram.

The Reliable Connection service associates a local QP with one and only one remote QP. A Send Buffer WQE placed on one QP causes data to be written into the Receive Buffer of the connected QP. RDMA operations operate on the address space of the connected QP.

A connected service requires a process to create a QP for each process it wishes to communicate with over FIO. If M processes on N processors all wish to talk, each processor requires $M*N^2$ QPs. A process can connect a QP to a QP on the same SANIC as itself.

The Reliable Connection is reliable because hardware can maintain sequence numbers and acknowledges all frame transfers. A combination of hardware and SAN driver software retries any failed communications. The client of the QP sees reliable communications even in the presence of bit errors, receive buffer under runs, network congestion, and if alternate paths exist in the fabric, failures of fabric switches or links.

The FIO acknowledgments are used to ensure data is delivered reliably to the remote QP or memory space. The acknowledgment is not a process level acknowledgment—it doesn't validate the receiving process has consumed the data. The acknowledgment only means the data has reached the destination. The Reliable Datagram service is connectionless. It allows the client of the QP to communicate with any other QP on any other remote node. On the Receive Queue, it allows in-coming messages from any QP on any other remote node.

The Reliable Datagram service greatly improves the scalability of FIO. Since the Reliable Datagram service is connectionless, an endnode with a fixed number of QPs can communicate with far more processes and processors compared to that possible using the Reliable Connection transport service.

The Reliable Datagram service uses sequence numbers and acknowledgments associated with each message frame to ensure the same degree of reliability as with the Reliable Connection service. The SANICs maintain end-to-end specific state to keep track of the sequence numbers, acknowledgments and time-out values. The end-to-end state is shared by all the connectionless QPs communicating between a pair of processors.

The Unreliable Datagram service is also connectionless. It is used by management applications to discover and integrate new FIO switches and endnodes. It does not provide the reliability guarantees of the other services, but also can operate with less state maintained at each endnode.

The fourth service is not technically a transport. It allows the QP to send and receive raw datagram frames. With the raw datagram service, the FIO hardware can generate and consume standard protocols layered atop Ipv6, such as the Transmission Control Protocol ("TCP") and the User Datagram Protocol ("UDP"). The FIO frame header can be mapped directly to and from an Ipv6 header. Native Ipv6 frames can be bridged into the FIO SAN and delivered directly to a QP. This allows an FIO client to support any transport protocol running on top of Ipv6.

The FIO client can register with the hardware in order to direct datagrams for a particular upper level protocol (e.g., TCP) to a particular QP. FIO hardware can de-multiplex an incoming Ipv6 stream of datagrams based on the Next Header field as well as the destination IP address.

FIO Transactions. An FIO data transaction is composed of several hardware and software steps. A user-mode or kernel-mode process can be a client of an FIO data-transport service. The process accesses the FIO hardware through one or more QPs (queue pairs). The process calls an operating-system specific programming interface called the FIO Verbs. The code implementing the FIO Verbs in turn posts a Work Queue Element (WQE) to the QP work queue.

The method of posting a WQE and the WQE format are not defined by FIO, and are implementation specific. This allows innovation in implementations as well as designs that support various cost performance points. This lack of standardization in no way affects interoperability. A user process talks to the FIO Verbs in a well-defined manner and the format and protocols of the data going across the wire is completely specified. FIO allows devices to interoperate in a heterogeneous vendor environment.

The hardware detects the WQE posting and accesses the WQE. The hardware translates and validates the WQE's virtual addresses and accesses the data. The outgoing message buffer is split into one or more frames. To each frame the hardware adds a transport header (sequence numbers, etc.) and a network header (destination IP address or destination Local ID, etc.). The appropriate local or global network header is added depending on if the destination resides on the local subnet or on a remote subnet.

A frame is the unit of information that is routed through the FIO fabric. The frame is an endnode-to-end-node construct, in that it is created and consumed by endnodes. Switches and routers do not generate or consume either request or acknowledgment frames, they simply move them closer to the ultimate destination (although routers do modify the frame's network header when the frame crosses a subnet boundary). When traversing a subnet a single frame stays on a single virtual lane.

When the frame is placed onto the wire, it is further broken down into flits. The flit is a unit of link-level flow control. The flow of flits is subject to the link-level protocol which can do flow control or retransmission after an error. The flit is a link-level construct. It is created at each endnode, switch or router output port and consumed at each input port. The header and payload sizes for FIO transactions are set forth in Table 1.

TABLE 1

Header and Payload Sizes

| Item | Header | Size | Payload Size (exclusive of all headers) |
|---|---|---|---|
| Frame | Local Network Header | 8 Bytes | variable, in byte increments up to 4 KB max |
|  | Global Network Header | 40 Bytes |  |
|  | Transport Header | 16 Byte (Send Request) 24 Byte (RDMA Request) 8 Byte (ACK) |  |
| Flit | Flit Header | 8 Bytes | variable, in 16 B increments up to 512 Bytes max. |

If a reliable transport service is in use, after the frame reaches the destination, the destination sends an acknowledgment frame back to the sender. The acknowledgment frame is key to the reliable transfer of data. It allows the requestor to validate that the request reached the destination. An acknowledgment is sent back to the requestor after each request frame. The requester may have multiple outstanding requests before it receives any acknowledgments. This window size is agreed to when the QP is created.

Structure of the Layered Architecture

The FIO architecture is described as a series of independent layers. Each layer is independent of the other layer and has a well defined interface to the layer above and below. Independent layers are an effective way to define an architecture. They allow modifications to one part of the design without affecting the other. FIGS. 17 and 18 show two views of this layering. FIG. 17 shows the hierarchy of architectural layers while FIG. 18 gives a different view of an FIO SAN showing the same architectural layers partitioned into software and hardware blocks Actual implementations need not follow the strict layers of the architectural description. The FIO architecture specification is organized around this layered model. Read from start to finish, this document will give a bottom-up view of the FIO architecture. The layered architecture includes the following layers:

a physical layer, discussed to some extent above in the architectural overview;

a link layer, including the flit format and protocols for flit operation, e.g., flow control, retransmission, etc. The current FIO specification defines three physical interfaces. The same link level encoding is used for these three physical interfaces. The current physical interfaces are all 10-bit parallel and use the same encoding. When they are practical, new physical interfaces will be defined e.g., a 10 gbps serial or quad 2.5 gbps. These new physical interfaces will require a new link layer encoding, but will still work with the current flit formats and protocol.

a network layer;

a transport layer. The network portion of the frame header gets a frame to the desired destination. The transport portion of the frame header delivers the frame to the proper QP along with the agreed upon service (e.g., reliable).

a driver layer;

a Network Supervisory and Management Protocol used for communication among the endnodes and switches for the initialization, error recovery and allocation of hardware resources (e.g. create QP, destroy QP etc.). The SANIC Driver communicates with other SANIC drivers using the Network Supervisory and Management Protocols described further below.

a management interface for communication between managed devices (Host endnodes, IO adapter endnodes, switches and routers) and a management agent using a simplified protocol.

an error recovery protocol. FIO performs error recovery at several of the different architectural layers.

Each architectural layer is defined separately so the user can jump to the appropriate sections and each is discussed further, in turn, below.

The Physical Layer. The Physical layer provides definition those element that allow for interoperability between components from ASIC OEMs, I/O adapter IHVs, and system vendors. The elements addressed are Electrical Signaling, Mechanical Form Factors, Power Control/Hot Swap and Hardware Management. The FIO Electrical/Mechanical Specification describes the Physical Layer.

Links are point-to-point in structure and are used to connect endpoints to switches and switches to switches. A link is a full-duplex interface using small swing differential signaling and is comprised of 40 conductors (10 data bits*2 differential*2 directions). The data on the link is encoded using an 8b/10b algorithm; this guarantees a maximum time between transitions on the lines and thus allows for clock ex-traction from the data stream using one or more phased locked loops (PLL). The link interface is definitionally parallel and is self tuning for jitter and both inter- and intra-pair skew compensation. The specification calls for a roadmap of interoperable link generations. The first uses signaling rate of 1.25 Gb/s per bit yields a net payload bandwidth of 1 GB/s per direction (2 GB/s of cross-sectional band width). The second generation calls for 2.5 Gb/s per bit for a net payload of 2 GB/s per direction. The third generation calls for 5 Gb/s per bit for a net payload of 4 GB/s per direction. As the 5 Gb/s signaling rate is recognized to be pushing the edges of foreseen technologies, pins are reserved to allow for growth to a 48 conductor (12 data bits*2 differential*2 directions) interface.

The targeted electrical topologies include on-board (e.g., switch to switch on a board), slot on board (e.g., switch to adapter like PCI), board to board (e.g., pluggable switch to pluggable adapter), remote copper attachment (e.g., modular I/O expansion), and remote optical attachment (e.g., datacenter expansion). This topologies bring a combination of FR4 PCBs, board connectors, assembled cable and connectors, and optical components. The differential signaling used enables the ability to drive copper with distance with still being applicable on PCBs. The encoding provides for DC balance in the data stream such to support optical implementations straightforwardly.

Standard slots with connector definition and board form factors are specified. The board sizes are based on IEEE and EIA industry standards. Specifically, three boards are defined: "Single" which measures 100 mm×220 mm and support either 1 or 2 link ports; "Double" which measures 233.35 mm×220 mm and supports 1, 2 or 4 link ports; and "Half" which measures 47 mm×220 mm and supports only 1 link port. Half sized board are intended for cable attachment to backplanes and optical conversion functions. Thermal and ElectroMagnetic Interference (EMI) properties are also addressed. Chassis mechanicals, other than those required by formation of the standard slot, are not defined.

Future I/O defines that adapter boards have power conversion circuits to take a 12 V distributed primary supply and produce those voltage levels required by an implementation. This allows for adapter ASIC technology evolution without implications on this specification. In conjunction with these power conversion circuits, pin sequencing and timing requirements facilitate both hot insertion and removal. Additionally, a separate auxiliary, low power input is defined to allow for wake-on-media and other hardware management operations when the primary inputs are not enabled.

Hardware Management defines those mechanisms that allow for control and monitoring of physical functions from within the Future I/O network and from the system chassis. Physical functions includes elements like power, thermal, vital product data (VPD), The "in-band" mechanisms defines access to This enables a broad range of management capabilities across differing system designs.

The Link Layer. FIGS. 19–27 and Tables 2–3 illustrate more particularly the structure and function of the link layer. The Future I/O layered architecture, diagrammed in FIG. 19, shows the various layers of data communications path, and shows the organization of data and control information as they are passed between layers. The architecture follows the general outline of a classical communication stack. For example, Transport Layers pass messages to Network Layers, which pass Frames down to the Link Layers, which pass flits through Physical layers, which send bits (or groups of bits) to other Physical layers. Similarly, the Link Layers pass flits to other Link Layers, and don't have visibility to how the Physical Layer bit transmission is actually accomplished, and Network Layers only handle frame routing, without visibility to segmentation and reassembly of frames into flits for transmission between Link Layers.

The details of the various layers up to Transport Layer and Verbs are described in various chapters of this specification. The Upper Layer Protocols are the "application level" processes which employ the Future I/O Transport services for data movement, and include, for example device drivers and their corresponding I/O adapters, or user-level distributed message-passing applications.

This chapter describes the functions handled by the Link Layer of the Future I/O Architecture. The Link Layer includes 2 functionally separate sub-layers: the Link Flit Level Logic, and the Link Encoding Level Logic. The Link Flit Level Logic handles sending and receiving of data across the links at the flit level. The Link Flit Level Logic is independent of the Physical Layer, other than the dependency on link transmission bandwidth (1–4 GB/sec). The Link Encoding Level Logic provides the digital data encoding/de-coding and multiplexing/demultiplexing necessary to interface the Flit level logic with the particular Physical Layer implemented.

This document describes only those portions of the Physical layer which are implemented within Future I/O Component chips (e.g., SANIC, Switch, or I/O adapter ASICs). These portions primarily include all the digital logic which is dependent on the particular Physical Layer implementation used. The other portions of the Physical Layer, which include the analog functions within a chip (e.g., drivers and receivers, de-skew logic, etc), as well as the interfaces between chip (e.g., voltage, attenuation, and power levels, connectors, board trace rules, cable specifications, etc.) are all incorporated into the Future I/O Electrical/Mechanical Specification, which can be found separately.

The Flit level protocol handles operations dealing with link-level flow control, link-level error control, and distinguishing between different types of data transferred over each link. The Link Flit layer logic relates only to the link-level protocol, i.e., each link-level engine is independent of all other link-level engines in the system. The Link Flit level protocol handles several functions. Link error control monitors the transmitted data for transmission errors, and corrects errors which can be fixed by data retransmission. Link data separation allows the link protocol logic to distinguish different types of data sent over the link, and provides some independence between the different types of data and control bytes flowing across the links. Finally, the link flit level handles link-level flow control, assuring that data is not transmitted across each link until there is guaranteed space to receive it into at the link receiver. The Link Flit level logic incorporates the following primary features.
* Frames, which are the unit of routing and end-to-end recovery, are split at the links into 1 or more flits. Flits (flow control units) are the fundamental unit of flow control, error control, and transmission granularity. This mechanism allows a combination of fine granularity for switching and link-level protocol, with larger frame-level granularity for protocol processing and the source and destination endnodes, for protocol-processing efficiency. The support for VLs on all links also provides fundamental link-level support for a wide variety of quality of. service or transmission priority capabilities, and allows the link level logic to be nearly independent of frame length, with minimal interaction between large and small frames on different VLs.

Flits includes an 8-byte flit delimiters, and between 0 and 512 bytes of flit body, in multiples of 8 bytes. The 8-byte flit delimiter includes error control information (sequence numbers CRCs), flow control information (credits for transmitting data across links), and flit description information (flit type, flit size, etc.).

Data transmission across links is transmitted across one of up to 16 architected "Virtual Lanes" or VLs. Each link supports separate buffering and separate flow control across each virtual lane, so that flits transmitted on one VL cannot be blocked behind data transmitted on another VL.

The link-level protocol allows ordered retransmission of flits, on a per-link (not per-VL) basis, to allow fast and efficient recovery from intermittent recoverable errors. This link-level error recovery mechanism is coupled with an end-to-end error recovery mechanism using frame retransmission on an alternate path, provides endnode-level recovery from unrecoverable link failure errors.

The link-level protocol is also involved with handling interoperability between link components operating at multiple speeds, to allow implementations at 1 GB/s, 2 GB/s, and 4 GB/s in the relatively near future.

These features provide a robust, high-performance link-level basic technology on which to build the routing and transport services described in the following chapters.

All transmission over each link of the Future I/O network is executed in units of a "Flit", which is the in-divisible unit of flow control and error control in the network. (The term flit is derived from "flow control unit".) All flow control through the network is executed in units of flits, and any link-level error detection and error recovery procedures are executed in units of flits.

The flit is of a variable size and has its own flit description, error control, and flow control information. One or more flits make up a frame, which can contain from 0 B to many KB of frame payload. The routing information for the data is kept at the frame level, and not at the flit level. All the flits for each frame are routed through the network along the same path, and are efficiently reassembled into a single per-VL frame buffer at the receiving endnode.

Flits of different frames can be interspersed on each link, at flit boundaries, provided that the frames are on different VLs. Within a particular VL, sequential flits must always be part of the same frame, on each link of the network. These rules assure that at the receiving endnodes, frames appear as fully reassembled frames in each of a set of per-VL receive buffers. This link-level segmentation and reassembly function simplifies and optimizes protocol processing for and interface to the higher-level endnode protocols.

The primary reason for using flit-based transmission on Future I/O links is to provide efficient transmission for both very small (8B) and very large (multi-KB) frames across a large switched fabric, with support for multiple priority levels. Large frames are a great help for the endnode engines for obtaining high-band-width data transmission, to minimize the per-frame processing overhead at the endnodes, particularly the receiving endnode. However, the link-level transmission and switching protocol and implementation be-comes more efficient with smaller transmission units, to minimize link-level buffer sizes, lower switching latency, and allow efficient interspersing of high- and low-priority traffic. Splitting long frames into shorter flits allows the endnodes to operate on a frame-level granularity, for better endnode protocol processing efficiency, while links and switches operate on a flit-level granularity, for better link buffering efficiency, lower latency, and faster switching between priority levels.

The flits are separated by 8B flit delimiters, which contain information about the subsequent flit, and about the error control and flow control state of the link. Each flit header also contains an error detection CRC which covers the flit header fields as well as the body of the *previous* flit.

Conceptually, the flits and flit delimiters flow across the links as shown in FIG. 20, with transmitted bytes being distinguished as either flit headers (shown shaded) or flit bodies (shown unshaded) of between 0 and 512 bytes. Note that on the actual links, the order of bit and byte transmission may not exactly reflect this picture, as described in the link encoding section (see Section 3.10 Link Encoding Layer and Link Physical Layer on page 63). FIG. 21 shows the format of the flit delimiter fields, which are the shaded bytes in FIG. 20. The format and use of these fields is described further below.

Each flit includes an 8B header, and between 0 and 512B of flit body, in multiples of 8B. This relatively large granularity simplifies data flow within the high-speed interfaces in the switches and endnodes. The 512B maximum flit size assures that the maximum time between arbitration across VLs is limited to 0.5 microseconds or less. Larger flits (e.g., 1 KB or larger) would allow a negligible amount of extra transmission efficiency. Frame payload may be defined to 1 B granularity, as indicated in the frame's local routing header, with filler bytes inserted to round out the final flit of the frame to the nearest larger 8B flit boundary.

Frame data is tightly packed into flits, starting a frame with a flit start, filling each until the end of frame, at which point a partly filled flit (and chunk) may occur. The Frame is assumed to carry its own length, so the link layer need not identify the length of a partly filled flit.

The end-point generating the frames determine the size of the flits used to transmit the frames. There is no segmentation or reassembly within a flit by the switches, in order that the flits generated at the source end-point are the same size as the flits received at the destination end-point.

When used to schedule transmissions, a flit is handled in its entirety. In general, flit scheduling between different VLs is done on a per-flit basis, regardless of the size of the flits transmitted, so endpoints that send small flits will tend to get less than their expected bandwidth in bytes per second, even though their percentage of flits is correct.

Components must allocate buffers and manage credits as though the flits are of a particular size, 64 bytes of data. If an actual flit is smaller, then it still uses a buffer and consumes a single credit. If a flit is larger than 64 bytes (data) it must consume more than one buffer and credit. Each buffer must carry the extra information associated with a flit; its data CRC, type, VL etc. (Note that some of this may be implied by the buffer itself, such as the VL. The opcode may also be reduced to a single bit such as start of frame.

The buffer and credit management size of 64 bytes was chosen to allow a better utilization of endpoint buffers and credits in the face of short flits. If we always manage the buffers as full flits, then 3000 bytes of buffer space contains about 6 flits. If we send very short flits on the wire, we may quickly starve the system for credits when the link is more than a few meters long.

To recover from soft errors, such as bit transmission errors on noisy links, flits can be re-transmitted at the link level between ends of a single link. Each flit containing valid information is assigned a sequence number, and is buffered at the link sender, for retransmission in case it is not acknowledged.

The originator of a flit keeps track of which flits have been acknowledged by looking for incoming 'Link Ack/Idle' flits. The sequence number in the Link Ack/Idle flit specifies the next expected flit, rather than the sequence number of the flit being acknowledged. This allows an 'aggregation' effect such that a single Link Acknowledge/Idle flit can be acking more than one flit.

The protocol allows for re-transmission of flits that may have already been received (i.e., a Link Ack/Idle flit was lost). Rather than attempting to get only the bad flit retransmitted, the protocol requires that everything be sent in sequence; the unacknowledged flit and everything sent after it is sent again in the same order as before. This simplifies the link receiver logic considerably, since it only has to determine whether the incoming flit's sequence number is the expected number or not.

The receiver is required to discard any valid flit whose sequence number does not match the current expected number, signal the Link Encoding Layer to generate and generate a Link Ack/Idle flit in response, regardless of whether the incoming flits sequence number is less than or greater than the expected sequence number.

If the sequence number of the incoming flit is less than the next expected sequence number, the receiver will acknowledge but discard the flit. This condition generally occurs when the sender did not receive a previously transmitted Link Acknowledge.

If the sequence number of the incoming flit is greater than the next expected sequence number, the receiver will still acknowledge the flit, however the sequence number of the Link Acknowledge flit will still reflect the next expected sequence number. This condition usually occurs when an preceding flit has been damaged/lost.

If a flit is retransmitted, the LCRC field of the preceding flit delimiter may be different than they were the first time it was transmitted, since they depend on the preceding flit at the time of transmission.

Flit types are as shown in FIG. 22, and include:

Ack/Idle flits are of minimum size, 8 bytes of delimiter only. The size field is set to zero, and not examined at the receiver. Sequence numbers are neither set (always 0) nor checked. No credits may be carried since this is not sequenced flit and a loss or repeat of this flit could result in incorrect sequence accounting. Ack/Idl flits are sent under two conditions: (1) when there is no other valid frame or credit or link control flit to send, and (2) at the interval required to prevent the corresponding link sender from timing out and retransmitting unacknowledged flits, as dependent on link roundtrip time measured with PING and PONG flits.

Credit-Only flits are of minimum size, and are sent when credits are needed but no data or other flit types are being sent. These are sequenced, i.e., they are assigned sequence numbers and must be acknowledged. This flit type should not be used unless there is at least one credit to send (never use this Opcode with Credit_Count set to zero), use an Sidle flit instead.

Frame flit are used to indicate flits that are used for data transmission between Future I/O components. These flits are assigned to particular Virtual Lanes, and have a VL field that must be used to put the flit in the appropriate VL receive buffer. The Frame:First flit indicates that this flit should be examined to find the frame's routing header information, and any other frame header information that fits in the first flit of the frames. All following flits in the frame are sent using Frame:Non-first flits. The end of the frame is determined by the length field in the frame's routing header. Control Frame flit types are used to indicate flits that travel on the management VL (15) and must be put in the appropriate queue. The same First/Non-first flit type mechanism is used as in Data transmission frames to delimit frame boundaries.

Init flits are used during link initialization, to re-set the sequence numbers, and zero the credit counts. This may be used to re-initialize the link, as well.

PING and PONG flits are used during link initialization, to determine the round-trip transmission time on the link. Each side transmits a PING flit, and reflects a received PING as a PONG, and the time between transmission of the PING and receipt of the PONG measures the link roundtrip time.

TOD are Time-of-Day flits, and are used to maintain a global 64-bit time-of-day across the whole FIO subnet. Each FIO component maintains a running counter, incrementing at the same rate, and TOD flits are used to synchronize the values at the various counters in the subnet. The exact design of the Time-of-Day mechanism (increment frequency, synchronization mechanism, etc.) will be documented in a later version of this specification.

Virtual Lanes provide independent, non-deadlocking data flows through the network. Each virtual lane has its own buffering and flow control, and the tunable VL arbitration mechanism allows the VLs to carry different priorities of traffic, as well. There are sixteen virtual lanes architected in the flit headers, but FIO components may be implemented with fewer VLs supported. VL 15 is reserved for management/network control functionality, for transmit-ting connection management, resource management, and subnet fabric management control frames, and shall be supported by all components. All components are expected to support at least VL0–VL7, as well as VL 15. Frames transmitted between end-points may be transmitted on any VL supported by all components on the path between those end-points. The end-points must agree on which VL to use, based on traffic priority and deadlock avoidance considerations. Switches and routers shall not change VLs during transmission, to prevent potential deadlock conditions.

The SEQ field allows individual flits to be distinguished, so that link-level error recovery can be used to correct link errors on a flit-by-flit basis. All flits except Idles and link initialization flits are sequenced, with sequence numbers in the 16-bit range from 0x0000 to 0xFFFE. The "all 1s" number, 0xFFFF, is reserved for distinguishing flits that are unsequenced—flits with SEQ=0xFFFF are not buffered at the link sender, and can not be retransmitted.

The link receiver logic tracks an expected sequence number, and only accepts the flit with the expected sequence number for transmission to the higher-level logic. If a flit with a sequence number other than the one expected is received, it is discarded silently.

The size requirement for the sequence number field is determined by the sizes of the transmitted flits and by the link BW*Roundtrip time supported. With an 16-bit sequence number field, up to 65535 flits can be outstanding. Assuming a minimum sequenced flit size of 24 bytes (the size of an End-to-End Ack Frame), this field covers at least ((2**16)−1)*24B=1.57 MB. Since each meter at 1 GB/s and 5 ns/meter supports 10B, this size of sequence number supports up to 150 km of link distance. Supporting this link distance* bandwidth will require single-mode optical fiber technology, which is not described in the current version of the Future I/O electromechanical specification, but which is expected to be at some time in the future.

This field describes the size of the flit body following the flit header, measured in 8-byte chunks. The actual flit size is 8 bytes times the value in this field, with the exception that the value 0b000000 may be interpreted as 64, for some TYPE values, to allow flits with up to 512 bytes (8*64 bytes) in size.

The link level credits are managed in units of 64 bytes of flit body only (a flit with a body shorter than 64 bytes is expected to use a full buffer, a longer flit uses multiple 64-byte buffers). The credits are managed as relative credits, the credit field in the flit is added to the available credits at the transmitter at each flit. Each valid normal flit contains a credit field, which may be set to zero.

The credits are forced to zero for each VL at link initialization, and credit-only flits are sent following link initialization to notify how much receive buffer space is available for each VL.

Credits are only transmitted in sequenced frames, which are buffered at the sender, acknowledged by the receiver, and retransmitted if they are not acknowledged. This assures that link credit is protected from loss to the same extent that the rest of the flit delimiter field data is protected. This allows incremental rather than absolute link credit accounting, which allows more flexibility in link technology design for bandwidth and distance. For current multi-mode parallel fiber modules, the maximum link bandwidth*roundtrip time is in the range of 3,000B, which would be covered by a credit counter with a size of (ceiling(log 2 (3,000/64))=) 6 bits.

The link level protocol relies on three independent, efficient error detection mechanisms for detecting link transmission errors, in addition to the implicit error detection mechanisms (e.g., valid sequence number, valid TYPE, valid VL, etc.). These error detection mechanisms include the following.

1) At the Coding layer, the 8b/10b code provides a level of transmission error detection, since link errors may either translate into invalid code points, or into errors in link disparity (imbalance between 0s and 1s). These errors are detected and flagged by the decoding logic.
2) A 16-bit End-to-end CRC calculation (ECRC) across the non-changing parts of the flit body allows error detection which is checked but not re-generated by the intermediate switches. This prevents a misbehaving switch from corrupting frame data, regenerating a CRC on the corrupted data, and presenting it as valid to the end-points.
3) A separate and distinct 16-bit Link CRC covering the flit body as well as the flit delimiter fields allows a third check on the flit body bytes, as well as second check on the 6 other flit delimiter bytes, including the ECRC value.

As shown in FIG. 21, the ECRC and LCRC calculations use different polynomials ($x^{16}+x^{12}+x^3+x+1$ and $x^{16}+x^{12}+x^5+1$, respectively), and cover different sets of bytes, so they provide independent error checking information.

Note that the LCRC is independently generated on each flit, since it covers link-level delimiter information (link credit, link flow control, etc.), as well as flit body (Frame header and Frame Data). If the link receiver gets an LCRC check, all of the other fields in the flit delimiter must be considered suspect and ignored, so no further error checking is possible.

Note also, that the ECRC calculation starts at the beginning of a frame, and is calculated cumulatively across the frame. That is, a running 16-bit ECRC is calculated along the frame bytes, and "snapshots" of this running ECRC calculation are inserted into the delimiter of each flit, as it is sent out. ECRC calculation is re-started from 0 at the beginning of the following frame. There is no necessity for a separate frame-level header CRC or data CRC.

ECRC is cumulatively collected separately for frames on each VL, requiring separate accumulators for each VL to allow the traffic from different lanes to be intermixed. The ECRC accumulator is restarted at frame boundaries.

If there is no data portion present in the flit before the delimiter, the ECRC is set to Zero, and the LCRC is calculated on the ECRC field and the other 4 delimiter bytes only.

For any particular flit slot across the link, the sending link layer may have a choice of flits to send. FIG. 23 on page 59. shows the multi-phase priority determination between flits of various types to be sent over each link.

The first phase of priority arbitration determines whether Time-of-Day Service Flits are to be transmitted. These flits, which allow a globally-accurate time-of-day to be maintained across all nodes of the network, must be sent immediately as they are generated, for global time accuracy.

The second phase of priority arbitration determines whether a link needs to be acknowledged, to assure the opposite end of the link that flits have been received correctly (in case of return ack time-out), or if the link needs to be re-initialized, by sending init flits. This level assumes that the more basic level of link initialization (tuning, de-skew, and length measuring using Ping and Pong flits) have been accomplished.

The third phase of priority arbitration determines whether any control frames originated from this switch or SANIC need to be sent. If the switch output port is not currently transmitting a packet on any VL, a locally generated control frame will have priority over all new packets. Once a service packet has left the chip that created it, the service packet will be handled like any other packet.

The fourth phase of priority arbitration determines which of the packets on the VLs of the higher level interface will be sent. This VL arbitration mechanism is described further below.

The fifth phase of priority arbitration determines whether there are credits to send and whether a new RSEQ needs to be sent. If credits need to be sent a credit-only flit is sent.

Finally, if no credits or other flits need to be sent, an Ack/Idle flit is sent.

There is an arbitration between the VLs at each link sender for transmission priority, since, at any time, there may be data on any or all of the VLs ready to be sent. This includes link senders in SPEs in SANICs, adapters, or switches. A wide variety of arbitration mechanisms are possible (round-robin between VLs, absolute priority per VL, guaranteed bandwidth per VL, etc., or various combinations), and the reality is that no arbitration mechanism is optimal, for all possible traffic patterns. The optimal VL arbitration mechanism at each link sender is determined by the overall quality-of-service level objectives provided to the various end-to-end data streams, which is a network-wide configuration, and depends strongly on the type of data being sent by the various end-points.

To handle this situation, the VL arbitration engines in each link sender will have to be configurable, to allow the fabric management to optimize the arbitration between VLs to match the overall quality of service objectives for the network. We are evaluating various VL arbitration configuration mechanisms, which will be configurable based on values programmed into configuration registers in each link sender.

For the entire network to work efficiently, the VL arbitration engines in each link sender need to be coordinated together under an overall fabric QoS policy, which is described further below.

The following counters are reset to zero at power-up, and count until reset by software. All values read are 64-bits so it is possible for software that periodically checks these counters to avoid resetting them by taking the difference between each reading as the current number. The minimum set of link level statistics counters is listed below.

Retries—Number of times flit level logic executed a retry.
Rx_Resets—Number of times flit level logic was reset
Work_time—Defined as the time (in milliseconds) spent transmitting all but idle or credit only flits. For each VL, the following should be kept:
Flits moved—Total number of flits moved on this VL. (Scaled down by 128).
Work_time—Amount of time spent moving flits on this VL since last reset. (in milliseconds)
Flits congested—Total of Flits that were delayed due to a credit congestion. (Scaled down by 128).
Congestion time—the sum of times spent while a flit was waiting for a credit (in milliseconds).

Other error counters may be defined, as required. All statistics counters should be roll-over counters and should not be reset, so that multiple fabric managers can monitor counters without interfering with each other. This means that thresholds will have to be defined in terms of difference between counts on successive reads, rather than on the counts reaching particular values. Managers should use the difference between the counts on successive reads for management.

Each sender maintains a single Link Retry timer (per FIO port) to control the interval for re-sending flits, or taking down the link if there's no response.

1) The Link Retry timer is enabled whenever a sequenced flit is out-standing.
2) The Link Retry timer is re-initialized when a valid Link Ack/Idle flit which advances the sequence number from the last acknowledged sequence number is received.
3) When the Link Retry timer expires, the following actions are taken:
    a second timer, the Link Kill Timer, is enabled. This timer determines the amount of time a device attempts to retry flits on a link.
    The Link Retry timer is re-initialized.
    The stream of unacknowledged flits is re-transmitted.

Future I/O employs a mechanism for synchronizing the FIO link between the devices on either end of the FIO link as follows:

1) Each FIO port initializes to a logical state referred to as "Link Untrained". While in the "Link Untrained" state, the Coding layer initialized the link at it's level. This mechanism is described further in the Link Encoding section, and includes sending Training sequences to as-sure that both end of the link are operational at the encoding layer.
2) When the link goes to the "Link Trained" State, as indicated by the Link Encoding layer, the Flit layer transmits an TYPE=Init Flits for a period longer than the maximum possible link roundtrip time, to ensure that the flit layers on both ends are operational. This resets the state on both ends of the link, nulls out all credit, and re-sets all CRC accumulators.
3) Following this, the flit layer transmits a TYPE=PING flit, and waits for a corresponding TYPE=PONG flit to return. If it receives an TYPE=PING flit, it returns an TYPE=PONG flit. This allows the link layer to determine the roundtrip transmission time on the link, which is necessary for efficiently setting time-out periods, and for the Time-of-Day logic.
4) Following this, the link flit layer goes into the "Link Active" state, and may start transmitting data. The first data to be transmitted will generally be a series of Credit-only flits, on all the VLs implemented except VL15 (which maintains only a singe large frame buffer, and operates in a store-and-forward manner). Once credit has been transmitted.

A requirement for Future I/O is to effectively support future improvements in link transmission bandwidth. As multiple generations of Future I/O link level technology are designed and built, a common procedure for allowing inter-operation of Future I/O components of different generations together. In more detail, as senders and receivers supporting a subset of the possible link speeds of 1 GB/s, 2 GB/s, and 4 GB/s, each sender/receiver pair must negotiate together to determine the highest commonly-supported link speed, and negotiate inter-operating at that speed.

This negotiation could be carried out locally, i.e., the sender/receiver negotiation to highest common link speed could be carried out in hardware, without knowledge of higher level layers. Alternatively, the link protocol hardware could be simplified by only requiring the link protocol hardware to determine the highest commonly-supported link speed, while allowing the fabric control service decide which speed each link should operate at.

In Future I/O, the plan is to allow the fabric control services to decide which links operate at which speeds, up to their highest commonly-supported speeds. In addition to link protocol design simplicity, this choice offers the higher-level logic to make global routing decisions, in order to assure load-balancing across the network links. Doing effectively load-balancing requires network-wide knowledge, so the service control logic to assure that most of the transmission bandwidth is distributed across faster links.

The general scheme for operating a link at higher than the base speed is as follows:

1) All link interfaces come up, at Power-On, at the base speed.
2) Each sender/receiver pair exchanges frames describing their status and capabilities, so that each knows what the other is capable of.
3) If the highest commonly-supported link speed is the base speed (1 GB/s), then both ends of the link go on operating at that level. Otherwise, if the highest-commonly supported link speed is higher than the base speed, then each end of the link records this information in its own internal state information.
4) As part of the network service control network initialization, building source/destination routes and assigning local addresses, the network service engine can tell both ends of the link that they should operate at the higher speed, if desired.
5) The network service logic then requests one or both ends of the link to re-initialize the link, and the sender and receiver attempt to bring up the link at the higher commonly supported speed.
6) If the link can be successfully brought up at the higher speed, communication carries on normally. If the link cannot be brought up success-fully, the link engines then drop back to both operating at the base rate. The network control service then reads the link engines to determine which speed is actually being used.

This close interaction through exchange of management frames between the link-level engines and the net-work service/management allows the network service/management to efficiently control the rate of injection of frames onto the network, so as not to flood the slowest links(s) and cause undue network congestion.

The Future I/O Link Encoding and Link Physical Logic are the lowest layers of the of the FIO protocol stack. These layers provide both the logical and physical conversions necessary to mask the attributes of the physical media for the Link Flit Layer protocol. This masking allows the Link Flit Layer protocol to communicate peer-to-peer, using flits, with each flit made up of one (or more) eight-byte-words (EBW) of unencoded data. The first generation (GI) definition of the FIO link encoding and link physical logic layer transfer data at a rate of 1250 Mbyte/sec, across a copper or optical link composed of 10 parallel lines, each running at 1.25 Gbit/sec. Future generations of FIO will transfer data at two and four times the first generation possibly using other physical link technologies. Second and third generation physical links may require changes to either or both the link encoding layer or the link physical logic layer. These changes will be transparent to the Link Flit Logic and other upper layers of the FIO protocol stack. All further discussion in this chapter refers to this first-generation physical link.

The primary functions provided by the Link Encoding Layer are to:

1) Multiplex and de-multiplex between the 8-byte and 10-byte wide portions of the link layer data path.
2) Generate and detect beaconing sequences to determine far end presence and readiness to initiate link training, and to manage power states for links incorporating low-power operation capability.
3) Generate and detect link training sequences to provide byte, word and flit alignment
4) Generate link training sequences that allow the link physical logic to obtain bit synchronization and perform skew compensation,
5) Encode and decode the byte stream, to provide conditioned bit streams with DC balance and limited run lengths for the physical layer.
6) Compensate for frequency differences between sending and receiving chips, by providing asynchronous clock boundary interfaces and Skip symbol insertion.

The primary functions provided by the Link Physical Logic are:

1) Serial-to-parallel and parallel-to-serial conversions between low-speed (8 ns) and high-speed (0.8 ns) signaling domains, and
2) Compensation for any inter-line skew encountered across the physical link by adaptively inserting compensating signal delays.
3) Conversion between digital and analog signals, The Physical Logic portion of the Link layer is described in the Future I/O Electro-Mechanical Specification, which will be available separately as described in the preface to this document.

The transmitter logic portion of the link encoding logic transforms the 1250 Mea-Bytes/second eight byte wide flit data stream to a ten byte wide stream; each of the ten streams are encoded 8b-to-10b and serialized and transfer at 1,250 Mea-bits/second to the receiving chip. Logic on the receiving chip de-serializes and de-codes the ten bit streams, which are converted to the eight byte wide flit data stream for next higher layer. FIG. 24 on page 65 shows the block-to-block changes in the data path needed as the flit data stream flows from chip to chip. The flit data shown in the figure is not characteristic of normal transfers, but instead an incremental byte pattern, intended to illustrate the de-multiplexing and multiplexing of the data path. Also shown in this figure is the SKIP symbol, which is inserted and removed by the Link Encoding Layer protocol to compensate for clock frequency differences between the clock sources of the two linked chips.

The FIO link encoding layer interface the upper layers of the Link Layer to the FIO physical media. At the higher layers data moves as flits, each flit composed of one or more 8-byte words. The FIO physical media is made up of 10 parallel serial links. The link encoding layer implements a multi stage conversion to sup-port peer-to-peer communication at the link flit interface. The data format conversions are listed in transmit order below:

1) De-multiplex flit 8-byte words to 10 independent byte streams
2) Insert link commands in the byte streams as required
3) Encode the combined data and command stream 8 bits-to-10 bits. (10 parallel streams)
4) Serialize and drive the 10 parallel bit streams. (Implemented by the Link Physical sub-layer).

The link encoding layer reconverts the serial bit streams to produce the 8-byte words of the flit sub-layer. The data format conversions are listed in receive order below:
1) Receive and de-skew the 10 parallel bit streams. (Implemented by the Link Physical sub-layer)
2) De-serialize the 10 parallel bit streams. (Implemented by the Link Physical sub-layer)
3) Decode the combined data and command stream 10 bits-to-8 bits
4) Remove link commands in the byte streams (10 parallel streams)
5) Multiplex the 10 independent byte streams to build flit 8-byte words.

The FIO link encoding uses the industry standard 8b/10b code invented by IBM (U.S. Pat. No. 4,486,739, Peter A. Franaszek and Albert X. Widmer. "Byte Oriented DC Balanced (0,4) 8B/10B Partitioned Block Transmission Code" (Dec. 4, 1984).), and used by Fibre Channel, Gigabit Ethernet (IEEE 802.3z), FICON, and ServerNet. The 8b/10b code was selected to provide DC balance, limited run lengths, byte (symbol) and word synchronization capabilities, and ability to distinguish between data characters and control characters. The code conversion for both data and control characters is shown in FIG. 25. Detailed description of the operation and usage of the 8b/10b code is available elsewhere, so it is not included here.

Link commands are uniquely identifiable code groups or ordered sets used for low level link control. Link commands are inserted from the link data stream before the transmitter's encoding logic and removed-following the receiver's decoding logic. Link layer commands are generated by or presented to the flit layer of the protocol; commands which do not force training or synchronization are transparent to the flit byte stream. Link commands are inserted simultaneously on all 10 byte streams creating 10 parallel copies of the same of the same command. Some portions of this section are closely tied to subject matter in the Future I/O Electromechanical specification, and refer to facilities described in more detail there. Please refer to that specification for more detailed information.

Beaconing Sequences (BS1 and BS2) are defined to allow for a means to determine far end presence and readiness capability for initiating link training. These sequences can influence the power subsystem of low power nodes, if so enabled. This entails the following functions:

If the end is on Auxiliary power, receiving BS1 causes the FmsxIntw line to assert (pulled low). The chassis shall use the Aux Power AND FmsxIntw to enable Primary Power to the chassis. Some time after the initial detection of BS1 at a port, "PowerGood" to the part that has the detecting port will assert indicating that full power is available.

The above assumes that the power converter on the board can provide a logical indication to the rest of the board that power is at a good level and stable.

For the BS1, a low frequency (1 KHz) waveform on data bit 0 that can be detected under both Aux and Primary Power to indicate that far end is there and desires to begin training. For the BS2, a low frequency (1 KHz) waveform on data bit 0 that can be detected under both Aux and Primary Power. It can only be sent when the local end is on Primary power.

Receiving BS2 indicates far end enabled for high frequency data streams

Sending BS2 indicates near end enabled for high frequency data streams

Link Available line from PHY (name TBD) indicates that both are enabled for high speed.

The FIO link encoding layer provides two link training sequence (TS1 and TS2). Both training sequences are eight symbol ordered set are chosen to optimize the training process. Both training sequences are 80-bits (64 ns) long, contain a unique code group (comma) for byte and word synchronization, and have a maximum number of signal transitions to facilitate PLL locking and bit de-skew. The two training sequences are used for:
1) Link Training: FIO link initialization, de-skew and flit synchronization when following link enabled or power-on.
2) Link Synchronization: FIO link synchronization is used to re-establish flit boundaries as part of link error recovery.
3) Link Clear: FIO use link clear as part of enhanced error recovery to force the complete initialization and training of the link.

As part of link training and link restart training, sequences may be repeated many times. The number of repetitions is dependent on the behavior to the remote link port.

Training sequences are the first code groups transmitted on a link. The training sequences ensure deterministic initialization of both transmitter and receiver initial state.
1) The FIO transmitter shall force its beginning running disparity negative before transmitting the first training sequence of link training, link synchronizations, or link clear.
2) The FIO transmitter shall follow normal running disparity rules when transmitting all subsequent training sequences.

Training sequences are used for link startup and link error recovery. It is expected that a port receiver will be unable to properly decode the symbol stream and maintain consistent running disparity when first receiving a training sequence.
1) The FIO receiver shall not report error detected when receiving a training sequence.
2) The FIO receiver shall not report the reception of a training sequence if any code error, running disparity error, or sequence mismatch is detected.
3) The FIO receiver shall report the reception of a training sequence only when all eight code groups of the ordered set are correctly received without error. Link Training Sequence One (TS1) is an ordered set of eight code groups. The first code group is a K28.5 comma control symbol, followed by the repeated data symbol D10.2. The complete ordered set is:
K28.5 D10.2 D10.2 D10.2 D10.2 D10.2 D10.2 D10.2

The D10.2 is encoded to a toggling pattern (0101010101) for both the positive and negative running disparity. Link Training Sequence Two (TS2) is an ordered set of eight code groups. The first code group is a K28.5 comma control symbol, followed by the repeated data symbol D21.5. The complete ordered set is:
K28.5 D21.5 D21.5 D21.5 D21.5 D21.5 D21.5 D21.5

The D21.5 in encoded to a toggling pattern (1010101010) for both the positive and negative running disparity. The link SKIP command is a single code group inserted regularly in the flit data stream to compensate for the clock frequency differences across the link. The link SKIP command is K30.7 code group.
1) A SKIP command shall precede the first data code groups transmitted on link, following link training, link synchronization, or link clear.
2) A SKIP command shall be inserted in the data stream every 2000 symbols after the first SKIP command.

3) The insertion of SKIP commands shall follow normal running disparity rules when inserted in the data stream.

Like all other link commands, the SKIP command is inserted simultaneously on all 10 lanes of the link.

It may be necessary to reestablish flit synchronization as part of link layer error recovery. When requested, the link encoding layer can transmit a link training sequence two (TS2) to initialize link running disparity and force flit alignment.

Simple flit retransmission is not capable of recovering from all possible link error. The upper layers of the link protocols can force a link clear (complete clearing of all state) by forcing link training sequence one (TS1). Reception of TS1 forces the complete link retraining.

The Link Layer on two chips may be clocked by independent oscillators, with a small frequency differences between the two sources expected. Without compensation, this frequency error would cause link data under-run (low frequency to high frequency) and link data over-run (high frequency to low frequency). Data under-run is easily tolerated without loss of data. Data over-run is unacceptable due to the loss of data. To compensate for the expected frequency error between two chips, SKIPs are inserted in the link layer data flow every 2000 symbol times. This SKIP insertion rate can compensate for total clock frequency difference of 500 ppm or less.

There are a number of "link states", including:

$L_{Disabled}$, which indicates this end of the link is disabled from sending or receiving any operations;

$L_{Standby}$, which indicates that the link is operating on Auxiliary power and thus can only detect beaconing sequences (BS1, BS2).

$L_{LSBeacon}$, which indicates that the link is looking for a far end but is only capable of receiving BS1 or BS2 responses as the high speed detection circuitry (PLLs) is disabled.

$L_{HSBeacon}$, which indicates that the link is looking for a far end but is capable of receiving BS1, BS2 or TS1 responses as the high speed detection circuitry (implemented in PLLs) is enabled.

$L_{Sleep}$, which indicates that this end of the link is powered and waiting to receive a beaconing sequence (BS1 or BS2) but is not itself sending a beacon.

$L_{Ready}$, which indicates this end of the link is high speed enabled and is looking to achieve both frequency lock and flit alignment.

$L_{Locked}$, which indicates this end of the link has achieved PLL lock and received TS1. TS2 is sent to the far end to indicate the Locked condition.

$L_{Trained}$, which indicates this end of the link has received the confirmation that the other end has gone to $L_{Locked}$. It is a holding state for TS2 duration. That is, a link would remain in this state from the first TS2 until the first real flit data is received.

$L_{Alive}$, which indicates this end of the link is fully operable.

The $L_{Disabled}$, $L_{Standby}$, $L_{LSBeacon}$, $L_{HSBeacon}$, $L_{Sleep}$, and $L_{Ready}$ states is discussed further below.

The $L_{Disabled}$ state indicates this end of the link is disabled from sending or receiving any operations. The FIsxOw signals shall be quiesced; the FIOwxIw signals shall be ignored. Entry into the $L_{Disabled}$ state is done through a management agent setting $LCS_{OperationStatePending}$ to the 'Disabled' as defined in Table 3 Link State Summary. It is the management agent's responsibility to ensure that traffic is appropriately quiesced if no data loss is required. $L_{Disabled}$ is maintained while $LCS_{Disabled}$ is set to '1'. Exiting from the $L_{Disabled}$ state will cause the link to proceed to the state indicated by the value in $LCS_{Enable-Default}$ facility. The valid options are:

$L_{Sleep}$: the port is to wait for a beaconing event (BS1 or BS2).

$L_{LSBeacon}$: the port is relatively low power mode and sending BS1 beaconing to actively attempt connections $L_{HSBeacon}$: the port is high speed enable (and consequently drawing more power) and sending BS2 beaconing to actively attempt connections $L_{Ready}$ (not supported): If the management element had definitive, absolute knowledge that the far end was enabled to receive high speed data streams (a/k/a TS1), then this transition would make sense. However, given this is the exit from the $L_{Disabled}$ state, whereby all contact has been lost with anything that might be present at the other end, this knowledge assertion is not valid. Thus, if the near end is to actively initiate a connection, it must be via beaconing to ensure that the far end will respond.

The LStandby state indicates that the link is operating on Auxiliary power and thus can only detect beaconing sequences (BS1, BS2). No drivers are active in this state. Receiving either BS1 or BS2 in this state will cause the assertion of the FmsxInt signal if enabled by a LCS bit such to allow for link activity to power-on the chassis. This assertion can be used by the chassis power subsystem to enable the Primary Power. The $L_{Standby}$ is entered by the following process:

Software sets LCS LinkStatePending to —.

Upon this bit being set, the board shall set a bit in the NV space and raise FmsxIntw to allow a CMP to know that the board is going into standby. The use of this information by the SMP is undefined.

Based on the above LCS LinkStatePending setting and upon loss of PLL Lock, the board will shutdown its primary power. Auxiliary power is still maintained by the chassis.

Once entered, $L_{Standby}$ is maintain as long as auxiliary power is present and primary power is disabled. $L_{Standby}$ is exited by receiving either BS1 or BS2. The primary power is enabled via the mechanism de-scribed above relative to the Link Beaconing Sequences. As the turn on of primary power and the completion of node device reset takes an unspecified amount of time, the beaconing sequence is continuously sent from the far end. Thus, the next link state is dependent on the capabilities of the far, beaconing end.

BS1 is received. This indicates that the far end only capable of low speed signaling. This condition leads to the preferred movement to $L_{HSBeacon}$ state, whereby the high speed circuitry is enable and BS2 is sent back to the far end. An acceptable movement would be to $L_{LSBeacon}$ state, whereby BS1 is sent back.

BS2 is received. This indicates that the far end is present and capable of high speed signaling. This condition leads to movement to $L_{Ready}$ state; this enables the high speed circuitry on the near end and sends TS1 to begin the link training sequence.

The $L_{LSBeacon}$ state indicates that the link is looking for a far end but is only capable of receiving BS1 or BS2 responses as the high speed detection circuitry (implemented in PLLs) is disabled This capability is indicated to any present far end by sending BS1. Only FIOsxIw(0) is active; the other drivers are quiesced. This state is used by switches to continually beacon for attachments while maintaining low power consumption. If the far end is on Auxiliary power and is in Standby, BS1 causes a notification to the power subsystem. $L_{LSBeacon}$ is entered due to following conditions:

Software exits $L_{Disabled}$

Primary Power Good ("PPGood") has been achieved

The PPGood could have happened due to either a physical or wake-up power-on. The link does not care. $L_{LSBeacon}$ is held when neither BS1 or BS2 is received. This indicates that nothing is present at the far end. $L_{LSBeacon}$ is exited due to the following conditions:

when BS1 is received. This indicates that the far end is present and only capable of low speed signaling. This condition leads to movement to $L_{HSBeacon}$ state; this enables the high speed circuitry on the near end and sends BS2 to the far indicating this high speed readiness.

when BS2 is received. This indicates that the far end is present and capable of high speed signaling. This condition leads to movement to $L_{Ready}$ state; this enables the high speed circuitry on the near end and sends TS 1 to begin the link training sequence.

The $L_{HSBeacon}$ state indicates that the link is looking for a far end but is capable of receiving BS1, BS2 or TS1 responses as the high speed detection circuitry (implemented in PLLs) is enabled. This capability is indicated to any present far end by sending BS2 Only FIOsxIw(0) is active; the other drivers are quiesced. This state is used by any node wishing to make an attachment at either low or high speed; the attachment speed is thus determined by the present capabilities of the far end. If the far end is on Auxiliary power and is in $L_{Standby}$) BS2 will cause a notification to the power subsystem for wake-up. $L_{HSBeacon}$ is entered due to following conditions:

Software exits $L_{Disabled}$

Primary Power Good ("PPGood") has been achieved. The PPGood could have happened due to either a physical or wake-up power-on. The link does not care.

$L_{HSBeacon}$ is held when BS1 is received. This indicates that though the far end is present, it is not capable of high speed signaling yet. Thus, the near end needs to continue sending BS2 near end and sends BS2 to the far indicating this high speed readiness. $L_{HSBeacon}$ is exited due to following conditions:

BS2 is received. This indicates that the far end is present and capable of high speed signaling. This condition leads to movement to L Ready state to begin the link training sequence.

TS1 is received. As the high speed circuitry is enabled in this state, this condition leads to the movement to L Ready state so that the near end can commence with the link training sequence.

The values for beacon and suspend should be driven by optical considerations.

The $L_{Sleep}$ state indicates that this end of the link is powered and waiting to receive a beaconing sequence (BS1 or BS2) but is not itself sending a beacon. This state is intended to be used by switches to wait on hot plug events or as a means to put the link into a low power state. For the case of preparing a port for hot plug, it can be assumed that the state of the far end is inconsequential; thus, no synchronization is necessary. The steps to enter this state are:

Software writes $LCS_{SleepPending}$ to the near end node

Software puts the near end into Sleep which causes the near end drivers to quiesce. The receive portion of the near end link is immediately ignored accept for detecting beaconing sequences. It is the responsibility of software to ensure that link activity is functionally quiesced to ensure no data loss.

The near end's drivers quiescing will cause the far end to lose Clock Sync. SleepPending AND ClockSync to will move the far end to the Sleep state. Clock Sync error setting is blocked due to SleepPending.

For the case of being put into low power state, the link is presently active and needs to move into Sleep state without propagating error conditions. The steps to effect this state movement are:

Software writes $LCS_{SleepPending}$ to the far end node. This conditions the far end for action at the next clock synchronization loss.

Software writes $LCS_{SleepPending}$ to the near end node

Software puts the near end into Sleep which causes the near end drivers to quiesce. The receive portion of the near end link is immediately ignored accept for detecting beaconing sequences. It is the responsibility of software to ensure that link activity is functionally quiesced to ensure no data loss.

The near end's drivers quiescing will cause the far end to lose Clock Sync. SleepPending AND ClockSync to will move the far end to the Sleep state. Clock Sync error setting is blocked due to SleepPending.

This state is entered by a management action to set $LCS_{Sleep}$. The state is exited by either a management action to reset $LCS_{Sleep}$ (through other ports of a switch or on a SANIC) or from the far end (through the receipt of TS0). In effect, this is a Low Power state that can be used to wait on a hot plugging or power management event without "beaconing" (i.e., sending TS0). $L_{Sleep}$ is maintained while $LCS_{Sleep}$ is set to '1'. $L_{Sleep}$ is exited from either a near end or far end action. Near End: A near end action implies that software can access the port through other ports of a switch or that the port is on a SANIC where software is running. Management software first writes the $LCS_{SleepExit}$ facility with the next state that is desired based on in-tended functionality of the port. Software then resets $LCS_{Sleep}$ to effect the transition.

$LCS_{SleepExit}$='01' ($L_{LSBeacon}$) The port will continue to operate in a low power consumption mode due to high speed PLL circuitry being disabled. However, BS1 is sent to activate any attached devices.

$LCS_{SleepExit}$='02' ($L_{HSBeacon}$) The port will move to a higher power consumption state due to the enablement of the high speed PLL circuitry. BS2 is sent to activate any attached devices.

Far End: Receiving a beaconing sequence from the far end will cause an exit of $L_{Sleep}$. The sequence received determines the next state of port functionality.

BS1 is received. This indicates that the far end is present, but is not capable of high speed signaling. The near end is recommended to move to $L_{HSBeacon}$, thereby sending BS2, to indicate readiness at high speed. Optionally, a device may choose to move to $L_{LSBeacon}$, thereby sending BS1.

BS2 is received. This indicates that the far end is present and capable of high speed signaling. This condition leads to movement to LReady state to begin the link training sequence.

The $L_{Ready}$ state indicates this end of the link is high speed enabled and is looking to achieve both frequency lock and flit alignment. Frequency lock will be achieved through any data stream received at the established frequency. This state will exist once the alignment is achieved through the detection of either TS1 or TS2. The difference between these is that TS1 will cause the de-skew function to be recalibrated; TS2 will not cause this recalibration.

TABLE 3

Link State Summary

| State | Power | Send | Receive Monitor | PLL | Decode [76543210] |
|---|---|---|---|---|---|
| Standby | Aux | Disabled | BS1, BS2 | Disabled | — |
| Disabled | Primary | Disabled | Disabled | Disabled | 00000— |
| Sleep | Primary | Disabled | BS1, BS2 | Disabled | 00100— |
| LSBeacon | Primary | BS1 | BS1, BS2 | Disabled | 01100— |
| HSBeacon | Primary | BS2 | BS1, BS2, TS1 | Enabled | 010000— |
| Ready | Primary | TS1 | TS1, TS2 | Enabled | 01010000 |
| Locked | Primary | TS2 | TS1, TS2 | Enabled | 01010001 |
| Trained | Primary | Data | TS2, Data | Enabled | 01010010 |
| Alive | Primary | Data | TS1, TS2, Data | Enabled | 01010011 |

Bit 7—Fills to full byte, reserved for future use
Bit 6:5—encode

'00': no Send, no Receive
'01': no Send, Low Speed Receive
'11': Low Speed send, Low Speed Receive
'10': High Speed enabled
Bit 4—qualifies bits 6:5='01' to indicate sending Low Speed ('0') or High Speed ('1')
Bit 3:2—Reserved for future use
Bit 1:0—High Speed Training States FIG. 26 illustrates Beacon Sequence showing the state transition defined for link operations within an SPE using the above state definitions. Additional "logical" signals are used to indicate functions that an SPE will have in an implementation. The signals are not considered "architectural", but representative. FIG. 27 illustrates the FIO Link Training, wherein one End Power-on shows the typical order of transmission of beaconing and link training sequences used in bringing a link from a powered-off state to an alive and operational state.

Table 4 is the beginnings of the matrix of the states possible at both ends and the wires between them. Red shading indicated and invalid or error state. Blue indicates a valid "holding state". Green indicates the normal training and then data passing states. "Con" means "connection"; "NC" means "No Connection". The Rows of "State" is meant to be the primary end of interest (i.e. what will that ends port logic see such to make decisions on) and also include a "Recv" and "Send" sub-row. "Recv", thus, has the combination of what the far might be trying to put on the wires base on its local knowledge (Con or NC) and the real connect at both end will produce at the near end. "-" means that the interface is "Null"; we could define what is. TS0, TS1, TS2 and Data are from above or self-defining.

TABLE 4

Link State Matrix

| Attach | | Power | | | | | | | |
|---|---|---|---|---|---|---|---|---|---|
| | | None | Aux | | Primary | | | | |
| | State | Con | NC | Con | NC | Con | | | |
| | Dir | — | Standby | Standby | Waiting | Waiting | Ready | Locked | Trained | Alive |
| None Con | Recv | — | — | — | — | — | | | | |
| | Send | — | — | — | — | — | | | | |
| Aux NC | Standby Recv | — | — | — | — | — | | | | |
| | Send | — | — | — | — | — | | | | |
| Con | Standby Recv | — | — | — | — | — | | | | |
| | Send | — | — | — | — | — | | | | |
| Primary NC | Waiting Recv | — | — | — | — | — | | | | |
| | Send | — | — | — | — | — | | | | |
| Con | Waiting Recv | — | — | — | — | TS0 | | | | |
| | Send | TS0 | TS0 | TS0 | TS0 | TS0 | | | | |
| | Ready Recv | | | | | TS0 | TS1 | TS2 | Data | Data |
| | Send | | | | | TS1 | TS1 | TS1 | TS1 | TS1 |
| | Locked Recv | | | | | TS0 | TS1 | TS2 | Data | Data |
| | Send | | | | | TS2 | TS2 | TS2 | TS2 | TS2 |
| | Trained Recv | | | | | — | — | TS2 | Data | Data |
| | Send | | | | | Data | Data | Data | Data | Data |
| | Alive Recv | | | | | — | — | TS2 | Data | Data |
| | Send | | | | | Data | Data | Data | Data | Data |
| | Disabled Recv | | | | | | | | | |
| | Send | | | | | | | | | |

The Network Layer. FIGS. 28–40 and Tables 4–8 describe more fully the network layer. Future I/O architecture is designed to deliver high-performance, efficient, and robust communication between endnodes (nodes, adapters, devices, switches, and routers) across a variety of arbitrary fabric topologies and operational conditions. Future I/O can be defined as a classic layered architecture as illustrated in FIG. 28. This chapter focuses on the network routing layer and the components which implement it. The network layer's primary responsibility is to route a from a source endnode, through an arbitrary number of intermediate fabric elements, to a destination endnode. Routing must be robust to operate over any arbitrary fabric topology, i.e., Future I/O does not restrict nor mandate fabric topologies. Future I/O network layer characteristics include:

Global, unique endnode and routing element identifiers.

Widely-scalable endnode and routing element addressing, i.e., to an arbitrarily large number.

Fast, efficient endnode and routing element addressing and routing based on fabric topology or operation type.

Efficient frame header size relative to payload and application workload requirements. An efficiency evaluation must take into account all headers involved in data movement, the impact to the fabric's operational model, the ability to implement a low-cost, functional solution, and the impact to the endnodes in terms of how header content may provide endnode off-load or enable new capabilities.

Switch-based unreliable multicast functionality is required for fabric management. Switch-based unreliable multicast support may also be supplied by an IHV for application data usage. Future I/O will leverage the existing Ipv6 and related multicast standards, e.g., PIM, DVMRP, etc. Note: Future I/O like Ipv6 does not support broadcast operations—broadcast operations create numerous problems with a very high cost/benefit ratio.

Reliable multicast, i.e., a multicast operation which is acknowledged by all destination endnodes. For version 1.0, reliable multicast is implemented as a series of unicasts—this has no impact on the hardware architecture nor implementation.

The ability to stripe a message across multiple ports within a endnode and across multiple links within a fabric subnet instance.

To provide context for this discussion on the network layer, the following figures are provided to illustrate typical Future I/O topologies which may be deployed within a platform, a chassis, or a data center.

FIG. 29 illustrates two exemplary point-to-point topologies in an FIO computing system. A point-to-point topology is a direct connection (ASIC-to-ASIC or via a copper or optical cable) between two endnodes. Given there are no intermediate routing elements and endnodes, in general, are not directly involved in the routing process, frame routing does not exist in such a topology. Note: A point-to-point link still requires a default destination identifier to be assigned to each SANIC. Topology one illustrates a SANIC attached directly to an endnode either through a cable or an ASIC-to-ASIC implementation. Topology two illustrates a point-to-point daisy chain configuration. In this topology, The SANIC may only send frames to the directly attached endnode. The endnode is responsible for forwarding all frames to the subsequent endnode. From the Sanin's perspective, all acknowledgments, management, etc. are handled by endnode 1.

FIG. 30 illustrates an exemplary switch topology. Future I/O allows an arbitrary number of switch elements between any two endnodes. The topologies that can be created will vary based on switch element usage, i.e. whether the switch is internal to a platform or chassis or external within a data center. The following figures illustrate sample topologies which may be constructed with using Future I/O fabric elements. Future I/O is designed to replace PCI within a platform. As such, the predominant topology deployed will be within a platform. FIG. 30 illustrates a single board platform, i.e., a platform whose backplane contains all platform components (processors, memory, SANICs, switch elements, etc.)—this is commonly referred to as an active backplane solution. Note: this figure illustrates an ASIC-to-ASIC connection, i.e., no cables are used, between the SANIC and switch.

FIG. 31 illustrates a multi-board platform. This topology is often used for platforms which support hot-plug functionality for various platform components—this is commonly referred to as a passive backplane solution. In this example, all Future I/O components are connected via ASIC—ASIC interconnects within the backplane.

FIG. 32 illustrates a platform which requires additional I/O slots. These slots are provided via an ex-pander bay—a separate enclosure which consists of a switch and a set of Future I/O slots. In general, an expander bay and the platform itself will be vertically mounted within a chassis and connected via copper cables. This example also illustrates replicated interconnects between the switches—replication provides alternative paths for availability and increased bandwidth and striping capabilities. Future I/O's autonomous fabric discovery automatically deals with such routing loops to avoid fabric deadlock.

FIG. 33 illustrates a set of endnodes which are mounted within multiple chassis. The chassis are inter-connected using external switch elements with either copper or optical cables depending upon the distance between components. endnodes may be platforms, expander bays, devices (e.g., disk arrays), etc. This ex-ample illustrates a fully meshed set of switches which allows any-to-any frame routing. The autonomous fabric discovery process will set up a reasonably optimal set of routes—these routes may be overlaid by an external fabric manager if desired to provide alternative routing rules. For example, a fabric manager may decide to segregate traffic based on application work load and connectivity requirements such as confining traffic between any two nodes to a specific route—Future I/O only specifies management primitives to con-figure routes; Future I/O does not specify the fabric manager nor the algorithms used to determine the routes for a given set of application or data center requirements—this is provided by ISV middleware solution providers.

To implement a multi-function end-station, e.g., a single adapter which implements multiple distinct I/O functions such as multi-port SCSI or a GbE and Fibre Channel combination adapter, an IHV may choose to embed a switch element ASIC on-board—conceptually, this is similar to a PCI bridge (illustrated in FIG. 34). While Future I/O does not specify how such an implementation is designed nor managed, per se, it does place the following restrictions:

1) For discovery purposes, the endnode is viewed as a single fabric destination, i.e. only one DLID per Future I/O port is assigned.

2) Second tier functions are not seen by the Future I/O discovery process and hence may not be directly routed to by an external endnode. The IHV is responsible for discovery, internal route determination, frame routing, etc. within the endnode for all second tier functions.

3) In a typical implementation, data targeting a second tier function would be transported over the Future I/O fabric as opaque payload data, i.e., Future I/O elements would not interpret this data. The IHV would be responsible for interpreting the data and routing it to the target device either leveraging the Future I/O network and link protocols or implementing a value-add, custom design.

4) Future I/O fabric level acknowledgments shall be generated by the directly attached SANIC port SPEs and not by the second tier functions. All recovery operations, e.g., frame sequence errors, alternative pathing, etc. shall target the external DLID and SPE instance. Each chassis of endnodes contains a set of switches which interconnect the stations within the chassis. Multiple switches are provided for avail-ability and bandwidth. Chassis are connected via a set of switches which are fully meshed complete connectivity.

Future I/O routes data via "frames." A frame is a Future I/O fabric unit of work with the following high-level attributes:

End-to-end fabric unit of transfer—Frames are transferred as atomic units between any two endnodes or routing elements (node, adapter, device, switch, or router with the later two only consuming a frame if it were the target destination). A frame is composed of a routing header, a transport header, and optional payload data. Hence, frames will be of variable size with an architecturally defined maximum.

End-to-end unit of acknowledgement—For each frame transferred, the receiving endnode may automatically generate in hardware an acknowledgement based on the operation type and target.

Hardware maintains timeouts (a function of distance) and frame sequence numbers to insure frames are delivered per ordering requirements.

Frame sequence number space is large to accommodate large fabric diameters.

Acknowledgements are sent to the source identifier as indicated within the frame header.

Unit of routing—The frame routing header is interpreted by the Future I/O fabric components, e.g., a switch or router, to route a frame to the next hop or endnode.

A frame is not modified as it passes through the fabric (with the exception of certain forms of error isolation that purposefully corrupts a frame).

End-to-end unit of recovery for hard failures, e.g., cable disconnects, switch or router failure, etc.

Frames may be strongly or weakly ordered based on operation type and QP semantics. For example, a connection-oriented or reliable connectionless QP nominally use strong ordering and reliable frame delivery semantics for the majority of its communication requirements. However, should the fabric support multiple routes between the two QPs, for a given transaction where strong frame ordering is not required, frames may be striped across the routes with the fabric providing strong message ordering to maintain correct application operation.

Frames may be transmitted between QPs using either a connection oriented or connectionless paradigm. For an unreliable connectionless paradigm, frames are weakly ordered and generally unacknowledged at the fabric level.

Future I/O nodes, devices, and adapters provide automatic message segmentation and reassembly via frames.

Switch elements do not perform any form of segmentation and reassembly.

Router elements may perform segmentation and reassembly if joining disparate subnets. If joining Future I/O to Future I/O subnets, a router behaves like a switch with respect to segmentation and reassembly.

There are two types of frame routing: within a subnet and between subnets. Within a subnet, Future I/O frames are routed between endnodes via switches—switches may be internal to an endnode (e.g., a platform or an expander box) or external (similar in concept to a GbE or Fiber Channel switch). FIG. 35 illustrates how a frame is routed within a switch. Between subnets, Future I/O frames are routed via routers. A router delivers a superset of the switch functionality—this superset is discussed in a later section. A router routes frames by:

1) The router examines the local route header's "next header" field to determine the associated addressing protocol, e.g., Ipv6, Ipv4, Netware, etc.

2) The router removes the local route header (nominally via pointer manipulation) and parses the next header to extract the associated protocol's destination address.

3) Using the appropriate address resolution protocol, the router deter-mines the correct output port and performs the necessary protocol header updates (e.g., decrements a hop count field or modifying the traffic class or flow data field). Note: Future I/O does not specify the address resolution protocol nor the associated implementation—this is left to other standards bodies and IHVs (possible point of differentiation).

4) If the router is targeting a FIO subnet, the router re-uses the existing local route header and replaces its DLID with this subnet's destination DLID and the SLID with the router's SLID and transmits the frame.

5) In general, to avoid congestion and the transmission of potentially corrupted frames across subnets, a router shall operate using a frame store-and-forward paradigm.

FIG. 36 illustrates a sample router route operation routing a FIO frame from FIO subnet A to FIO subnet B. The router parses the FIO global route header to extract the destination IP address. Using this address it accesses a separate IP-to-DLID table to determine the DLID for the next router or endnode in subnet B. It replaces the original DLID with the new DLID and sends the frame onwards to the next destination.

FIG. 37 provides a brief, high-level overview of routing technologies which may be used to construct Future I/O switches and routers. Future I/O does not specify any particular implementation, and admits wide variation across implementations.

Local identifiers are 16-bit, endnode identifiers with the following properties:

1) Local identifiers ("LID") are subnet unique, i.e., they are not globally unique identifiers across all subnets as is an Ipv6 address.

2) A local identifier is referred to by one of two names: source local identifier ("SLID") or destination local identifier ("DLID"). A SLID or DLID is used during to route frames and acknowledgments within a subnet.

3) A LID may be associated with multiple Ipv6 addresses.

4) If an endnode contains multiple ports, each port, at a minimum, shall be assigned a globally unique Ipv6 address and a subnet unique LID. Multiple Ipv6 addresses and LIDs may be assigned per port to provide alternative path (transparent fail-over or for policy-based routing) and multi-home support.

5) LIDs shall be assigned during autonomous discovery. LIDs may be re-assigned by an operational fabric manager. Note: LID generation and assignment need not be serialized with complete fabric discovery and initialization.

6) If the destination endnode is not in the same subnet as the source endnode, the DLID within the local routing header ("LRH") shall be for the router associated with routing this frame to the next hop on its way to the final destination. Router operation is discussed further below.

7) LIDs are used to simplify and hence improve the performance of route table lookups within switches and routers. Nominally, a route table is implemented as a single dimension array which is directly indexed by the local identifier to determine the output port(s) to send the frame to.

A subnet is a collection of endnodes and routing elements which use the same address prefix. A Future I/O subnet has the following attributes:

1) A subnet is composed of a collection of endnodes which are interconnected via either point-to-point links or via cascaded switches.

2) A subnet is addressed using the upper 64-bits of the 128-bit Ipv6 ad-dress.

3) A subnet may route to another subnet using one or more Future I/O routers.

4) A router is capable of routing frames between two Future I/O subnets which are directly connected or connected via an intermediate, disparate fabric (e.g., the Internet), or between a Future I/O subnet and an endnode located on a disparate fabric (e.g., a node on a Future I/O subnet and a node on an IP subnet for IPC communication).

Future I/O will leverage and comply with the Ipv6 standard with respect to subnet management and operation.

Future I/O must be able to operate without requiring a fabric manager to be up and operational. As such, Future I/O defines a default subnet which is used during endnode and fabric initialization. This default subnet will be used for all routing operations until an optional fabric manager decides to perform a re-con-figuration operation. For a simple Future I/O topology, e.g. a platform with a Future I/O backplane, a fabric manager may never exist or if it does, it may choose to not configure a non-default subnet address. As such, all Future I/O management and routing operations which involve the subnet address, shall be able to operate using the default address. If a fabric manager is operating (e.g., an operating system on a platform is executing), it may reconfigure the default subnet address to one set by a system administrator or returned from some form of directory service. Future I/O does not define how this middleware operates; it defines a set of management messages which may be issued to perform the endnode configuration as appropriate. * If a fabric manager is not present, the autonomous discovery protocol will assign DLIDs. This protocol is described in further below in connection with configuration and discovery.

Basic operation principles for subnet masks include:

Subnet masks operate on Ipv6 addresses and not DLIDs—DLIDs are not valid outside a given subnet. A subnet masks is generally not used within a given subnet. A router will use the subnet mask to determine whether a frame can be routed within this subnet —this provides one level access control.

Future I/O switches do not understand nor use subnet masks—it routes strictly based on the DLID within the route header.

Access control is important because an endnode must be protected against unauthorized access at multiple levels—application, kernel, hard-ware, etc. Future I/O specifies two types of routing protection: source route restrictions and hardware fire-walls. Other type may be implemented in Future I/O switches and routers. Note: Additional levels of protection are provided via other services (e.g. Partitioning) within Future I/O or by OSV/ISV/IHV middleware with the later being outside the scope of the Future I/O specification.

Source route restrictions are best implemented in the switch where the source endnode attaches to the Future I/O fabric. Future I/O will define the management messages needed to configure source route restrictions (default is unlimited access within a subnet or between subnets) and it is up to the IHV to determine the switch implementation. Note: While this section focuses on switches, there is nothing to restrict an adapter or SANIC from providing a similar protection mechanism to protect itself from unauthorized access. One possible example implementation is to use a small number of access control bits which are associated with each switch input port (this limits the switch resource requirements to the number of ports*the number of access control bits). The following table illustrates how a set of bits might be interpreted. An alternative implementation which is more robust at the expense of additional resources and complexity (additional management messages and possibly for global headers, the storage and mapping of source Ipv6 addresses), is to provide a set of access control bits or partition key per DLID. This would allow a switch to provide more fine-grain access control on a per source/destination tuple or application partition basis.

A hardware firewall may be constructed by limiting which endnodes may route to another or across sub-nets. For example, a router may be configured to restrict access to a given subnet or individual endnode. This may be accomplished using a subnet mask or by configuring individual source (protocol dependent) addresses which may access this subnet or route to or from a given node within a subnet. A switch may provide similar functionality by expanding its route table to include an additional source/destination access rights table—this functionality is left to the IHV to design and implement as a value-add feature.

TABLE 5

Access Control Values

| Value | Frame Route Access Allowed |
| --- | --- |
| 0 | No access - the sender may not route any frames through this port. |
| 1 | The sender is allowed to issue management enumeration frames and to perform base discovery operations. |
| 2 | The sender is allowed to issue management control messages, e.g. update the switch/router route tables, reset the switch, etc. |
| 3 | The sender may route application data and connection management frames |

Future I/O allows arbitrarily large fabric topologies to be created, i.e., it is highly scalable. Given the architecture's life span and the growth in the number of elements which may be addressed, Future I/O will use the IPv6 addressing standard as follows:

1) Each endnode shall be assigned a 64-bit globally unique hardware identifier (GUID). A GUID may be assigned by the manufacturer per IEEE guidelines or created by converting a 48-bit GUID into a 64-bit address—see IEEE "Guidelines for 64-bit Global Identifier (EUI-64) Registration Authority", http://standards/ieee.org/regauth/out/tutorials/EUI64.html, March 1997
2) The endnode GUID shall be combined with a 64-bit subnet prefix to create a unique Ipv6 address. In situations where a centralized administration authority does not exist, Future I/O shall use the default Ipv6 default subnet prefix (FE80::0). The result is there shall never be a time when an endnode or routing element has not been assigned a valid Ipv6 address.
3) If an endnode contains multiple ports which may be separately ad-dressed, each port shall be assigned a unique Ipv6 address.
4) Applications identify target endnodes via their Ipv6 address. This ad-dress is used as input to an address resolution service to derive an IP handle which is subsequently used by all Future I/O verbs to transmit data. Usage of an IP handle reduces the Work Queue Element's ("WQE") size, reduces resource and logic complexity within the SANIC, and allows transparent DLID updates (e.g., for policy-based load balancing or alternate path fail-over) to occur without directly impacting application design nor implementation.
5) Each endnode may be assigned multiple Ipv6 addresses per destination endnode port. Each port's Ipv6 address set shall resolve to one or more IP handles which in return resolve to one DLID per path to this port within the fabric.
6) Ipv4 and other legacy protocols shall resolve to Future I/O addressing similar to Ipv6 and shall use/leverage the same IP handle and DLID algorithms and implementations.

Future I/O defines two route headers referred to as Local Route Header ("LRH") and Global Route Header ("GRH") —all Future I/O components—endnodes, adapters, devices, switches, and routers—shall support both route header formats. Route header selection is determined as follows:

1) If the source and destination are within the same subnet, the LRH shall be used.
2) If the source and destination are within different subnets and the QP at-tributes indicate the source QP is associated with a Future I/O transport (see FioSetQP verb), then the GRH shall be used. The source endnode shall attach a LRH to route the frame within the local subnet to the appropriate router. The router shall strip the LRH and use the GRH to route the FIO frame to its final destination. This allows a router efficiently route FIO data between FIO subnets or across disparate inter-mediate subnets with minimal latency and complexity.
3) If the source and destination are within different subnets and the QP at-tributes indicate the source QP is not associated with a Future I/O transport, the LRH shall set the next header field to indicate the non-Future I/O protocol header and set the DLID to route the frame to the associated router. The router shall parse the LRH next header field, strip the LRH, parse the non-FIO protocol header and perform the appropriate routing operation. This allows FIO to transparently support other upper layer protocols over the same physical fabric without ex-posing the FIO fabric attributes nor requirements to the upper layer protocol.

Note: The route headers are completely independent of the transport headers from a layered architecture viewpoint which allows Future I/O data to be opaquely transported at the network layer. The combination of global and local frame headers reflect that end-points on the network (host SANICS, adapters, and switches) may be known both by one or more Local Identifiers ("LIDs"), managed within a subnet within a small (2-byte) name space, and by one or more Global Unique Identifiers ("GUIDs"), man-aged within the IP namespace. Details of the address assignments, and of the routing on the basis of those addresses, is described further below.

The local route header is a compact, efficient, 8-byte header containing the following four 16-bit fields (one might view it as a compressed Ipv6 header optimized for use within a single Future I/O subnet): The LRH attributes are:

1) Route frames within a single subnet—the local route header may only be used within a single subnet; it may not be used to route frames between subnets. There are several reasons to restrict this header to a single subnet but the primary reason is efficiency for the volume topology. The volume deployed topology, given one of Future I/O's objectives is to replace PCI, will be a platform backplane attached to optional expander boxes. This topology does not require complex routing nor complex management protocols.
2) Highly efficient (a function of header size relative to data payload) over a wide variety of application work loads and implementation options. The following table illustrates LRH efficiency relative to data payload. Efficiency is calculated as: E=Payload/(Payload+Flit Header+Route Header+Simple 16-byte Transport Header). Example calculation: A 4 KB frame requires 8 full/packed flits and one partial flit to transfer the frame header and data payload. This translates into 4096/(4096+9*8+8+16)=97.7% efficiency.
3) All discovery and management operations within a single subnet shall use the local route header to insure inter-operability among all end-nodes.
4) Provides an efficient and high-performance implementation within hardware. The number of fields to be filled out is small and the operations required to fill the fields are straight-forward.

To route frames, LRH is appended to the transport and optional data and transmitted onto the fabric. The transport and data are generally treated as opaque items for routing purposes which allows Future I/O transport headers and legacy protocol headers to be supported without complex rules.

TABLE 6

| Local Route Header | | | |
| --- | --- | --- | --- |
| Bits 63–48 | Bits 47–32 | Bits 31–16 | Bits 15–0 |
| Header Control | Destination Local Identifier | Frame Length | Source Local Identifier |

TABLE 7

LRH Efficiency Relative to Data Payload

| Data Payload (Bytes) | LRH Efficiency (%) |
|---|---|
| 32 | 50 |
| 64 | 67 |
| 128 | 80 |
| 256 | 89 |
| 512 | 94 |
| 1024 | 96 |
| 2048 | 97 |
| 4096 | 98 |

Future I/O uses the Ipv6 header for global routing of FIO transport headers and optional data. FIO will work with the IETF to obtain the associated Ipv6 Next Header identifiers to uniquely identify the FIO transport headers. See RFC 2460 Internet Protocol, Version 6 (Ipv6) Specification for additional details on how Ipv6 operates. Unless otherwise indicated within this specification, FIO will comply with the RFC 2460 for header definition and addressing. Clarifications:

Future I/O is not, in the strictest definition, an IP-based fabric.

Future I/O leverages IP technology and concepts when appropriate.

Usage of the Ipv6 header does not imply usage of the IP protocol stack—an endnode is not required to support the IP protocol stack.

Future I/O will comply with other IP RFCs as deemed necessary; this does not mean that FIO will comply with all IP RFCs.

Future I/O leverages IP technology and concepts to provide a number of customer value propositions. The following provides a sample of how customers directly benefit by leveraging IP technology:

1) All data center and network management middleware solutions are IP-centric. Using IP technology translates into faster time-to-market, lower development (leverage a large majority of the existing middle-ware algorithms and implementations), training, and deployment costs, and fairly seamless solution integration. This protects the customer in-vestment in their existing technology, application solutions, and people. In other words, Future I/O protects the customer value chain which reduces the total solution cost.

2) Leveraging IP technology allows Future I/O to only invent where it is needed and to leverage the considerable standards, technology, and knowledge base of the thousands of people working on Internet standards and deploying communication solutions.

3) High-speed switches and routers filter frames to provide differentiated services. By leveraging IP technology, IHVs are able to leverage a very large percentage of their management infrastructure, improve their time-to-market, and allow them to differentiate their product offerings through new services.

4) Leveraging the IP technology allows Future I/O to use existing subnet techniques to improve management, fabric efficiency, and to provide a first level hardware firewall.

5) As encryption and compression technology evolves, the IP Security standard may be deployed in hardware either on a per subnet (router provides a first level VPN gateway solution), on a per session basis, or on a per data center basis (direct attach to a telecommunications backbone). The Ipv6 standard provides complete support for the IP Security standard which can be used to tunnel Future I/O frames between components over a non-trusted intermediate subnet(s).

6) Data centers are moving to layer 3 switching (e.g., IP over SONET) for both voice and data services. By leveraging the IP technology, a Future I/O/WAN router solution may be developed which replaces the custom, hand-crafted, expensive solutions deployed today with a low-cost, standard solution—this translates into significant customer solution cost savings.

7) Over the life span of this architecture, Ipv6 will become widely deployed. As such, given its large address space, any Future I/O endnode will be capable of routing frames to any endnode independent of location (assuming routers are deployed) with minimal management overhead. This will allow ubiquitous endnode connectivity.

8) Leveraging the IP technology allows new Future I/O capable protocol analyzers or other diagnostic (software or hardware) tools to be quickly developed at a lower cost without reworking the entire tool set. This preserves the customer value chain and provides faster time-to-market for a complete Future I/O tool chain solution.

Table 8 illustrates that the local and global routing headers are relatively comparable across most payload types if the applications used data size exchanges were completely uniform. However, most application work loads are a mix between small and large data exchanges with many applications using 80% small and 20% large data exchanges. When this is taken into account, the efficiency delta between the two header formats is sufficiently small to quell any concerns about the GRH size.

TABLE 8

GRH Efficiency Relative to Data Payload

| Data Payload (Bytes) | GRH Efficiency (%) |
|---|---|
| 32 | 33 |
| 64 | 50 |
| 128 | 67 |
| 256 | 80 |
| 512 | 89 |
| 1024 | 93 |
| 2048 | 96 |
| 4096 | 97 |

Each 16-bit field in an LRH field should be treated as a little endian field to determine bit position within the two-byte field. More particularly, the 16-bit header control field contains control bits used for routing a frame. The destination local identifier ("DLID") field specifies the local identifier for the destination endnode within a subnet. If the final destination is outside of the subnet, the DLID shall be a router which is routing the frame onwards to its final destination—the LRH is stripped in such a situation. The frame length indicates the length of the frame which is the sum of the route (local and/or global) header length, the transport header length, and the optional payload data length. To calculate the actual payload data length, the route and transport header lengths are subtracted from the frame payload length. Future I/O specifies this frame length encoding scheme to allow frames to be routed while treating the payload (transport and optional payload data) as an opaque sequence of bytes. Additional guidelines:

1) For Future I/O version 1.0, data payload length shall be limited to 4096 bytes. To accommodate header size variations and potential header growth in subsequent Future I/O versions, the Maximum Transmission Unit ("MTU") for version 1.0 is 4096+128=4224 bytes. Future I/O shall use Path MTU to determine the actual MTU between any two endnodes. Use of Path MTU allows Future I/O to be forward compatible with future versions of the specification which support larger MTUs and to operate across disparate inter-mediate fabrics which support larger/smaller MTUs than Future I/O.

2) To minimize congestion conditions which may result in a fabric in-stance which supports multiple link speeds (i.e., 1x, 2x, and 4x Future I/O links), each switch or router shall provide per port per VL buffering for each output port which is capable of holding a full frame. This will allow the VL for the source port to be re-used for subsequent frames.

3) Flits payloads are padded to a multiple of 8 bytes. The frame length is used to determine the actual payload length, i.e., to discard pads.

4) Flit headers do not contribute to frame length byte count. Flit headers are automatically added/stripped by the SPE and are not seen by the frame level processing element.

5) If the frame contains both LRH and GRH headers, the LRH frame length will be the sum of the LRH, GRH, FIO Transport, optional data lengths and End-to-END CRC. The GRH frame length will be the sum of the GRH, FIO Transport, optional data lengths and End-to-END CRC.

The source local identifier ("SLID") field specifies the local identifier, in general, for the source endnode. If the frame must be acknowledged, the acknowledgment will target the source local identifier specified within the frame header.

TABLE 9

Header Control Definition

| Bits | Definition |
|---|---|
| Bits 15–12 | Indicates Future I/O Version. Initial value is set to 0x8. Subsequent versions of Future I/O are required to be backward compatible to allow endnodes developed for an earlier version to inter-operate without modification. However, new functionality tied to a given version may not be accessible by these earlier version endnodes. |
| Bit 11 | Field indicates if the operation is sequenced (set to 0) or non-sequenced (set to 1). A sequenced opera-tion is one in which the frame sequence number is incremented for each unique frame sent between destination or QP endpoints. The sequence number is used to maintain strong ordering. If a missing sequence number is detected (either due to an end-to-end time-out or due to the arrival of a frame with a sequence number which exceeds the expected sequence number), the destination endnode gener-atesa NAK which indicates how the sender should recover from this error. A non-sequenced operation is one in which the frame sequence number is not incremented for each frame sent and ordering is not preserved. This allows frames to be automatically striped across redun-dant links within the fabric. A non-sequenced operation should not be followed by a sequenced opera-tion until all frames from the first operation have been received and acknowledged. |
| Bit 10–8 | Reserved |

TABLE 9-continued

Header Control Definition

| Bits | Definition |
|---|---|
| Bit 7–0 | Next Header - Indicates the header type which follows the LRH, e.g. FIO transport header. FIO will leverage RFC 2460 for next header field value. For non-FIO protocols, a SANIC may be implemented such that the Next Header field acts as an index into a table which contains a list of locally managed QPs. This allows an endnode hardware to directly target the upper layer protocol without having to parse the header - this translates into improved protocol implementation efficiency and scaling |

Future I/O provides transparent support for legacy protocols, e.g., IP, IPX, SNA, etc. within a FIO subnet as follows:

1) A source endnode shall append a LRH before the legacy protocol header and optional data—the total byte count shall not exceed the FIO MTU.

2) The source endnode shall set the LRH Next Header field to the appropriate legacy protocol identifier per IETF standards.

3) The frame shall be routed through the FIO subnet as though it were a FIO frame, which from the network layer's perspective, it is.

4) The destination endnode shall receive the frame, parse the LRH Next Header field and determine the associated locally managed QP to target. If the endnode does not support the legacy protocol, the endnode shall generate an error message and route this to the source endnode via the LRH SLID field. The source endnode shall not transmit subsequent frames for this target protocol to this destination endnode.

5) The destination endnode shall be responsible for parsing the payload data and performing the associated upper layer protocol processing—this operation is outside the scope of the FIO specification.

6) Legacy multicast frames are transmitted opaquely by the FIO fabric, i.e., FIO does not parse the legacy protocol headers to determine how to multicast the frame. The legacy protocol using multicast protocols, e.g., PIM (Protocol Independent Multicast), must establish a multicast group and generate the appropriate FIO management messages to program the FIO switch route tables. FIO will attach a LRH to each legacy frame which will be used by the switches to multicast the frame as appropriate.

Implementation note: To support legacy protocols, a destination endnode shall create at least one QP which the SANIC route frames to for subsequent processing. A SANIC may support multiple QPs for this purpose—this is implementation specific and is outside the scope of the FIO specification. One possible implementation is to use the next header value as an index into a SANIC local table to perform a direct lookup for the associated QP and to determine what value-add functions should be performed, e.g., the SANIC could implement IP checksum off-load to avoid consuming unnecessary processor cycles for this task.

Future I/O will support two forms of multicast—unreliable and reliable. Multicast routing and management leverages the existing IP-based multicast standards and algorithms. Future I/O will provide the following:

1) Management messages to provide multicast group membership (additions, deletions, cast-outs), route management, etc.

2) Management messages to manage the Future I/O fabric. These messages shall be supported by all Future I/O endnodes and routing elements with support primarily delivered within the Future I/O SAN Protocol Engine (SPE) to reduce the complexity and impact to the customer and IHV.
3) Software verbs to provide applications and OSVs access to management and data transfer operations.
4) Endnode requirements to participate within a multicast group.
5) Additional operational messages and algorithms as required to implement a viable multicast solution Note: Non-fabric management multicast operations require external software support and a fabric manager to provide multicast group management and route updates and is considered optional, i.e., a switch or router may refuse to participate in multicast operations and thus an application will informed per the multicast specification in use by it as to whether a join/leave operation has succeeded. Such functionality is not part of the autonomous discovery and management protocol—it is provided by OSV, ISV, and IHV middleware providers.

Applications address endnodes and routing elements using their associated Ipv6 address and are unaware of the corresponding Ipv6-to-DLID mapping. As such, applications will use the Ipv6 Multicast standard (RFC 2375—Ipv6 Multicast Address Assignments) to manage multicast addresses. The OSV, ISV, and IHVs shall provide the associated Ipv6-to-DLID mapping services. Multicast uses the same route header DLID field as a unicast DLID— the difference is how the field is interpreted by the source, destination, and intermediate routing elements.
1) The source endnode targets the multicast DLID for a given send operation. It fills in the frame's DLID field using the same technique as a unicast send operation.
2) The switch or router receives a frame and performs a route table look-up using the DLID. An example route table implementation might encode the target port(s) for a given DLID as a bit mask with one bit per port, e.g., a 8-port switch would contain a 8-bit field, a 16-port switch would contain a 16-bit field. For each indicated output port, a copy of the frame would be transmitted.
3) The destination endnode receives the frame and compares the multicast DLID with the set of DLIDs which it recognizes as its own. If the DLID is not valid, the destination endnode drops the frame, updates its error statistics and issues a management message to the designated management entity informing it to update the multicast routes to remove it as a target for the received DLID (see the Error Recover Protocol Chapter for additional details).
4) For reliable multicast, the destination endnode is receiving a unicast re-liable datagram frame for which it shall generate an acknowledgment. For a local route header, the SLID shall be valid and will be used by the acknowledgment frame. For a global header, the endnode shall determine the route to the source using the Ipv6 address and generate an acknowledgment frame using a global route header.

FIO unreliable multicast is implemented within switches and routers by sending a frame to a DLID which has been previously configured to represent a multicast group. FIG. 39 illustrates the basic operation. In this figure, an endnode creates a LRH frame which contains the destination multicast DLID. The switch performs a route table look-up and discovers the frame must be routed to three output ports. In this ex-ample, the switch replicates the frame on each output port (the strategy used is left to the IHV since there are numerous technical and business trade-offs to consider). Additional guidelines:
1) The destination endnode shall not verify sequence numbers given ordering is not preserved and frames may be dropped by intermediate endnodes.
2) The destination endnode shall not generate an acknowledgment.
3) The destination endnode shall forward the frame to the associated per-missive QP.
4) Unreliable multicast groups are dynamic in their composition. As such, it is normally not possible for a source endnode to know whether the multicast group contains endnodes which exist on a different subnet. Therefore, all multicast frames shall use the GRH. Within the local FIO subnet, the source endnode will encapsulate the GRH and associated FIO transport header and data within a LRH. A destination endnode (e.g., a router) shall discard the LRH and parse the GRH to determine what action to take. For example, if the endnode is a router, it will discard the LRH and multicast the frame per the routing rules of the attached subnet(s).
5) If any endnode drops a multicast frame, it shall not forward subsequent flits for the dropped frame. The endnode shall enter a state in which all subsequent flits targeting this frame are automatically dropped. When a flit arrives which indicates it is the first flit of a new frame, the endnode exits this state and routes/consumes the frame per normal operation.
6) While unreliable multicast is assumed to be unreliable, for an application to be successful, the underlying fabric needs to perform multicast operations at a reasonable level of success. It is strongly recommended that switch and router providers provide sufficient re-sources per VL to accommodate a reasonable number of multicast operations at any given time. These resources may be separate from unicast resources to avoid creating congestion issues due to resource constraints.
7) Unreliable multicast shall comply with the same rules which apply to unreliable datagram messages. In particular, unreliable datagram messages are implemented as single frame messages.

Reliable multicast is implemented as a series of acknowledged unicasts by the source endnode. For Future I/O version 1.0, reliable multicast is implemented via the Future I/O software verbs as a series of individual sequenced message sends (this functionality may be rolled into hardware in a later version or implementation of Future I/O). In other words, switches and routers view a reliable multicast operation as a normal unicast operation; their route tables are not modified to indicate the associated DLID is participating in a reliable multicast group. A reliable multicast group is set up using the same high-level multicast group operations but the underlying interpretation and actions taken are very different. For example, a join operation requires each participating endnode to know the exact group composition, i.e., it must maintain a complete list of destination addresses and establish reliable datagram end-to-end contexts to transmit data, and to track and generate acknowledgments for each frame received. Additional guidelines:
1) The multicast group's composition shall be communicated to all members within a given group to avoid frame loss.

2) Frames shall be strongly ordered and be acknowledged—the SLID shall be valid to generate the acknowledgment.
3) Reliable Multicast DLIDs are source and destination endnode concepts. While a multicast DLID consumes a DLID from the available DLID space, it is not reflected within any switch nor router route table. If a reliable multicast DLID is used within a frame, an endnode will generate a NAK to indicate this is an invalid DLID.

Striping, i.e., the dynamic sending of frames within a single message to an endnode's QP through multiple fabric paths (nominally using a least busy port algorithm), is used to increase aggregate bandwidth and to reduce the end-to-end message latency. Striping also allows replicated fabric resources (typically deployed to provide fault tolerant fabric paths between endnodes) to their maximum benefit. Future I/O supports striping for two configurations:

1) A message to a given QP may be striped across an arbitrary number of SANIC output ports. The message must arrive at the destination end-node through a single SANIC.
2) A message to a given QP may be striped by the fabric across an arbitrary number of switch-to-switch links.

Multiple striping operations may be simultaneously in flight to different QPs; i.e., striping operations are not serialized if the a source is targeting multiple QPs. Striping is restricted to messages which do not require strong ordering between frames, e.g., RDMA reads and writes. When all frames have been successfully delivered, the destination endnode will be issued a single completion event. Future I/O Restrictions: 1) For Version 1.0, Future I/O does not support striping across WAN links.

Policy based routing (sometimes referred to as static striping) is focused on end-to-end aggregation across multiple QPs to provide one level of fabric and QP QoS—this differs from striping which is focused on end-to-end aggregation to a specific QP. This is illustrated in FIG. 40. The main objectives for policy based routing across replicated link are:

1) Increase aggregate bandwidth available between endnodes.
2) Balance traffic across links to minimize congestion and smooth response time between endnodes
3) Segregate traffic based on application work load throughput, latency, and QoS objectives.
4) Segregate traffic based on dynamic fabric utilization.

There are several configurations of interest:
1) An endnode contains a SANIC with multiple ports.
2) An endnode contains multiple SANICs.
3) A fabric contains multiple switch-to-switch links between the source and destination endnodes.

Switch requirements include:
1) A switch shall be able to route to any valid DLID within a single subnet for which there exists an accessible physical route. If a switch receives a frame with an invalid/unknown DLID, the switch discards the frame, updates the associated error statistics and generates an alarm per the switch error recovery protocol.
2) A switch shall implement/inter-operate with the Future I/O autonomous discovery. The autonomous discovery protocol is used to determine what endnodes are attached to a switch and to establish a deadlock free set of routes within a given subnet.
3) A switch shall support the Future I/O management messages required to update and maintain routes, access rights, etc.
4) A fabric manager may update a switch's route table to reflect a more optimal or application work load driven set of routes.
5) A switch may be implemented with a small quantity of NVRAM which is used to hold the route table and ether pertinent switch configuration data through power events. Upon initialization, a switch will perform a first level discovery of the attached endnodes. If the attached endnode matches the data stored within the NVRAM, the switch will configure its route table and associated resources to reflect the previous state.
6) A switch shall support multicast for Future I/O management operations. A switch may optionally support multicast for Future I/O application usage.
7) A switch may use the LRH DLID to perform a direct route table index to determine the target port(s).
8) A switch shall support configurable hardware timers (may be per port) which when exceeded result in the current frame being discarded and the associated resources released.
9) A switch may support access control services to protect an endnode from unauthorized access by restricting the ability of a source endnode from being able to route to a destination via this switch.
10) A switch shall support a forward progress/deadlock avoidance timer. A switch may support multiple timers, i.e., one per VL to provide more fine-grain control in conjunction with frame/flit service rates.

A router is an endnode which is used to join Future I/O subnets to Future I/O subnets or to disparate fabric types. Router requirements include:

1) A router shall meet all switch requirements.
2) A router shall be capable of performing route table look-ups using the destination Ipv6 address contained within the global route header.
3) A router shall be capable of replacing the frame's DLID with the next destination within the new subnet's DLID—this may be an endnode or another router.
4) A router may optionally support connectivity to disparate fabric types, e.g., a WAN. If a router supports such connectivity, it should comply with the associated standards for routing Ipv6 traffic across such fabric types. Section 4.5 Legacy Protocol Support on page 104 specifies how legacy protocols and fabric types may be supported based on the inter-mediate fabric and destination endnode types.
5) A router shall propagate unreliable multicast frames to attached subnets if the subnets contain an endnode which is participating in an active multicast group.
6) A router shall prevent back-pressure across subnets. One implementation technique would be for a router to act as a frame store-and-forward endnode. Frames would be consumed by the router before it propagates the frame onto the next subnet. This reduces the risk of source subnet congestion caused by back pressure from the destination subnet.
7) A router shall perform frame segmentation and reassembly if the path MTU to the target endnode does not support Future I/O's frame size.
8) A subnet may contain multiple routers which can route to a given destination endnode. Future I/O does not specify how a source endnode chooses a router—this is left to middleware.

9) A router shall filter (at the Ipv6 address or subnet mask level) traffic entering an attached subnet to prevent unauthorized traffic.
10) A router may optionally implement IP-Security services. These services are not specified by Future I/O.
11) Management services which exceed the Future I/O management requirements may be implemented at an IHVs discretion.
12) A router should preserve the Future I/O end-to-end semantics if routing frames to a Future I/O subnet (this is independent of whether frames are routed through intermediate, disparate fabrics).
13) A switch shall support a forward progress/deadlock avoidance timer. A switch may support multiple timers, i.e., one per VL to provide more fine-! grain control in conjunction with frame/flit service rates.

Router fail-over. A strong RAS solution provides support for replicated ports and fabric instances which allows an application to transparently fail-over or explicitly migrate (e.g., Service Level Objective load-balancing) from one instance to another. To facilitate this, it is strongly recommended that the SANIC driver maintain alternative DLIDs for reliable transport services which can be transparently updated within the SANIC's QP state structure during the fail-over/migration process. Note: At a minimum, each port shall be assigned one LID. If there exist multiple paths within the fabric to a port, these LIDs may be optionally determined and maintained within the endnode for fail-over/migration purposes. Future I/O fabric management (not the autonomous discovery protocol) is responsible for determining this data.

The Transport Layer Protocol.

The description of the network and routing layer found immediately above describes how a frame, with its network header, is sent through the network to the appropriate endnode. Encapsulated within the network frame is the transport header and the data payload. The transport header has the information needed by the endnode to deliver the data payload to the appropriate process or thread residing on the endnode. FIO fabric switches and routers ignore the transport header; they only need the network header to rout the frame to the destination.

User of kernel mode clients of FIO interact with the transport layer indirectly through the Verbs and SANIC provider software layer. These software layers provide a series of calls to manipulate a "queue pair" ("QP") made up of a send work queue and a receive work queue. The client posts buffers or commands to these queues and hardware transfers data from or into the buffers.

When a QP is created it is associated with one of four transport services. The transport service describes the degree of reliability and to what and how the QP transfers data. An endnode offers four types of transport services:
 a reliable connection;
 a reliable datagram;
 a unreliable datagram; and
 a raw datagram.

Table 12 below compares several key attributes of the types of transport services directly supported by FIO. This section will describe each of the transport services and the terms used in the table.

TABLE 12

FIO Transport Services Comparison

| Attribute | Reliable Connection | Reliable Datagram | Unreliable Datagram | Raw Datagram |
|---|---|---|---|---|
| Scalability (M processes on N Processor nodes communicating with all processes on all nodes) | M 2 *N QPs required on each processor node, per SANIC | M QPs required on each processor node, per SANIC. | M QPs required on each processor node, per SANIC | 1 QP required on each end node, per SANIC. |
| Reliability | Reliable. Any errors not recovered by flit retransmission (e.g. a failed cable or switch/router) are handled by the SANIC driver without client involvement. All messages are received correctly, without duplicates, unordered or dropped frames. The user client sees correct data delivery. The QP is halted only if the destination is dead or all communication paths have failed. | | Unreliable. The message is delivered in its entirety or not at all. Flit retransmission on errors is supported, but duplicates, dropped frames, out- of- order, and stale messages may occur. | Unreliable. While in the FIO network, The message is delivered in its entirety or not at all. When routed out- side the FIO network, data corruption is a function of the external media and protocols |
| Direct from user mode, zero copy Data transfers? | | Yes | | Kernel Only |
| Send Message Size | Arbitrary message sizes allowed. Send message may consist of multiple frames. | Single frame messages only. | Single frame messages only. | Single frame messages only. |

TABLE 12-continued

FIO Transport Services Comparison

| Attribute | Reliable Connection | Reliable Datagram | Unreliable Datagram | Raw Datagram |
|---|---|---|---|---|
| RDMA Reads & Writes Supported? | Yes | Yes | No | No |
| Connection Oriented? | Connected. The client connects the local QP to one and only one remote QP. No other traffic flows over these QPs. | Connectionless. Appears connection-less to the client, but the SANIC driver shall first create one hidden connection for each SANIC it talks to. | Connectionless. No prior connection is needed for communication. | Connectionless. No prior connection is needed for communication. |
| Support for FetchOps? | Yes | Yes | No | No. |

The reliable connection and reliable datagram services use frame acknowledgment messages called "Ax" as well as sequence numbers in the transport header. These ensure the delivery of every frame, prevent duplicate frames, and allow the detection of out of sequence or missing frames. Once detected, missing frames are retransmitted by the requestor.

The reliable transport services assume incoming frames destined for a particular QP are in order. The network, except for brief periods when it reconfigures itself, will deliver frames in order. Out of order frames are essentially interpreted as missing frames. The endnodes are not expected to reorder incoming out of order frames.

For the reliable services, every request frame has a corresponding Ack frame. While the FIO Architecture Specification does not imply an implementation, it is typical for hardware to generate Ack frames. The far less common case of error recovery whereby frames need to be retransmitted can involve SANIC driver software to schedule the retransmitted frames.

NAK, or "negative acknowledgement," frames are used to respond to a failed request. NAKs are intended for error handling or error reporting when informing the requestor can help solve the problem or provide debugging insight. For example, a NAK is generated for a sequence error detected on a reliable connection QP. The NAK tells the requestor to resend earlier frames. A NAK is not generated for things like checksum errors or a routing element which delivers the frame to the incorrect destination. Such errors were not the fault of the requestor nor can the requestor ameliorate the problem.

FIO data structures and wire format described in this and related documents follow the following rules:

Sequential Qwords arrive later in time.

Bits in the Qword are arranged onto the physical interface according to the rules described above in relation to the link encoding layer data flow.

For each field, the most significant bits are always shown to the left of the diagram.

For larger entities, such as the 128-bit IPV6 addresses, the order of the Qwords will be explicitly identified.

Entities are labeled with byte addresses and are placed into Qwords at (naturally aligned) starting addresses as shown in the figure below.

In general, byte, word, dword etc. entities will be placed on their natural alignment boundary.

When an entity is placed off of its natural alignment, or if it is an odd bit size, it will be shown in the table with bit and byte addresses clearly indicated.

The various size entities are shown as follows with the byte address shown in parenthesis in decimal.

TABLE 13

Bit, Byte, Word, Dword, Qword formats

| bytes | bits | | | | | | | |
|---|---|---|---|---|---|---|---|---|
| | 63-56 | 55-48 | 47-40 | 39-32 | 31-24 | 23-16 | 15-8 | 7-0 |
| 0 | Byte (7) | Byte (6) | Byte (5) | Byte (4) | Byte (3) | Byte (2) | Byte (1) | Byte (0) |
| 8 | Word (14) | | Word (12) | | Word (10) | | Word (8) | |
| 16 | Dword (20) | | | | Dword (16) | | | |
| 24 | Qword (24) | | | | | | | |

There are 10 different transport header formats used by the four transport services. Table 14 below lists which frame formats are used to support each of the transport services. The formats of the various transport headers are defined below. The Opcode field in the first byte of the transport header determines the transport frame type.

TABLE 14

Frame Formats Used by the Transport Services

| Transport Frame Type | Reliable Connection | Reliable Datagram | Unreliable Datagram | Raw Datagram |
|---|---|---|---|---|
| Send | X | X | X | The raw |
| Ack | X | X | not used | datagram |
| NAK | X | X | not used | transport |
| RDMA Write | X | X | not used | fields are |
| RDMA Read | X | X | not used | not defined |
| RDMA Read Acknowledgment | X | X | not used | by FIO. The next header |
| FetchOp Command | X | X | not used | field in the |
| FetchOp Ack | X | X | not used | Network |
| FetchOp Release | X | X | not used | header is used to interpret the |
| Inquire | X | X | not used | contents of |
| Resync | X | X | not used | the frame. |
| Restart | X | not used | not used | |

[a]An "X" indicates the transport service can use that particular frame type.

TABLE

Transport header for "Restart", "Resync", or "Inquire" Operations

| bytes | 63-56 | 55-48 | 47-40 | 39-32 | 31-24 | 23-16 | 15-8 | 7-0 |
|---|---|---|---|---|---|---|---|---|
| 0 | Opcode (8) | Sequence number (24) | | | Source QP# (20) | | TSN (12) | |
| 8 | FKEY (32) | | | | Destination QP# (20) | | SLIDE | Rsvd |

Note:
FKEY usage for the above commands is a "Work in progress"

TABLE

Transport header for "Send" Operations

| bytes | 63-56 | 55-48 | 47-40 | 39-32 | 31-24 | 23-16 | 15-8 | 7-0 |
|---|---|---|---|---|---|---|---|---|
| 0 | Opcode (8) | Sequence number (24) | | | Source QP# (20) | | TSN (12) | |
| 8 | FKEY (32) | | | | Destination QP# (20) | | SLIDE | Rsvd |
| 16 | Payload Data | | | | | | | |

Note:
the length of the Payload is calculated off the route header frame length.

TABLE

Transport header for "General Ack" Operations

| bytes | 63-56 | 55-48 | 47-40 | 39-32 | 31-24 | 23-16 | 15-8 | 7-0 |
|---|---|---|---|---|---|---|---|---|
| 0 | Opcode (8) | Sequence number (24) | | | Original Source QP# (20) | | TSN (12). | |

Note The TSN field is copied from the same positions of the request frame, the length of the Payload is calculated off of the route header frame length, the length of the Payload is calculated off of the route header frame length, and, for Acks, the SLIDE field is encoded into the Opcode field. This was done to keep the Ack header small (it will only use a single 16 byte flit).

The General Ack frame is sent in response to a Send, FetchOp request, FetchOp Response, or RDMA Write request that is received at a QP offering one of the two reliable transport services. Note that there is only one Ack opcode available for these commands, so the Ack must be associated with the request frame by use of the QP, TSN, and sequence number, to determine the original request opcode. The sequence number, TSN, and Source QP fields in the Ack frame are replicated from the associated Send or RDMA write request frame. Acks are always sent to the "source ID" stored in the QP or EE context, and matched against the "Source ID" found in the incoming request frame. This is even if the other end's ID for the connection is different. An Ack cannot be sent until the QP context is examined and Various checks are made; including whether to send an Ack or not (unacknowledged service).

Transport header for a NAK Opcode

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Original Sequence number (24) | | | Original Source QP# (20) | | TSN (12) | |
| 8 | | Original FKEY (32) | | | Original Destination QP# (20) | | SLIDE | Rsvd |
| 16 | NAK Code | | | | Reserved | | | |

Note The TSN field is copied from the same positions of the request frame.

Transport header for an RDMA write Operation

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Sequence number (24) | | | Source QP# (20) | | TSN (12) | |
| 8 | FKEY (32) | | | | Destination QP# (20) | | SLIDE | Rsvd |

-continued

| bytes | |
|---|---|
| 16 | Virtual Address |
| 24 | R_Key          Payload Data |
| 32 | Payload Data |

Note: the length of the Payload is calculated off of the route header frame length.

Transport header for an RDMA Read Operation

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Sequence number (24) | | | Source QP# (20) | | TSN (12) | |
| 8 | | FKEY (32) | | | Destination QP# (20) | | SLIDE | Rsvd |
| 16 | Virtual Address | | | | | | | |
| 24 | R_Key | | | | Reserved | | RDMA Length | |

Transport header for an RDMA Read Ack Operation

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Sequence number (24) | | | Original Source QP# (20) | | TSN (12) | |
| 8 | | FKEY (32) | | | Original Destination QP# (20) | | SLIDE | Rsvd |
| 16 | Payload Data | | | | | | | |

Note: the length of the Payload is calculated off of the route header frame length.

Transport header for a FetchOp Command Operation

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Sequence number (24) | | | Source QP# (20) | | TSN (12) | |
| 8 | | FKEY (32) | | | Destination QP# (20) | | SLIDE | Rsvd |
| 16 | Virtual Address | | | | | | | |
| 24 | R_Key | | | | Reserved | | | |
| 32 | Swap Data | | | | | | | |
| 40 | CMP Data (Used for Compare and swap only) | | | | | | | |

Transport header for a FetchOp Ack Operation

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Sequence number (24) | | | Original Destination QP# (20) | | TSN (12) | |
| 8 | | FKEY (32) | | | Original Source QP# (20) | | SLIDE | Rsvd |
| 16 | Pre-Swap return Data | | | | | | | |

Transport header for a FetchOp Release Operation

| bits bytes | 63–56 | 55–48 | 47–40 | 39–32 | 31–24 | 23–16 | 15–8 | 7–0 |
|---|---|---|---|---|---|---|---|---|
| 0 | Opcode (8) | Sequence number (24) | | | Original Destination QP# (20) | | TSN (12) | |
| 8 | | FKEY (32) | | | Original Source QP# (20) | | SLIDE | Rsvd |
| 16 | Virtual Address | | | | | | | |
| 24 | R_Key | | | | Reserved. | | | |

Table 15 presents the definitions of the opcode field.

TABLE 15

Opcode field

| 00eeeeee[a] | General Ack |
|---|---|
| 10000000 | Connected Send (First or intermediate frame) |
| 10000001 | Connected Send (last or only frame) |
| 10000010 | Connected RDMA Read |
| 10000011 | Connected RDMA Read Ack |
| 10000100 | Connected RDMA Write |
| 10000101 | Connected Restart |
| 10000110 | Connected Inquire |
| 10000111 | Connected Resync |
| 10001000 | Connected Swap |
| 10001001 | Connected CmpSwap |
| 10001010 | Connected FetchAdd |
| 10001101 | Connected FetchOp Ack |
| 10001110 | Connected FetchOp Release |
| 10001111 | Connected NAK |
| 10100001 | Reliable Datagram Send |
| 10100010 | Reliable Datagram RDMA Read |
| 10100011 | Reliable Datagram RDMA Read Ack |
| 10100100 | Reliable Datagram RDMA Write |
| 10100110 | Reliable Datagram Inquire |
| 10100111 | Reliable Datagram Resync |
| 10101000 | Reliable Datagram Swap |
| 10101001 | Reliable Datagram CmpSwap |
| 10101010 | Reliable Datagram FetchAdd |
| 10101101 | Reliable Datagram FetchOp Ack |
| 10101110 | Reliable Datagram FetchOp Release |
| 10101111 | Reliable Datagram NAK |
| 11000001 | UnReliable Datagram Send |
| 1110xxxx | Manufacturer Specific Opcodes (16 codes) |
| 11111111 | NAK (Unsupported feature). |

[a]"eeeeee" is the request frame's SLIDE field

Note that unlisted opcodes are reserved; they should not be generated by senders, they should be ignored and NAKed (11111111b) by receivers. Reserved values of the opcode field and those that are not supported by the device, are NAKed by endpoint devices. The current frame qualifiers "first", "intermediate", "last", and "only" listed above indicate which frame of the message is represented by the opcode. There are separate opcodes for Reliable Connection, and Reliable Datagram to allow the remote SANIC to determine the mechanism for accessing the connection state (QP context or EE context).

With respect to other fields used in the various headers:

the source and destination QP (Queue Pair Identifier) field is a 20 bit field allows up to 1 million queue pairs to be supported by the architecture at each endpoint.

the virtual address field is used for those operations that can access specific memory in the remote node (RDMA, FetchOps). It is a 64 bit entity that is used in conjunction with the R_Key and remote node virtual to physical address translation mechanism to indicate the location in memory accessed by the operation. A further discussion on the use of Virtual address, and R_Key is provided is found below. This address is generally expected to be the virtual address of an operation that accesses memory in the remote node. As such the final interpretation is up to the endpoint.

the transaction serial number ("TSN") is a 12-bit number is not used by the switches or the destination device, it is simply passed in the Request header through to the ACK (or NAK) Header. It is used by the source SPE to correlate the frame request operation and the Acknowledge. The receiver shall copy the sequence number into the ACK or NAK frame unchanged. Though not strictly necessary for sequenced frames, (because the same information can be determined by a CAM lookup on the QP or EE and sequence numbers) it is a great convenience for the SPE. This number allows a direct lookup on up to 4096 outstanding frames. If more than this number of outstanding frames are supported by the SPE, then additional information such as the QP, port, and/or sequence number must also be used. For Reliable Datagram QPs, this number will probably be used as a QP sequence number. This is a convenience for the sender in that it can more quickly access the context for completing the WQEs when the Acks come in. If the SPE supports sending of "unsequenced" frames, then this field is required to determine the Ack/Re-quest match for RDMA writes.

the sequence numbers are used to enable error detection and recovery for the reliable services. For Reliable Connection QPs, the sequence numbers are associated with the QPs in each endpoint, there is a separate sequence number tracked for each direction of each QP. For Reliable Datagram QPs, sequence numbers are associated with the source/destination devices (i.e., the end-to-end [EE] context). There is a separate sequence number tracked at the source device for each destination device, and each VL, and a separate sequence number tracked at the destination for each source device, and each VL. For UnReliable Datagram QPs the sequence number is present in the frame header but is not used by either the source or the destination. A source device may use this field for any purpose, a destination should ignore it.

For "sequenced" frames, the sender increments the sequence number for each frame sent. The receiver keeps track of the currently expected sequence number and compares the incoming request frame's sequence number to the expected one. If the sequence number matches, and all other fields of the frame are acceptable (Opcode, source and destination QP, Source ID or address, F_Key, Destination ID or address) and the memory access rights are acceptable, the request frame can be acknowledged and the expected sequence number incremented. Incoming request frames that have an unexpected sequence number are NAKed. The receiver shall copy the sequence number into the ACK or NAK frame unchanged.

Certain operations (RDMA read and write) may be marked as "non-sequenced" ("sequenced flag" cleared) to allow them to be dynamically routed through different routes. As a result they may arrive at the receiver in a different order than sent. For these operations, the transmitter "freezes" the sequence number (using a single number for all of the "non-sequenced" frames. The number used is a single increment above the number used for the last "sequenced" frame. The receiver shall compare the incoming sequence number to the expected number for every incoming "non-sequenced" frame but it shall not increment the expected number. On receiving a frame with the "sequenced flag" set, the comparison is made again, and incrementing is done as normal. Since the receiver has no idea if a non-sequenced (RDMA) operation is complete or if frames are lost, the sender shall not send a sequenced operation following a non-sequenced operation until all Acks for the non-sequenced operation are back. Since the sequence number is not changed for "non-sequenced" operations, the only way a sender has to match the acknowledges to the requests is via the TSN field. The sender shall insure that no more than $2^{24}-1$ frames are outstanding (unacknowledged) at one time. This prevents errors in interpreting the sequence number incorrectly.

The sequence number is very large in order to deal with several problems, including:

allowing many frames to be outstanding at one time ($2^{24}-1$)

insuring a very low probability of having a "ghost I/O" effect the system unfavorably.

Note that for most implementations, multiple frames are expected to be outstanding at one time (sent but not acknowledged). This implies that the sender must actually keep track of the sequence number that is being received (ACKed) as well as the number that is being transmitted. The sequence number being attached to request frames is called the "Request Sequence", the sequence number expected for an arriving Ack is the "Expected Sequence" number.

TABLE 16

Receiver's Interpretation of Incoming Sequence Number

| Sequence Number | Interpretation |
|---|---|
| Exp#[a] − Rx#[b] = 0 | OK |
| Exp# − Rx# ! = 0 | "past" |

[a]Expected Sequence Number
[b]Received Sequence Number

The 32-bit R_Key field is associated with a 64 bit virtual memory address and together the two are used by the destination node to validate an incoming RDMA and FetchOp request. The R_Key field in the in-coming RDMA or FetchOp request frame shall match the R_Key value the destination node previously associated with its memory buffer. This mechanism allows the remote client to restrict RDMA access to only those nodes that know the proper key value. A client must associate one or more R_Key values with each virtually contiguous range to which it allows RDMA access. The buffers associated with an R_Key may be of arbitrary size and alignment as is discussed further below. A node must always know the tuple of R_Key and virtual address to initiate an RDMA request. The R_Key, like the RDMA address, is a client manipulated field.

The Source ID Extension ("SLIDE") is present to assist the endpoint hardware in associating the incoming frames with the appropriate "EE" (end to end) data structures. During QP or Endpoint "open" operations, each endpoint returns the value that the remote endpoint shall use when accessing the remote endpoint. The value is expected to be stored in the QP or EE context along with the remote end's Source LID or Ipv6 address. When sending request frames, the sender sets SLIDE to the value that the remote end requires (as set up by "open" operation). When Acknowledging the request frame (or NAKing it), the receiver must load the response frame with the SLIDE value stored in its EE or QP context.

Implementation Note: This field is intended as a convenience to the hardware, to simplify the access to endpoint resources. In particular, in the Reliable Datagram mode, this field is used to assist in the accessing of the endpoint to endpoint (EE) data contexts. It is expected that these contexts must be indexed by a hash function of the LID and or IPV6 Address, depending on header mode. To deal with hash collisions without requiring an additional search, (except in exceptional cases) the hash function result can be offset by the SLIDE field, allowing a single lookup operation. With the SLIDE field at 6 bits, up to 64 entry offset can be identified, reducing hash collisions in all but the most heavily utilized hash tables.

The Frame Protection Key ("Fkey") field provides a degree of protection from unwanted request frames. The receiving node matches the 32b Fkey in the incoming request frame to the value expected for that QP. If the Fkey matches, the request is processed. If the Fkey does not match, the request is ignored and a NAK frame is sent back to the requestor The Fkey is managed by the consumer of the FIO services. That is, the process using the QP is aware of the Fkey associated with its QP and must communicate the QP's Fkey to any process it wishes to communicate with.

The NAK_code NAK Codes are part of the NAK header. When the NAK can be generated because the SLID is present, or when a connection is operating, the NAK is sent back to the source. The following additional information is returned in the NAK code when an error is detected:

TABLE

NAK_codes

| Code | | Note | Mode |
|---|---|---|---|
| 0 | Sequence | The receiver sequence number did not match the incoming sequence number. | RC, RD |
| 1 | Receiver not ready ("RNR") | The receiver cannot perform the operation at this time | RC, RD |
| 2 | Invalid R_Key | R_Key not recognized by the receiver | RC, RD, RDMA |
| 3 | Access outside of R_Key limit due to Virtual address | Start address not in range specified by R_Key | RC, RD, RDMA |
| 4 | Access outside of R_Key limit due to frame length | Access beyond the end of the range specified by the R_Key | RC, RD, RDMA |
| 5 | Access outside of process space (L_Key violation) | Page protection violation at the receiver | All |
| 6 | Access outside of Rx buffer limit for Send | Send message length too long for the receive buffer | RC, RD |
| 7 | Invalid Opcode (either reserved or not supported) | | All |
| 8 | Unexpected FIO Version in route header | | All |
| 9 | Invalid QP (QP number not supported) | Destination does not support this QP number | RC, RD, UD |
| 10 | Source QP not valid for this destination QP | For Reliable Connections, the source QP must match the programmed value at the destination. | RC |
| 11 | Source LID not valid for this destination QP | For Reliable Connections, the source LID must match the programmed value at the destination. | RC |
| 12 | Source IPV6 address not valid for this destination QP | For Reliable Connections, the source address must match the programmed value at the destination. | RC |
| 13 | Unexpected destination ID (route failure!) | The receiver's DLID did not match the value programmed into the SANIC | All |

TABLE-continued

NAK codes

| Code | | Note | Mode |
|---|---|---|---|
| 14 | Unexpected destination IPV6 address (route failure!) | The receiver's Address did not match the value programmed into the SANIC | All |
| 15 | Frame length shorter than expected (next frame arrives before frame length is achieved.) | At least the header arrived correctly, so the NAK can be generated. | All |
| 16 | Invalid SLIDE | Correct EE context could not be located for this Reliable Datagram. | RD |
| 17 | Invalid FKEY | | RC, RD, UD. |

*The Payload field is the contents of the message. For multi-frame messages, the sender breaks up the message into frames of the appropriate size, the receiver must re-assemble the frames into a complete message. It is generally assumed that the endpoints will do the break-up and reassembly in the final Frame Level Details.

The FIO team is currently investigating flow control at the frame level. If used, it must require minimum hardware state and algorithms since it is assumed that it will be combined with the hardware frame scheduler. Currently we are trying to avoid the use of additional "request to send" and "clear to send" messages because we expect these to increase latency and network bandwidth. We also expect that it would also be impractical to have any sort of credit count. Given the large number of endnodes and QPs in an FIO system, any attempt to pre-establish frame credits would be either not scalable or would require very large pre allocated buffers. As a result, we are looking at the use of adaptive rate mechanisms such as have been proposed for use (or used) in the internet.

FIO specifies flow control at the link level and at the message level. The link level flow control is done with flit level credit counts. It is used so switches and endnodes do not drop frames if a resource (e.g. a switch output port) is temporarily busy. Message level flow control is used if a Send message is sent to a QP and there is no receive buffer available. Assuming receive buffers are available, an endnode is expected to process all incoming request frames.

VLs are used for deadlock avoidance by employing different virtual lanes for request and acknowledgment frames. The transport layer shall not cause deadlock in the FIO fabric. Specifically, it shall never cause back pressure on an input because of back pressure it receives from the network. To help meet this requirement, FIO defines that a different virtual lane be used for acknowledgment frames than the request frames. A full description on the use of Virtual lanes is located the discussion on Quality of Service below.

Protection against ghost frames is also provided. Ghost frames, or frames that may be "lost" in the network following an error or network route change, are handled by use of the sequence numbers. See the sections on sequence numbers above and on error handling below Reliable Datagrams and frame level error recovery below for Reliable Connections for more detail.

Frame level timeouts are maintained by the QPs for Reliable Connections and the "end to end" (EE) connections for Reliable Datagrams. These are set by default, to values that work well for FIO subnet use. If the connection goes outside the subnet, the values must be programmed to higher values appropriately. See the discussion on connection management below. Timeouts for the RNR mechanism should be established by software. For Reliable Connection, the timeout is based on waiting a bit longer than the longest expected software response time. When this times out, the FIO consumer is notified. For Reliable Datagram, the timeout is based on a reasonable "poll" interval. The SANIC also maintains a "poll counter" to determine the number of times to poll before the FIO consumer is notified. Both the RNR timeouts must be set to be longer than the frame level timeouts. These timeouts will be not less than the amount specified, but may be considerably more. Implementation note: It is expected that the timeout will use the QP frame scheduler as a timing mechanism. As a result, the timeouts will probably be an integral number of scheduler cycles.

Operations.

Turning first to the send operation, there is a one to one correspondence between send WQEs on the transmitting side and receive WQEs on the receiving side. The data to be transmitted is given by the "local address" and "data length" parameters given by the calling verb. There may be up to 8 address and length pairs organized into a "gather list" to make up a single message. A zero length is acceptable for the first (only) data region specified, if more than one region is given as a gather list, they must all have non-zero lengths. The SANIC must support a length of a region up to $2^{32}-1$ bytes. If there is no actual data present in the incoming frames, the receiver should not perform any memory protection checks. Each local data address range is checked for validity against the local page protection table, translated into the appropriate address, read from memory and packed into frames for transmission. Page access violations are reported when the message WQE is dequeued. See the SANIC Memory protection section for more details.

More particularly:

For Reliable Connection service, the message is packed into frames tightly, all but the last frame of a message shall be completely filled to the frame limit. Frame packing shall not depend on the buffer address, length, or gather list structure.

For Reliable Datagram, UnReliable Datagram, and Raw Datagram services, a message longer than one frame is considered an error.

For Reliable Datagram, UnReliable Datagram, and Raw Datagram services, the Destination IPV6 address, and FIO subnet local DLID of the router or gateway is included in the WQE. Also included is the Next Header, and Hop count values.

Note: performance will usually be improved if the message buffers are naturally aligned, at least with the CPU native word width, and preferably with the system native line size. Buffers that do not cross page boundaries will have better performance than those that do, so it is advantageous to organize the buffers to cross the minimum number of page boundaries possible. This does not imply that a message should be broken up artificially into smaller messages in order to avoid buffer page crossings.

When received, the message is subject to appropriate checks, stored, and each frame is acknowledged. Errors are returned with a NAK, and the appropriate error code. See the discussion on the receive operation immediately below for more details. When the message has been completely sent, and all acknowledgements have been returned to the sender, the WQE is marked "done" for reporting with the appropriate verb.

The receive operation is used to inform the SANIC, the location of buffers used to store incoming data. It also provides a mechanism where the incoming data characteristics (length, immediate data, etc.) can be re-turned to the application.

Unlike other operations, Receives are posted to the receive queue. Each incoming message is stored in the buffers described by a single "receive WQE". There must be sufficient room in the buffers for the incoming message, or the sender and receiver will get an error. The buffer may be larger than necessary, if so, the state of memory in the buffer beyond the end of the message is left undefined. The buffer which receives the data is given by the "local address" and "data length" parameters given by the calling verb. There may be up to 8 address and length pairs organized into a "scatter list" to accept a single message. A zero length is acceptable for the first (only) data region specified, if more than one region is given as a scatter list, they must all have non-zero lengths. The SANIC must support a length of a region up to $2^{32}-1$ bytes. As the data comes in, each local data address range is checked for validity against the local page protection table, translated into the appropriate address, and used to store the data. Page access violations are reported when the message WQE is dequeued, as is discussed below relative to memory registration.

The amount of actual data in the Send frames is determined from the route header "Frame Length" field according to the rules for this field.

For Reliable Connection service, data is packed tightly into the memory buffers described by the scatter list.

For Reliable Datagram, UnReliable Datagram, and Raw Datagram services, the source ID and QP are available in the receive buffer at the destination for security and reliability checks. The format of the first. 56 bytes of the receive buffer depends on the header mode, local or global. The software verbs or API may translate the local information back to global for the user. Reserved fields in the buffer prefixes set forth in the Tables below are not defined; the values may be written with any value by the SANIC, or left unwritten.

For Reliable Datagram, UnReliable Datagram, and Raw Datagram services, the receiver will only accept a single frame into each receive buffer, regardless of buffer size.

Note: performance will usually be improved if the message buffers are naturally aligned, at least with the CPU native word width, and preferably with the system native line size. Buffers that do not cross page boundaries will have better performance than those that do, so it is advantageous to organize the buffers to cross the minimum number of page boundaries possible. This does not imply that a message should be broken up artificially into smaller messages in order to avoid buffer page crossings. When the last frame of the incoming message is received (as denoted by the frame Opcode field) the receiver will store the message size and any error information, and will mark the WQE "done", ready to be dequeued by the appropriate verb.

TABLE

Receive buffer prefix for Global header mode

| | bits | | | | | | |
|---|---|---|---|---|---|---|---|
| bytes | 63-56 | 55-48 | 47-40 | 39-32 | 31-24 | 23-16 | 15-8 | 7-0 |
| 0 | Reserved (16) | | Destination LID (16) | | Frame length (16) | | Source LID (16) | |
| 8 | Veers/Talc's | | Flow Label | | IP Frame Length | | Next Hop Dr. | Count |
| 16 | Source Ipv6 Address High Qword (64) | | | | | | | |
| 24 | Source Ipv6 Address Low Qword (64) | | | | | | | |
| 32 | Destination Ipv6 Address High Qword (64) | | | | | | | |
| 40 | Destination Ipv6 Address Low Qword (64) | | | | | | | |
| 48 | Reserved (32) | | | | Source QP# (20) | | reserved (12) | |
| 56 | FKEY (32) | | | | Destination QP# (20) | | reserved(12) | |
| 64 | Beginning of Payload Data | | | | | | | |

TABLE

Receive buffer prefix for Local header mode

| | bits | | | | | | | |
|---|---|---|---|---|---|---|---|---|
| bytes | 63-56 | 55-48 | 47-40 | 39-32 | 31-24 | 23-16 | 15-8 | 7-0 |
| 0 | Reserved (16) | | Destination LID (16) | | Frame length (16) | | Source LID (16) | |
| 8 | Reserved | | | | | | | |
| 16 | | | | | | | | |
| 24 | | | | | | | | |
| 32 | | | | | | | | |
| 40 | | | | | | | | |
| 48 | Reserved (32) | | | | Source QP# (20) | | reserved (12) | |
| 56 | FKEY (32) | | | | Destination QP# (20) | | reserved (12) | |
| 64 | Beginning of Payload Data. | | | | | | | |

The RDMA Read operation describes a message that can move a single virtually contiguous block of memory from a remote location to a local location as described by the operation verb. The verb provides a single remote address and its associated protection key and a length of the region to access.

The local buffer which receives the data is given by the "local address" and "data length" parameters given by the calling verb. Scatter lists are not supported for RDMA reads, so only a single address and length pair is allowed. A zero length is acceptable for the data region specified. The SANIC must support a length of a region up to $2^{32}-1$ bytes. Scatter lists for RDMA read seriously complicate the hardware, primarily due to the out of order properties of the data when striping is used. Since a scatter list can be simulated by multiple RDMA read WQEs, this feature was dropped from FIO. On execution, the SANIC takes the WQE for the operation and breaks up the remote address range into frame sized requests, with each request set up to fill an entire acknowledgment frame. Since RDMA read requests are usually small compared to the response frames, they shall be sent out no faster than the expected incoming data rate, adjusted for the rate control as discussed below in connection with Quality of Service (dos).

The remote endpoint performs the expected protection checks on each frame based on the R_Key, address and size, reads the data from memory, and returns RDMA Read Ack for each frame to the sender. Since the data can be read from the correct memory location regardless of the order of arrival, the sender may mark these operations "non-sequenced", potentially causing the frames to be delivered out of order. When the frames are marked in this way, the receiver only checks for a constant transport sequence number, (discussed above) for these operations. It is the responsibility of the sender to make certain that an ACK is returned for each request, so that all of the data is transferred.

When the RDMA Read Acknowledge frames arrive, with the data, they are stored according to the local buffer description from the operation verb. When all acknowledges are in, the local WQE is marked with the length transferred (should be the same as the length requested, unless there was an error), and any error information available, and will mark the WQE "done", ready to be dequeued by the appropriate verb. The sender shall not send any Send or FetchOp commands until all of the Acks for the RDMA Read are back from the receiver. This is required for Reliable Connection service, inherent for Reliable Datagram service. This is required to maintain ordering in the face of a lost RDMA Ack. If an Ack is lost, followed by a Send operation that causes the receiver to invalidate its R_Key, the RDMA Read cannot be retried successfully. No WQEs on the remote node's receive queue are consumed by RDMA operations. No notification is given to the remote node that the request has completed.

Thee RDMA write operation describes a message that can move a block of memory from a local location to a single virtually contiguous remote location as described by the operation verb. The verb provides a single remote address and its associated protection key and a length of the region to access. The local buffer which provides the data is given by the "local address" and "data length" parameters given by the calling verb. There may be up to 8 address and length pairs organized into a "gather list" to accept a single message. A zero length is acceptable for the first (only) data region specified, if more than one region is given as a gather list, they must all have non-zero lengths. The SANIC must support a length of a region up to $2^{32}-1$ bytes. If there is no actual data specified in the WQE, the sender should not actually place the operation on the wire; the sender should not perform any protection checks, and should complete the WQE immediately.

On execution, the SANIC takes the WQE for the operation and reads frame sized chunks from the local address space, creates the appropriate remote address and length, and creates RDMA write request frames with the data. The remote endpoint performs the expected protection checks on each frame based on the R_Key, address and size, writes the data to memory, and returns RDMA Write Ack for each frame to the sender. Since the data can be written to the correct memory location regardless of the order of arrival, the sender may mark these operations "non-sequenced", potentially causing the frames to be delivered out of order. When the frames are marked in this way, the receiver only checks for a constant sequence number for these operations (see Section 6.2.5 on page 133 transport sequence numbers). The amount of actual data in the RDMA write frames is determined from the route header "Frame Length" field according to the rules for this field. It is the responsibility of the sender to make certain that an ACK is returned for each request, so that all of the data is transferred. When all acknowledges are in, the local WQE is marked with the length transferred (should be the same as the length requested, unless there was an error), and any error information available, and will mark the WQE "done", ready to be dequeued by the appropriate verb. No WQEs on the remote node's receive queue are consumed by RDMA operations. No notification is given to the remote node that the request has completed.

Three atomic "FetchOps" operations are supported, Fetch and Add, Compare and Swap if match, and Swap. These are generally expected to be used by applications that require synchronization on some resource that is identified by a memory location. The operations are "atomic" in that they all perform a read and a write at the destination and guarantee that no other devices (Cpus, etc.) are able to slip a write in between these. These are guaranteed to execute at most once. If the FetchOp does not execute on the destination, it is re-ported to the sender. However, like all operations, a non-recoverable error that occurs after execution at the destination, but before the response reaches the sender, is basically unknown as far as the sender is concerned. If this occurs, the connection is lost, and this will ultimately be reported to the application. Any errors that are recoverable will be recovered invisibly to the FIO client.

To enable error recovery, particularly to enable recovery from a lost Ack, FetchOps are handled by a special mechanism that uses a two request/response pair operation. The two request frames are called the "FetchOp Command", and "FetchOp Release". A "FetchOp Command" request is executed to the remote SANIC, consisting of the write (and compare for Compare and Swap) data needed for the operation. The remote SANIC either responds to the operation with a FetchOp Ack, or, if currently unable, responds with an RNR NAK. As with other operations, the RNR could be generated due to a memory page fault, or be-cause the SANIC does not have enough resources to process the FetchOp (presumably other FetchOps are being processed).

The "FetchOp Command" request is effectively queued to a special facility at the remote SANIC that processes the FetchOp. This facility shall be implemented with hardware. The "FetchOp Facility" executes the operation, and internally stores the result, the source QP (and EE identifier if in Reliable Datagram mode), the Virtual address and the R_Key to allow error recovery. Following the execution of the operation, the remote SANIC sends a "FetchOp Ack" frame, containing the result data. The sender then returns the data to the FIO consumer as specified in the Verb. The sender then sends a "FetchOp Release" frame to release the remote SANIC's FetchOp resources (the FetchOp result). The Receiver Acks the "FetchOp Release" with a "General Ack". The WQE is not completed and returned to the FIO consumer until the final acknowledgement arrives.

As with all operations, errors could occur on any of the transfers. If the original "FetchOp Command" re-quest is lost, it is retried using the normal retry procedures. If the retry fails, it is not certain whether the FetchOp took place at the destination, but the QP will be in the error state and the connection broken. (Note that, if the FetchOp is executed on a QP in the Reliable Datagram mode, the failure will result in the EE connection being in the Error state.) If the "FetchOp Release" has an error, the sender will retry as with any operation. If all retries fail, that implies that the connection is lost, and the error recovery routines in the remote SANIC driver will release the FetchOp Facilities' resources. Note: Suggest that only one target be present in a "cache line" of the target node CPU architecture to pre-vent cache line contention. The Size of the operation is always 64-bits. The target must be naturally aligned (low 3 bits of the virtual address must be zero). An error will be reported if the R_Key range does not fully enclose the target. If this or other protection error occurs, it will be reported but will not result in taking an of the "FetchOp Facility" resources.

On getting a FetchOp command, the receiver FetchOp facility checks to see if this is a repeated command by matching its resources against the request parameters (Source QP, EE identification [for Reliable Datagram], R_Key, and VA). If not, the receiver determines whether it has the resources (at least one not busy) to perform the FetchOp. If these resources are not available, the receiver returns an RNR NAK. It is expected that SANICs will have a limited ability to maintain the state required between the "FetchOp Command" and the "FetchOp Release". Since these operations must be separated by at least one round trip fabric latency, plus any other latencies at the sender, each "resource" is busy for a potentially significant time. It is strongly encouraged that the SANIC be designed to handle a large number of these in order to limit the number of times the RNR protocol will be invoked. If the facility has resources to execute the FetchOps, then the receiver QP performs the memory protection checks as usual. Again the receiver NAKs on any errors.

The receiver's FetchOp Facility then performs the command and stores the request parameters and the result. The facility sets the state of the result re-source to "Busy", and returns the FetchOp Ack. When the receiver gets the "FetchOp Release" frame, it locates the appropriate resource by matching against the request parameters (Source QP, EE identification [for Reliable Datagram], R_Key, and VA) and releases them for reuse. If the receiver gets a repeated command, as determined by a match between the request parameters and the stored resources, it shall simply return the stored result data with the "FetchOp Ack" frame. If a connection is lost or killed at the receiver, the SANIC driver must examine the "FetchOp Facility" re-sources to determine if any of them should be released.

Initial FetchOp command processing is done for sender FetchOp Actions just as with all other operations. The difference begins when the "FetchOp Ack" frame arrives. When this occurs, the sender must send a "FetchOp release" frame as soon as possible. Implementation note: If request frames are only sent at the QP's scheduled time, it is important to adjust the schedule to send the "FetchOp Release" as quickly as possible. Extra latency at this point delays the sender from getting its result, and causes the receiver's resources to be tied up longer, potentially causing resource contention at the receiver. When the "FetchOp Release" Ack arrives, the WQE should be retired. The sender shall not send any Send or FetchOp commands until the "FetchOp Ack" is back from the receiver. This is required for Reliable Connection service, inherent for Reliable Datagram service. This is required to maintain ordering in the face of a lost "FetchOp Ack". If an Ack is lost, followed by a Send operation that causes the receiver to invalidate its R_Key, the FetchOp cannot be retried successfully.

The FetchAdd operation provides a way to atomically perform a read, add a constant, and write to a 64-bits, naturally aligned memory region on a remote node. The value initially read is returned to the local endpoint. On the sending end, there is one value and a remote buffer address in the WQE. Local WQE contains the value (Data) to add to the remote buffer at the beginning of the operation. After the operation the remote buffer contains the "original remote value"+"original local value" After the operation the local receive buffer contains the original remote value.

The CmpSwap operation provides a way to atomically perform a read, compare with a constant, and, if the comparison was equal, write a second constant to a 4-bits, naturally aligned memory region on a remote node. The value initially read is returned to the local endpoint. On the sending end, there are two values and remote buffer addresses in the WQE. First value (CmpData) contains the value to compare with the remote buffer. Second value (SwapData) contains the value that is swapped with the remote buffer only if the compare operation (done first) results in equality. After the successful operation the remote buffer contains the original (SwapData) local value. After the successful operation the (SwapData) receive buffer contains the original remote value (which must be the same as the (CmpData) from the WQE). After unsuccessful operation, the (SwapData) receive buffer contains the original remote value (which must be different from the (CmpData) from the WQE).

The Swap operation provides a way to atomically perform a read and write to a 64-bits, naturally aligned memory region on a remote node. The value initially read is returned to the local endpoint. On the sending end, there is one value and a remote buffer address in the WQE. The local WQE value (SwapData) contains the value to swap with the remote buffer at the beginning of the operation. After the operation the remote buffer contains the original local value After the operation the receive buffer (SwapData) contains the original remote value.

These Bind R_Key and Unbind R_Key commands are implemented by the SANIC so that the OS kernal does not have to be involved. This is expected to be implemented by hardware so that the Verb posted on the WQE will be executed in the correct order. The operation does not actually transmit any frames for this command, it initializes tables used by the hardware instead.

The Delay command provides a way for software to implement delay operations in between other WQEs. This is expected to be implemented by hardware so that the Verb posted on the WQE will be executed in the correct order. The operation will use the SANIC scheduler for timing so it will provide delays that are not less than the one specified, but may be more, depending on scheduler settings and traffic.

A QP consists of a pair of Work Queues: a send queue and a receive queue. FIO Consumers post requests, in the form of WQEs (Work Queue Elements), on the Work Queues to send or receive data. A WQE is a memory structure that contains all of the information that the FIO Provider needs to process the request, such as pointers to data buffers. SANICs asynchronously process the posted WQEs and report the results when completed. Each Work Queue has an (implementation dependent) associated mechanism (such as a Doorbell) that is used to notify the SANIC that a new WQE has been posted to a Work Queue. This mechanism (Doorbell) is directly implemented by the SANIC and requires no OS intervention to operate.

Each QP has establishment parameters, these must be fully set prior to operation of the QP, some may be changed with appropriate care during operations. For QPs in the Reliable Datagram mode, the EE context must also be set up prior to any communication, as is discussed more fully in the discussion on connection setup management frames (and especially on connection management control frame definition) below. When setting up a connection, a particular QP service type is requested:

Reliable Connection—Supported by all endnodes;

UnReliable Datagram—Supported by all endnodes;

Reliable Datagram—Supported by Full SANICs for hosts or complex IO devices;
Raw Datagram—Supported by Full SANICs for hosts;

The following parameters are listed for each mode in the following Table.

TABLE

QP and EE Establishment Parameters

| Element required for operation | Reliable Connection | Reliable Datagram | UnReliable Datagram |
|---|---|---|---|
| Global/Local header mode | QP[a] | EE[b] | D[c] |
| Connection state[d] | QP | QP + EE | QP |
| MTU | QP | 4096 | 4096 |
| Transmit "hop limit" for Global header mode | QP | EE | D |
| Transmit "Flow Label" for Global header mode | QP | EE | D |
| Transmit "Tclass" for Global header mode | QP | EE | D |
| (x, y, . . . ): port, DLID, D_IPV6 address, VL | QP | EE | D |
| current path (x, y, . . . ) per port | QP | EE | D |
| Frame Ack timeout | QP | EE | NA[e] |
| RNR timeout | QP | EE | NA |
| Send "Request" sequence number | QP | EE | NA |
| Rx sequence number | QP | EE | NA. |
| QOS parameters | QP | QP | QP |
| Send queue Automatic retry count for frame errors | QP | EE | NA |
| Send queue Automatic alternate connection retry on link lost | QP | EE | NA |
| Send queue timeout for "Receiver not ready" | QP | EE | NA |
| Send queue stop/continue on frame transmission error | QP | EE | NA |
| Send queue stop/continue on WQE or protection error | QP | QP | QP |
| Receive queue stop/continue on frame transmission error | QP | EE | NA |
| Receive queue stop/continue on overrun error | QP | QP | NA |
| Receive queue use RNR protocol for overrun error | QP | QP | NA |
| Receive queue stop/continue on WQE or protection error | QP | QP | QP |

[a](QP) This is part of the QP context state and must be set up by the QP connect or Open operation.
[b](EE) This is part of the EE (end to end) context state and must be set up in a (hidden) end to end open operation.
[c](D) This is provided by the WQE verb for each frame sent.
[d]The connection state is split between the QP and EE context.
[e](NA) Not applicable The following items are controlled locally at the endpoint:
L_Key: "page table" identifier for this QP (full SANIC local attribute only)
Kernal mode: enables the L_Key to be loaded from the R_Key structure for RDMA target operations. (full SANIC local attribute only)
R_Key table address, size (full SANIC local attribute only)
Send queue memory address, size (local attribute only)
Receive queue memory address, size (local attribute only)
Send queue Completion queue (local attribute only)
Rx queue Completion queue (local attribute only)
Current Send queue pointer
Current Rx queue pointer
Interrupt on Send queue entry done
Interrupt on Rx queue entry done
Reliable Connection QPs. The Reliable Connection service uses two QPs that are "connected" such that the contents of send buffers placed on one QP are transported across the SAN and are placed in the buffers described by WQEs on the receive queue of the second QP. This data transfer is reliable in that any error or disruption in communication is handled by the SANIC driver which deals with retransmission and possible use of alternate paths. The client of the Reliable Connection service does not deal with any of the error handling issues. For Global headers, incoming Reliable Connections are identified by the presence of the "FIO" in both the Local and Global next header fields and the Reliable Connection Opcodes in the transport header. For Local only headers, incoming Reliable Connections are identified by the presence of the "FIO" in the "Local next header" field in the LRH, and the Reliable Connection Opcode in the transport header.

A Reliable Connection QP guarantees that all data submitted for transfer will arrive at its destination exactly once, intact, and in the order submitted, in the absence of errors. A WQE is completed with a successful status only when the data have been delivered into the target memory location. If an error occurs that prevents the successful in-order, intact, exactly once delivery of the data into the target memory, the error is reported through the WQE completion mechanism. The Provider guarantees that, when an error occurs, no subsequent WQEs are processed after the WQE that caused the error. Transport errors are considered catastrophic and should be extremely rare for FIO Providers using this service.

Depending on the error handling options selected, errors can cause hardware to stop processing, just be reported in a WQE (on one or both ends), or, in the case of network errors, retried. An error may optionally be delivered if a Send is lost because the Receive Queue is empty. An error will be reported to both ends if the WQE at the head of the receive queue is not of sufficient size to contain the data. Errors that occur on the initiating system, such as WQE format errors or local memory protection errors, cause a WQE to be completed with an unsuccessful status with no data sent onto the network. Errors that occur after a message is placed onto the network, such as a transport error, hardware error, lost packet, reception error, or sequencing error, are delivered to the sender and cause a WQE to be completed with an unsuccessful status. Depending on the error, it may be reported at the sending side or both sides.

A Send or RDMA Write WQE is completed with a successful status once the associated data has been successfully received by the remote endpoint. An RDMA Read WQE is completed with a successful status once the requested data has been written to the target buffers on the initiator's system.

There is no guarantee of the state or order of the memory state until the WQE has been marked done. For Send operations, this is true at both ends, the sender and the receiver. For RDMA write operations, the sender must have the message completed before the remote end can depend on the data. For RDMA read operations, the local side data state is not known until the WQE is marked done. If a message is completed in error, the contents of the buffers associated with the message are not known, one or more of the frames associated with the message may have failed. To allow for more efficient transmission across wide area networks, the frame size used for Reliable Connections can be set to values smaller than 4096. The frame size ("MTU," or "Minimum Transfer Unit") must be programmable in 64 byte units to allow the senders and receivers to use the same values.

TABLE 17

Reliable Connection QP characteristics

| Property/Level of Reliability | Support |
| --- | --- |
| Corrupt data detected | Yes |
| Data delivered exactly once | Yes |
| Data order guaranteed | Yes |
| Data loss detected | Yes |
| RDMA Read Support | Yes |
| RDMA Write Support | Yes |
| State of Send/RDMA Write when request completed | Completed on remote end also |
| State of in-flight Send/RDMA Write when error occurs | First one unknown, others not delivered |
| FetchOp Support | Yes |
| Max Size of Send messages | At least $2^{32}-1$ bytes. |

For a Reliable Connection implementation with a connected QP, the HW looks at state associated with the QP to determine such things as sequence numbers, the location of a buffer, the destination ID and destination QP number, etc. To support the Reliable Connection, the software must create the QP data structure (context). This connection establishes the data structures needed for sequence numbers and QOS parameters to support the reliable communication. Consider, for example, an outbound request, which involves:
1) The client of the Reliable Connection posts a send message. This consists of:
   the gather list of virtual addresses that describes the send message; and
   if an RDMA operation, the R_Key for the desired buffer is also included.
2) When the QP is scheduled to send a frame, the SANIC uses the L_Key of the enqueuing process (stored with the QP context) and the virtual address of the work queue WQE. This allows the Send Queue HW to directly access the virtual address space of the process that posts send message buffers.
3) The Send Queue reads the data buffer, builds the frame header (including the "Request sequence" number associated with the QP context) and puts the frame onto the wire.

Alternatively, consider an inbound request. The inbound request needs to access per QP state associated with the target client's receive queue as well as the source QP. The following lists the steps taken by the SANIC to process an incoming request frame:
1) The incoming request frame arrives and the flit layer CRCs are validated.
2) The frame header specifies the destination QP number. This is the QP associated with the client of the Reliable Connection service. This QP points to the receive buffers and has the sequence number information associated with the requesting host.
3) The incoming request's sequence number is compared against the state of the QP context connected to the requesting node. 4) If the sequence number is correct, and the receive buffer checks are valid, the incoming request is written to (or in the case of an RDMA read, read from) memory.

Or, alternatively, consider also an outbound response. After the inbound request is validated and memory is accessed, a response frame is sent back to the requester acknowledging the incoming request frame. Assuming the request is valid, the acknowledge is generated after the request frame is committed to memory. For example, on an incoming Send request frame, the acknowledge could be generated after the Send is written to memory. Or, the acknowledge could be sent back to the requestor once the frame is committed to be written to memory. The requirement on the responding node is to generate the acknowledgment only after the frame is written to the same fault zone as the processor. Finally, consider an inbound response A returning acknowledgment indicates the request was successfully completed. The originating SANIC shall match the acknowledgment with the request and if the ACK is for the last frame of a message (and all previous frames were Acked), indicate to Verbs the message is completed. The inbound response is matched to an earlier request by comparing the original Destination ID, QP, and sequence number in the returning response against all the outstanding requests.

Operation of the FIO Implementation

This section of the detailed description shall relate certain operational aspects of the FIO Implementation. Namely, this section shall relate:
   the operating environment;
   quality of service issues; and
   the layered error management architecture.

Operating Environments

As was mentioned above, the physical properties of the FIO interconnect support three predominant environments, with bandwidth, distance and cost optimizations appropriate for these environments:
1) Chip-to-chip, as typified on single board computers
2) Board-to-board, as typified by larger computer systems that support I/O board add-in slots
3) Chassis-to-chassis, as typified by interconnecting computers, external storage devices and external LAN/Wan access devices (such as switches, hubs and routers) in a data-center environment.

Figure 13:
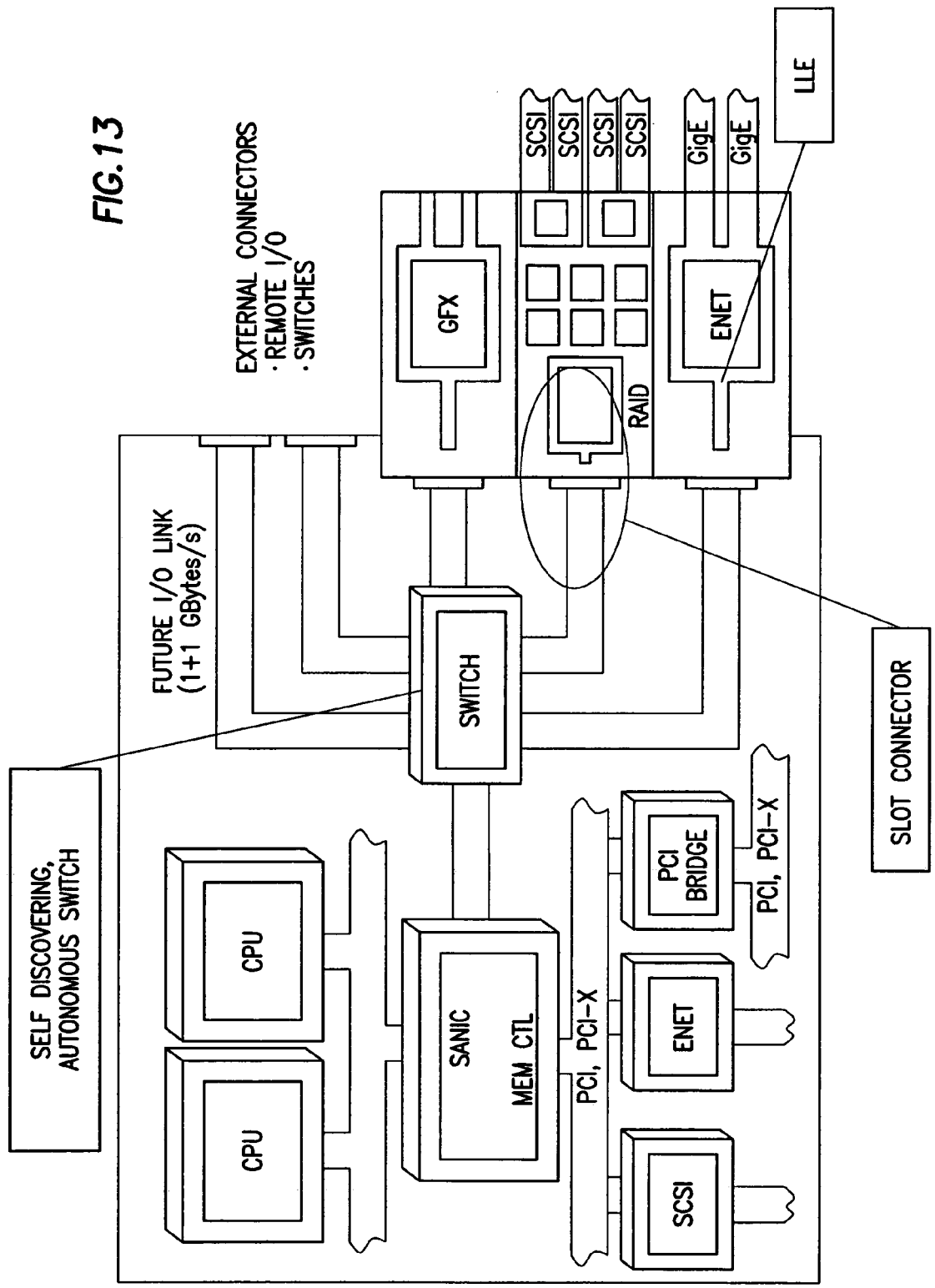
FIG. 13 Single Board Computer.
Figure 56:
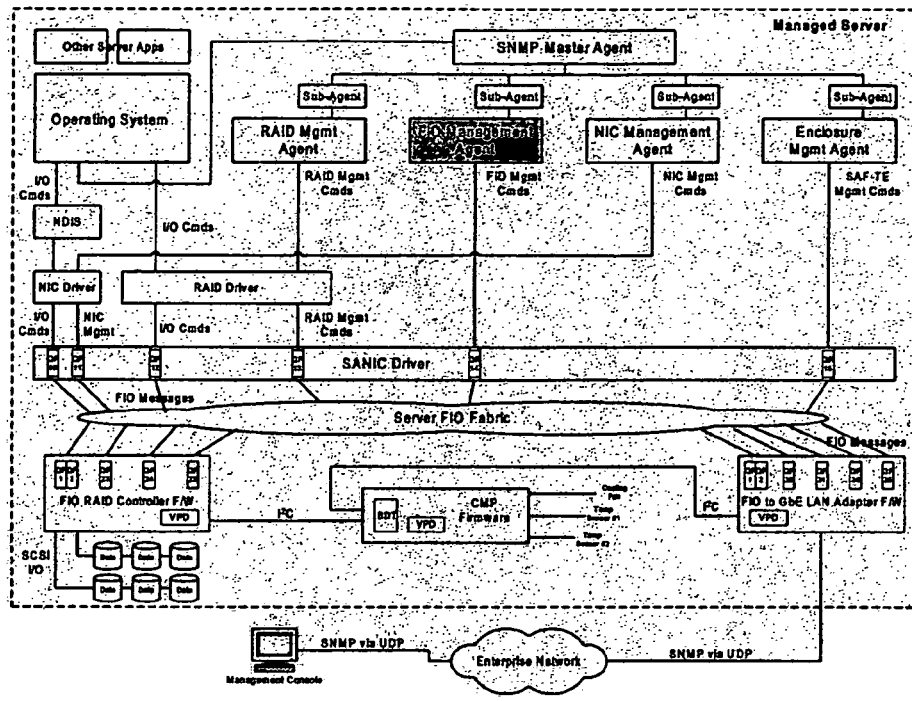
FIG. 56 A block diagram of a managed server.
Figure 59:
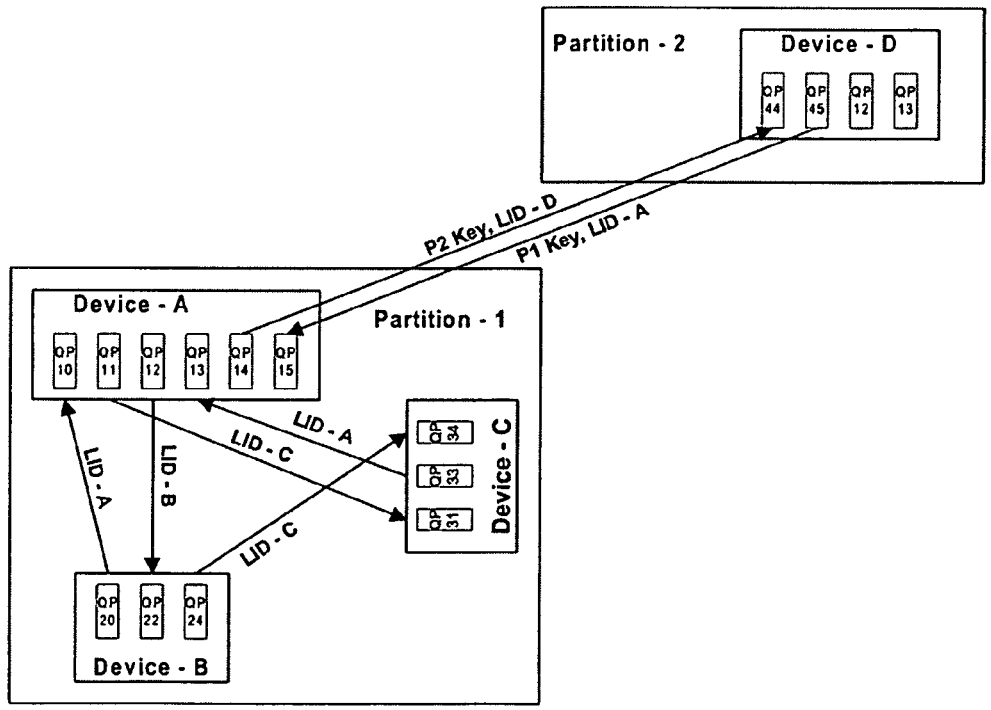
FIG. 59 Diagram of communication flow between Partition-1 and Partition-2.
Figure 57:
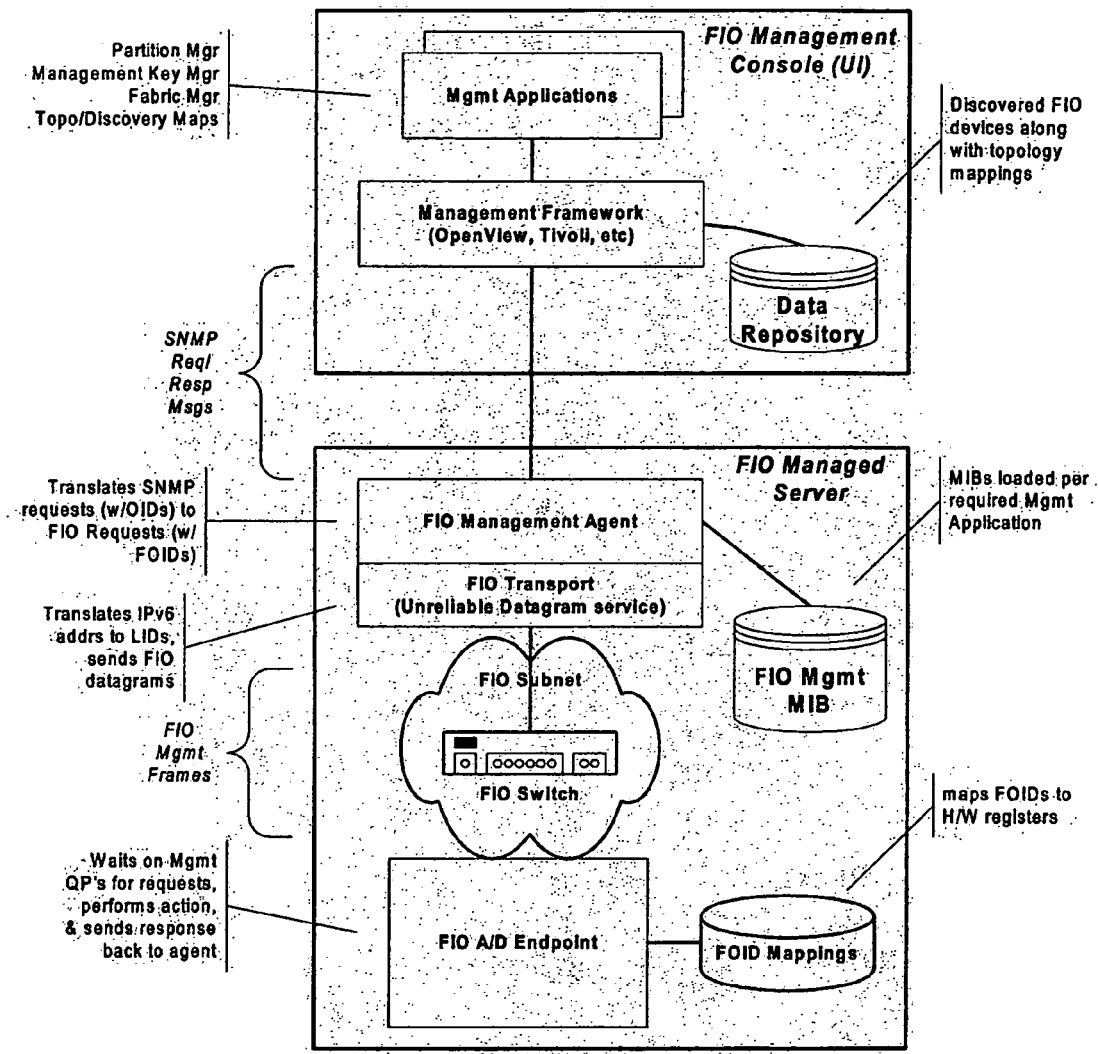
FIG. 57 Block diagram of a FIO management console and FIO management server.
Figure 58:
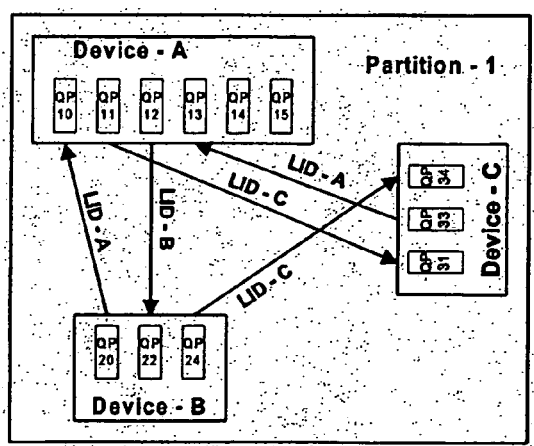
FIG. 58 Block diagram of Parition-1.

Future I/O, has an architectural successor to PCI and PCI-X, continues to enable the concept of single board computers where the processor, memory, and I/O subsystems are all packaged within a physical chassis. This structure has been typified by many current systems including desktop personal computers, desktop and deskside workstations, and many offerings of server class systems. For the case of the I/O, these systems typically offer attachments through two basic forms: "natively" implemented subsystems with media interfaces (Ethernet, SCSI, etc.) exposed directly; or through and "plug-gable" entity based on a standard electrical interface. Examples of the latter form are ISA, ESIA, Micro-Channel, PCI, PCI-X, Personal Computer ("PC") Card, CompactPCI, and VME. In the case of the "pluggable entity" offerings, systems typically offer some number of "slots" to allow for expansion or featurization based on the cost and/or performance optimization desired. The number and type of "slots" will be vendor and system specific. Additionally, when a new standard is introduced, systems will typically offer support of the currently prevailing standard interfaces. To the extent that these standards are compatible (bus structure, timings, connector means, etc.) will dictate how system vendors offer transitions between the standards. FIG. 13 depicts a typical structure for single board, Future I/O systems. Two of electrical topologies that are supported are shown:
1) Both ends of the link are implemented on the same electronic board. The example shown is from the SANIC to the Switch.

2) One end on a PCB "motherboard" with the other end in "slot". The example shown is from the switch to the adapter board through a connector.

For the case that systems want to implement pluggable switch elements that interface to pluggable adapter boards, a board-to-board topology must be supported. This is depicted in FIG. 14. For the case that systems want to support I/O expansion or inter-system attachment remote to the source computing node (or platform), a chassis-to-chassis topology must be supported. This is depicted in FIG. 15 and FIG. 16. Both copper and optical media are supported.

Quality of Service

Tables 9–11 illustrate certain concepts surrounding quality of service with respect to an FIO implementation. This description shall now discuss the Future I/O architectural components upon which a Quality of Service ("QoS") solution may be developed. The discussion is structured generally as follows:

QoS overview
Future I/O QoS QP and VL Impacts
Future I/O Switch and Router Architecture QoS Impacts Future I/O does not specify how middleware determines QoS requirements nor how upper layer protocols communicate their requirements to endnodes and routing elements.

Due to the variety of terminology and concepts surrounding QoS, this description will first describe the base terms and concepts used by Future I/O QoS. More particularly, the following terms shall be discussed:

service rate types
QoS and fabric congestion
trasnport-level Qos
fabric level QoS
FIO Qos and Ipv6 interaction
middleware interaction
virtual lanes
QP and VL base requirements
prriority arbitration policy for VLs Service rate types determine the efficiency with which service level objectives ("SLOs") are met. Applications and I/O drivers/devices require predictable performance to meet their service level objectives, e.g., an application may require N-Units/s of bandwidth with an average end-to-end latency of M u-seconds to provide a user with an acceptable service rate. SLOs are commonly defined as a function of the end-to-end latency, bandwidth, jitter (i.e., data delivery rate variance), and data loss within a fabric. For this discussion, we will consider three end-to-end service rate types:

Best effort service is essentially a no-guarantee service rate. The application is not provided any guarantees with respect to latency, bandwidth, jitter, or data loss. In general, an application using the best-effort service must be designed to deal with what may amount to be an unpredictable operating environment depending upon the QP and VL scheduling heuristics for best effort service.

Differentiated service may be viewed as a form of traffic shaping where the FIO SANIC and the fabric control the QP frame injection and VL service rates. Differentiated services involves signalling how to treat a given QP or frame either explicitly (e.g., setting the priority field within the frame route header control field) or implicitly (e.g., a fabric manager setting global VL service rates within the fabric routing elements).

Guaranteed service rates are essentially based on a upper layer protocol quota system which reserves fabric resources using schemes such as. RSVP. Future I/O does not expose fabric resources within a given subnet to applications and thus does not support guaranteed service rates. However, this does not mean that applications cannot create guaranteed service rates on their level, e.g., an adapter which is pro-viding I/O sharing services, may limit the number of message work descriptors it will allow a given endnode which creates an upper limit bound on the number of transactions which may be in-flight at any given time.

From the above, the reader should discern that QoS, from a FIO perspective, is primarily focused on man-aging the scheduling policies of the fabric components, i.e., SANICs, switches, and routers, and signalling service rate requirements via the setting QP attributes and translating these attributes into fabric level at-tributes, e.g., route header control priority levels.

Fabric congestion causes data to be dropped, e.g., if a router implements a random early detection ("RES") policy which allows data to be dropped when congestion occurs), reduced bandwidth throughput, in-creased end-to-end latency and jitter, i.e., heavy congestion translates into poor application QoS. Future I/O provides two techniques to deal with congestion. The first technique is the use of a link level (point-to-point) credit scheme which insures that a flit may not be injected down a link unless the receiver has sufficient resources to receive it. The second technique is the use of Virtual Lanes (VLs) which multiplexes multiple logical data streams onto a single physical link. By providing per VL credits and buffer resources, Future I/O increases fabric utilization in the face of congestion by allowing a data stream on a non-block VL, i.e., a VL with available credits, to route data while a blocked VL is delayed awaiting additional credits.

Future I/O separates transport-level QoS from fabric-level QoS since they are managed independently of each other. Transport-level QoS is primarily focused on the QP scheduling algorithm within a SANIC-scheduling algorithms are not specified by Future I/O and thus will vary from SANIC-to-SANIC and from end device-to-end device. For example, an adapter with limited sharing capabilities may decide to implement a simple round-robin QP scheduling algorithm, i.e., the adapter injects schedules a frame on each QP which can transmit data. On the other hand, a SANIC within a host may implement a multi-level QP ser-vicing algorithm with transaction hints for dynamic frame injection control. What Future I/O does provide is:

An application or management application using a SANIC library implementation of the Future I/O verbs may explicitly or indirectly set a QP's differentiated service level via the FioSetQP verb. This verb sets. an opaque service level value which the SANIC may act upon to adjust the QP's scheduling priority.

The ability to signal to the destination or intermediate routing elements on a per message basis, the relative priority of this message. For ex-ample, IPv6 defines 8-bits to indicate the relative priority of the message being sent. Intermediate routing elements may decode these bits to determine how to treat the message relative to other traffic within the fabric. Note: These 8-bits are not used within the Future I/O subnet; Future I/O assigns QPs to VLs as part of the fabric-level QoS solution.

Note: Applications which rely upon channel semantics must post receive buffers to avoid creating re-ceiver-not-ready conditions for a given connection or reliable datagram which can impact the application's ability to reach its SLOs. This issue is beyond the scope of Future I/O but the problem remains one that needs to be solved if the application is to be successful.

Fabric-level QoS is primarily focused on:

Preventing application deadlock due to fabric back pressure. If an application is executing on a fabric which contains physical loops, e.g., a meshed switch configuration, and its requests and responses were sent on the same VL, there exists a possibility that the application will dead-lock. To prevent this, all QPs are required to issue requests on one VL and receive responses on a different VL operating. For example, if a connection exists between two nodes A and B, the QP on node A might be transparently assigned to send its requests on VL 4 and receive responses on VL 5.

VL scheduling heuristics are used to provide best effort and differentiated services. For example, one might implement a simple round robin scheme whereby each link injects one flit (assuming available credits exist) per VL within a given scheduling group. This would allow all VLs within a given group to make forward progress. Future I/O provides both default and adjustable VL scheduling heuristic capability.

Policy based routing is the assignment of data streams to different ports and routes within the fabric based on requirements derived from a middleware application or on default heuristics provided by Future I/O.

Future I/O leverages IP concepts and technology where applicable. The following is a brief review of pos-sible points of interaction—this section requires additional thought on how one might best leverage IP's technology.

Future I/O does not use the IPv6 Flow Identifiers for Future I/O traffic. Flow identifiers are used to communicate a level of QoS at the application level which is not required by applications using Future I/O transports.

If the application is not using Future I/O transports, it may use the IPv6 Flow Identifiers to identify a given flow's resources and priority at the edge of the Future I/O subnet, i.e., within a Future I/O router.

The Future I/O verbs may be used to set service level attributes which might be based upon the IPv6 Traffic Class field (this field is reflected within the Future I/O header control field in both the local and global route headers). The current IPv6 RFC does not specify a policy for these rules and is awaiting results from research and experimentation. The following is an excerpt from the RFC 2460 Internet Protocol, Version 6:

The service interface to the IPv6 service within a node must provide a means for an upper-layer protocol to supply the value of the Traffic Class bits in packets originated by that upper-layer protocol. The default value must be zero for all 8 bits.

Nodes that support a specific (experimental or eventual standard) use of some or all of the Traffic Class bits are permitted to change the value of those bits in packets that they originate, forward, or receive, as required for that specific use. Nodes should ignore and leave unchanged any bits of the Traffic Class field for which they do not support a spe-cific use.

An upper-layer protocol must not assume that the value of the Traffic Class bits in a received packet are the same as the value sent by the packet's source."

Future I/O QoS provides a set of management messages which may be used by a middleware or OS pro-vider to configure SANIC and routing element QoS heuristics which are different than the defaults. Future I/O does not specify the algorithms used to determine these heuristics for a given application work load, fabric topology, etc.

Virtual Lanes (VLs) are a link layer construct provide the following high-level services:

Multiplex multiple logical lanes of traffic onto a single physical lane. Lanes may be assigned the same or different service rates.

Provide differentiated services on a flit boundary. For a 1× fabric, VL arbitration may occur every 0.5 u-seconds; on a 4× fabric, VL arbitration may occur every 0.125 u-seconds.

Prevent fabric deadlock due to endpoint resource shortages by segregating request traffic onto one VL and response traffic on another. Deadlock may occur under the following conditions: Since an Ack must be generated for every request, and the endpoint cannot only holds a finite number of requests (perhaps only one), incoming requests must be back-pressured until the outgoing Ack can be sent. If the ack was queued behind an incoming request to the far end in the same condition in the fabric, and the Ack could not pass the request, the result would be a deadlock. In general, request VLs are used for Sends and RDMA Read or Write requests while reply VLs are used for Send and RDMA Write ACKs and RDMA Read responses (ACK/Data)

VLs may also be used to determine traffic flow within the fabric, i.e. a VL may be used as one input to determine the output port and path a frame will take within the fabric—this is sometimes referred to as a "color" VL. A later section will discuss one possible implementation using such a scheme.

Increase fabric utilization in the face of head-of-line blocking

Implementations may provide per VL dedicated resources to avoid back pressure associated with a shared resource implementation.

If multiple paths exist between end stations, fabric utilization may be increased by routing different VL traffic on separate paths, e.g., clockwise and counter-clockwise.

General QP and VL base characteristics include:

From an architectural perspective, VLs are completely independent re-sources with dedicated logical resources. Future I/O does not preclude an endnode from sharing resources among the VLs it supports as long as there is at least sufficient buffer to support one entire full-sized flit per VL supported per input port.

If a routing element supports multiple speed links, i.e. 1×, 2×, or 4× in any combination, each port shall support output port buffering suffi-cient to contain a full-sized (minus one full-size flit) frame to prevent fabric congestion due to speed differences when a fast link feeds a frame to a slower one—the fast link shall congest until the slow link has consumed the entire frame.

A link failure (excessive backpressure, open link, hardware failure etc.) shall cause any flits or frames des-tined for that link to be dropped.

VLs are not visible to applications and hence QPs are not aware of the VL they are assigned to.

A QP may be assigned to a VL as a result of a FioSetQP verb operation or transparently by the SANIC driver subsequent to QP creation.

A QP is assigned one VL for request operations and one VL for re-sponse operations—this prevents a fabric deadlock which could occur if requests and responses contended for the same resources.

A QP may be dynamically reassigned to a different VL based on changes in fabric topology, fabric state (e.g., intermediate component fail-over), or application work load priority within the endnode or the fabric.

SANICs, switches, and routers shall implement support for all VLs corresponding to the Future I/O version(s) they support.

An I/O device shall, at a minimum, implement support for VL 15 (fabric management usage) and VLs 0 and 1 (application usage).

For Future I/O version 1.0, VLs 0–7 and 15 are valid. VLs 8–14 are reserved and should not be used by any implementation. Use of a version 1.0 reserved VL will generate a hard link error. Note: Subsequent Future I/O specification versions will maintain complete backward compatibility with version 1.0 VL manage-ment messages and service capabilities. VL 0–7 are used for application and general fabric management data transfer. VLs may be individually or as a group assigned a given service rate. For example, one might create two fabric service rates with VLs 0–3 in one group (best effort) and VLs 4–7 (differentiated services) in the other. The service rates and al-gorithms for each group may be adjusted independently. Continuing with this example, the VL 0–3 group executes using a best effort QoS policy. Thus, the service rate heuristic might be to use a simple round-robin technique whereby one flit (if present and sufficient credits exist) on each VL is sent before returning to the initial service VL (this too may be varied by tracking which VL was serviced last within this group and starting with the next VL in this service group). Note: If a differentiated service flit were to arrive, the differentiated service group would be placed in the scheduling queue immediate service upon the current flit completing its transmission on the link. Now, the VL 4–7 group may have a different policy for servicing individual VLs. For example, it may choose to always start with VL 7 when flits are available and then round robin or perform a weighted service algorithm, e.g., N flits on VL 7, N-2 on VL6, etc. For VL 15: 1) Reserved for fabric management operations involved in route table and fabric deadlock. 2) VL 15 operates in a store-and-forward which allows it to proceed in the face of fabric deadlock independent of the routing table contents. 3) VL 15 is not used for normal management messages which may be sent on any of the other available VLs. 4) VL 15 operates as the highest priority VL for scheduling purposes, i.e., regardless of the existing VL scheduling heuristics, if a management message needs to be sent on VL 15, the message will be immediately scheduled once the currently transmitting flit has finished. 5) To prevent denial-of-service attacks via consuming VL 15 bandwidth, only trusted code may issue the associated management messages which execute on VL 15.

Basic characteristics for priority arbitration include:

VLs which have the same service priority, are scheduled using a round-robin arbitration policy.

VLs are scheduled on a per frame basis—frames may not be interleaved within a given VL.

When backpressure occurs on a given VL, the scheduling policy shall be to schedule VL at the same service priority if available ahead of VLs with a lower service priority.

If a given VL is idle, other VLs will be scheduled according to their service priority to use the link.

For switches, the VL "transmit objects" are arbitrated at flit boundaries (unless modified by the Complete_frame control bit). At source endnodes, the VL "transmit objects" are arbitrated at frame boundaries. Complete_frame control bits causes the current frame to be completed before VL arbitration is allowed. This only occurs if incoming flits for the frame are adjacent; if flits in a frame are separated by flits at another VL or by other flit types, then the normal arbitration takes place. This control only applies to switches. This control improves the overall network utilization at the expense of less deterministic VL bandwidth allocation.

To allow guaranteed forward progress at all priority levels, some transmit objects are (by default) allocated to the lower levels at each priority level. This is implemented with an object counter to give the most predictable bandwidth allocation. This is configurable.

Arbitration cycles occur when the object counter expires for arbitrating to another service priority level. When a VL at a given priority level is granted the right to transmit, a transmit object counter is preset to Xmit_On, which is configurable. This counter counts out this number while sending objects. When the counter expires, the VL logic begins counting other objects that go by against Xmit_Off. When this counter expires, if there are more objects to transmit at this VL, the VL logic asserts its request to transmit until the Xmit_On counter expires again. If the objects cannot be transmitted or there are no objects to transmit before the Xmit_On counter expires, the VL request is dropped and the Xmit_Off counter is started. If no VL requests are asserted, each Xmit_Off counter is accelerated at the same rate until VL requests are as-serted or the counters expire.

Implementation note: The "acceleration" of the counters may be done in any fashion; one way might be to increment the counters each clock. If the arbitration is pipelined sufficiently ahead of the actual use, this will probably hide the delay. If not, then idles may end up being inserted unnecessarily.

The requests to transmit from the various VLs are prioritized with VL 7 the highest, and the appropriate VL is granted the request. This prioritization is invoked whenever there are more than one VL ready to transmit at one time. The table below shows the arbitration states for each VL and what causes these states to change:

| ST | Conditions | Description | Exits |
|---|---|---|---|
| 0 | Xmit_request * VL_request * VL_Grant * On | Xmit_On counter running If no more objects, but another VL has a request, goto st3 | If no more objects, but NO other VL has a request, goto st4 When counter expires, goto st2 |
| 1 | Xmit_request * VL_request * !VL_Grant | Waiting for VL grant, no counter running | When VL_Grant occurs, goto st0 |
| 2 | Xmit_request * !VL_request * !VL_Grant * Off | Xmit_Off counter running and objects to transmit | When counter expires, goto st1 |

-continued

| ST | Conditions | Description | Exits |
|---|---|---|---|
| 3 | !Xmit_request * !VL_request * !VL_Grant * Off * Any_VL_request | Xmit_Off counter running and no more objects to transmit at this VL, but other VLs transmitting | If an object becomes ready, goto st2; If no other VL has a request, goto st4; when counter expires, goto st5 |
| 4 | !Xmit_request * !VL_request * !VL_Grant * Off * !Any_VL_request | No VLs requesting, lets accelerate the Xmit_Off counters in case that's what is holding us off | If an object becomes ready, goto st2; If an other VL has a request, goto st3; when counter expires, goto st5 |
| 5 | !Xmit_request * !VL_request * !VL_Grant | No counters running, nothing to do | If an object becomes ready, goto st1. |

Appropriate setting of the VL control registers allows a wide range of choices in arbitration policy. Possible choices are "Strict priority" with VL 6,7 the highest, "Round robin" among VLs, and various band-width allocations to different VLs (which of course only applies when all VLs are contending). "Strict priority" with VL 0,1 the highest is not possible, but can be approached by setting long off times for VL 6,7 and high on times for the VL 0, 1 etc.

Arbitration among the VL0–VL7 data queues has 8 registers, and four control bits to control it. The Xmit_On registers can have values from 0 to 31, where 0 has the meaning "infinite" or stay on the VL until no more transmit objects can be transmitted, or a higher priority VL wins the arbitration. Xmit_Off registers can have values from 1 to 32 where 32 is coded as zero. Table 10 lists some example settings and their bandwidth allocations.

TABLE 10

Example Arbitration control register settings

| VL Use | Absolute Priority | Round Robin | Mostly High pri. | | Matching Red/Blue | | Mostly Best Effort | |
|---|---|---|---|---|---|---|---|---|
| 6,7 Xmit_On[6] | 0 | 25% | 1 | ~53% | 1 | ~10% | 1 | ~5% | 1 |
| Xmit_Off[6] | 1 | | 3 | | 1 | | 9 | | 19 |
| 4,5 Xmit_On[4] | 0 | 25% | 1 | ~27% | 1 | ~10% | 1 | ~5% | 1 |
| Xmit_Off[4] | 1 | | 3 | | 3 | | 9 | | 19 |
| 2,3 Xmit_On[2] | 0 | 25% | 1 | ~13% | 1 | ~40% | 2 | ~10% | 1 |
| Xmit_Off[2] | 1 | | 3 | | 7 | | 3 | | 9 |
| 0,1 Xmit_On[0] | 0 | 25% | 1 | ~7% | 1 | ~40% | 2 | ~80% | 4 |
| Xmit_Off[0] | 1 | | 3 | | 15 | | 3 | | 1 |

The register layout for these values is shown below in Table 11:

TABLE 11

VL Arbitration control registers

| offset | 15 | 14,13 | 12-8 | 7-5 | 4-0 |
|---|---|---|---|---|---|
| 0 | Complete_Frame[0,1] (1 bit) | Reserved (2 bits) | Xmit_On[0,1] (5 bits) | Reserved (3 bits) | Xmit_Off[0,1] (5 bits) |
| 2 | Complete_Frame[2,3] (1 bit) | Reserved (2 bits) | Xmit_On[2,3] (5 bits) | Reserved (3 bits) | Xmit_Off[2,3] (5 bits) |
| 4 | Complete_Frame[4,5] (1 bit) | Reserved (2 bits) | Xmit_On[4,5] (5 bits) | Reserved (3 bits) | Xmit_Off[4,5] (5 bits) |
| 6 | Complete_Frame[6,7] (1 bit) | Reserved (2 bits) | Xmit_On[6,7] (5 bits) | Reserved (3 bits) | Xmit_Off[6,7] (5 bits). |

Implementation note: The Xmit_On and Xmit_Off registers are described as if they operate on both the re-quest and Ack VLs equally; that is the object level requests for the pair of VLs is ORed into a single request for the purposes of the bandwidth arbitration. When the request is granted the Ack VL is expected to be serviced at the higher priority, sharing the bandwidth with the request VL. If this is not considered accept-able, due to the concern for Ack VLs hogging the bandwidth, then the implementation may use counters for each VL independently and initialize the Xmit_Off values to twice the programmed value.

Programming of the Xmit_On and Xmit_Off registers should use the following formula for best results:

$$1/(Xmit\_Off[0]/Xmit\_On[0]+1)+1/(Xmit\_Off[2]/Xmit\_On[2]+1)+1/(Xmit\_Off[2]/Xmit\_On[2]+1)+1/(Xmit\_Off[0]/Xmit\_On[0]+1)=1$$

If the sum of terms is much greater than one, then the priority of the higher order VLs will be satisfied first, at potential starvation to low order VLs. If the sum is much less than one, then the logic may insert unnecessary idle flits (depending on the effectiveness of the "acceleration" mechanism described above).

In general it is best to use the smallest values of the Xmit_On and Xmit_Off that will satisfy the application needs. For example, use of 2, 2 instead of 1, 1 at a VL will both achieve about 50% bandwidth allocation, but the 2, 2 values will create longer arbitration intervals. The programming of the arbitration control registers is expected to be done to the same values fabric wide; use of different settings in different components will generally reduce performance and QOS guarantees.

Layered Error Management

This section will describe portions of the Future I/O layered error management architecture, or error handling methods. Before delving into the details we will describe the philosophy, and terms, behind the Future I/O Layered Error Management Architecture. Future I/O relies on several error detection mechanisms to determine if a fault exists within a Future I/O fabric component. The error detection mechanisms are performed at each interface layer of the Future I/O Archi-tecture: Verb, Message, Frame, Flit, and Electrical. Once an error has been detected the Future I/O LEMA uses several mechanisms to contain and recover from the error. Finally, the Future I/O LEMA uses several mechanisms to remove the faulty component and replace it. The following section will provide an over-view of Future I/O's Layered Error Management Architecture. The remainder of this chapter will describe the details of Future I/O's LEMA.

Following is a description of the philosophy behind the Future I/O LEMA, as well as the terms used by the Future I/O LEMA. Some of the terms were derived from: Fault Tolerance, Principles and Practice; T. Anderson and P. A. Lee; 1981; Copyright Prentice Hall International, Inc. More particularly:

Work Unit—An operation considered to be atomic by each interface layer. Atomic means: the operation either completes or doesn't complete; and during the execution of the operation, it does not interact with any other operations in process at the same layer or at higher layers. The future I/O work units are: Verbs, Messages, Frames, Flits, and Electrical timings.

Fault—A hardware or software defect in a component. In most architectures a fault may remain undetected until the function affected is used. When the function containing the fault is used an error surfaces. Future I/O will use this process, but will also perform periodic analysis to determine if faults are present in a given function. Faults can be transient, intermittent, or permanent. A transient fault is present in the system for a short period of time, after which it disappears. If the transient fault recurs periodically it is an intermittent fault. If the fault has a long duration it is considered a permanent fault. The error recovery methods used for each type of fault vary considerably (see below and section 7.0.4.4 Flit ERP on page 199).

Error—The manifestation of a fault in a system, in which the logical state of the system deviates from the intended state. A system state transition can be valid or erroneous. An erroneous state transition can lead to a failure by subsequent valid or erroneous internal state transitions. Errors can surface at each layers of the Future I/O architecture and can be characterized by their duration:

Temporary Error—A temporary error is surfaced when a (transient) fault is present within a Future I/O component for a short period of time, after which it spontaneously disappears from the component.

Excessive Temporary Errors—An excessive temporary errors condition (a.k.a. intermittent error) occurs when the number of temporary errors exceeds the maximum number expected over a given time period. An "Excessive Temporary Errors" condition can result from an intermittent transient fault within a Future I/O component which resurfaces periodically as a temporary error. If the time period of the intermittent transient fault is too small, it is considered a permanent error.

Permanent Errors—A permanent error is surfaced when a permanent fault is present within a Future I/O component. Where permanent either means continuous and irreversible, or periodic but with a higher frequency than the temporal recovery frequency.

Error Detection—The ability of a component to recognize that an error has occurred.

Error Containment—Errors are caused by faults, which could spread throughout the fabric and system if they are not contained. Error containment consists of mechanisms used to constrain the flow of information in order to confine faults to the work unit(s) that surfaced the error.

Error Recovery—The ability of detecting a contained error and transforming the state of the affected components from an erroneous state into a well defined and error-free state from which normal operations can resume.

Fault Treatment—The mechanisms used by the system to isolate and replace the component(s) which surfaced the error condition(s) as a result of a specific fault.

Component Replacement—The mechanisms used to place a fully operational component in the location previously held by a faulty component.

Component Reconfiguration—The mechanisms used to activate a fully operational component which has replaced a previous faulty component.

Failure—A system's inability to its designed function because of error(s) in the system or its environment, which in turn are caused by various faults.

Future I/O supports the following error detection, containment, and recovery mechanisms:

Error Detection—Future I/O uses four error detection approaches:

Interface checks—An interface check is used to determine the legitimacy of a requested unit of work. This may include determining if the operands are valid and compatible with the requested operation. An example of an interface check is determining whether the remote key associated with a RDMA request is valid for the address referenced. Future I/O will use interface checks at the verb, frame, and flit layer.

Coding checks—A coding (e.g. error detection coding) check relies on adding a small amount of redundancy to the data being checked in order to hold an error detection code. Within a work unit (e.g. frame, flit), a small amount of redundant data, representing the value of the work unit, is maintained at a fixed relationship (e.g. end of work unit) with the non-redundant data. A coding check will be detected if either form of data is corrupted. As an example, the sender of a flit will create an error code for the flit and send the error code as part of the flit. The flit's receiver recalculates the error code as the flit is being received and compares the result with the error code contained in the flit. If the codes are equal, the data is valid, otherwise the data is erroneous. Future I/O will use error detection coding at the frame and flit level.

Timing checks—A timing check (a.k.a. time-out) is used to determine if an work unit has completed within the maximum time specified in this document. As an example, the sender of a flit will start a timer for each flit placed on the wire. If the flit's acknowledgement is not received within the maximum flit transfer time, then the timer will post an exception condition at the sender. The sender will use the exception condition to initiate the flit recovery process (see below and section 7.0.4.4 Flit ERP on page 199).

Diagnostic checks—The above forms of error detection are used in conjunction with operational work units. Diagnostic checks are used in conjunction with management test work units. A diagnostic check consists of issuing a management test work unit to a component and comparing the actual results with the results expected if the component was behaving according to specifications. For example, a training sequence used by the electrical layer to synchronize the deskew logic of it's receivers is a form of diagnostic checking. If the training sequence is successful, then the link's electrical behavior is considered valid, otherwise it is erroneous and an exception condition is posted at the initiator of the training sequence.

Error Containment—The Future I/O error containment architecture can be characterized by the techniques used to contain errors to: a work unit and a fabric component/segment.

Work Unit Level Error Containment—At each interface level Future I/O uses interface, coding, and timing checks to contain errors to an atomic work unit. By passing these checks a work unit is guaranteed to not be contaminated. However, if a work unit fails any of these tests, it is considered contaminated and the work unit's recovery process is invoked.

Fabric Component Level Error Containment—In addition to containing errors at the work unit level, Future I/O must also contain errors to a fabric component. Future I/O uses coding and interface checks to contain errors from propogating across fabric components. The severity of some permanent errors requires additional error containment functions to be supported in order to prevent the faulty component from degrading the Future I/O SAN's performance or RAS (Reliability, Availability, and Serviceability).

Error Recovery—In general the Future I/O error recovery process relies on: temporal recovery of temporay errors detected through coding and interface checks; and redundant alternate path recovery of permanent errors detected through coding, timing or interface checks. However, recovery of some unexpected interface checks (e.g. invalid remote key during a remote DMA operation) is left to O/S services to perform. Future I/O error recovery procedures can be segmented by the type of error detected:

Temporary Error—Most temporary errors surface during a coding or timing check. Temporary errors are recoverable at the layer that performed the check. The error recovery philosophy for temporary errors is temporal redundancy at the layer that performed the check. The layer performing the check will retry the work unit up to the maximum retry limit for that layer. As an example, a transient fault can result from an electro-static discharge. This transient fault may surface as a temporary error, more specifically it may reverse a bit(s) of a flit that is active on a Future I/O fabric. If this occurs, the flit receiver will stop accepting flits until a resynchronization sequence is invoked by the sender. The sender will eventually time out and will initiate a resynchronization sequence. Once the resynchronization sequence has been completed, the sender will being transmitting flits starting with the next expected (last unacknowledged) flit. If the fault is indeed a transient, the retransmission will be successful.

Excessive Temporary Errors—As stated earlier, the recovery procedure for an "Excessive Temporary Error" condition depends on the frequency of the intermittent error as compared to the recovery time. If the time period of the intermittent transient fault is too small, it is considered a permanent error. If the time period of the intermittent transient fault is greater than the time required to recover from the fault, then the error recovery procedure is as follows. First a set of temporary error counters is maintained for each port at each stage in the Future I/O fabric. The temporary error counters keep track of the number of temporary errors that have surfaced on the fabric within a specified time window. If a temporary error counter reaches its maximum value, then the following error recovery procedure is followed:

The temporary error counter will be reset (implies management entity knows the value of maximum 1).

The temporary error that caused the maximum value to be reached will be retried.

An exception condition will be posted to the management focal point.

At this point, the management focal point can choose to either:

Immediately invoke the fault treatment methods for the temporary error.

Surface an "fault treatment required" type of error message to the system management services asking to invoke delayed fault treatment.

Permanent Errors—Permanent errors surface during an interface, coding, timing, or diagnostic check. Permanent errors are not recoverable at the layer that performed the check. The error recovery philosophy for permanent errors is component redundancy, where the main components are: SANICs, switches, SPEs, connectors, cables, and optics. Interface checks will result in permanent errors and will be surfaced to the next higher layer (i.e. the layer above the one that detected the interface check). All coding and timing checks will be assumed to have surfaced as a result of temporary or intermittent errors. Hence, the layer that detected the error coding and timing check will retry the work unit, even if the error was the result of a permanent fault. Once the retry limit has been reached, the error will be classified as permanent. When an error is classified as permanent an exception condition will be posted to the next higher layer (i.e. the layer above the layer that discovered the permanent error condition). The treatment of the exception condition will depend on: the amount of redundancy used in the specific configuration, and which component experienced the permanent error.

Fault Treatment—Future I/O will use a four step process to treat a faulty component:

Fault Isolation—The mechanisms used to locate a specific fault within the Future I/O fabric. A specific error detected within a given Future I/O fabric layer can be the result of several distinct faults in several different components. For example, a flit level LCRC check can be the result of a: poor cable connection, a damaged cable, a damaged connector, a faulty receiver within a Future I/O component (i.e. SANIC, SPE, or switch port), a faulty sender within a Future I/O component, a dead or poorly operating fan, etc.

Component Removal—The mechanisms used to remove a faulty component from the Future I/O fabric.

There are three cases for removing a faulty component in the Future I/O fabric:

a) The component is completely dead and all its ports are dead. In this case the component can be removed without any consideration for removal philosophy.

b) The component is partially dead and one or more of its ports are fully operational. In this case, the removal philosophy will determine what mechanisms will be needed before the component can be "safely" removed.

c) The component is "fully" operational. A "fully" operational component may need to be removed because one (or more) of its resources has (have) reached an intermittent error detection threshold. Similar to (b), the removal philosophy will determine what mechanisms will be needed before the component can be "safely" removed.

There are three removal philosophies which may be employed by the Future I/O Consumer process:

a) Quiesce (i.e., allow work units to complete normally, which requires support to cease consumption of further work units and to indicate all outstanding work units have indeed completed) outstanding operations to resources shared with the faulty component, then remove component.

b) Abort (i.e., end a work unit abnormally. Requires support for an abort work unit, which forces all outstanding work units to be, well, aborted) outstanding operations to resources shared with the faulty component thereby invoking reconfiguration around faulty component, then remove component.

c) Remove faulty component thereby causing an error detection check for all outstanding operations to resources shared with the faulty component which then results in reconfiguration around the faulty component. Multiple components may be packaged together, in which case component removal must take into consideration the other components contained in the same package. Must also deal with component replacement of: a redundant component and a non-redundant component.

All three of these mechanisms are believed to be needed to support all different O/S, plat-form, and I/O types. For instance, a high end configuration may have full redundancy of all fabric components and it's O/S may support an abort operation, so it may choose the second approach. A low-end configuration may have partial redundancy and would require quiesce if the fault is in a resource that is redundant, but is part of a component which has non-re-dundant resources as well.

Similar to component removal there are three cases for activating a replaced, fully operational component in the Future I/O fabric:

a) Operator initiated activation and association of component ports b) Dynamic activation of component ports relying on operator association c) Unmediated activation and association of component ports.

All three of these options are believed to be needed to support all the different O/S, platform, and I/O types.

As described above Future I/O employs a layered error management architecture. Faults can occur at each layer in the Future I/O architecture. This chapter summarizes the:

Errors surfaced at each layer of the Future I/O fabric.

Error recovery procedures performed at each layer of the Future I/O fabric.

Fault isolation architecture.

The following sections summarize the errors detected at each layer of the Future I/O architecture. The current contents are not complete.

| Interface Layer | Type of Check | Check | Description of error check |
|---|---|---|---|
| Verb Immediate | Interface | Communication down | Communication service is not operational. |
| | Interface | Error resource | Error occurred due to insufficient resources. |
| | Interface | Invalid MTU | MTU attribute for a QP was invalid or not supported. |
| | Interface | Invalid parameter | One or more of the input parameters was invalid. |
| | Interface | Invalid RDMA read | A memory or QP attribute requested RDMA read support, but the SANIC provider doesn't support it. |
| | Interface | Invalid service type | Service type attribute for a QP was invalid or not supported. |
| | Interface | No open communication done | No previous open communication request has completed. |
| | Interface | No WQE done | No WQE was ready to be dequeued. |
| | Interface | Not done | No WQEs are maked completed on the specified queue. |
| | Interface | Out of (remote) keys | Abnormal condition indicating the SANIC has ran out of Remote Keys. |
| | Interface | Rejected invalid service ID | Communication service was rejected by the remote node due to an invalid service ID. |
| | Interface | Rejected QP attributes | Communication service was rejected by the remote node due to invalid QP attributes. |
| | Interface | Rejected resources | Communication service was rejected by the remote node due to lack of SANIC resources. |
| | Timing Interface | Timeout | The verb timed out. |
| Verb A-synchronous | Interface | Communication lost | |
| | Interface | QP overrun | |
| | Interface | Receive queue empty | |
| | Interface | Local protection error | |
| | Interface | Remote protection error | |
| | Interface | Transport error | |
| | Interface | Flit error | |
| | Interface | SANIC error. | |
| | Interface | Communication lost | |
| | Interface | QP overrun | |
| | Interface | Receive queue empty | |
| | Interface | Local protection error | |
| | Interface | Remote protection error | |
| | Interface | Transport error | |
| | Interface | Flit error | |
| | Interface | SANIC error | |

-continued

| Interface Layer | Type of Check | Check | Description of error check |
|---|---|---|---|
| Frame | Interface | Invalid QP | Frame referenced an invalid (or closed) QP (local or remote). |
| | Interface | Remote Key was invalid | Remote key was invalid for the memory region referenced. |
| | Interface | Sequence lost | Receiver (or sender) received a frame (or Ack) with a frame sequence count that is outside of the sequence window for outstanding frames. |
| | Interface | Invalid frame key | Frame key was invalid |
| | Interface | Transaction sequence lost | Receiver (or sender) received a frame (or Ack) with a transaction sequence count that is outside of the sequence window for outstanding frames. |
| | Timing | Timeout | The frame timed out at the receiver. |
| | Timing | Resource not ready | Receiver did not have resources (e.g. WQE) available to receive the frame. |
| Flit | Coding | One coding check to cover: | Link segment CRC check occurred. |
| | Coding | - Link CRC - End-end CRC | End to End CRC check occurred. |
| | Coding | - Wire coding check | Wire coding (e.g. invalid 8b/10b code) check occurred. |
| | Coding | Excessive temporary errors | An excessive number of coding and timeout checks occurred. |
| | Interface | One interface check to cover: - No buffer available - Invalid VL - Sequence lost | Sender attempted to send a flit, but receiver did not have a buffer available (e.g. sender sent flit without flit credits). |
| | Interface | | A flit was received on an unsupported VL. |
| | Interface | | Sender received an ACK with a sequence count that is outside of the sequence window for outstanding flits. |
| | Timing | One timing check to cover: - Training sequence failed - Flit timeout | Link training sequence was attempted and failed. |
| | Timing | | The flit timed out at the sender. |
| Electrical | Timing | Link dead | Link alive is not active. |

This section describes some error recovery procedures used at each layer of the Future I/O architecture.

The link layer is responsible for flit level error recovery procedures.

Three types of errors are detected at the flit level: interface checks, coding checks, and timing checks.

Three types of flit level interface checks are performed by the receiver as a result of checking the legitimacy of flit fields: insufficient virtual lane credit, invalid virtual lane, and invalid flit type. All three are logged as an interface check.

Three types of coding checks are performed by the receiver: a Link CRC check, an End—End CRC check, and valid 8b/10b code check. All three are logged as a coding check.

Two types of timing checks are generated at the flit layer: flit level timeouts which are detected by the sender and physical level (re)synchronization timing problems are surfaced to the receiver end. Both are logged as a timing check.

The following summarizes the responsibilities of the flit error management sender and receiver:

Sender
  Error Detection Responsibilities
  The sender is responsible for flit timeout checks.
    Error Retry Responsibilities
    The sender is responsible for retrying coding checks.
    (Error) Exception Responsibilities
    The sender is responsible for raising several exception checks: temporary retry counter threshold check, Ack flit interface checks, and coding counter threshold check.
    (Error) Counting and Threshold Exception Responsibilities
    The sender is responsible for maintaining a coding check counter, an interface check counter, and a timing check counter.
Receiver
  Error Detection Responsibilities
  The receiver is responsible for flit interface checks, coding checks, and timing checks.
  Error Retry Responsibilities
  The receiver is not responsible for link level retry.
  (Error) Exception Responsibilities
  The receiver is responsible for raising two exception checks: timing check and flit in-terface check.
  (Error) Counting and Threshold Exception Responsibilities
  The receiver is responsible for maintaining an interface check counter and a timing check counter.

GENERAL DISCUSSION

Figure 66:
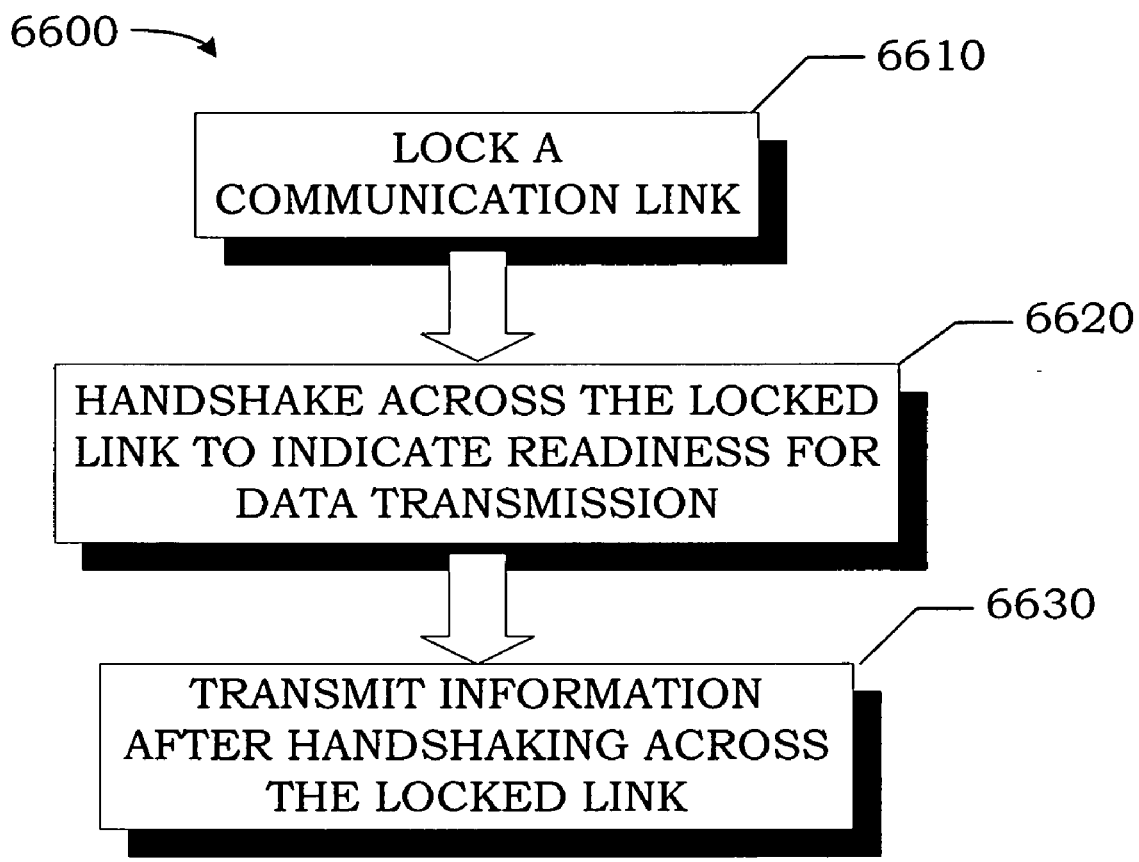
FIG. 66 illustrates one particular embodiment of a method for training a link for communicating information in a computing system.

FIG. 66 illustrates one particular embodiment of a method 6600 for communicating information in a computing system. The method 6600, in one particular embodiment, is manifested in the computing system detailed above. Note that, although the embodiment detailed above implements the FIO specification the invention is not so limited. Alternative embodiments may implement different technologies, e.g., the InfiniBand Specification. One such alternative embodiment is discussed further below.

Turning now to FIG. 66, the method 6600 begins by first locking a communications link, as set forth in the box 6610; followed by handshaking across the locked link, as set forth in the box 6620; before transmitting data over the locked link, as set forth in the box 6630. The computing system includes at least two "ports," each of which includes a transmitter and a receiver. Generally speaking, the method 6600 is implemented by at least two ports in a computing system transmitting a first training sequence TS1 of code groups and a second training sequence TS2 of code groups.

A port transmits the first training sequence TS1 to alert a receiving port to configure its receiver.

Thus, one particular aspect of the method 6600 is the locking and handshaking in the boxes 6610, 6620 of FIG. 66, which is a method for "training" links between ports in a computing system. FIG. 67 illustrates one particular implementation 6700 of this aspect of the method 6600 shown in FIG. 66. The method 6600, generally comprises:

transmitting a first training sequence from a first port and a second port, as set forth in the box 6610; and synchronizing the receipt of the first training sequence at the first and second ports, as set forth in the box 6620;

transmitting a second training sequence from the first and second ports upon the synchronized receipt of the first training sequence at the first and second ports, as set forth in the box 6630; and receiving the second training sequence transmitted by the first and second ports and the second and first ports, respectively, in synchrony, as set forth in the 6640.

Note that, in the present context, "synchrony" or "synchronization" means that the receivers of the means that the receivers of the involved ports are configured and are ready for data transmission. What this involves will depend on the particular implementation. For instance, an implementation employing parallel links will need to be de-skewed, which would not be necessary in a serial implementation.

The composition of the first and second training sequences will also be implementation specific. For instance, an embodiment implementing an FIO system will use the following training sequences:

TS1: K28.5 D10.2 D10.2 D10.2 D10.2 D10.2 D10.2 D10.2

TS2: K28.5 D21.5 D21.5 D21.5 D21.5 D21.5 D21.5 D21.5

The FIO Specification employs 8b/10b coding, which coding is well known in the art. The code group K28.5 is a comma control symbol, which may also be implemented using the K28.1 or a K28.7 comma control symbols. An embodiment implementing an InfiniBand system will use the following training sequences:

TS1: K28.5 LID D10.2 D10.2 D10.2 D10.2 D10.2 D10.2

TS2: K28.5 LID D5.2 D5.2 D5.2 D5.2 D5.2 D5.2 D5.2 where the LID code group is a lane identifier used for lane reordering in InfiniBand systems. Note also that the D10.2 and D21.5 code groups in the TS1 and TS2 in a FIO system are 1's complements, which means that one cannot check for data inversion in an FIO system. Since the D10.2 and D5.2 are not 1's complements, this is not an issue in an InfiniBand system.

INFINIBAND IMPLEMENTATION

In order that those having the benefit of this disclosure may appreciate the invention more fully, FIG. 68 illustrates an exemplary computing system 6800 on which the method 6600 of FIG. 66 may be implemented. This illustrated embodiment 6800 will employ the implementation 6700 of FIG. 67. Note, however, that the present invention may be implemented on a wide variety of computing systems and is not limited to the exemplary computing system disclosed herein.

Turning now to FIG. 68, an exemplary computing system 6800 includes a central computer 6810 coupled to an external storage tower 6820 and a system router 6830 via a multiservice switch 6840. Storage tower 6820 may be internally connected by a Fibre Channel, SCSI, or any suitable storage system. The system router 6830 may be connected to a local area network ("LAN") or Integrated Services Digital Network ("ISDN") system or it may provide a connection to the Internet via a suitable asynchronous transfer mode ("ATM") system. It should be appreciated that any number of computers, servers, switches, hubs, routers, or any suitable system device can be coupled to the system shown in FIG. 68.

In the illustrated embodiment, the devices are connected via a point to point serial link 6850. The serial link may comprise an even number of lanes or channels through which data is transmitted. Of the even number of lanes, half will transmit serial data in one direction while the other half transmits data in the opposite direction. In the preferred embodiment, the physical links will implement 1, 4, or 12 lanes in each direction. Thus, each link will have a total of 2, 8, or 24 total lanes. Note that alternative implementations may employ alternative kinds of links.

In the latter two implementations (i.e., the 4 and 12 lane links), a single stream of bytes arriving at the input to the physical link are distributed evenly, or "striped", among the multiple lanes. In the case of the 12-lane link, the first byte is sent to the first lane, the second byte is sent to the second lane and so on until the 12th byte is sent to the 12th lane. At that point, the byte distribution cycles back to the first lane and the process continues. Thus, over time, each lane will carry an equal 1/12th share of the bandwidth that the entire link carries. The same process and technique are used in the 4 lane link. Alternative embodiments with different numbers of lanes would preferably implement this striping process.

Once the bytes are distributed among the individual lanes, the 8-bit words (i.e., bytes) are encoded into 10-bit words, serialized, and transmitted through the physical link. At the output of the physical link, the 10-bit words are decoded back to 8-bit bytes and are re-ordered to form the original stream of 8-bit words.

Figure 69:
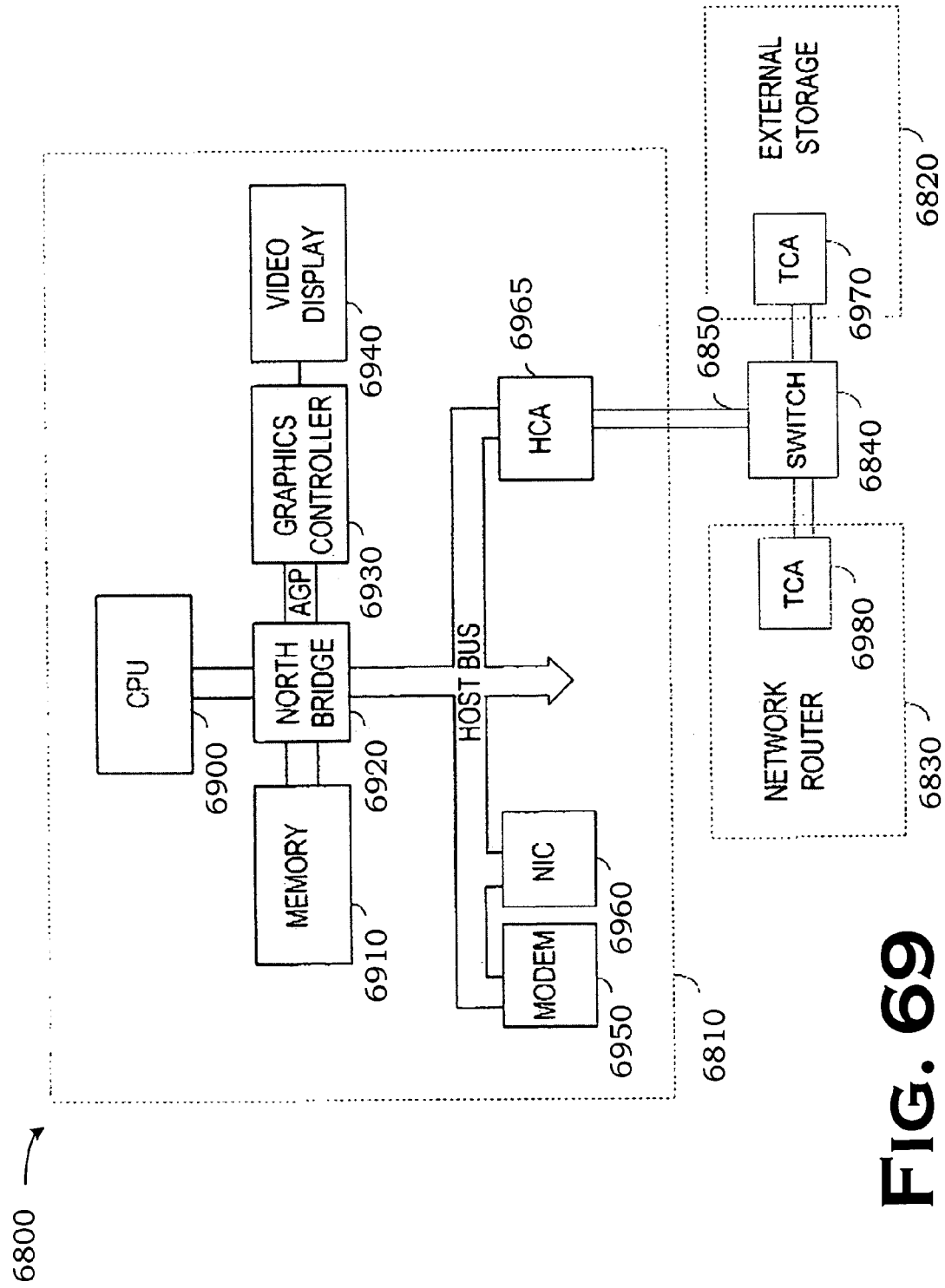
FIG. 69 shows a functional block diagram of the computing system in FIG. 68.

FIG. 69 represents a functional block diagram of the computer system shown in FIG. 68. The computer 6810 generally includes a central processor unit ("CPU") 6900, a main memory array 6910, and a bridge logic device 6920 coupling the CPU 6900 to the main memory 6910. The bridge logic device is sometimes referred to as a "North bridge" for no other reason than it often is depicted at the upper end of a computer system drawing. The North bridge 6920 couples the CPU 6900 and memory 6910 to various peripheral devices in the system through a primary expansion bus (or "Host Bus") such as a Peripheral Component Interconnect ("PCI") bus or some other suitable architecture.

The North bridge logic 6920 also may provide an interface to an Accelerated Graphics Port ("AGP") bus that supports a graphics controller 6930 for driving the video display 6940. If the computer system 6810 does not include an AGP bus, the graphics controller 6930 may reside on the host bus.

Various peripheral devices that implement the host bus protocol may reside on the host bus. For example, a modem 6950, and network interface card ("NIC") 6960 are shown coupled to the host bus in FIG. 69. The modem 6950 generally allows the computer to communicate with other computers or facsimile machines over a telephone line, an ISDN line, or a cable television connection, and the NIC 6960 permits communication between computers over a LAN (e.g., an Ethernet network card or a Cardbus card).

These components may be integrated into the motherboard or they may be plugged into expansion slots that are connected to the host bus.

FIG. 69 also depicts a host channel adapter ("HCA") 6965 connected to the host bus and target channel adapters ("TCA") 6970, 6980 connected to the external system devices 6820, 6830. These channel adapters generally provide address and translation capability for the switched topology architecture in the preferred embodiment. The channel adapters 6965, 6970, 6980 preferably have dedicated Internet Protocol, Version 6 ("IPv6") addresses that can be recognized by the system switch 6840. As data is transmitted to the system, the source file is divided into packets of an efficient size for routing. Each of these packets is separately numbered and includes the address of the destination. When the packets have all arrived, they are reassembled into the original file. The system switch 6840 in this preferred embodiment can detect the destination address, and route the data to the proper location.

FIG. 69 also shows the physical links 6850 between the system devices as simple two lane links. In the embodiment shown in FIG. 69, data would flow through one lane in one direction while data would flow through the parallel lane the other direction. As discussed above, alternative embodiments comprising any even number of lanes are also permissible, with 2, 8, and 24 lanes per link being the preferred number. Note that, in an FIO implementation, there would be 10 lanes. However, any even number may be valid depending on the technology being implemented.

Figure 70:
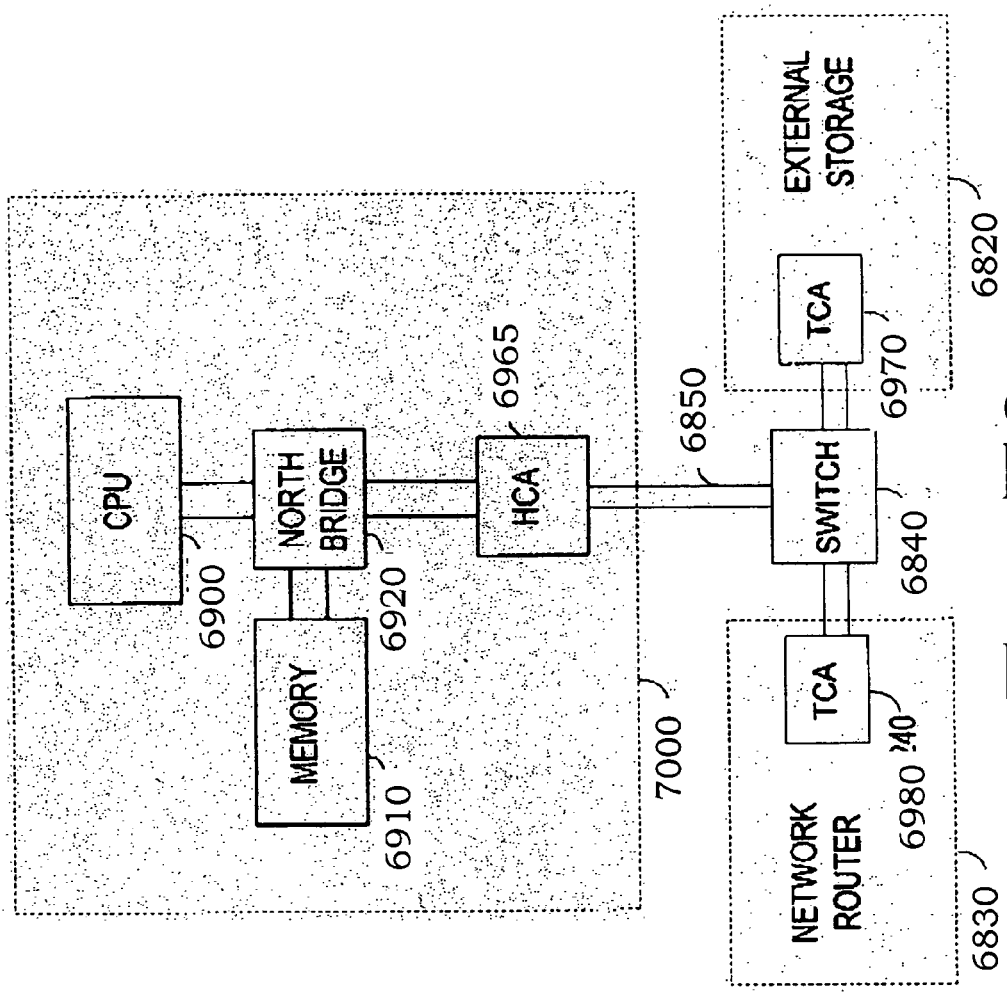
FIG. 70 shows a functional block diagram of computing system alternative to that in FIG. 69.

FIG. 70 shows an alternative embodiment of the computer system in which the computer 6810 is replaced by a server 7000 with a simple memory-processor architecture. Such a server may be part of a cluster of servers, a group of several servers that share work and may be able to back each other up if one server fails. In this particular embodiment, the server 7000 is coupled to the switched-fabric system in much the same way the computer 6810 of FIG. 68 is connected. The physical link 6850 is connected to the server via a host channel adapter ("HCA") 6965. However, in this embodiment, the HCA 6965 is connected directly to a North Bridge 6920. Alternatively, the HCA 6965 may be connected directly to a memory controller. In either event, a shared peripheral bus, such as a PCI bus, is not necessary in this embodiment. A peripheral bus may still be used in the server 7000, but is preferably not used to couple the north bridge 6920 to the HCA 6965.

As discussed above the serial data sent through the physical links is sent in the form of packets. The preferred embodiment employs packetized data and uses specialized packets, more precisely known as ordered sets, that are called Training Sequence 1 ("TS1") and Training Sequence 2 ("TS2") to train the system devices prior to transmitting "real" data through the switched system. The actual content and structure of the training sequences are discussed in further detail above, for an FIO implementation, and below, for an InfiniBand implementation.

Figure 71:
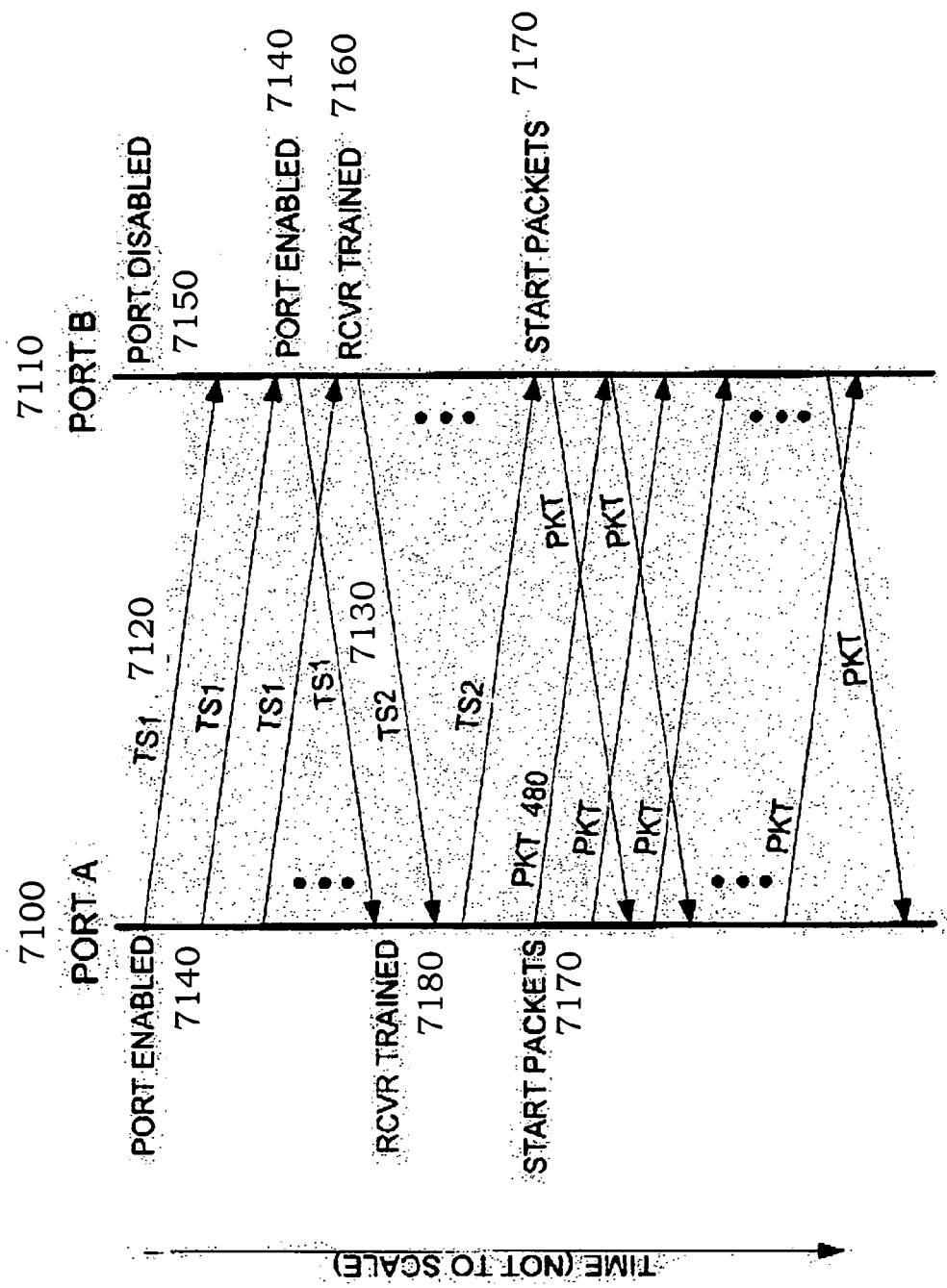
FIG. 71 shows a ladder diagram of a training sequence in accordance with the present invention used to train ports.

FIG. 71 shows a link training ladder diagram describing the sequence of events during the training of ports located on either side of the physical link. In the preferred embodiment, a port refers to a transmitting and receiving device configured with a channel adapter to communicate via a serial link. In FIG. 71, Port A 7100 refers to one such device while Port B 7110 refers to the device at the other end of the serial link.

The training data, TS1 7120 and TS2 7130 are known data that are transmitted between Port A 7100 and Port B 7110. The training sequences perform at least two functions. First, the initiation and duration of the training sequence is established by the transmission and reception of the training sequences. Secondly, given that the training sequences contain pre-determined data, the transmit and receive ports can use this knowledge to correct for any problems (e.g., data inversion, lane order, lane skew) that may be encountered. Since these problems constant and permanent conditions of the physical media, the training sequence may be used to automatically correct the errors for all subsequent data transferred through that physical link.

FIG. 71 represents a time line for both Port A 7100 and Port B 7110 with time elapsing toward the bottom of the figure. Before training begins, Port A 7100 may exist in an enabled state 7140 while Port B is in a disabled or link down state 7150. By transmitting an initial sequence of TS1 training sequences 7120, Port A 7100 can effectively wake up Port B 7110 from a disabled state to an enabled state 7140. Once Port B is enabled 7140, two things occur. First, Port B 7110 will begin transmitting TS1 training sequences back to Port A 7100. Secondly, Port B 7110 will check the content of the incoming TS1 training sequences 7120 to see if the data was received as it was sent. If there is any discrepancy, Port B 7110 will correct the incoming signals so that the original content of TS1 7120 is restored. At this point, Port B 7110 will be trained 7160 and will respond by sending the second training sequence, TS2 7130, back to Port A 7100. Note the symmetry of the ports' operation.

Note also that the order in which Port A 7100 and Port B 7110 configure their receivers is irrelevant in this particular implementation. Thus, regardless of what Port A 7100 is doing, Port B 7110 can come out of reset and immediately transmit the TS1 and, upon receipt of another TS1 transmitted by another port (regardless of whether that port is Port A 7100), begin transmitting TS2. Port A 7100 can begin doing the same thing. When both Port A 7100 and Port B 7110 are transmitting TS2, they can then begin transferring information to each other. The process is scalable across an entire computing system comprising many ports.

Meanwhile, Port A 7100 has been receiving TS1 data 7120 from Port B 7110 and performs the same signal integrity checks and correction that Port B has completed. Once both ports are trained with TS1 data 7120, the ports will proceed by sending TS2 training data 7130. This second training sequence serves as a redundancy check to verify that the Ports were trained properly with TS1 data 7120. In addition, the TS2 data 7130 signifies that both ports are trained and are ready to transmit and receive data packets 7170. Once a port is transmitting and receiving the TS2 training sequence, it may begin sending data. With physical link errors corrected by the training sequences, the data packets 7180 can then transmitted and received by the ports as intended.

In the event the training sequence fails, a timeout may occur and the affected port may be powered down or otherwise deactivated. Thus, when a transmission fault occurs, locating the problems in the physical link is facilitated by determining which port has been deactivated. By comparison, failure isolation in a bus architecture can be difficult because if one attached device fails, the entire system may fail. Discovering which device caused the failure is typically a hit-or-miss proposition.

FIG. 72 shows the actual format and content of the training sequences TS 1 and TS2 for an implementation according to the InfiniBand specification. In the preferred embodiment, each training sequence is 16 words long. It should be appreciated however, that training sequences of different lengths are certainly possible. The width of the training sequence corresponds to the number of physical lanes in a training sequence. In the preferred embodiment, the training sequences are 1, 4, or 12 words wide corresponding to the 1, 4, and 12 lanes in the preferred embodiment of the physical link. Certainly, other combinations of lane quantities are possible, but the width of the training sequence corresponds to the number of lanes in the physical link. The embodiment shown in FIG. 72 corresponds to a 4 lane link.

Each word in the training sequence is a 10-bit word that complies with the 8B/10B code discussed above. The first row (COM) in each column is a comma delimiter with a preferred code name K28.5. The second row in each column is a lane identifier that is unique to each lane in the physical link. A table of preferred lane identifiers is shown in FIG. 73. In a single lane link, only lane identifier 0 is used. In a 4 lane link, lane identifiers 0, 1, 2, and 3 are used. In a 12 lane link, all twelve lane identifiers shown in FIG. 73 are used. After the lane identifier, the remaining 14 rows of the 16 row training sequences are repeated 10-bit words. For training sequence 1, the repeated word name is D10.2. For training sequence 2, the repeated word name is D5.2.

The comma delimiter and lane identifiers are chosen to be insensitive to data inversion. That is, inverting a comma delimiter or a lane identifier symbol changes only the running disparity and not the symbol itself. Consider the 10-bit word for the comma delimiter K28.5. For a negative running disparity, the word is 001111 1010. For a positive running disparity, the word is 110000 0101. These two words are complements of each other. Inverting all the bits in the first word will yield the second word and vice-versa.

Hence, regardless of whether or not a bit inversion has occurred in the physical link, when the receiver port decodes this word, the comma delimiter will result. The same is also true for each of the lane identifiers in FIG. 73. For each lane identifier, the 10-bit words for negative running disparity are the complement of the 10-bit word for positive running disparity. Thus, a receiver will always know when a comma delimiter has arrived and which lane identifier corresponds to a given bit stream. The preferred code names selected for the comma delimiter and the lane identifiers were selected because of their inversion properties. Other code words exhibiting the same properties will also work in alternative embodiments.

To correct for a crossed differential pair (i.e., bit reversal in a lane), a receiver will decode the 10-bit words arriving in a particular bit stream and determine when the training data starts (as marked by the comma delimiter) and determine the lane number (as marked by the lane identifier). For training sequence 1, the preferred 10-bit code name is D10.2 and the bit sequence for positive running disparity is 010101 0101. The D10.2 code word is chosen for the training sequence because it uses the exact same code word for negative running disparity as it does for positive running disparity. Thus, the receiver expects to receive the 010101 0101 sequence repeated 14 times for each TS1 regardless of the current state of the running disparity. However, if the complementary code word is received (101010 1010), a completely different word is decoded. The inverted word corresponds to the D21.5 code word. If the receiver decodes this inverse word, the decoder will be configured to invert all the subsequent bits received in that particular lane.

The same conditions hold true for training sequence number 2. For training sequence 2, the preferred 10-bit code name is D5.2 and the bit sequence for both positive and negative running disparity is 0101001 0101. The inverted code word (010110 1010) corresponds to code name D26.5. Again, the receiving port will attempt to recover the correct polarity by inverting a bit stream if the D26.5 code words are received. The preferred code names selected for training sequence 1 and training sequence 2 were selected because of their inversion properties. Other code words exhibiting the same properties will also work in alternative embodiments.

Figure 74:
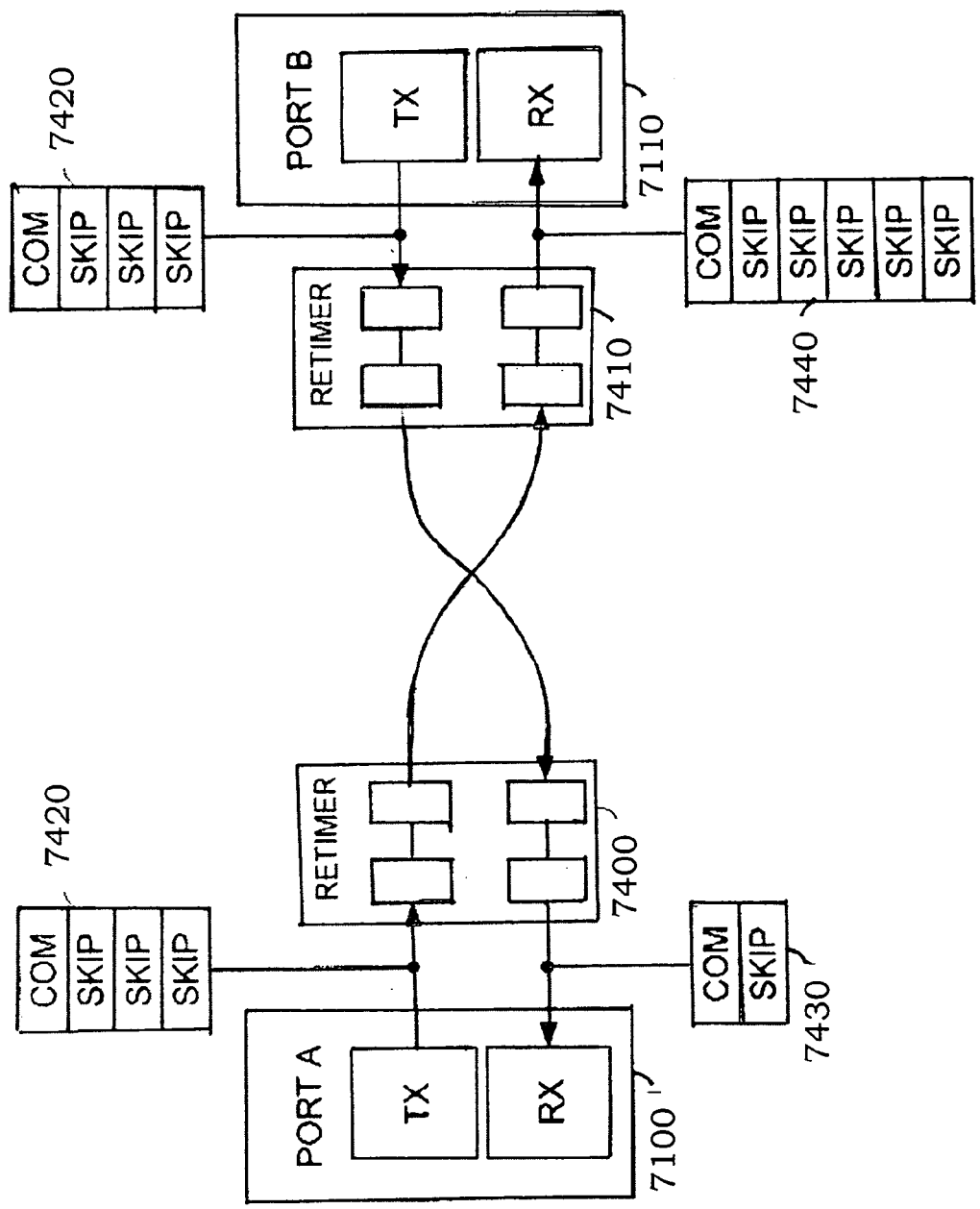
FIG. 74 shows a functional block diagram of a serial physical link.

FIG. 74 shows a block diagram of a preferred embodiment of a serial physical link. Included in the link are Port A 7100 and Port B 7110 as discussed above. The link shown in FIG. 74 is a 2-lane link with one lane configured to transmit in one direction and the other lane configured to transmit in the opposite direction. Included in the link are retimers 7400, 7410 located at opposite ends of the link. Retimers 7400, 7410 provide a means of compensating for minor clock tolerances that result in different clock rates between Port A 7100 and Port B 7110. To compensate for these clock differences, a data packet called a SKIP ordered set 7420 is transmitted at regular intervals amidst the training, data, or idle data packets. In the preferred embodiment, the SKIP ordered sets 7420 are inserted every 4608 symbol clocks and include a COM delimiter followed by three SKIP words. As with the training sequences, the SKIP ordered sets 7420 are as wide as the number of lanes in the link. In FIG. 74, the link contains only one lane, so the SKIP ordered sets 7420, contain only one column of 10-bit words.

If a delay is needed to compensate for advanced clock timing, the retimers 7400, 7410 may insert an additional SKIP word to delay the arrival of subsequent data at the receiving end of the link. This scenario is depicted by the SKIP ordered set 7440 shown at the receiver of Port B 7110. SKIP ordered set 7440 includes two additional SKIP words that have been added by retimer 7400 and retimer 7410. Consequently, a SKIP ordered set that started with three SKIP words now has a total of five SKIP words. Conversely, if an advance is needed to compensate for delayed clock timing, the retimers 7400, 7410 may remove an existing SKIP word to advance the arrival of subsequent data at the receiving end of the link. SKIP ordered set 7430 shows an example of this scenario. SKIP ordered set 7430 contains only one SKIP word as a result of the removal of one SKIP word each by retimer 7400 and retimer 7410. By compensating for clock tolerances, the link and the Ports on either end of the link can operate in a common clock domain.

In the preferred embodiment, the SKIP word name is K28.0 and the associated 10-bit word is 001111 068100 for negative running disparity and 110000 1011 for positive running disparity. As is the case with the COM and lane identifier words, the SKIP word is insensitive to bit inversion. Other code words exhibiting the same property will also work in alternative embodiments.

Figure 75:
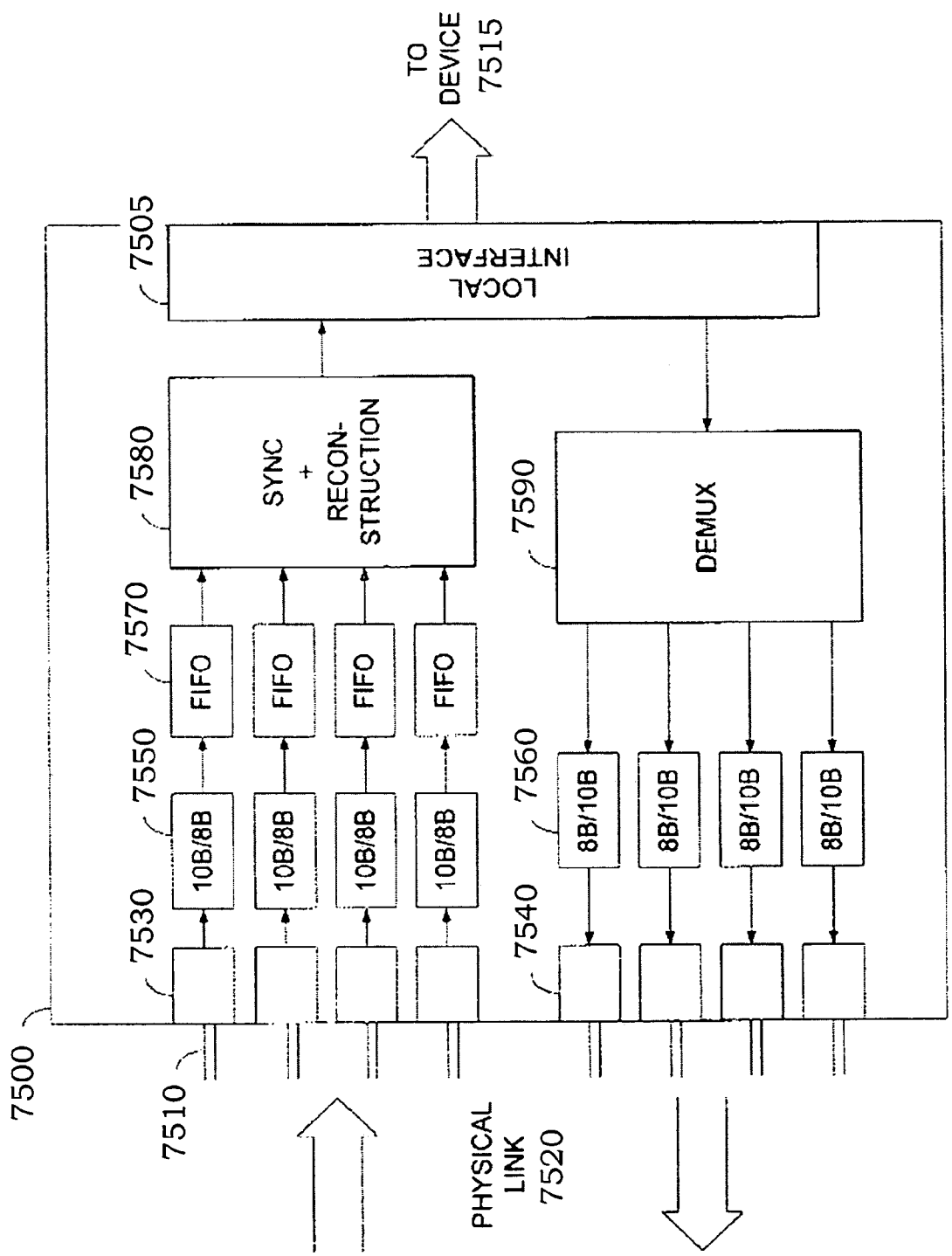
FIG. 75 shows a functional block diagram of an adapter configured to transmit and receive differential signals.

FIG. 75 shows a block diagram of an adapter 7500 configured to convert signals transmitted to and received from a physical link 7520. The adapter may be coupled to or otherwise form a part of a port and/or a channel adapter. The adapter 7500 is coupled to differential wires or traces 7510 in the physical link. Differential signals received from the physical link 7520 are detected by a lane receiver 7530 that converts the differential signals to a bit stream that is sent to a 10B/8B decoder 7550. The decoder converts the 10 bit words received from the individual lanes into 8 bit words that are directed to the FIFO buffers 7570. In an alternative embodiment, the FIFO buffers 7570 may precede the 10B/8B decoders. After the 10B/8B decoders and FIFO buffers, the 8-bit words are synchronously clocked into a multiplexer or other suitable logic device 7580 to reconstruct a single byte stream from the individual byte streams. The byte stream is then sent to a local interface 7505 for transmission to the local device 7515.

The adapter 7500 may also convert signals for transmission to a physical link 7520. A byte stream from a local device 7515 is detected and transmitted to a demultiplexer 7590 that stripes bytes from the single byte stream across a number of individual byte streams. FIG. 75 depicts four lanes in the physical link, but this quantity may be different and may depend on whether the link is coupled to a single channel adapter. The individual byte streams are then coded by the 8B/10B encoders and the resulting bit streams are delivered to lane adapters 7540 which convert the bit streams to differential signals for transmission across wire pairs or traces 7510 in the physical link 7520.

Figure 76:
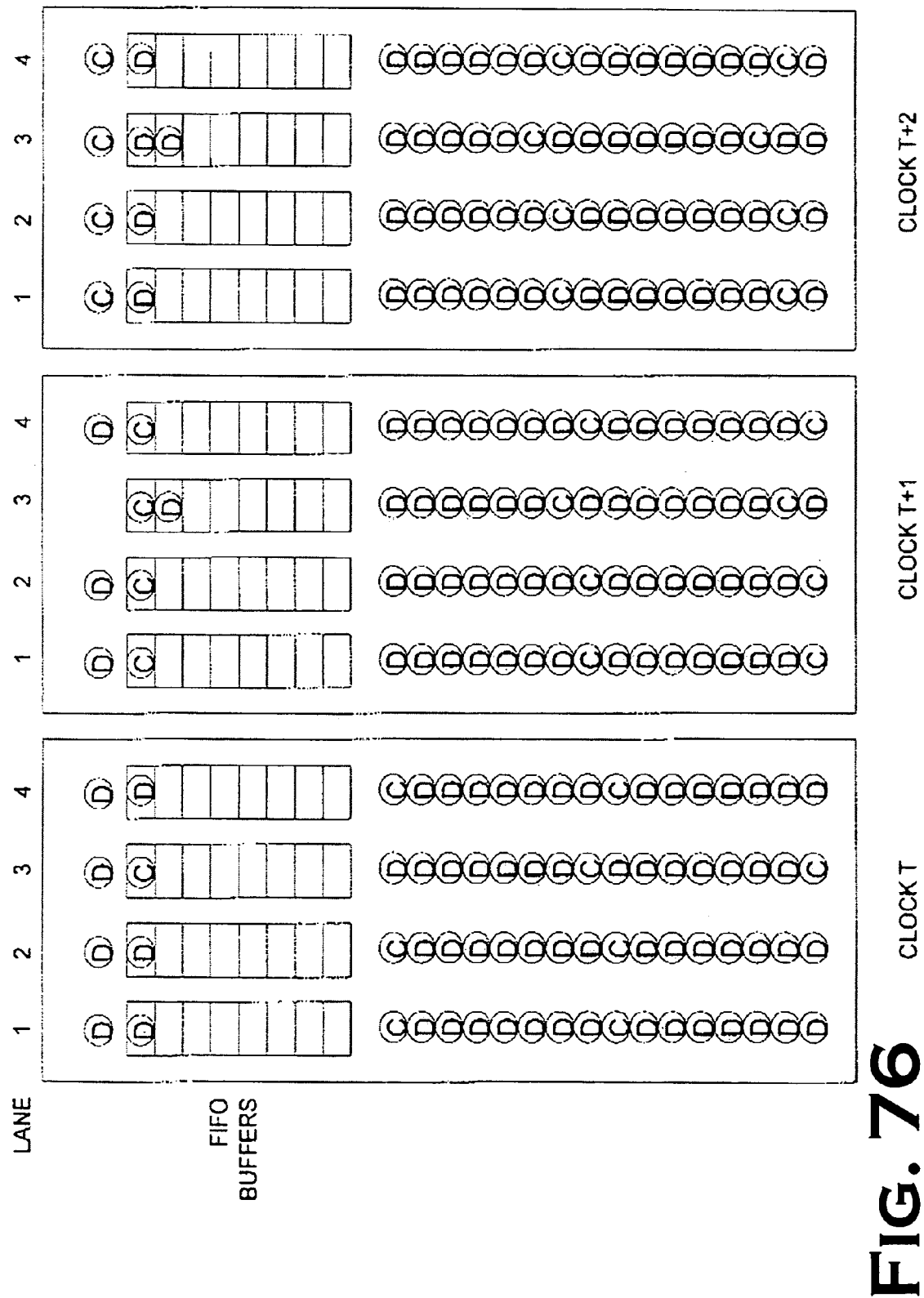
FIG. 76 symbolically represents a de-skew method used in the illustrated embodiment.
Figure 77:
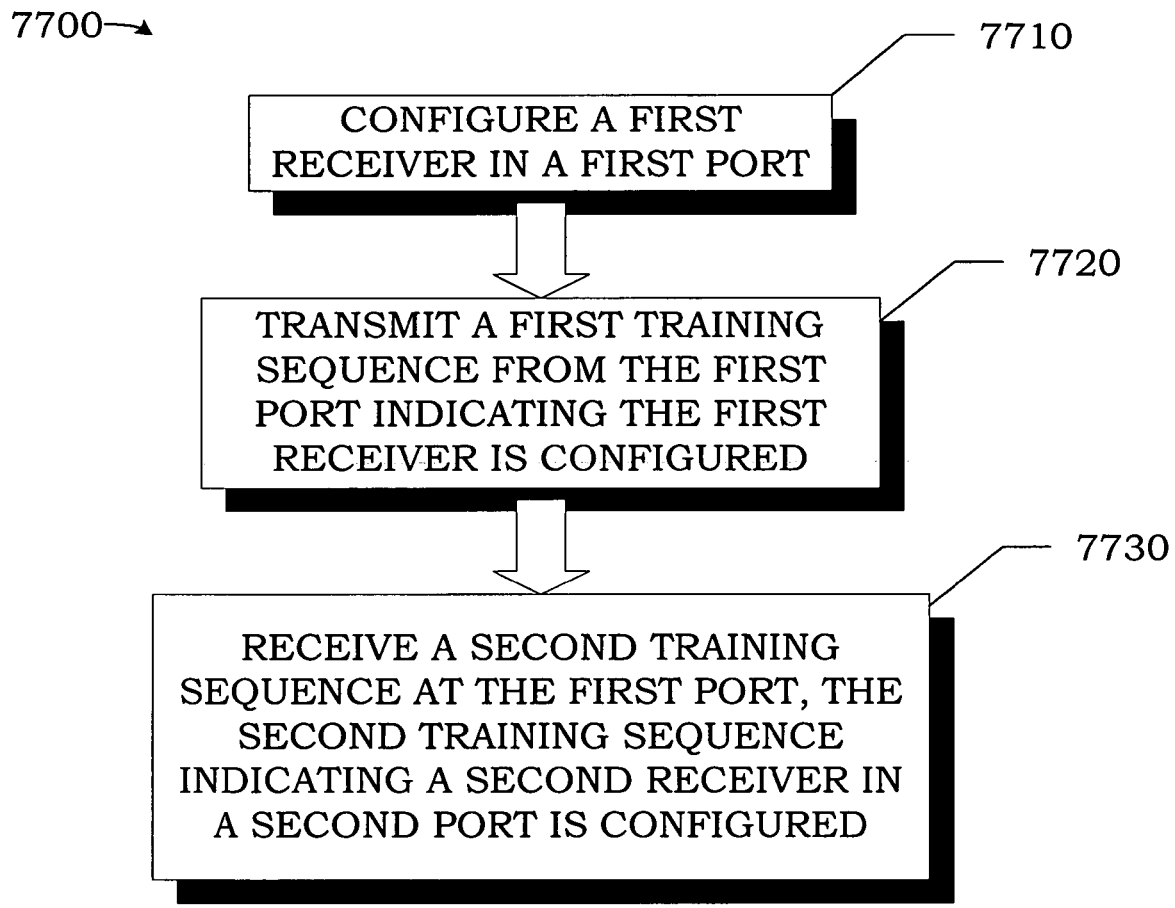
FIG. 77 shows a method embodiment.

FIG. 76 shows a symbolic representation of the preferred de-skew method using a bank of synchronous first-in, first-out ("FIFO") register buffers. Logic in the port receivers search the data stream for the 8B/10B COM delimiter which signifies the start of a training sequence. When a comma is found in any stream, that stream is held in a FIFO buffer pending appearance of commas in the other data streams. When commas are present on all lanes, the link is de-skewed and the comma symbol group may then be discarded. When data symbols are present on all lanes, the words form a valid data symbol group and reconstruction of the original word stream is possible.

Referring to FIG. 76, the individual blocks depict the contents of a 4 lane link at various clock times during a training sequence. Hence, each lane of the link contains training sequence data consisting of a COM delimiter followed by repeated D10.2 or D5.2 words. For clarity, the words have been depicted as individual balloons marked with a C for COM and D for a D10.2 or D5.2 word. Also for clarity, the length of the training sequence has been shortened from the preferred length of 16 to 8. One word at a time is read into the FIFO buffers at the top of the block. The buffers may or may not shift out a word depending on the contents of the uppermost location in the buffer.

The leftmost block of FIG. 76 represents the contents of the four FIFO buffers and the four lanes at a clock time T. In this example, FIFO number 3 has a COM delimiter in the uppermost location of the buffer. In accordance with the description above, at the next clock time, FIFO number 3 will keep this word in the upper buffer and read a new word from lane 3 into the buffer. Since the other FIFOs do not contain a COM word, the contents of those buffers will be discarded at the next clock time.

The center block of FIG. 76 represents the contents of the buffers and lanes at clock time T+1. All four buffers read in a new word from their respective lanes and once again, the associated logic checks for COM words. In this particular example, all four FIFOs now have COM words located in the uppermost buffer location. As a result, all lanes have been de-skewed and at the next clock time, the COM words can be discarded.

The rightmost block of FIG. 76 represents the contents of the buffers and lanes at clock time T+2. The COM words have been shifted out of the buffers and all subsequent words will be synchronized. Note that FIFO number 3 still holds two words in the buffer. This ensures the continuous arrival of de-skewed data and facilitates the reconstruction of the original word stream.

The preferred embodiment discussed above uses a bank of synchronous FIFO register buffers, but other embodiments may work. For instance, the buffers and related logic may be implemented using a field-programmable gate array ("FPGA") or any other suitable programmable logic device ("PLD").

To prevent buffer overflow, a time limit is implemented on attempting to locate COM words across each lane of the link. In the preferred embodiment, a time limit of 4 clock times is used. This time limit corresponds to one fourth of the length of the training sequence. If COM words cannot be found across all lanes of the link within four clock times, the buffers are cleared and the de-skew process is restarted. By limiting the time required to de-skew the multiple lanes, the size of the FIFOs may be reduced and the logic required to implement the de-skew is simplified.

In addition to correcting static skew errors as discussed above, the synchronous FIFOs may advantageously provide an additional measure of correction for active skew errors such as jitter and drift. The receiver in each channel in the link is frequency and phase locked to the transmitter, but the active components in the physical link responsible for serial/parallel conversion and the retimers 7400, 710 shown in FIG. 74 may induce drift and jitter and other dynamic skew. The common clock in the FIFOs may advantageously recover synchronization of each individual channel.

Thus, the present invention manifests many advantageous characteristics in its various embodiments and implementations. In an implementation in accordance with the Infini-Band Specification, the present invention provides techniques for:

automated crossed differential pair correction, which is disclosed more fully and claimed in U.S. patent application Ser. No. 09/597,192, filed Jun. 20, 2000, entitled "High Speed Interconnection Adapter Having Automated Crossed Differential Pair Correction," naming William Bunton, Patricia Whiteside, and John Krause as inventors, and commonly assigned herewith;

automated lane de-skew, which is disclosed more fully and claimed in U.S. patent application Ser. No. 09/596,980, filed Jun. 20, 2000, entitled "High-Speed Interconnection Adapter Having Automated Lane De-Skew," naming William Bunton, Patricia Whiteside, and John Krause as inventors, and commonly assigned herewith; and automated lane re-ordering., which is disclosed more fully and claimed in U.S. patent application Ser. No. 09/597,190, filed Jun. 20, 2000, entitled "High-Speed Interconnection Link Having Automated Lane Reordering," naming William Bunton, Patricia Whiteside, and John Krause as inventors, and commonly assigned herewith.

However, the FIO embodiment also manifests many advantageous characteristics as is evident from the discussion above. Still other advantages may become apparent to those skilled in the art having the benefit of this disclosure.

MORE GENERAL DISCUSSION

Note that, in some embodiments, the first and second training sequences may be identical, or match. More particularly, if the ports have an automatic configuration capability for their receivers, the first and second training sequences may match as long as they indicate the true state of the receiver. In this instance, the method 6600 in FIG. 66 may be implemented as the method 7700 in FIG. 77. More particularly, the method 7700 calls for:

configuring a first receiver in a first port, as set forth in the box 7710;

transmitting a first training sequence from the first port indicating the first receiver is configured, as set forth in the box 7720; and receiving a second training sequence at the first port, the second training sequence indicating a second receiver in a second port is configured, as set forth in the box 7730.

Note that the training sequence may be either the TS1 or the TS2 depending on the implementation, whose compositions will be implementation specific as was discussed above.

This concludes the detailed description. Some portions of the detailed descriptions herein are consequently presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Furthermore, the particular embodiments disclosed above are illustrative only, as the invention may be modified and practiced in different but equivalent manners apparent to those skilled in the art having the benefit of the teachings herein. Although the present invention is one aspect of the FIO Architecture Specification, it is not so limited. The invention may be utilized in computing systems that do not employ FIO, as specified or even FIO, as may become apparent to those skilled in the art having the benefit of this disclosure. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The following documents are hereby incorporated by reference as if expressly set forth verbatim herein:

U.S. Provisional Application 60/154,150, filed Sep. 15, 1999, and entitled "Method and Apparatus for Transferring Data";

U.S. patent application Ser. No. 09/597,192, filed Jun. 20, 2000, entitled "High Speed Interconnection Adapter Having Automated Crossed Differential Pair Correction," naming William Bunton and John Krause as inventors;

U.S. patent application Ser. No. 09/596,980, filed Jun. 20, 2000, entitled "High-Speed Interconnection Adapter Having Automated Lane De-Skew," naming William Bunton and John Krause as inventors; and U.S. patent application Ser. No. 09/597,190, filed Jun. 20, 2000, entitled "High-Speed Interconnection Link Having Automated Lane Reordering," naming William Bunton and John Krause as inventors; and U.S. Provisional Application 60/135,664, filed May 24, 1999, and entitled "Method and Apparatus for Transferring Data".

What is claimed is:

1. A method for training a communication link that includes a plurality of data lanes coupling first and second ports in a computing system, the communication link is trained in order to correct for errors including data inversion, lane skewing and lane order errors that may be caused by the communication link, the method comprising:
    locking the communication link by transmitting a first link training sequence from the first and second ports and synchronizing the receipt of the first link training sequence at the first and second ports;
    handshaking across the locked link to indicate readiness for data transmission by sending a first link training sequence that contains a lane identifier of at least one of the plurality of data lanes from the first port to the second port;
    transmitting information after handshaking across the locked link; and
    using the first link training sequence to correct for errors caused by the communication link.

2. The method of claim 1, wherein synchronizing the receipt of the first link training sequence includes at least one of:
    synchronizing code group recognition; and
    de-skewing multiple physical links.

3. The method of claim 1, wherein transmitting the first link training sequence includes transmitting an 8b/10b special symbol followed by a repeated data symbol.

4. The method of claim 3, wherein the 8b/10b special symbol is a K28.5, K28.1, or a K28.7 comma control symbol.

5. The method of claim 3, wherein transmitting a comma control symbol followed by a repeated data symbol comprises transmitting the following sequence:
    K28.5 D10.2 D10.2 D10.2 D10.2 D10.2 D10.2 D10.2.

6. The method of claim 3, wherein transmitting the 8b/10b special symbol followed by a repeated data symbol includes transmitting the 8b/10b special symbol, followed by a lane identifying symbol, followed by the repeated data symbol.

7. The method of claim 1, wherein synchronizing the receipt of the first link training sequence includes:
    capturing a comma control symbol from the first link training sequence transmitted by the second port in a queue associated with the first port;
    clocking code groups from the first link training sequence transmitted by the second port into the first queue and bit groups from the first link training sequence transmitted by the first port into a queue associated with the second port until a comma control symbol from the first link training sequence transmitted by the first port is clocked into the queue associated with the second port; and
    clearing the queues if a comma control symbol is not clocked into the queue associated with the second port from the first link training sequence transmitted by the first port within N/2 clock cycles, where N is the length of the first link training sequence.

8. The method of claim 1, wherein handshaking across the locked link includes transmitting a second link training sequence from the first and second ports upon the synchronized receipt of the first link training sequence at the first and second ports.

9. The method of claim 8, wherein transmitting the second link training sequence includes transmitting a comma control symbol followed by a repeated data symbol.

10. The method of claim 9, wherein the comma control symbol is a K28.5, K28.1, or a K28.7 comma control symbol.

11. The method of claim 8, wherein transmitting the second link training sequence includes transmitting the following ordered set:
K28.5 D21.5 D21.5 D21.5 D21.5 D21.5 D21.5.

12. A method for training a link between first and second ports in a computing system in order to correct for errors that may be caused by the links, the method comprising:
transmitting a first link training sequence of code groups from the first port and the second port, wherein the first port and the second port are configured to send and receive data on a plurality of data lanes, and the first link training sequence of code groups contains a lane identifier of at least one of the plurality of data lanes;
synchronizing the receipt of the first link training sequence at the first and second ports; and
transmitting a second link training sequence of code groups from the first and second ports upon the synchronized receipt of the first link training sequence at the first and second ports; and
receiving the second link training sequence transmitted by the first and second ports and the second and first ports, respectively, in synchrony.

13. The method of claim 12, wherein transmitting the first link training sequence includes transmitting a comma control symbol followed by a repeated data symbol.

14. The method of claim 13, wherein the comma control symbol is a K28.5, K28.1, or a K28.7 comma control symbol.

15. The method of claim 13, transmitting a comma control symbol followed by a repeated data symbol comprises transmitting the following sequence:
K28.5 D10.2 D10.2 D10.2 D10.2 D10.2 D10.2.

16. The method of claim 13, wherein transmitting the 8b/10b special symbol followed by a repeated data symbol includes transmitting the 8b/10b special symbol, followed by a lane identifying symbol, followed by the repeated data symbol.

17. The method of claim 12, wherein synchronizing the receipt of the first link training sequence includes:
capturing a comma control symbol from the first link training sequence transmitted by the second port in a queue associated with the first port;
clocking bit groups from the first link training sequence transmitted by the second port into the first queue and code group from the first link training sequence transmitted by the first port into a queue associated with the second port until a comma control symbol from the first link training sequence transmitted by the first port is clocked into the queue associated with the second port; and
clearing the queues if a comma control symbol is not clocked into the queue associated with the second port from the first link training sequence transmitted by the first port within N/2 clock cycles, where N is the length of the first link training sequence.

18. The method of claim 12, wherein transmitting the second link training sequence includes transmitting a comma control symbol followed by a repeated data symbol.

19. The method of claim 12, wherein the comma control symbol is a K28.5, K28.1, or a K28.7 comma control symbol.

20. The method of claim 12, wherein transmitting the second link training sequence includes transmitting the following ordered set:
K28.5 D21.5 D21.5 D21.5 D21.5 D21.5 D21.5.

21. A method for training a link in a computing system having first and second ports each including a receiver and a transmitter in order to correct for errors that may be caused by the link, comprising:
configuring the receiver in the first port using a first link training sequence transmitted by the second port, wherein the first port is configured to send and receive data on a plurality of data lanes, and the first training sequence contains a lane identifier of at least one of the plurality of data lanes;
transmitting a second link training sequence from the first port to the second port indicating the receiver in the first port is configured; and
receiving the second link training sequence transmitted by the second port at the first port, the second link training sequence transmitted by the second port and received by the first port indicating that the receiver in the second port is configured.

22. The method of claim 21, wherein transmitting the first link training sequence includes transmitting an 8b/10b special symbol followed by a repeated data symbol.

23. The method of claim 22, wherein the 8b/10b special symbol is a K28.5, K28.1, or a K28.7 comma control symbol.

24. The method of claim 22, wherein transmitting a comma control symbol followed by a repeated data symbol comprises transmitting the following sequence:
K28.5 D10.2 D10.2 D10.2 D10.2 D10.2 D10.2.

25. The method of claim 22, wherein transmitting the 8b/10b special symbol followed by a repeated data symbol includes transmitting the 8b/10b special symbol, followed by a lane identifying symbol, followed by the repeated data symbol.

26. The method of claim 21, wherein transmitting the second link training sequence includes transmitting a comma control symbol followed by a repeated data symbol.

27. The method of claim 26, wherein the comma control symbol is a K28.5, K28.1, or a K28.7 comma control symbol.

28. The method of claim 21, wherein transmitting the second link training sequence includes transmitting the following ordered set:
K28.5 D21.5 D21.5 D21.5 D21.5 D21.5 D21.5.

29. The method of claim 21, further comprising transmitting data from one of the first or second ports to the other of the first and second ports.

* * * * *

UNITED STATES PATENT AND TRADEMARK OFFICE
CERTIFICATE OF CORRECTION

PATENT NO. : 7,010,607 B1 Page 1 of 1
APPLICATION NO. : 09/661214
DATED : March 7, 2006
INVENTOR(S) : William P. Bunton It is certified that error appears in the above-identified patent and that said Letters Patent is hereby corrected as shown below:

In column 27, line 56, delete "(GI)" and insert -- (G1) --, therefor.

Signed and Sealed this

Nineteenth Day of May, 2009

JOHN DOLL
*Acting Director of the United States Patent and Trademark Office*